(12) United States Patent
Choppla

(10) Patent No.: US 11,309,827 B2
(45) Date of Patent: Apr. 19, 2022

(54) SOLAR MOUNTING FRAME AND LIGHTING ASSEMBLY

(71) Applicant: Gulshan Prem Choppla, Montezuma, GA (US)

(72) Inventor: Gulshan Prem Choppla, Montezuma, GA (US)

( * ) Notice: Subject to any disclaimer, the term of this patent is extended or adjusted under 35 U.S.C. 154(b) by 0 days.

(21) Appl. No.: 16/036,858

(22) Filed: Jul. 16, 2018

(65) Prior Publication Data

US 2019/0013771 A1    Jan. 10, 2019

Related U.S. Application Data

(63) Continuation-in-part of application No. 14/834,396, filed on Aug. 24, 2015, now abandoned.

(51) Int. Cl.
| | |
|---|---|
| *H02S 20/23* | (2014.01) |
| *H02S 40/38* | (2014.01) |
| *H02S 40/20* | (2014.01) |
| *H02S 99/00* | (2014.01) |
| *G09B 5/00* | (2006.01) |
| *H02S 40/36* | (2014.01) |
| *F21S 11/00* | (2006.01) |
| *F21S 19/00* | (2006.01) |
| *F21V 23/04* | (2006.01) |
| *F21S 13/02* | (2006.01) |

(52) U.S. Cl.
CPC ............. *H02S 20/23* (2014.12); *F21S 11/007* (2013.01); *F21S 19/005* (2013.01); *G09B 5/00* (2013.01); *H02S 40/20* (2014.12); *H02S 40/36* (2014.12); *H02S 40/38* (2014.12); *H02S 99/00* (2013.01); *F21S 13/02* (2013.01); *F21V 23/0464* (2013.01)

(58) Field of Classification Search
CPC ........ F21S 11/007; F21S 13/02; F21S 19/005; F24S 25/12; F24S 10/50; G09B 5/00; G09B 5/06; H02S 20/20; H02S 20/23; H02S 40/20; H02S 40/36; H02S 99/00; Y02E 10/44; Y02E 10/50; Y02B 10/10; F21V 23/0464
See application file for complete search history.

(56) References Cited

U.S. PATENT DOCUMENTS

| | | | | |
|---|---|---|---|---|
| 4,620,771 | A * | 11/1986 | Dominguez | ............ F21S 11/00 359/591 |
| 5,062,247 | A * | 11/1991 | Dittmer | ................... E04D 13/03 52/200 |
| 5,078,047 | A * | 1/1992 | Wimberly | ............... E04D 13/17 454/366 |
| 6,060,658 | A | 5/2000 | Yoshida et al. | |
| 6,695,692 | B1 | 2/2004 | York | |
| 2010/0043869 | A1 | 2/2010 | Bennett et al. | |
| 2013/0307420 | A1 | 11/2013 | Yoder et al. | |
| 2013/0314929 | A1* | 11/2013 | Manahan | ................ F21V 29/20 362/373 |
| 2014/0007528 | A1* | 1/2014 | Keller | ..................... H02S 20/20 52/173.3 |
| 2016/0254774 | A1* | 9/2016 | Brady | .................... H02S 20/10 136/251 |

\* cited by examiner

*Primary Examiner* — Zheng Song
(74) *Attorney, Agent, or Firm* — Crose Law LLC; Bradley D. Crose

(57) ABSTRACT

A solar mounting frame for a ventilator apparatus includes: a solar mounting frame having four sides mounted to the ventilator; and a side solar mounting frame having two L-shaped angle rails to mount a solar panel.

9 Claims, 141 Drawing Sheets

Roof top Solar panel mounting frame come ventilator side to inside view with assembly parts

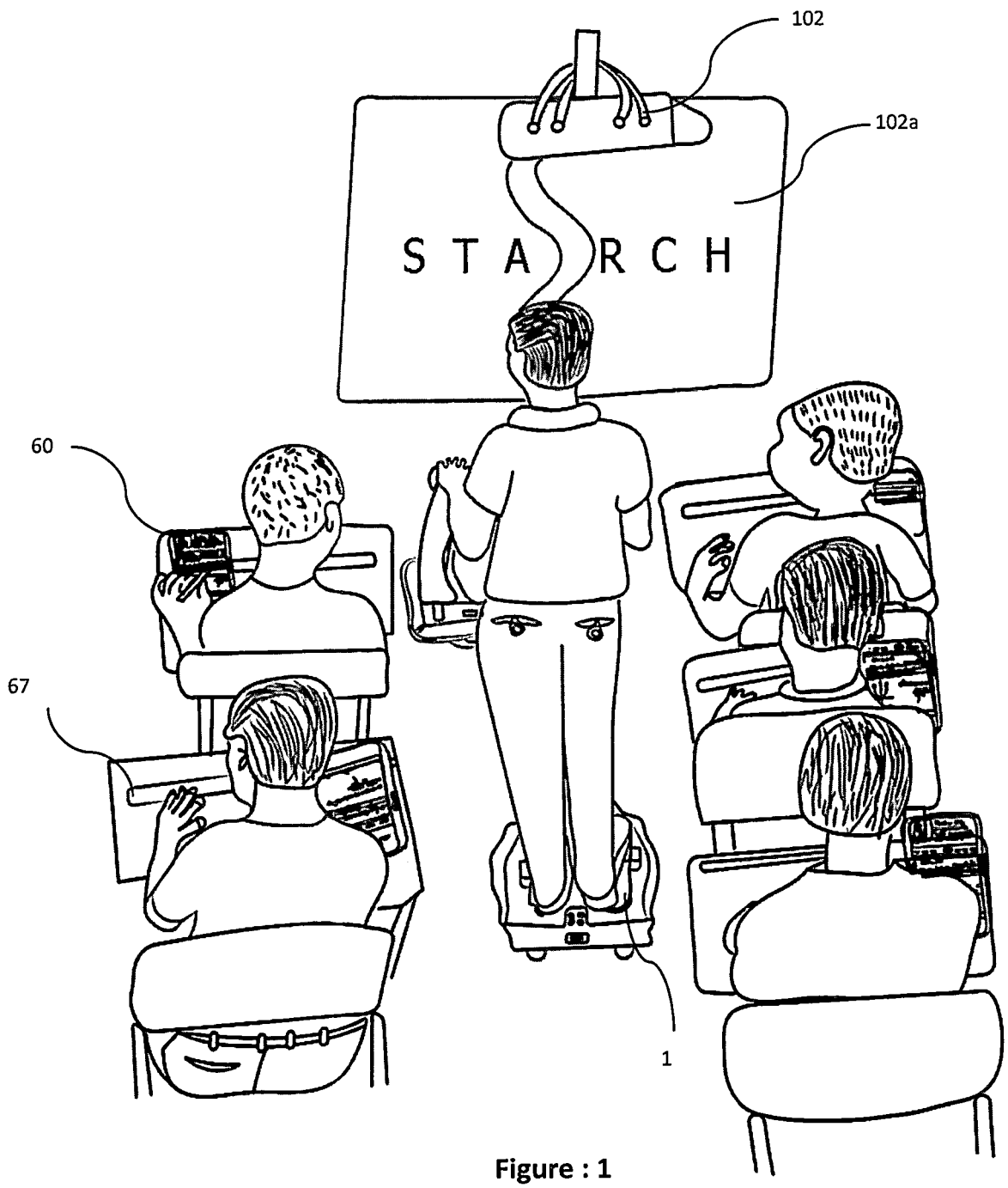
Figure : 1

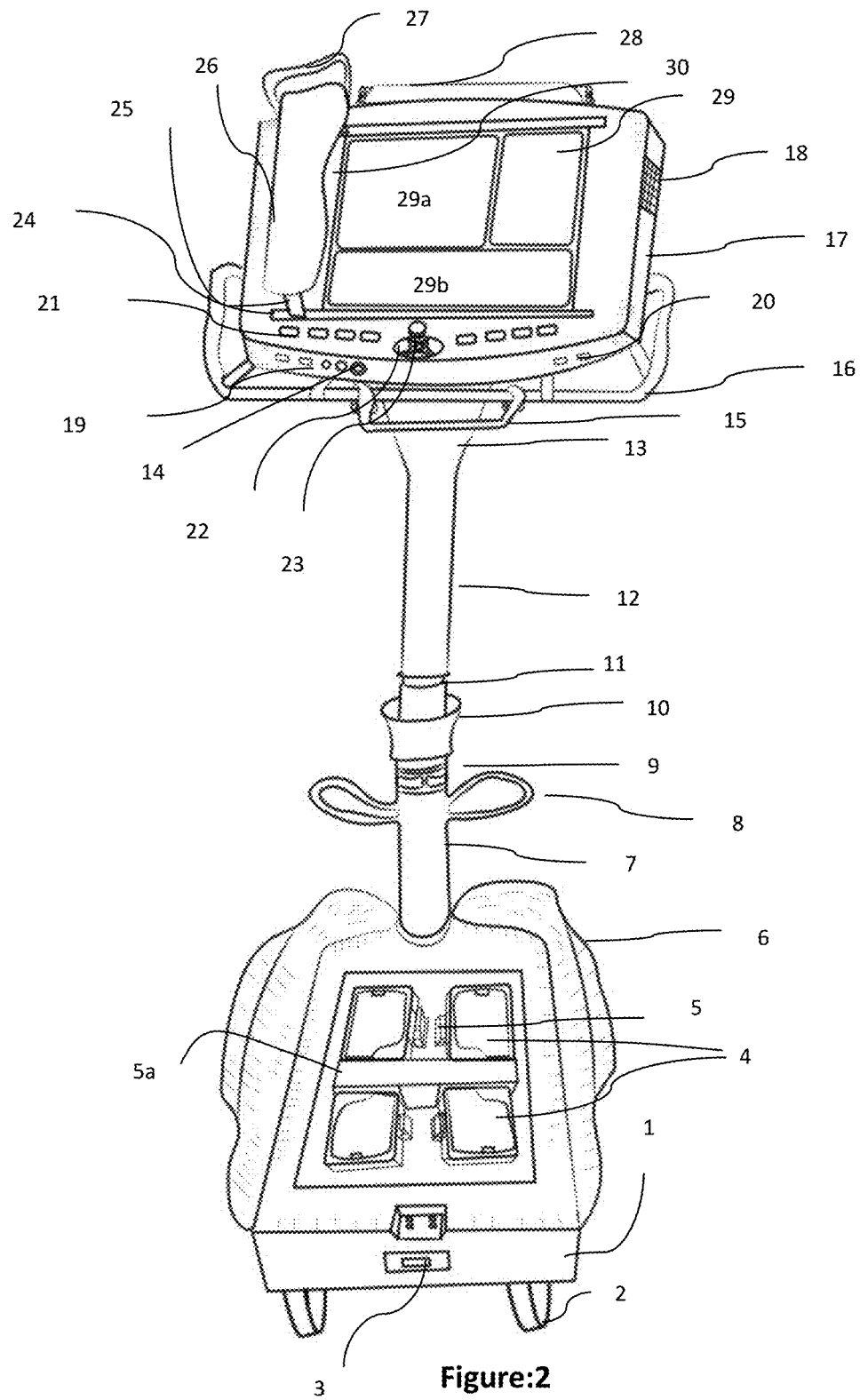
Figure: 2

Digital Podium– side view
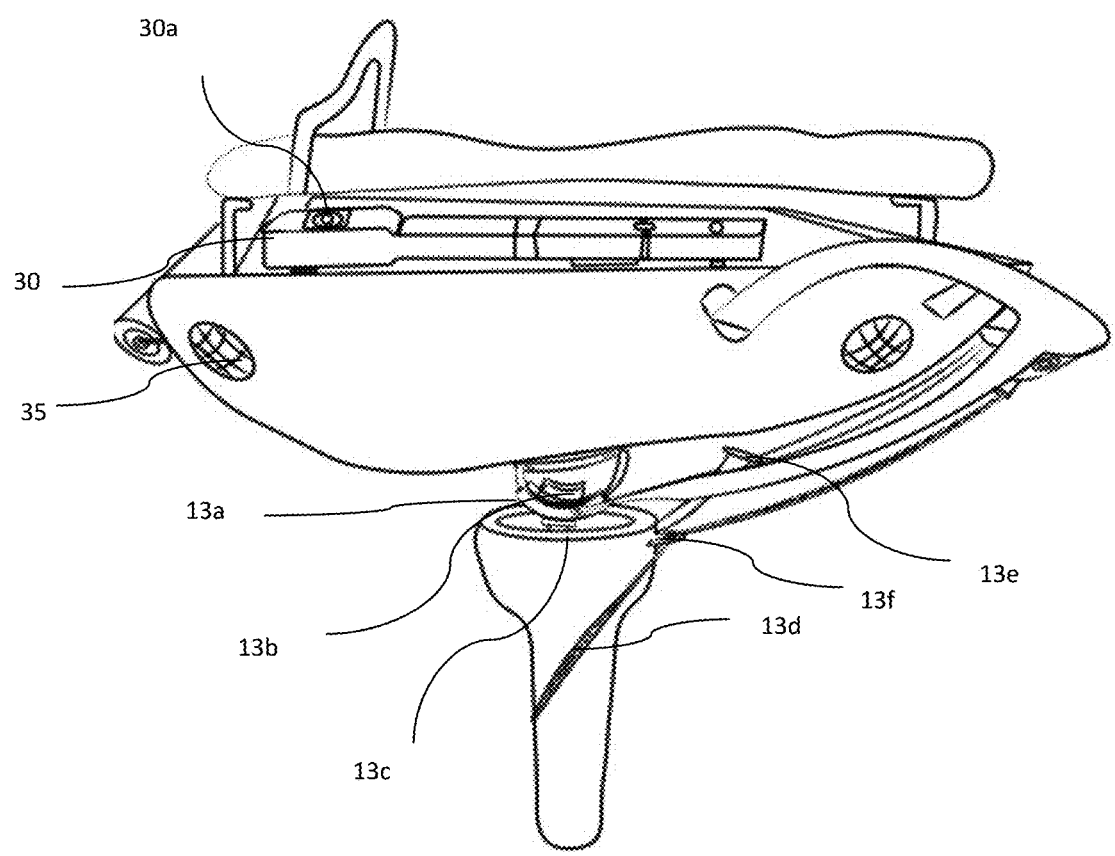
Figure: 3

Multi-tab frame first layer and tab-3, inserting into frame
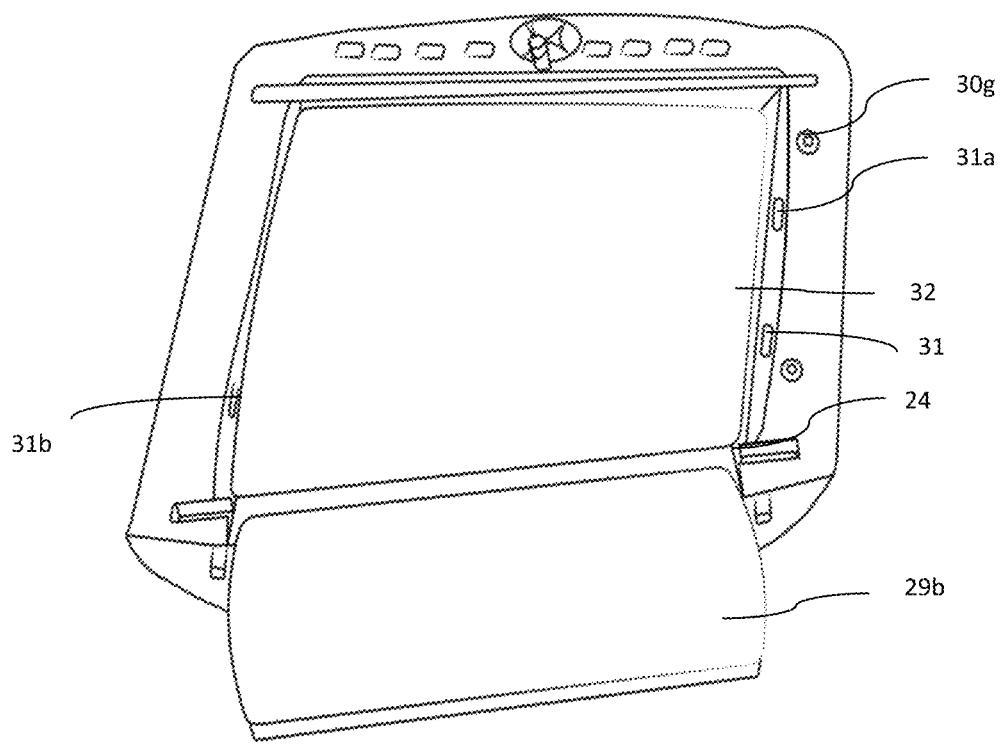
Figure :4

Multi-Tab , dual cam and microphone arrangement view
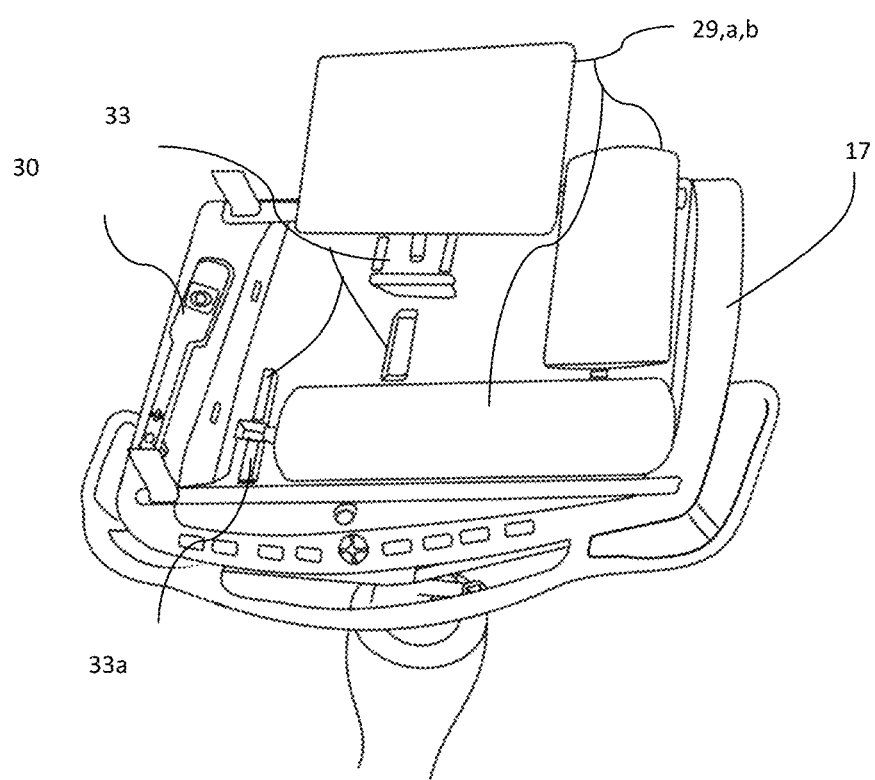
Figure: 5

Multi– Tab arrangement and front view of mini projector
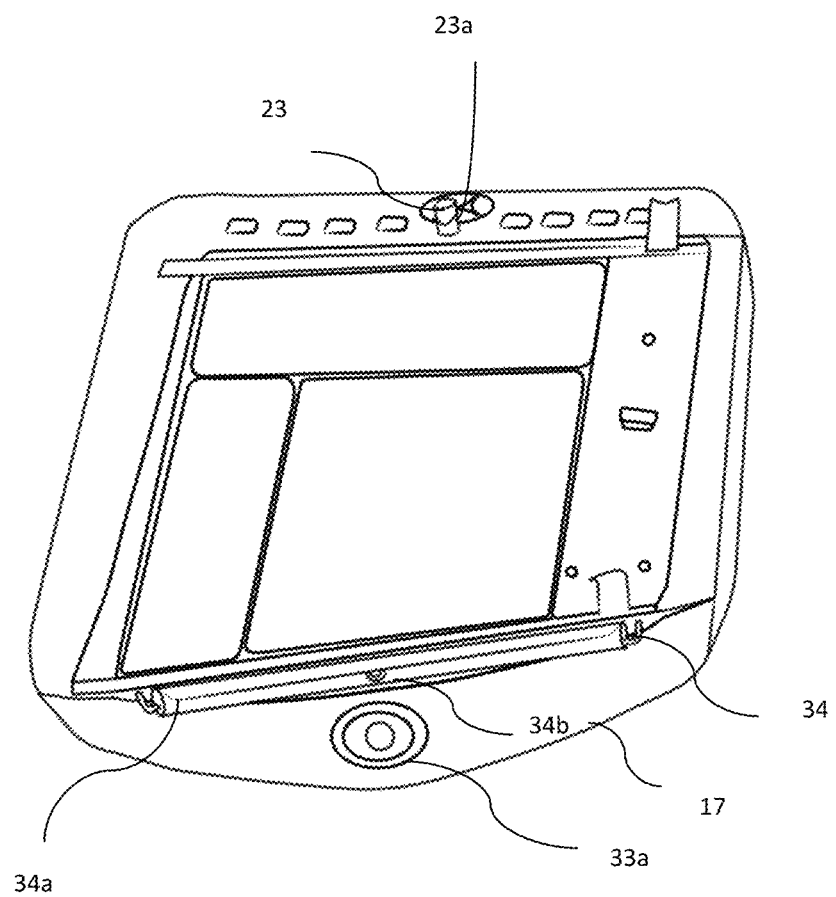
Figure : 6

Multi-Tab frame bottom view
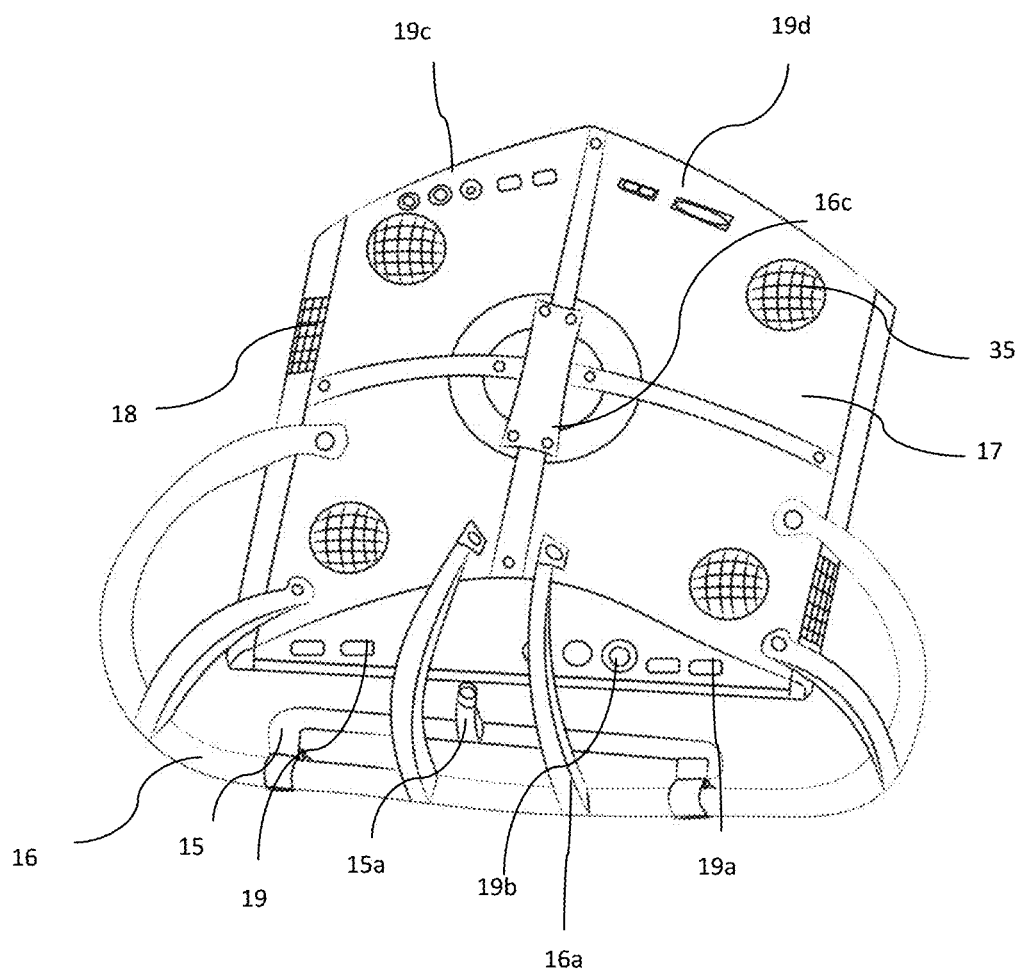
Figure: 7

Multi- Tab internal layers
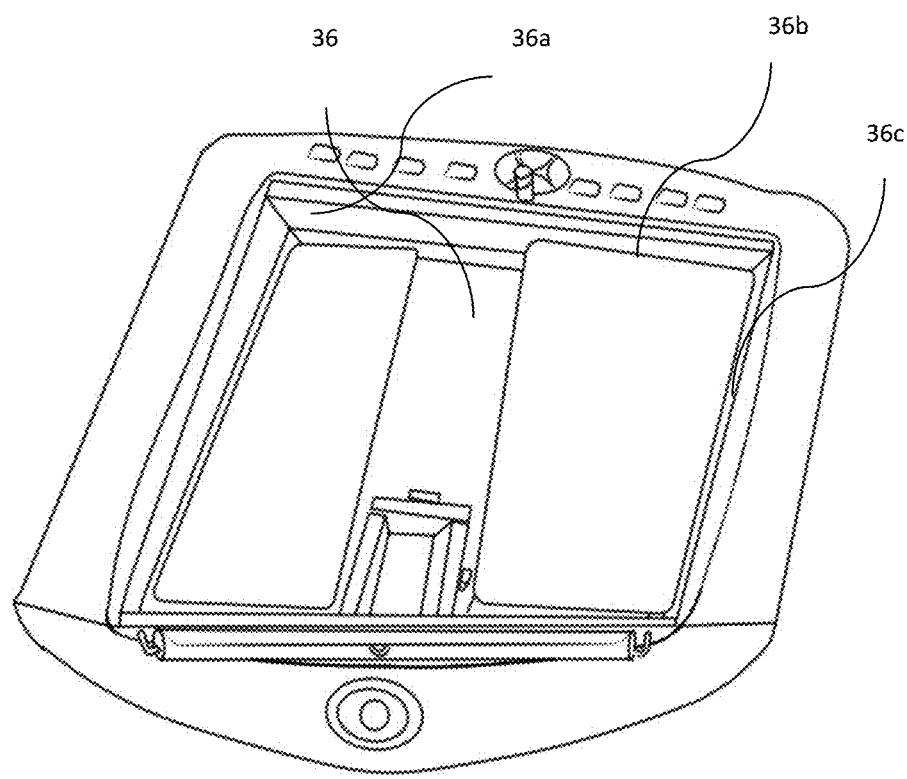
Figure: 8

Multi – Tab Internal layer and mini laser projector arrangement
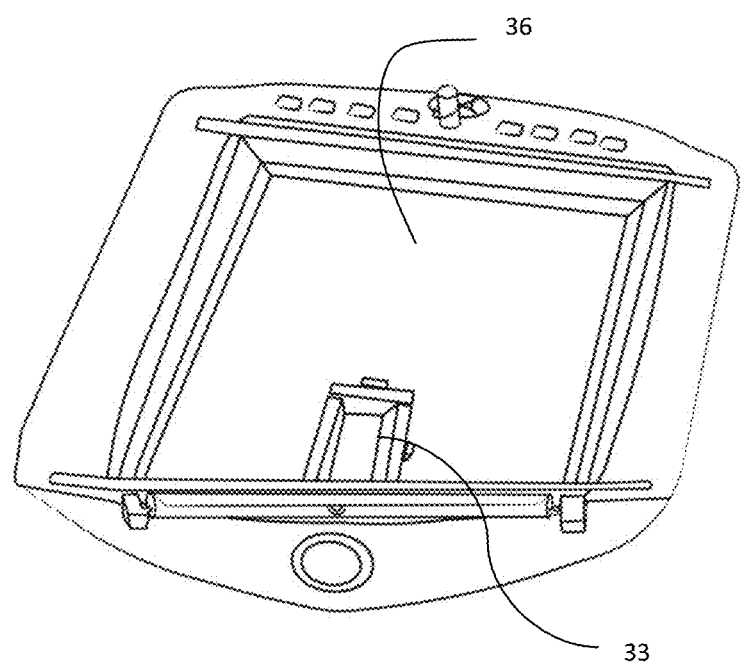
Figure: 9

Ball baring clamp - connects podium pole and multi- tab frame
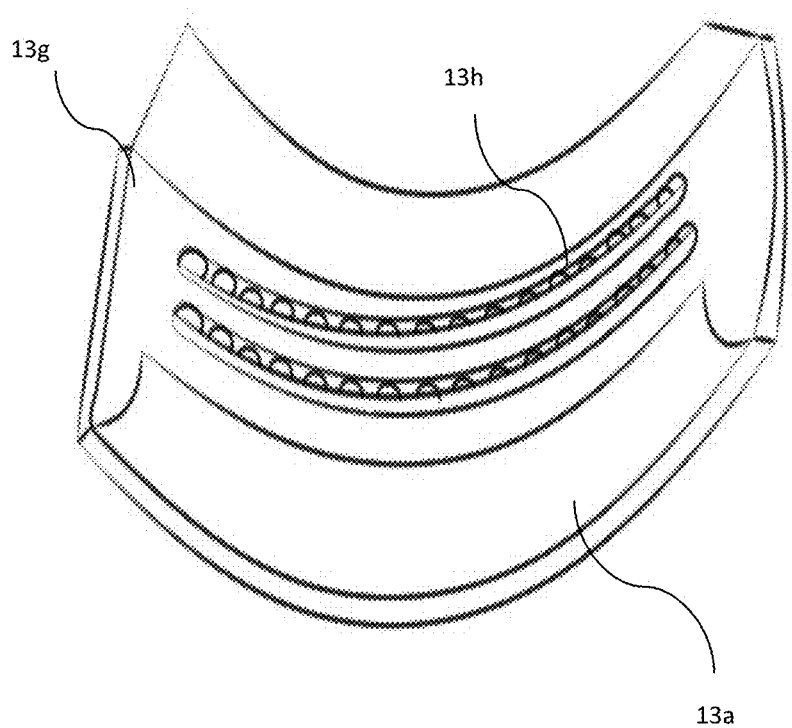
Figure: 10

Ball baring clamp welded to a round pipe
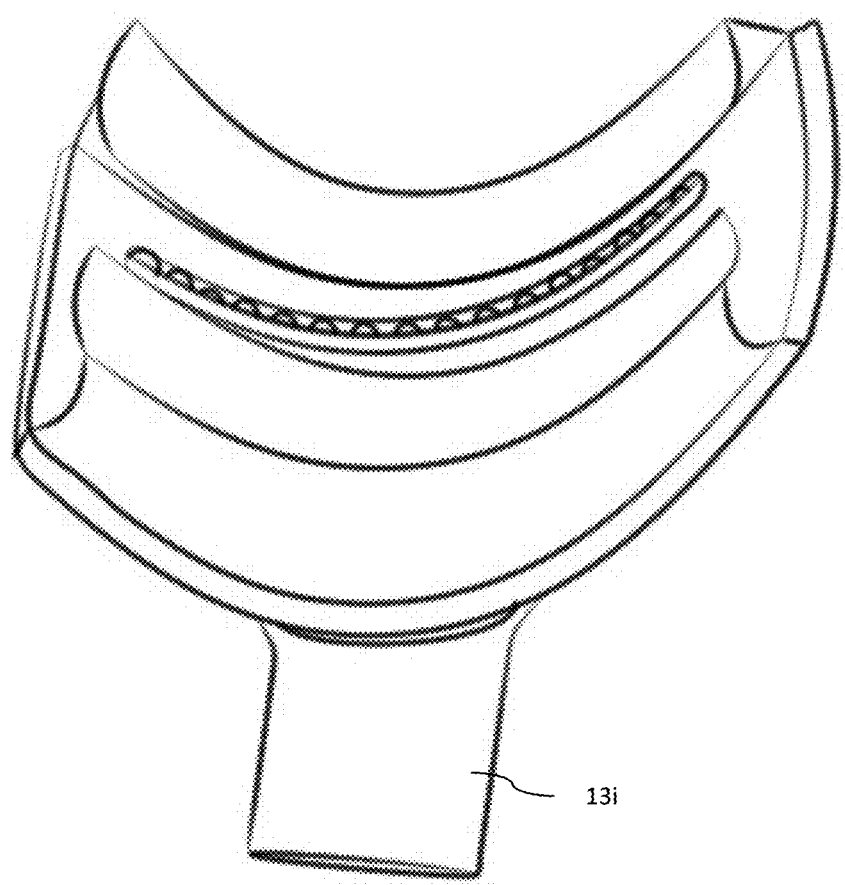
Figure: 11

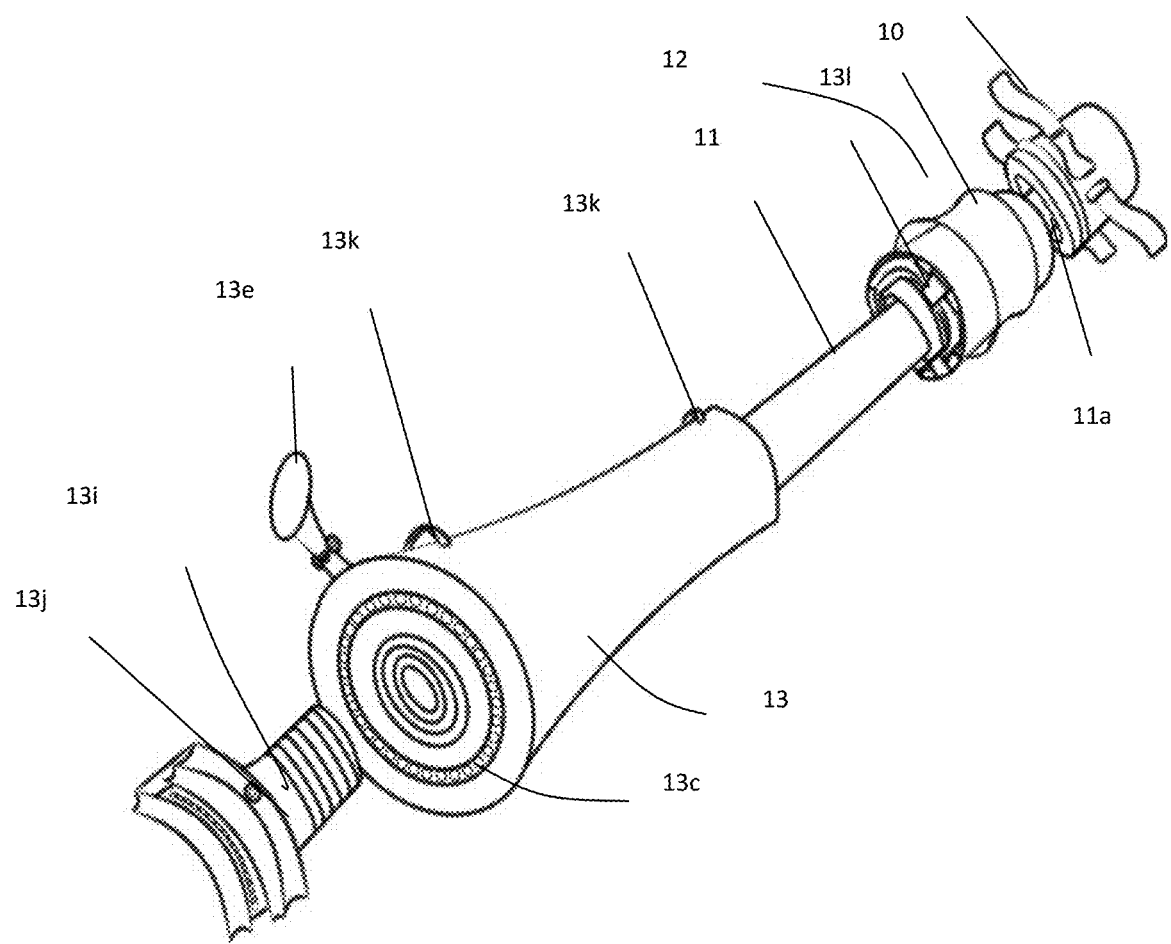
Figure: 12

Round iron ring clamp with flat mounting plate—mounted in ball baring clamp
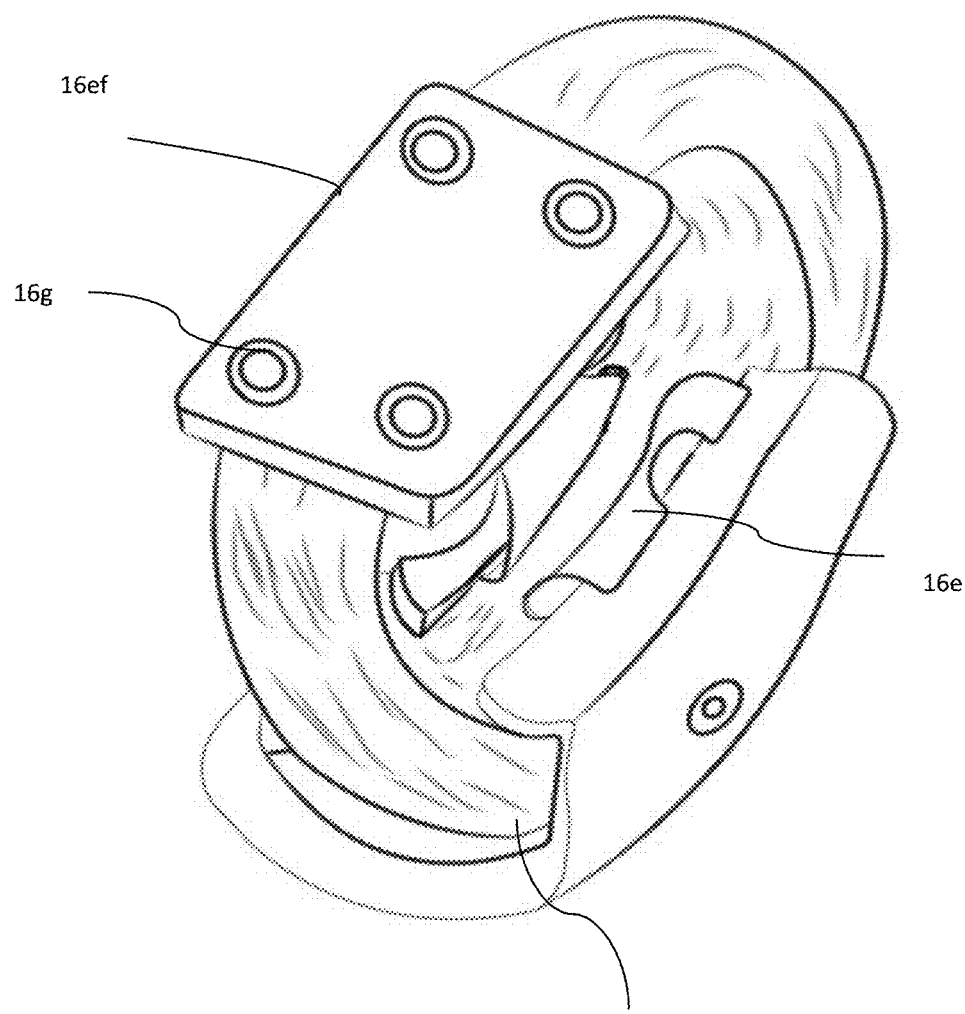
Figure: 13

Pedal five wheel for Podium
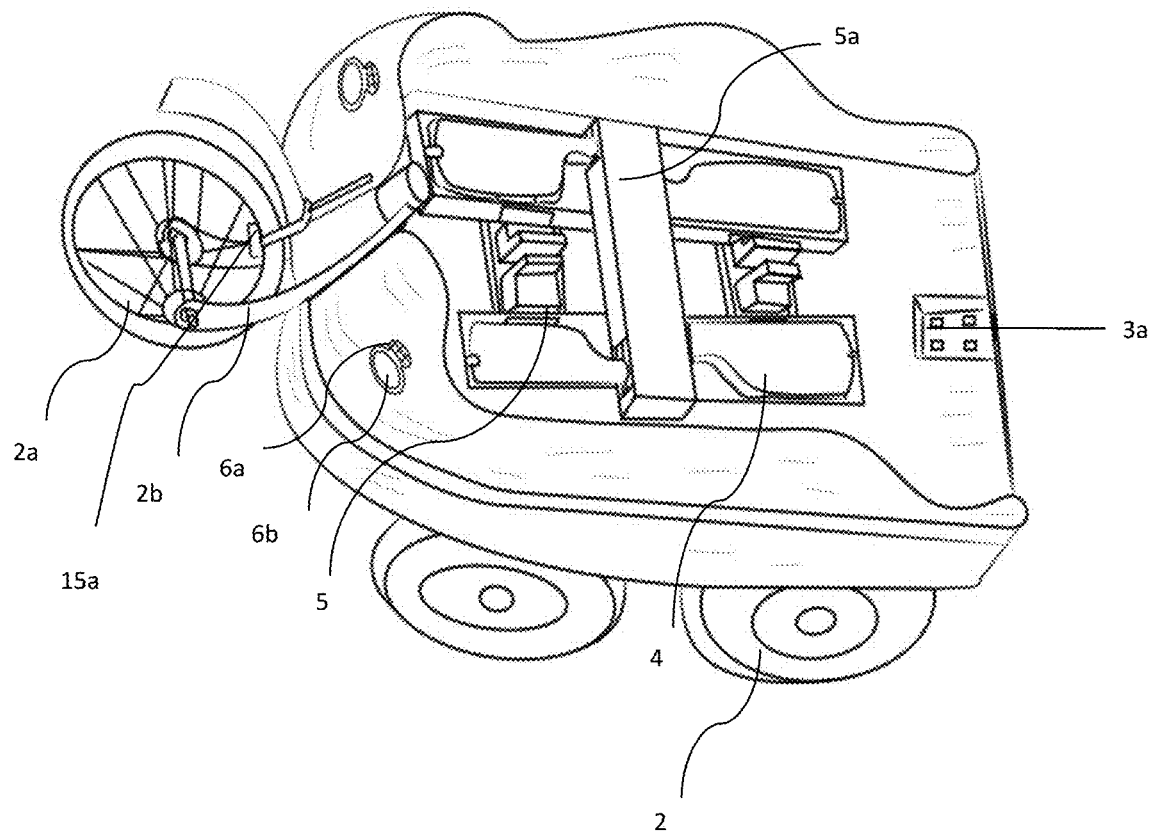
Figure: 14

Podium supporting pole and handle back view
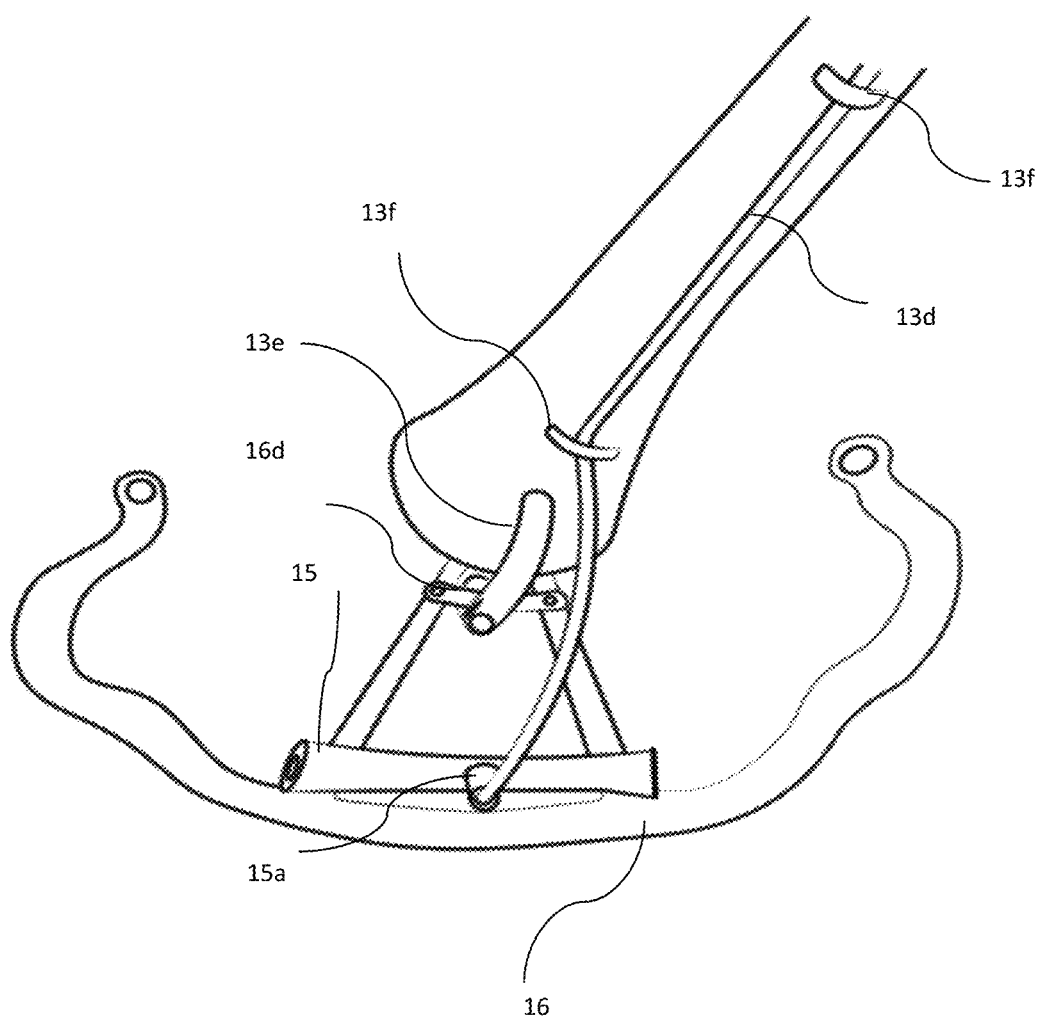
Figure : 15

Custom Punched one and half inch iron bar
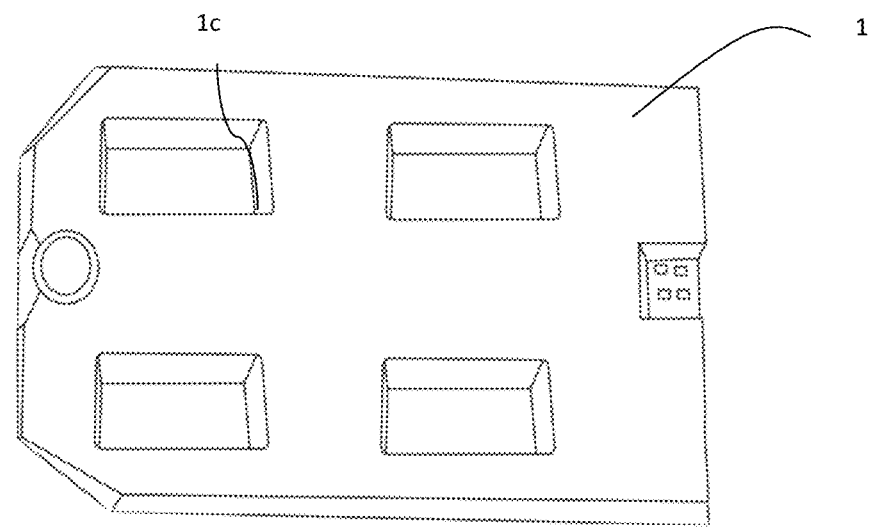
Figure: 16

Pedal four Wheel base and its Internal parts
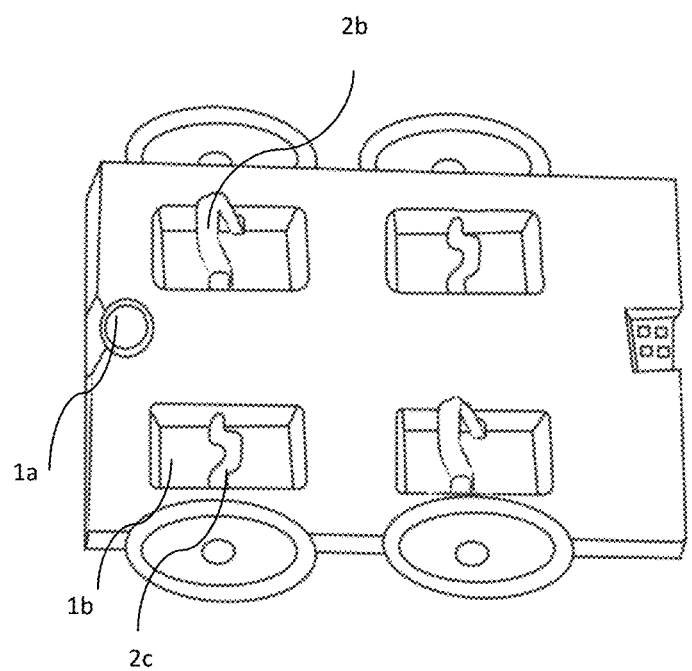
Figure: 17

Pedal Wheel Mechanism
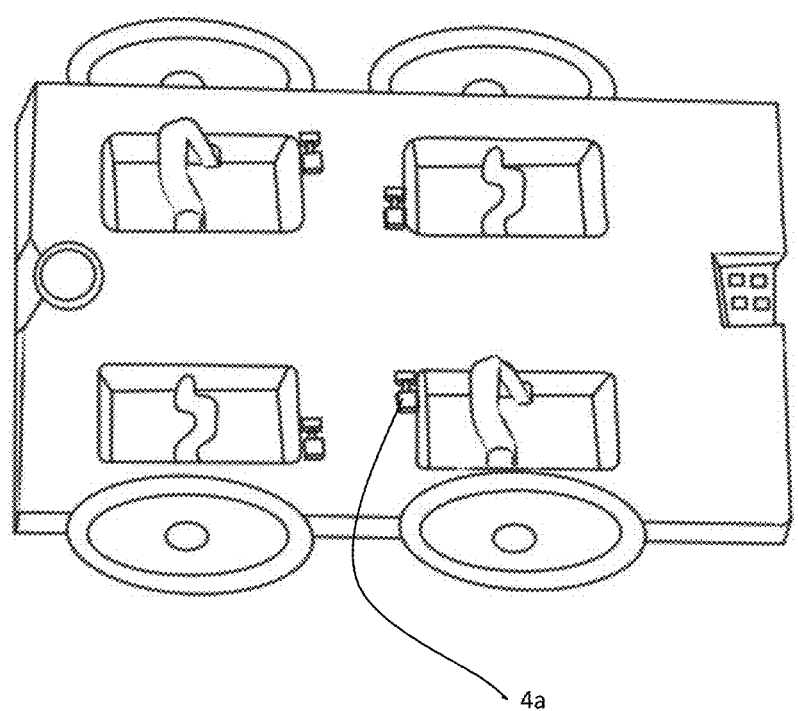
4a
Figure: 18

Pedal arrangement in podium four square spaces
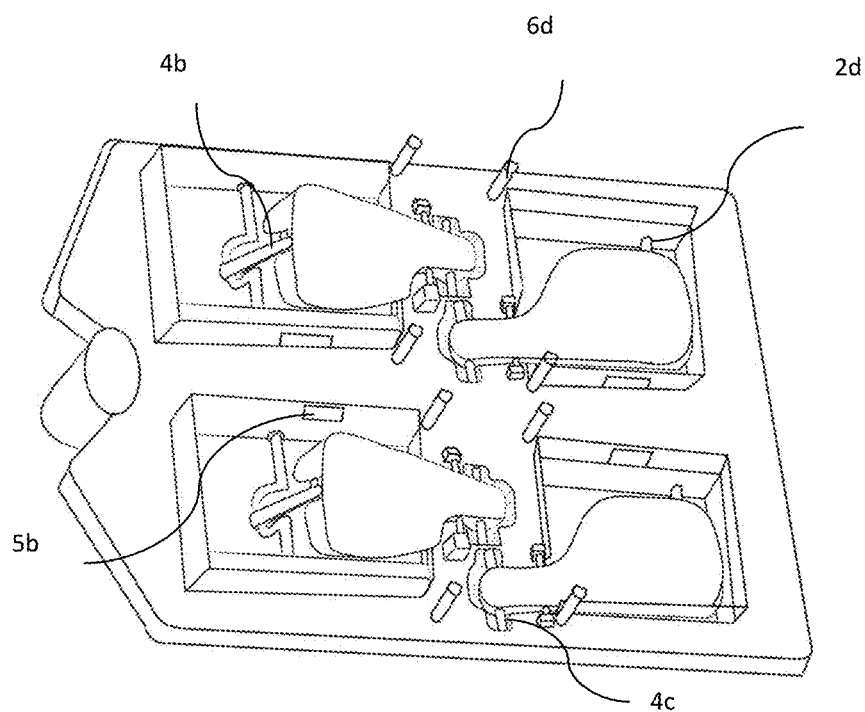
Figure: 19

Pedal four wheel foot divider arrangement
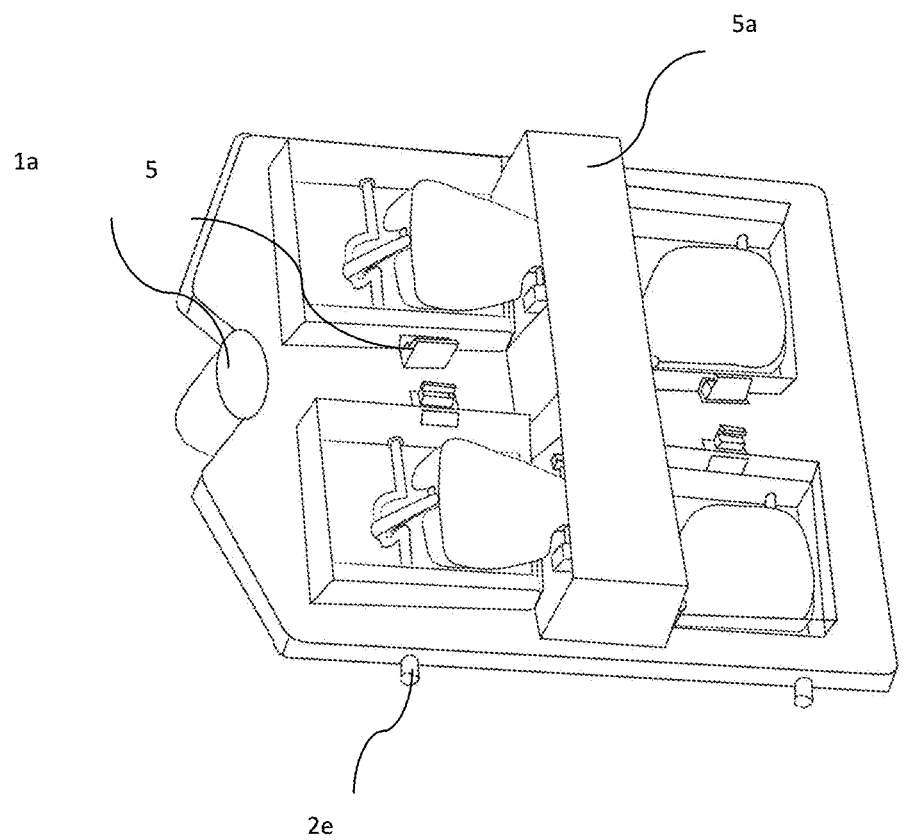
Figure: 20

Podium standing base back view
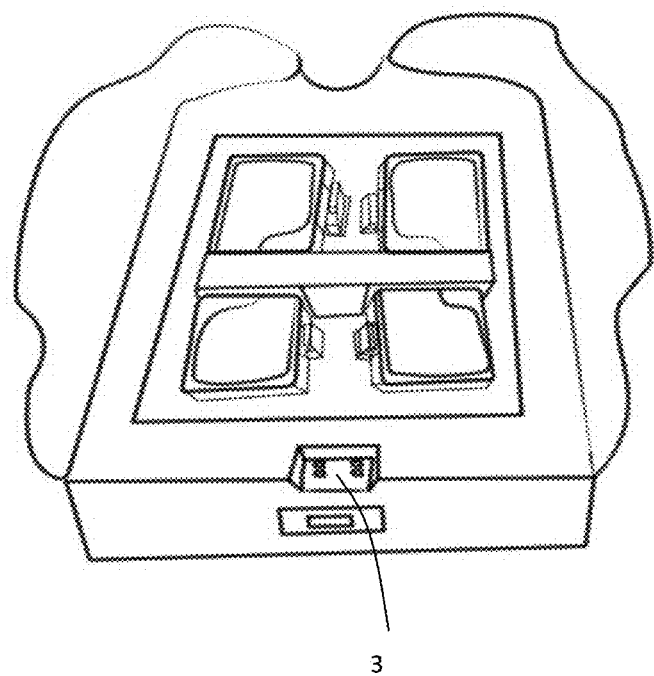
3
Figure: 21

Pedal bike without podium
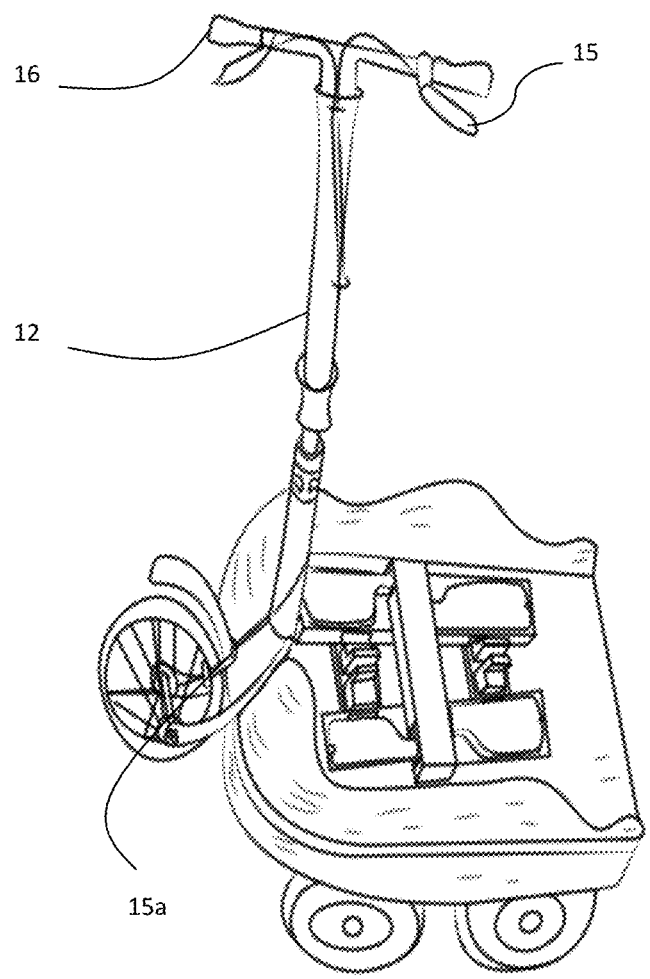
Figure: 22 five wheel chain bike without podium
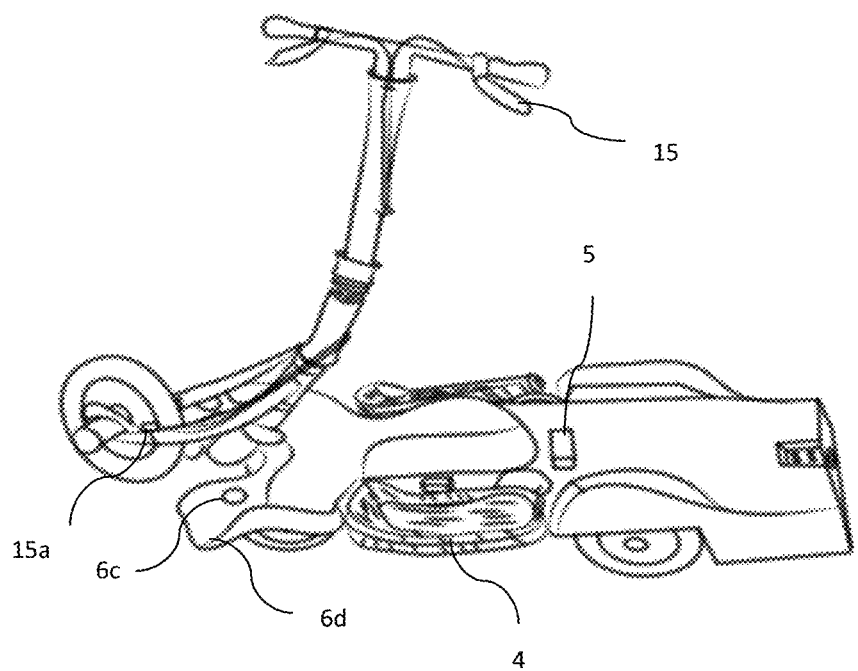
Figure: 23

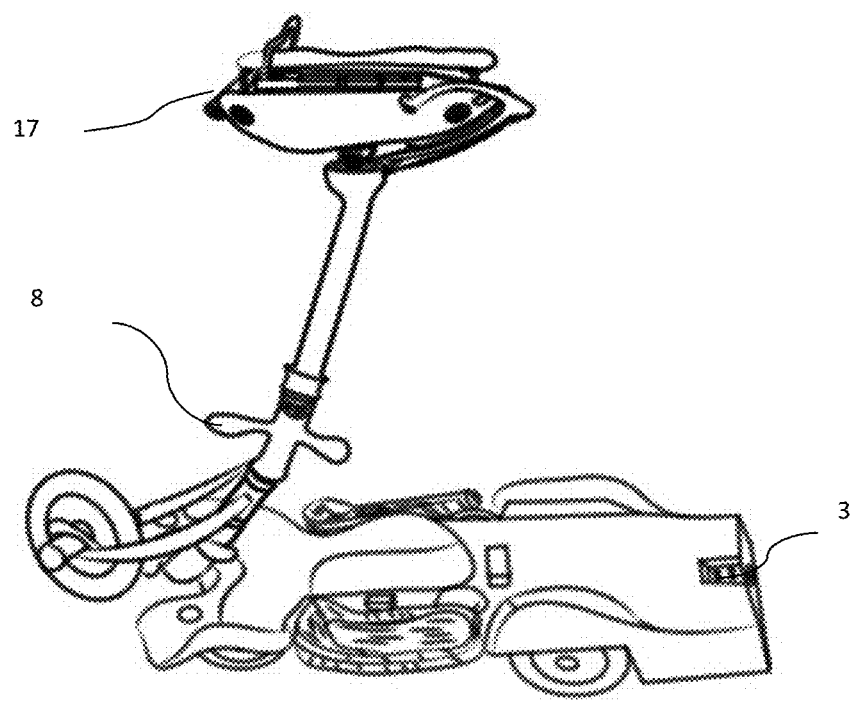
Figure: 24

Pedal bike with podium
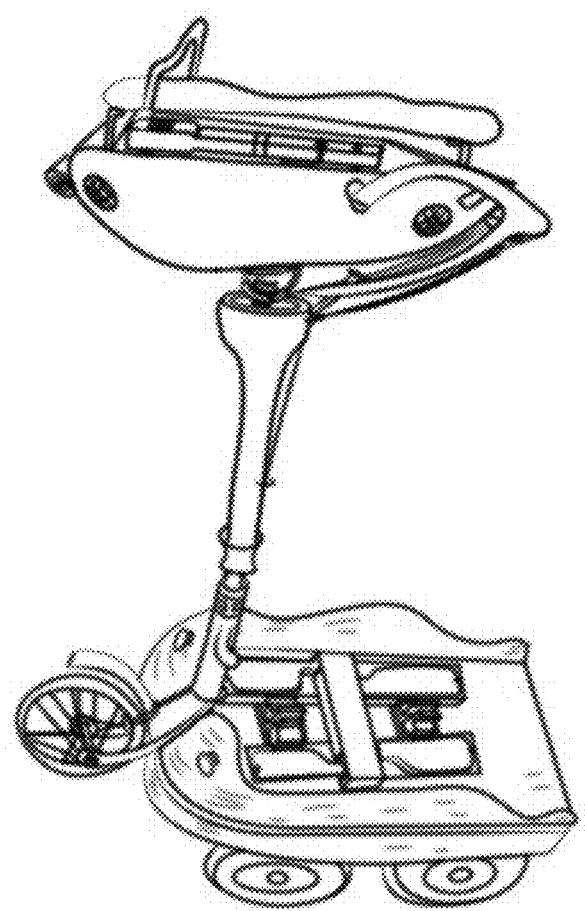
Figure: 25 writing pad and dual cam enabled with mini focusing projector on pedal five wheels podium
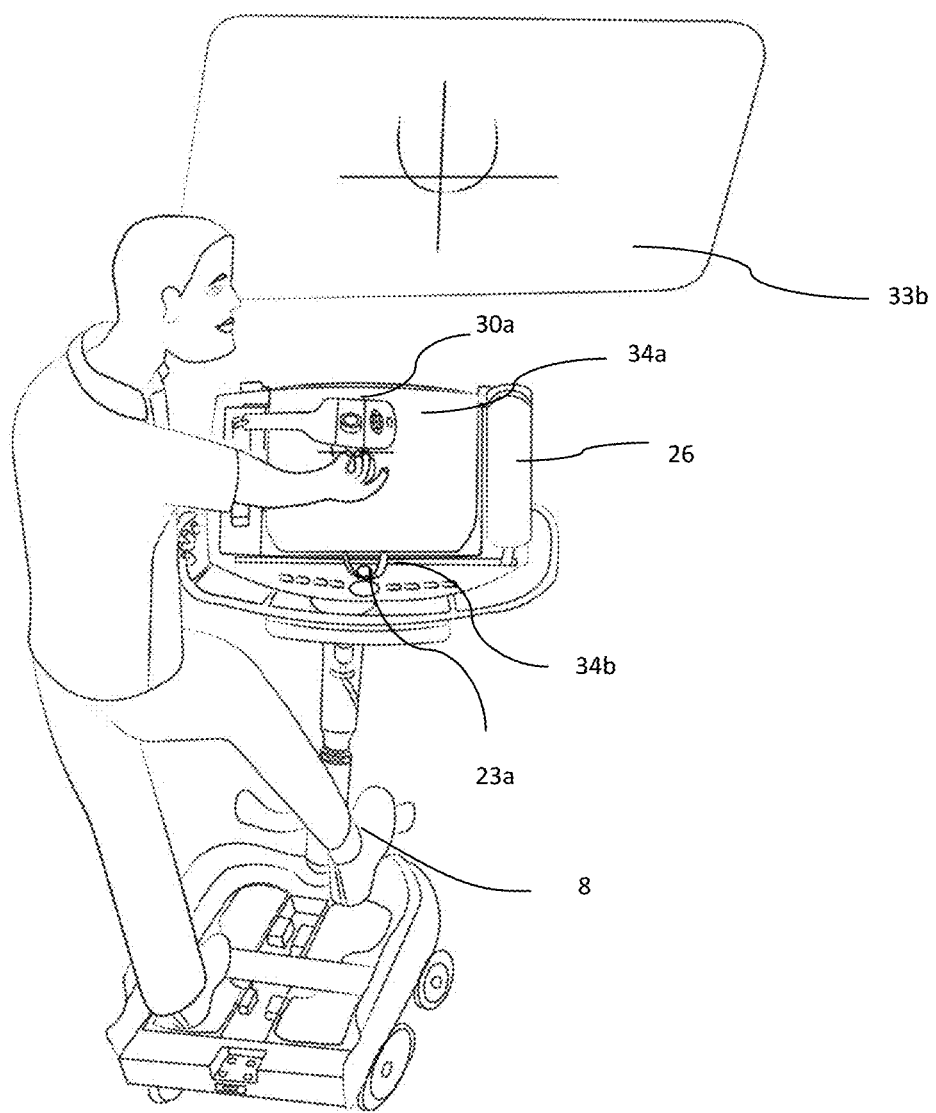
Figure: 26

Moving on chain wheel podium inside the building
Figure: 27

Chain podium internal mechanism
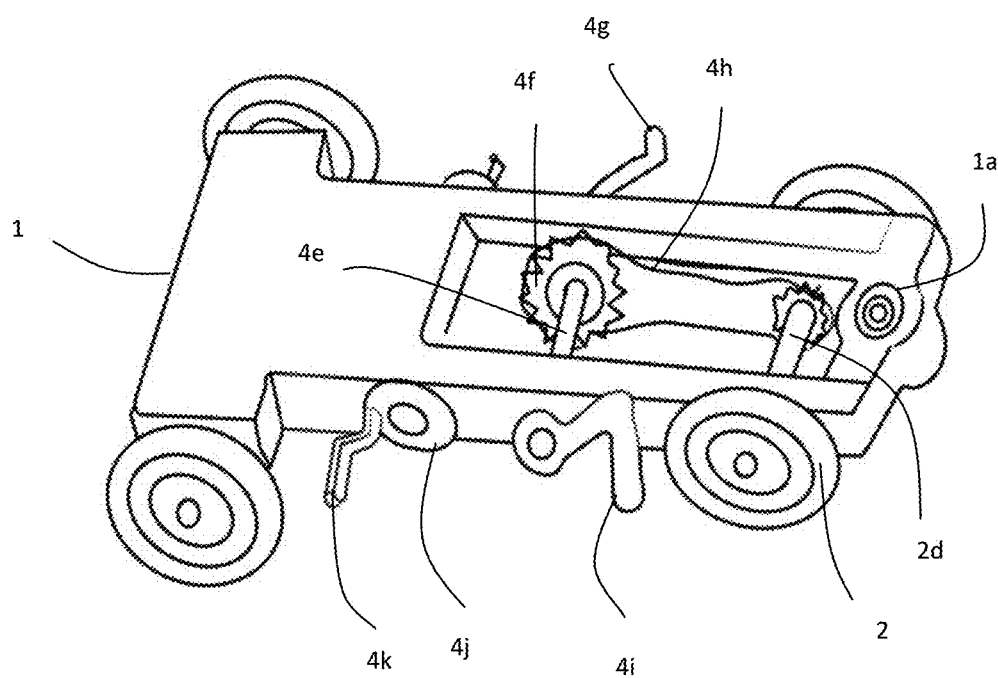
Figure: 28

Pedal mounted on the two extension rods
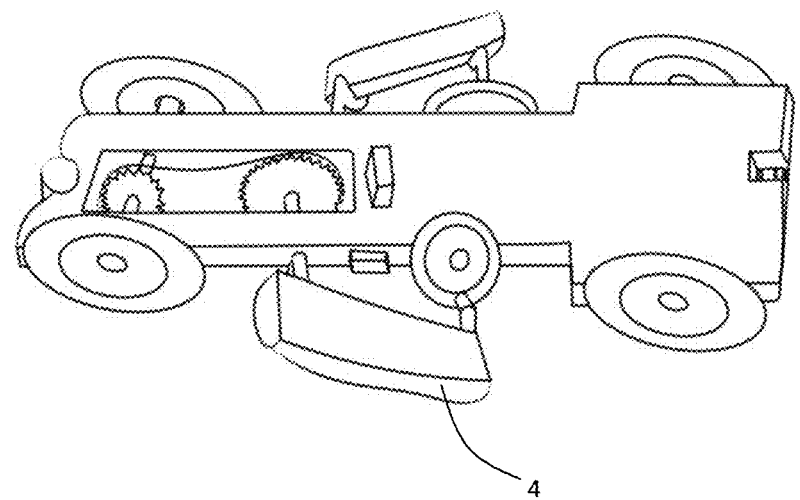
Figure: 29

Chain moving pedal comfort arrangement
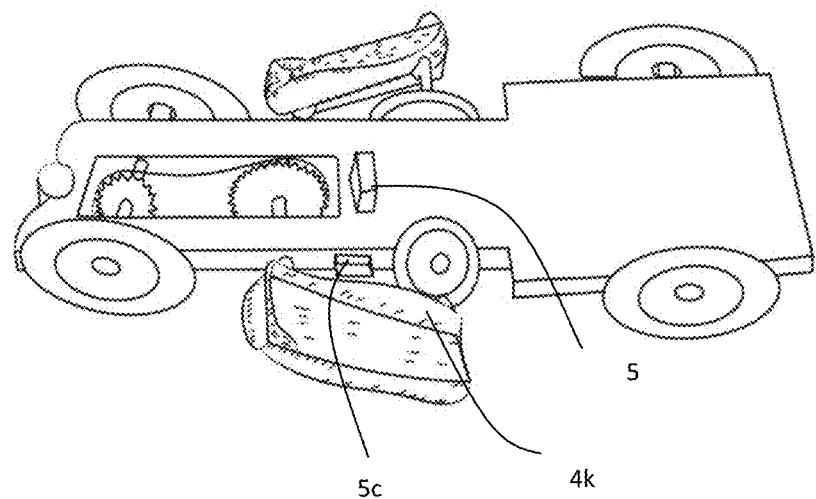
Figure: 30

Chain wheel cover hood supporting poles
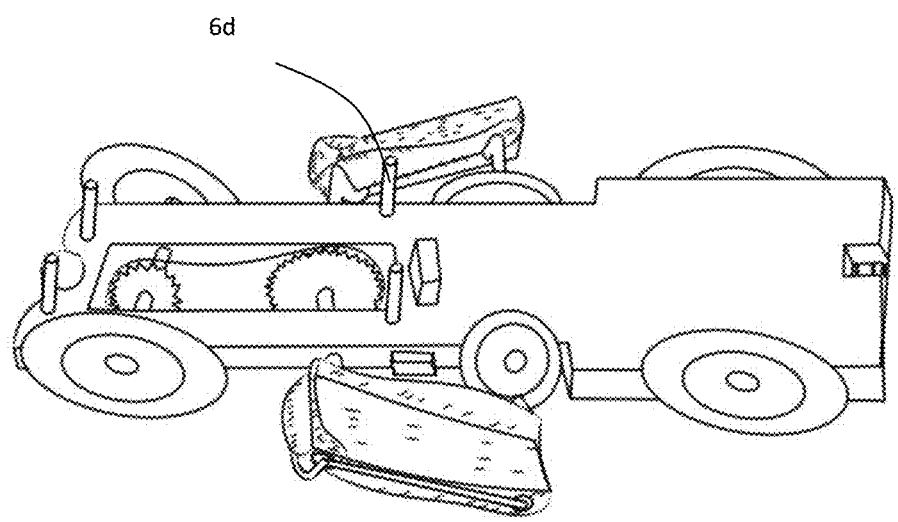
Figure: 31

Chain wheel covered with a plastic hood
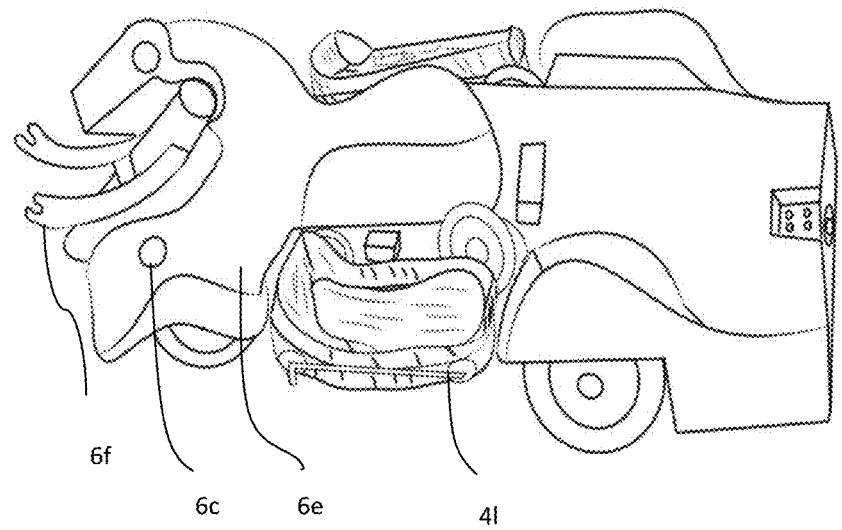
Figure: 32

Height adjustable single pole chair
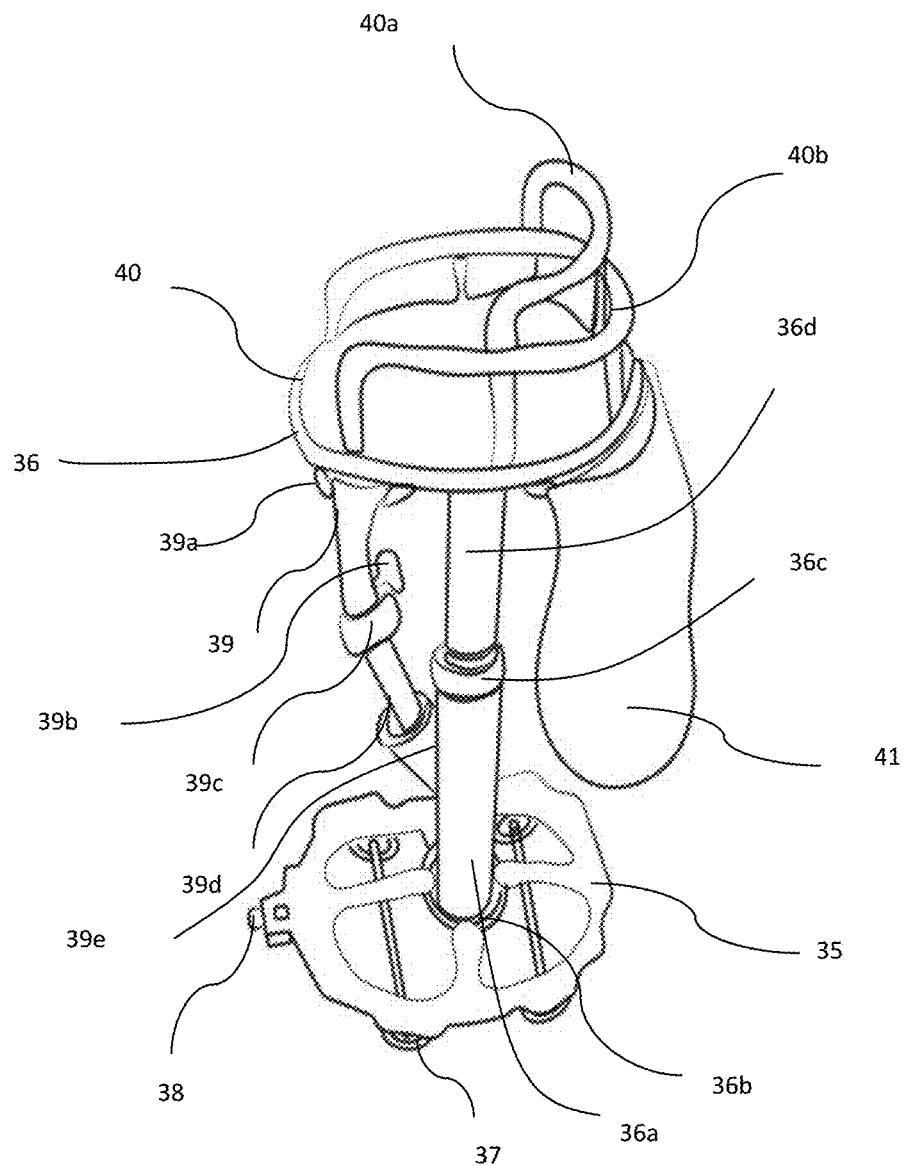
Figure: 33

Pedal podium connected to a single pole wheel chair
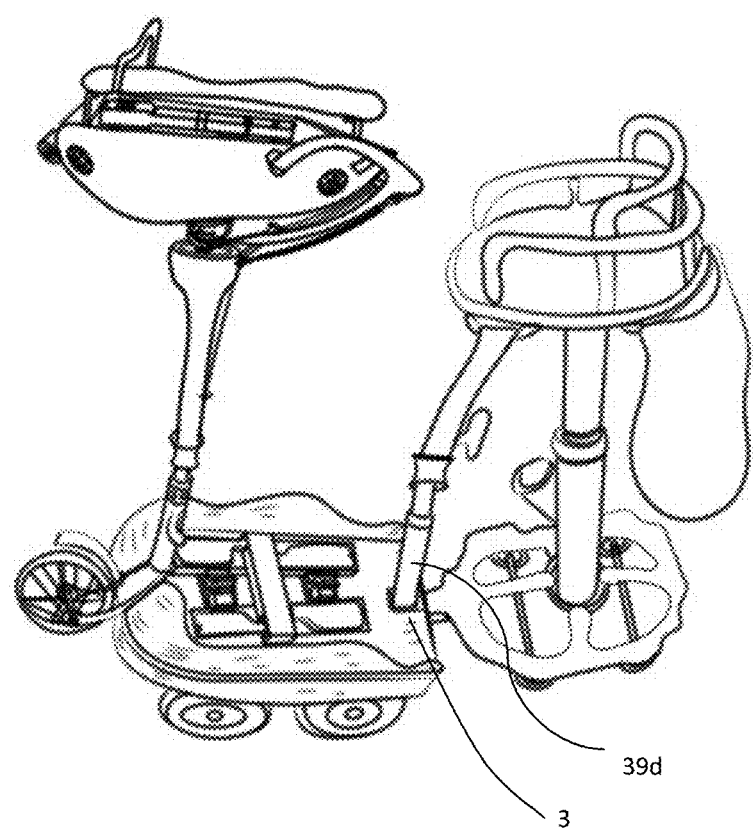
Figure: 34

Dual cam , microphone and multiple - tab system is in us by a class teacher
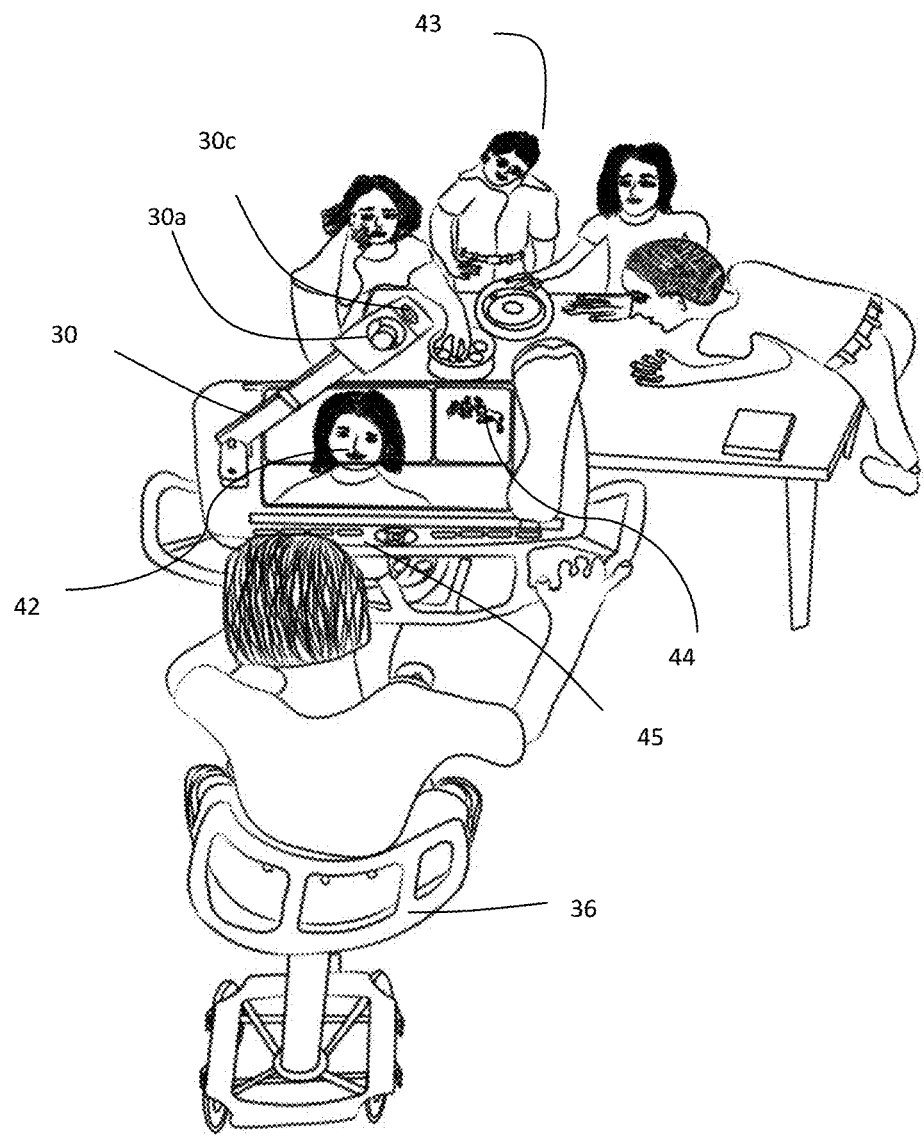
Figure: 35

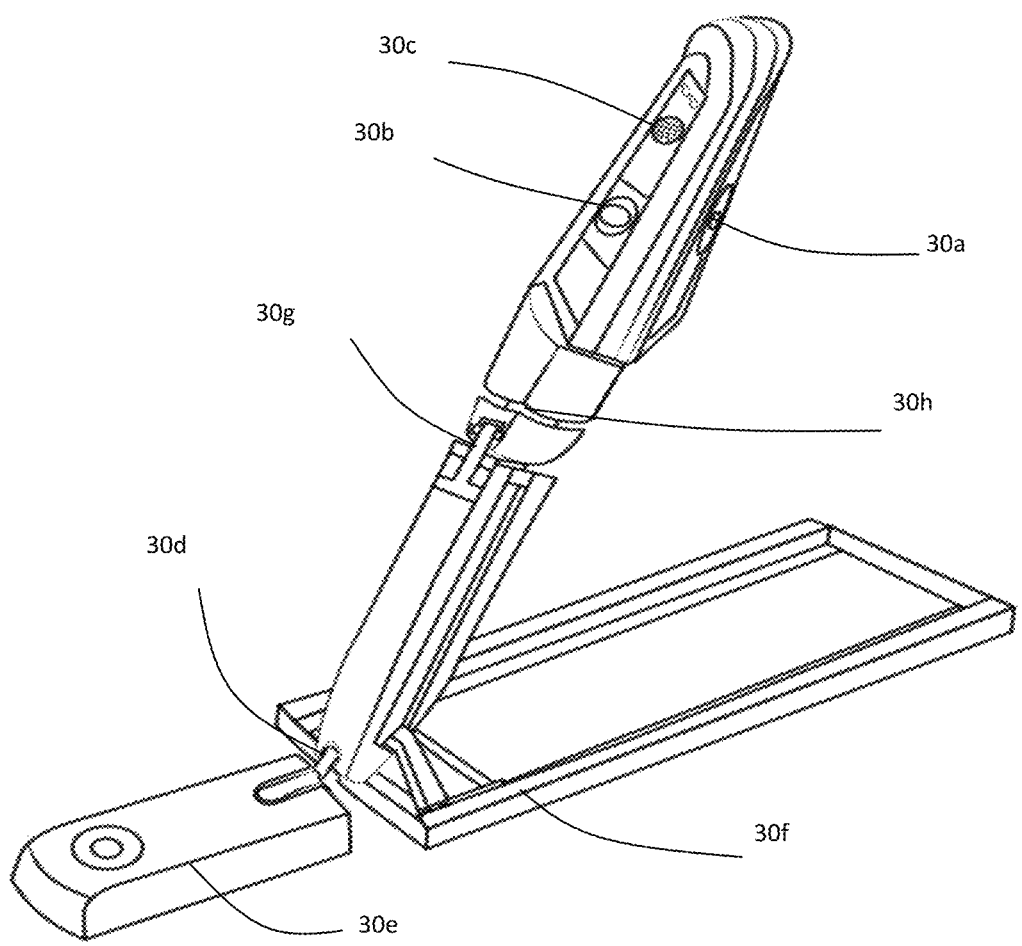
Figure: 36

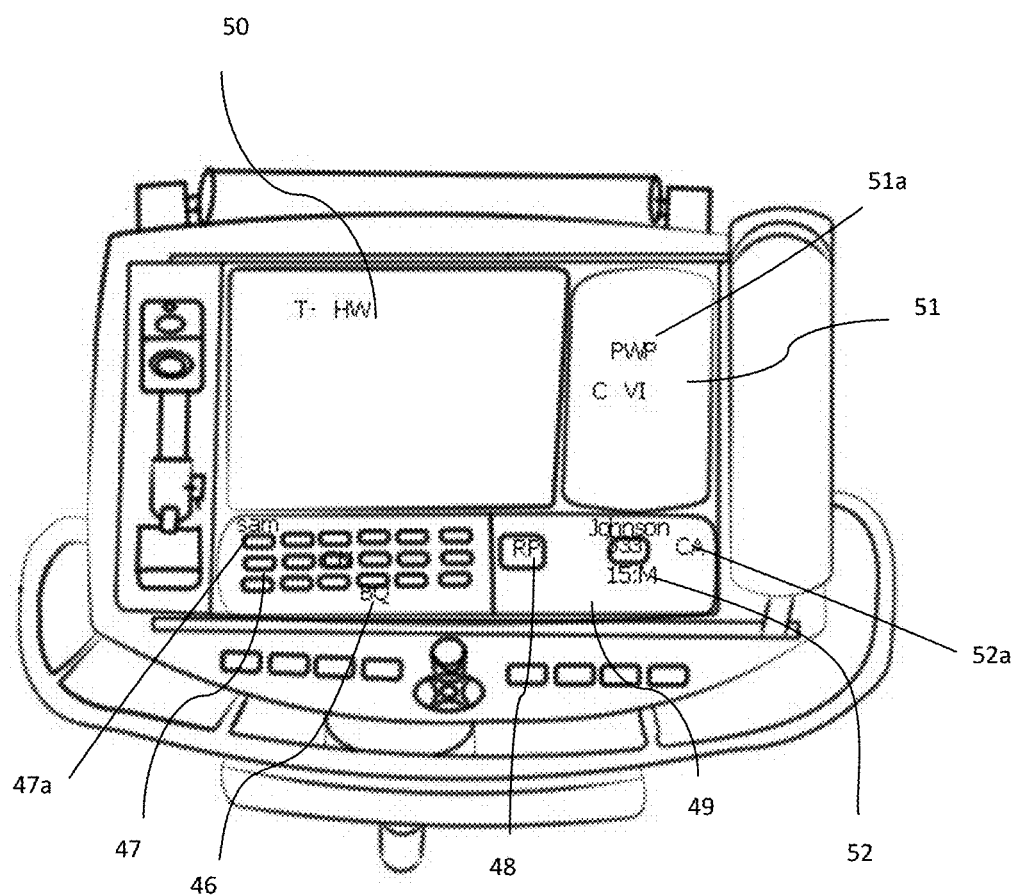
Figure: 37

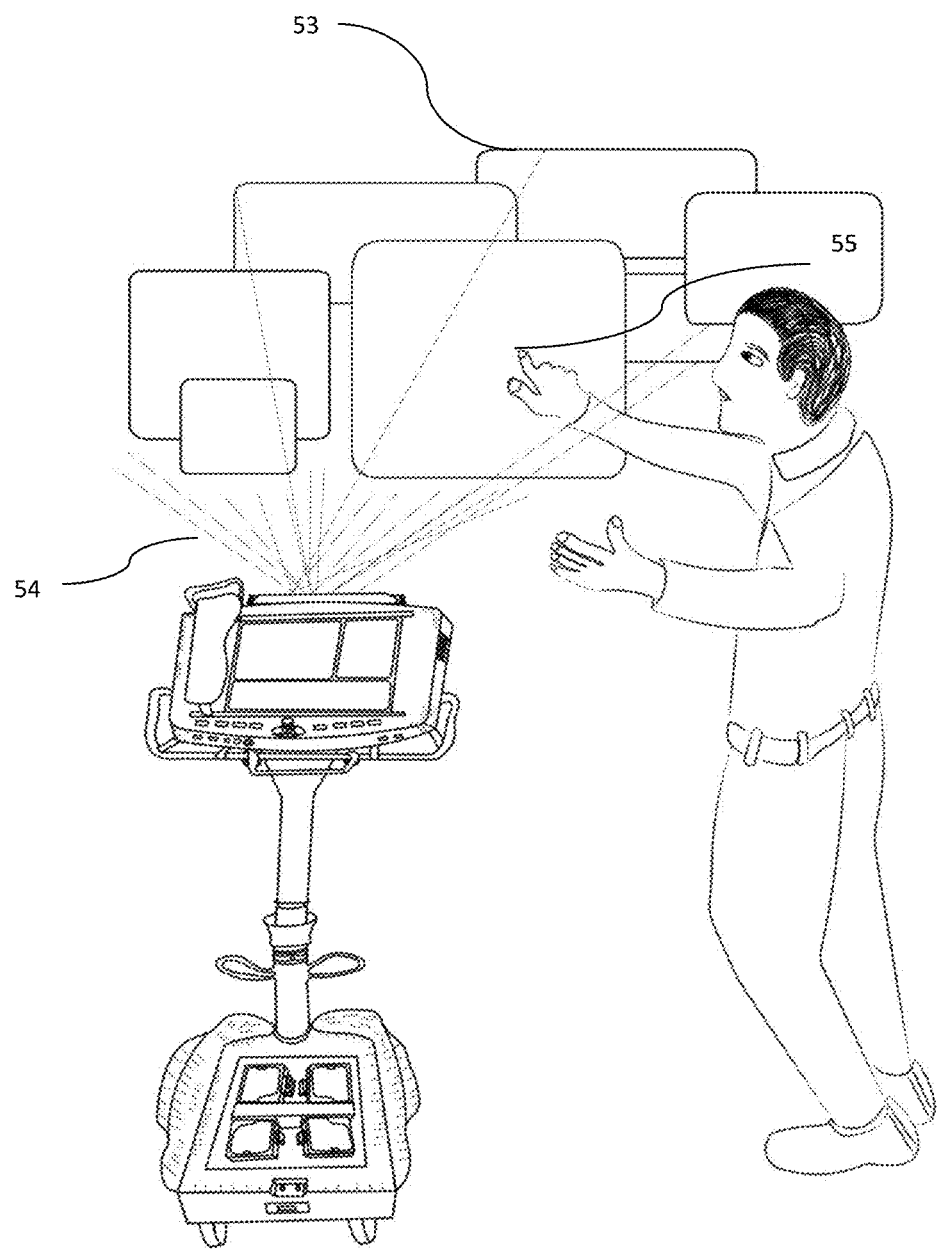
Figure: 38

Permanent digital podium
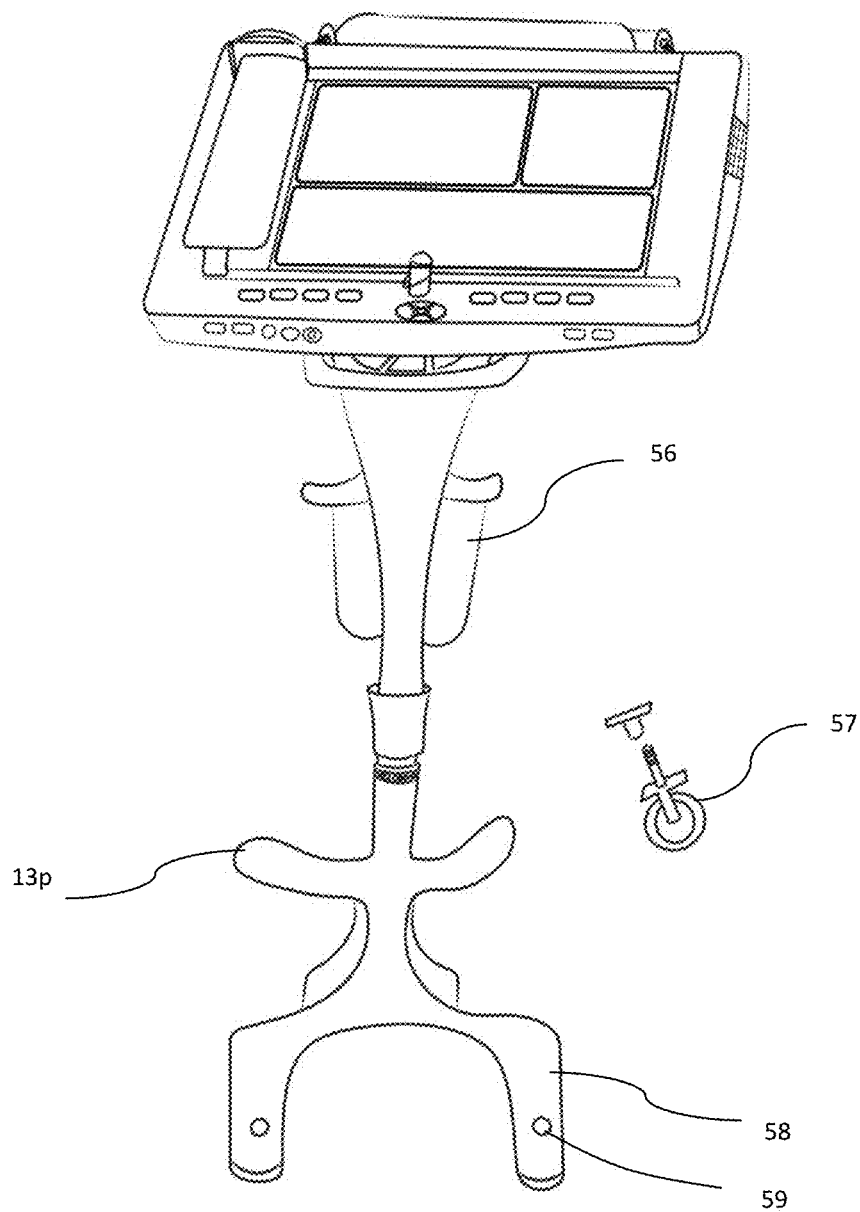
Figure: 39

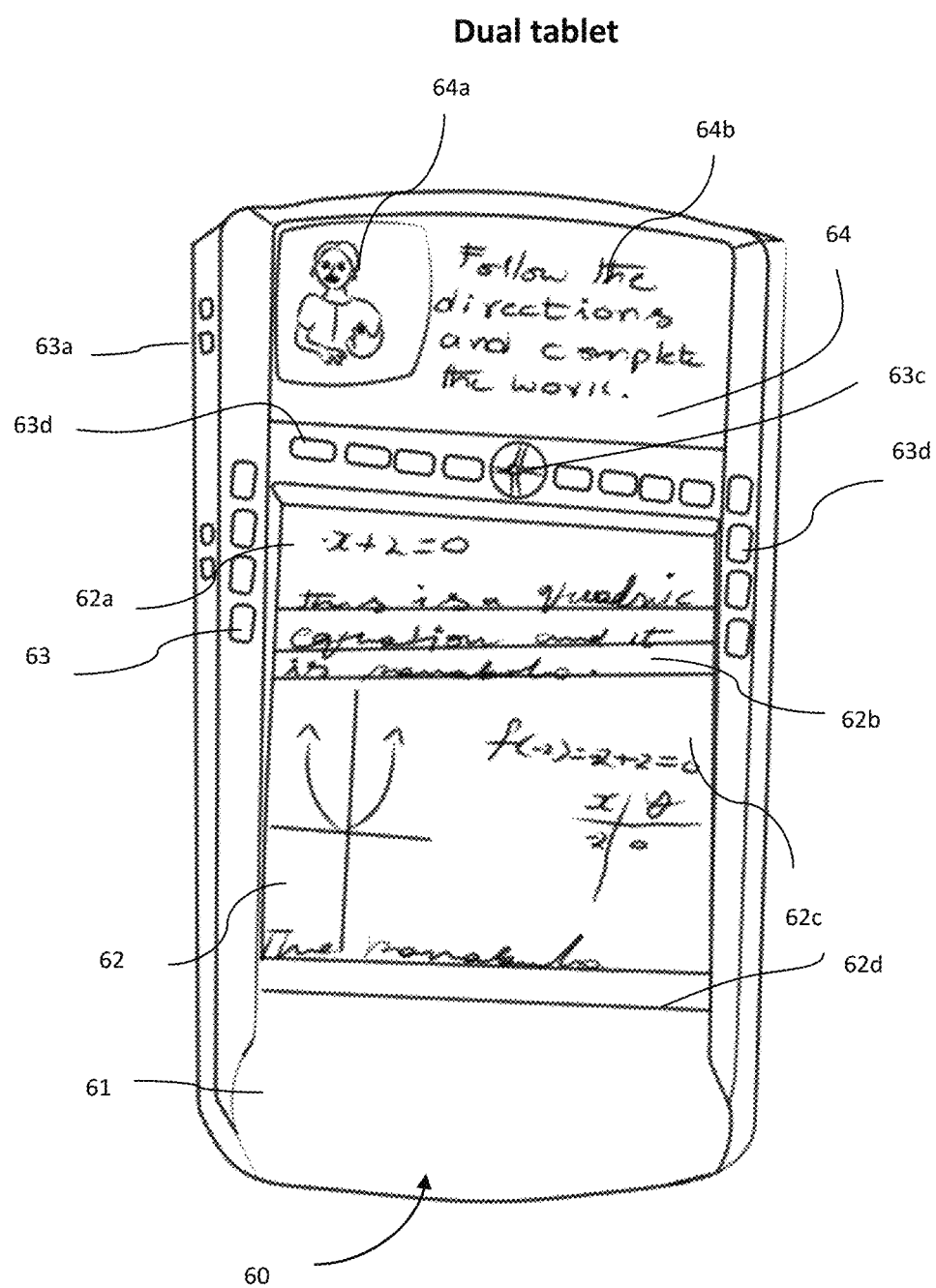
Figure: 40

A student using dual tablet in the classroom
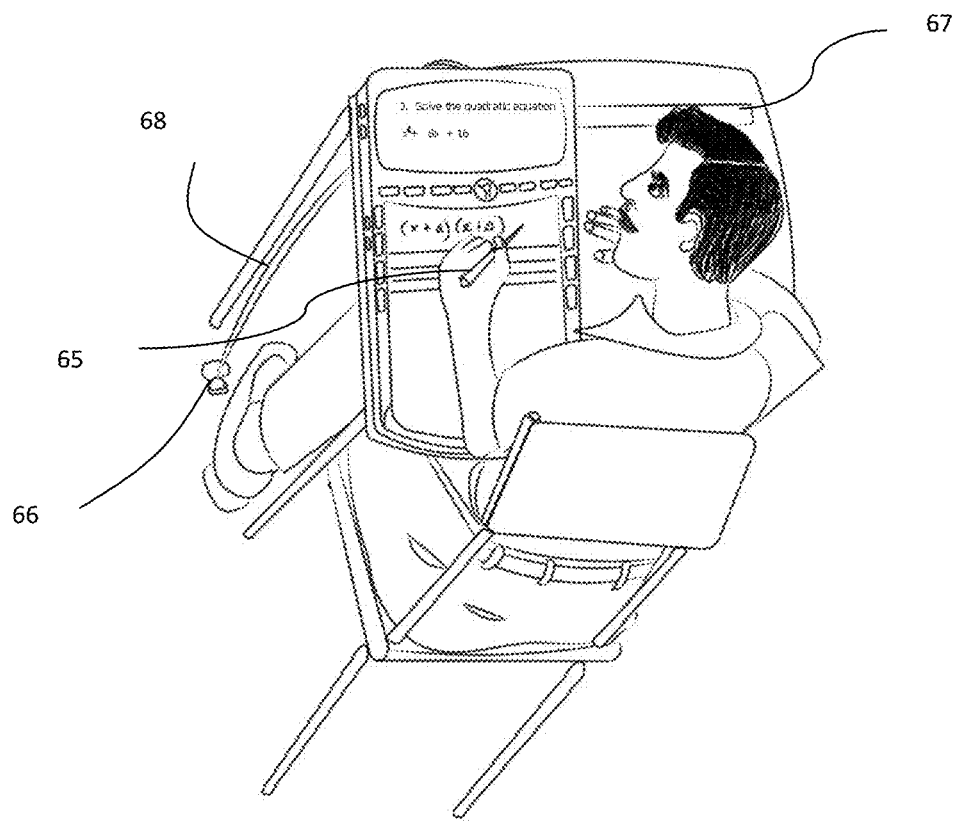
Figure: 41

Dual tablet enabled with finger print recognition for public poling
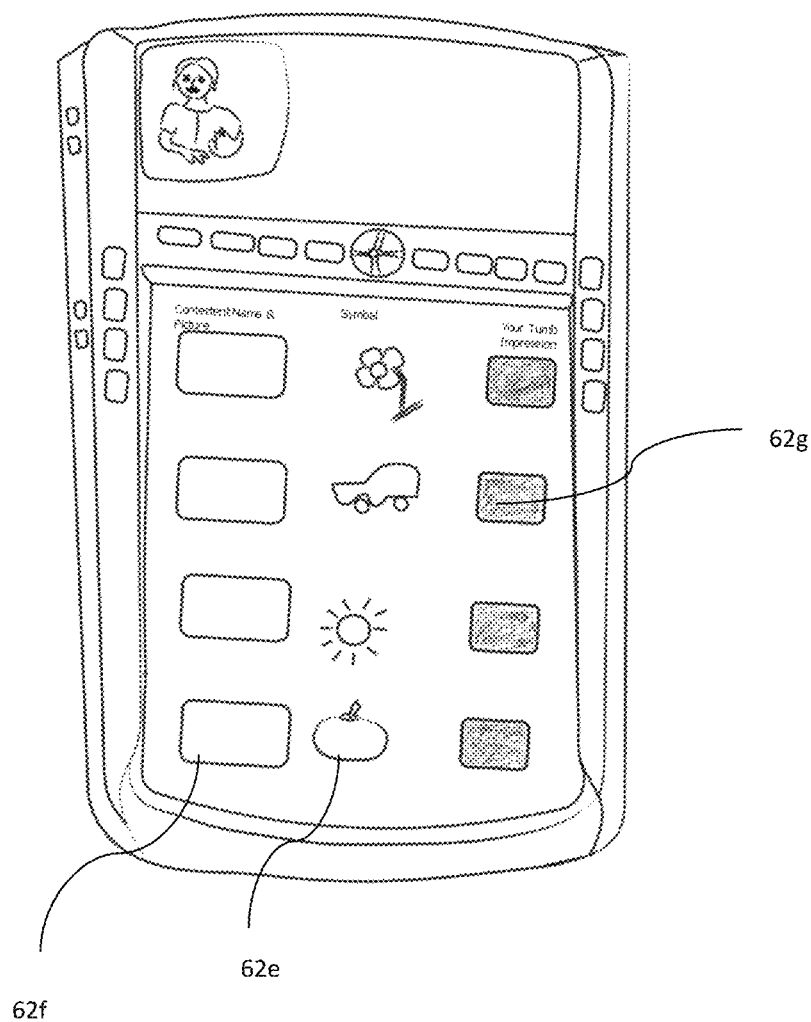
Figure: 42

Solar powered dual tablet
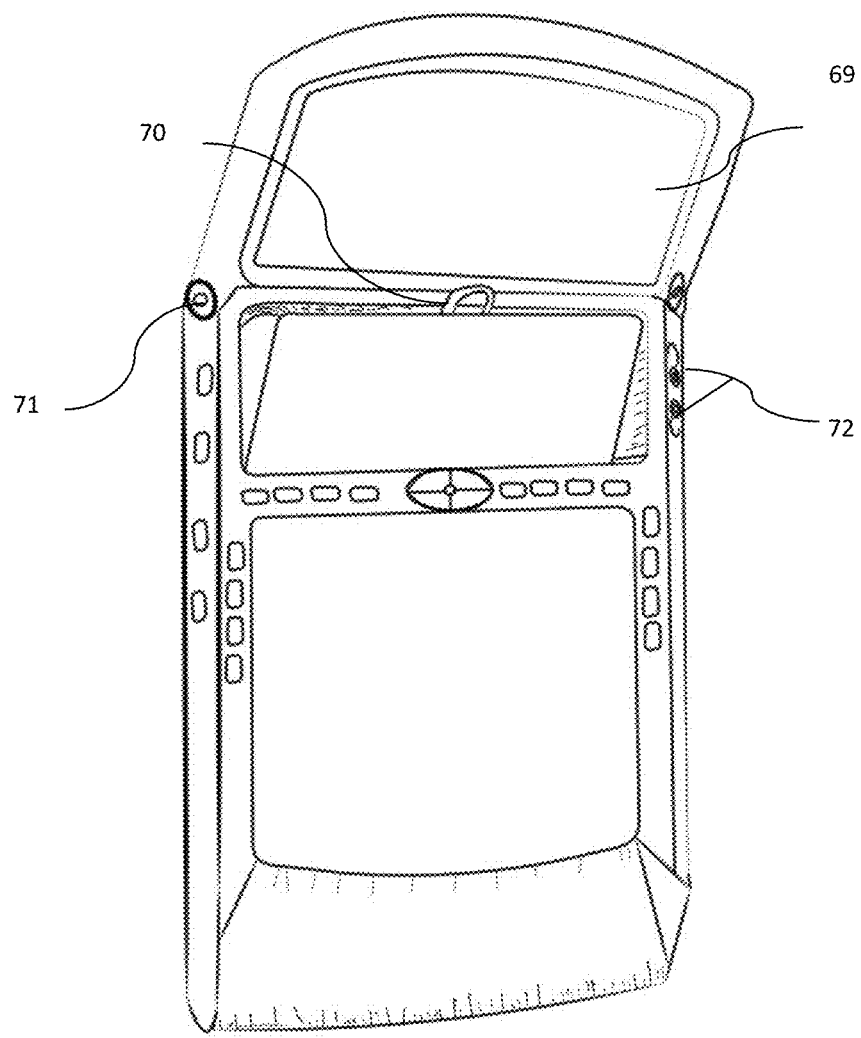
Figure: 43

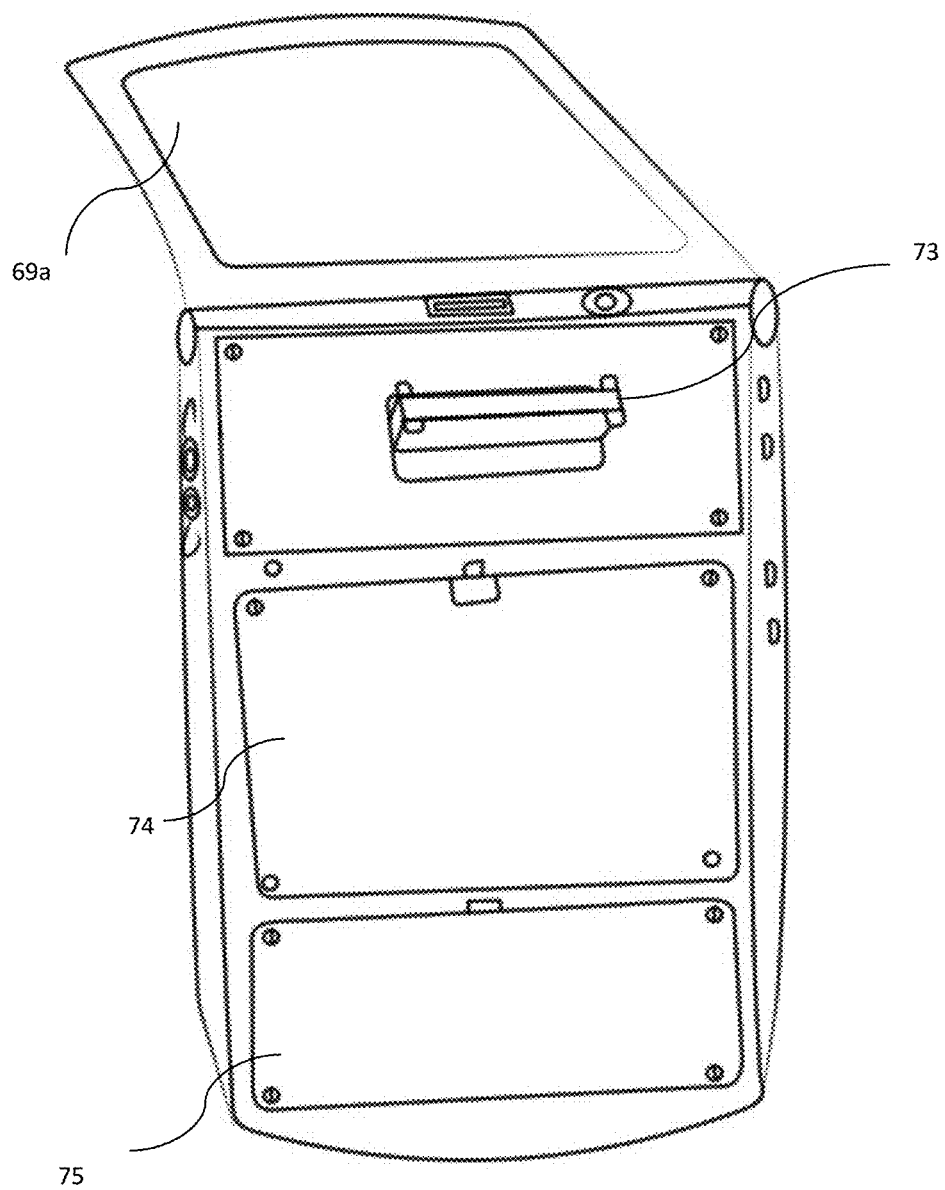
Figure: 44

Security system display on school restroom with number locked door
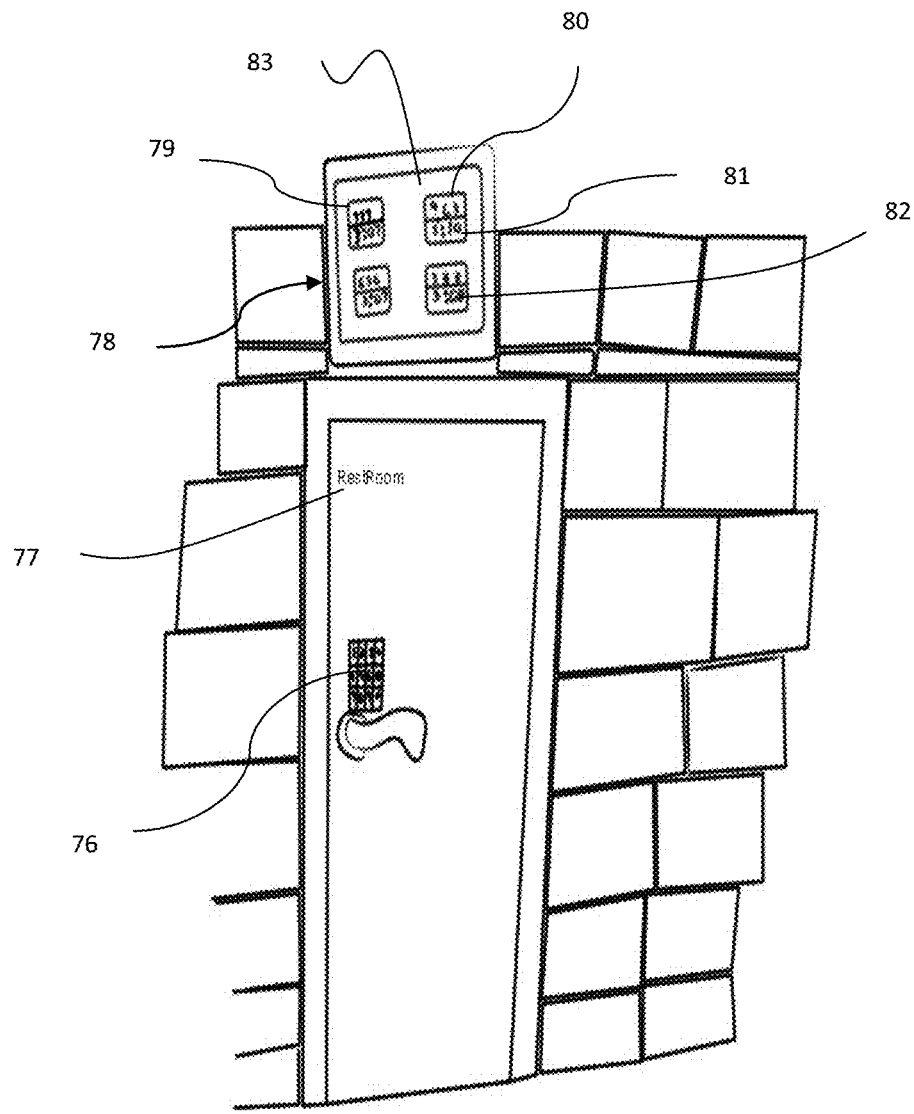
Figure: 45

Roof top solar panel mounting frame come ventilator side to top view
(permanent mounting frame)
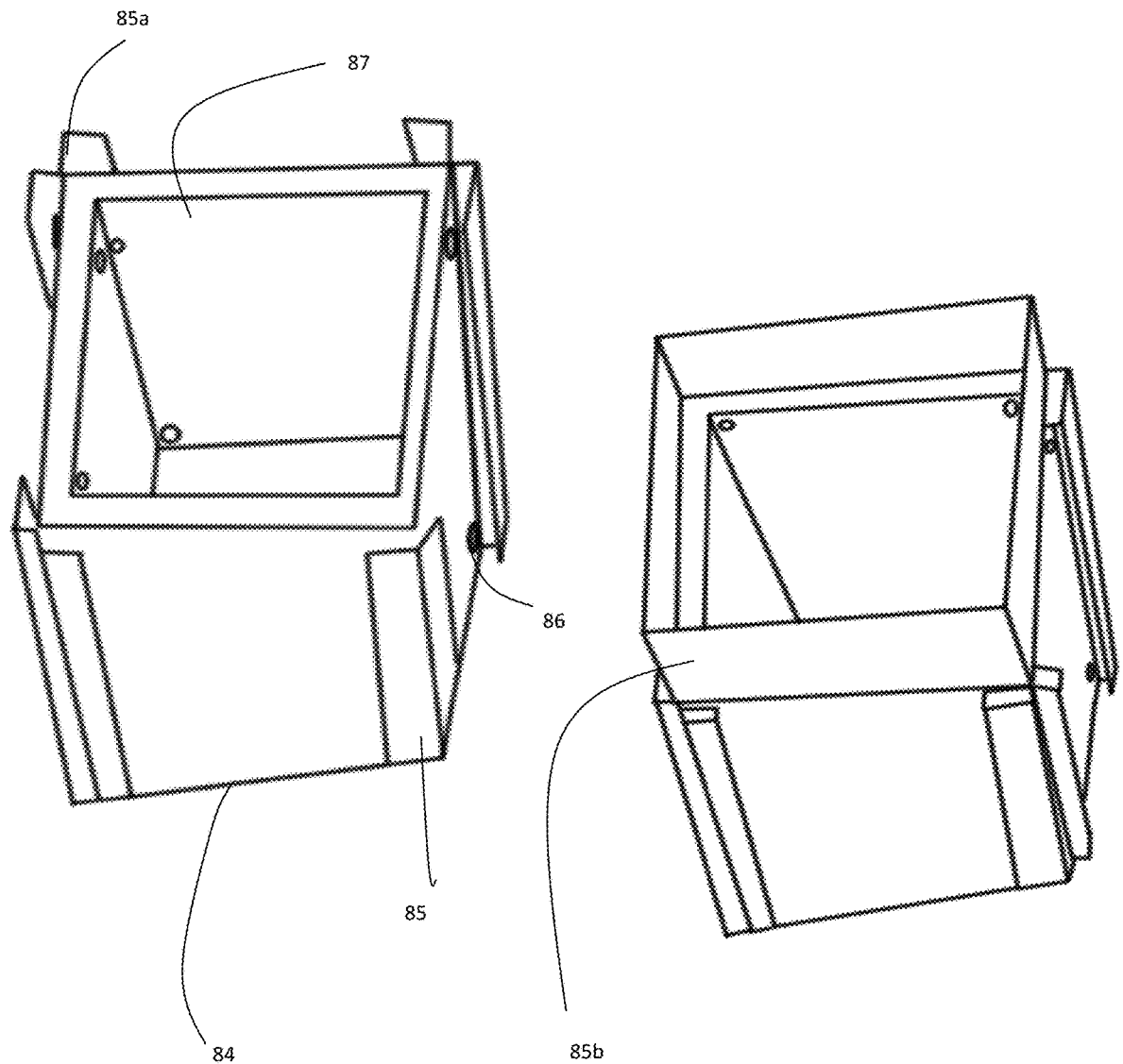
Figure: 46

Solar panel mounted on one side of roof top solar panel mounting frame come ventilator
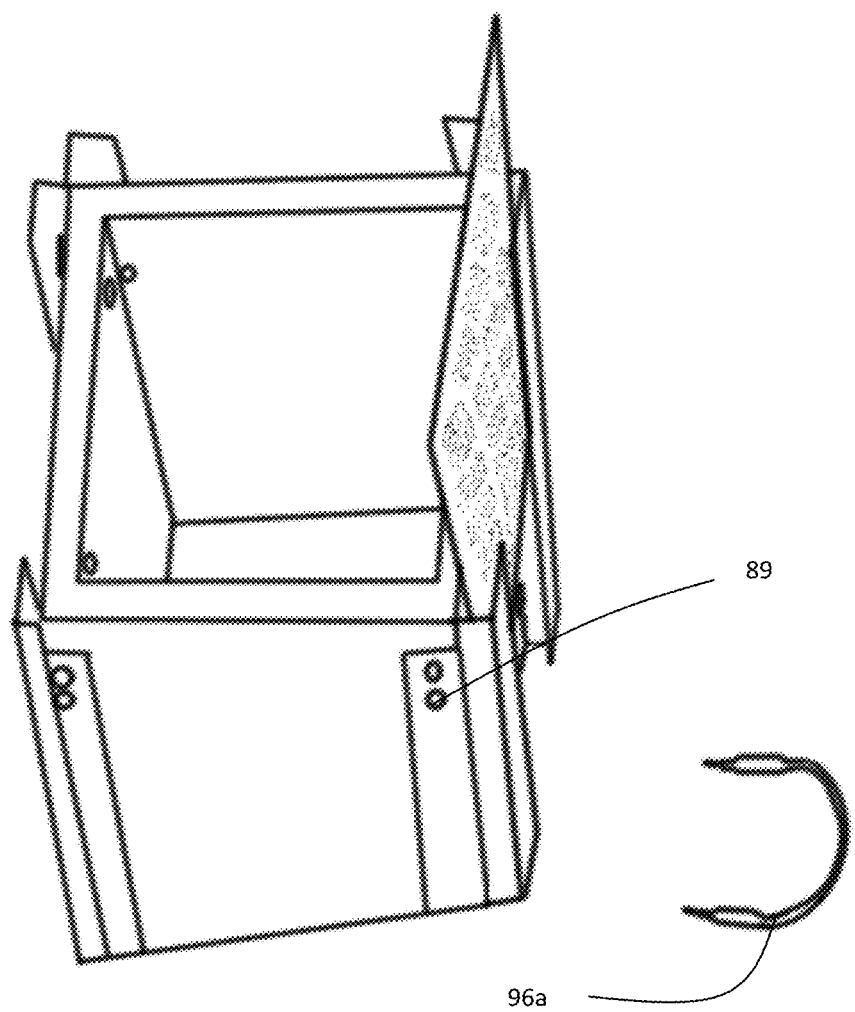
Figure: 47

Wall insert solar panel mounting frame come ventilator
(permanent wall mount) back and side view
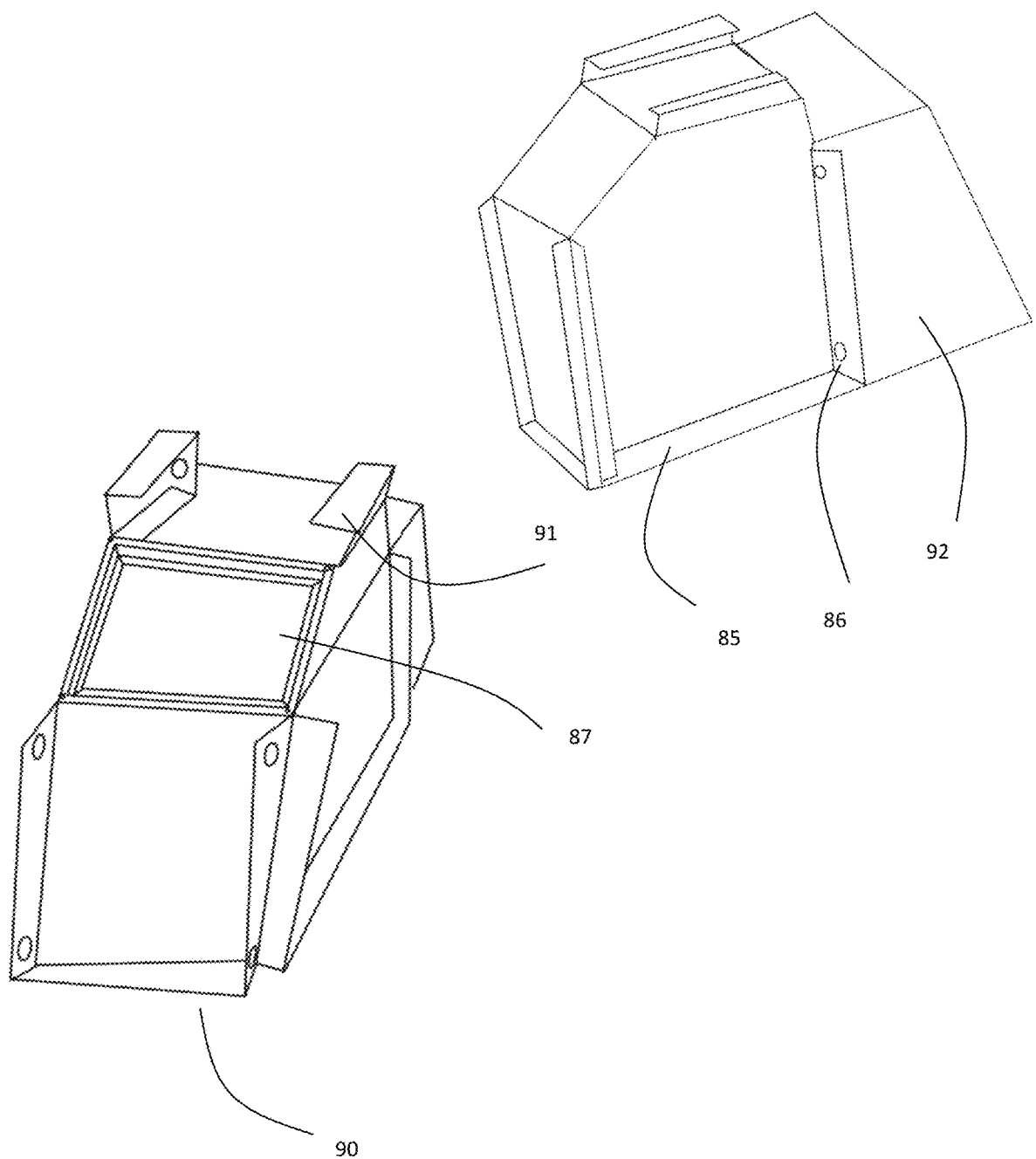
Figure: 48

Solar panel mount frame into the wall
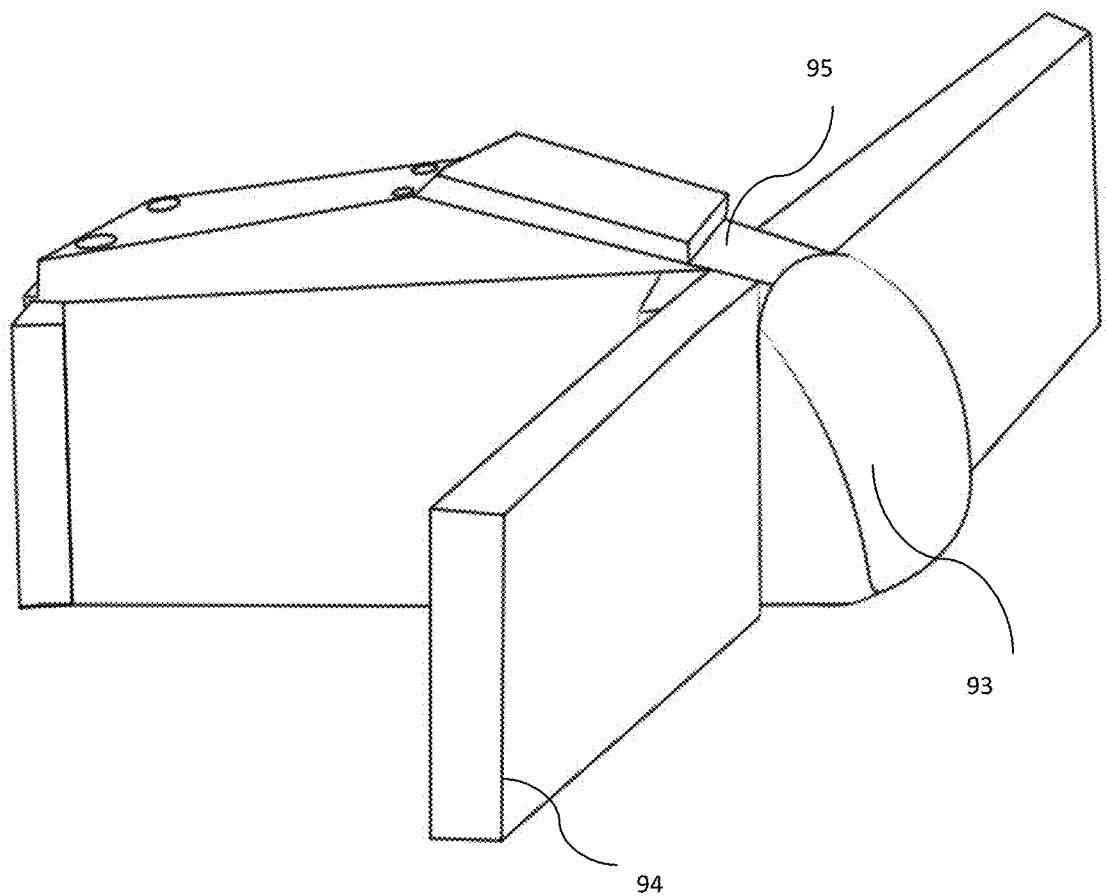
Figure: 49

Solar power storage system as well as supply method for dual tablets in the classroom
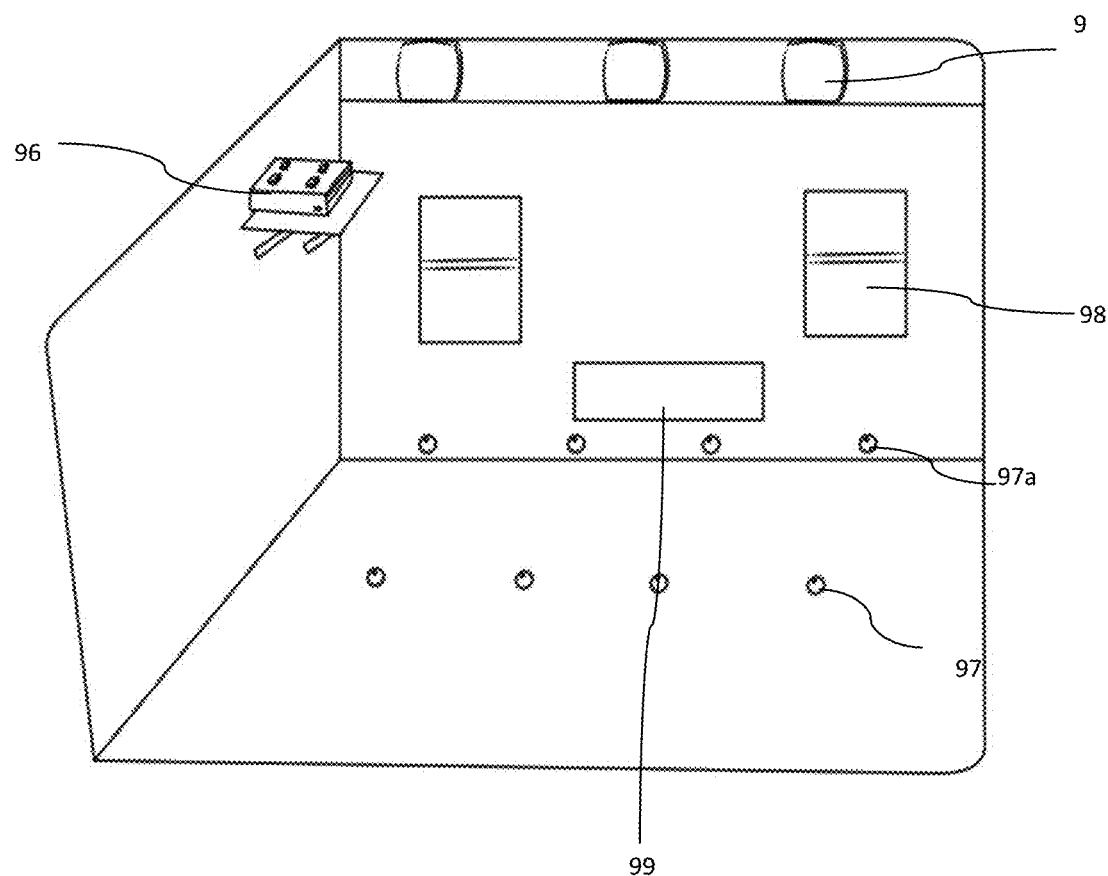
Figure: 50

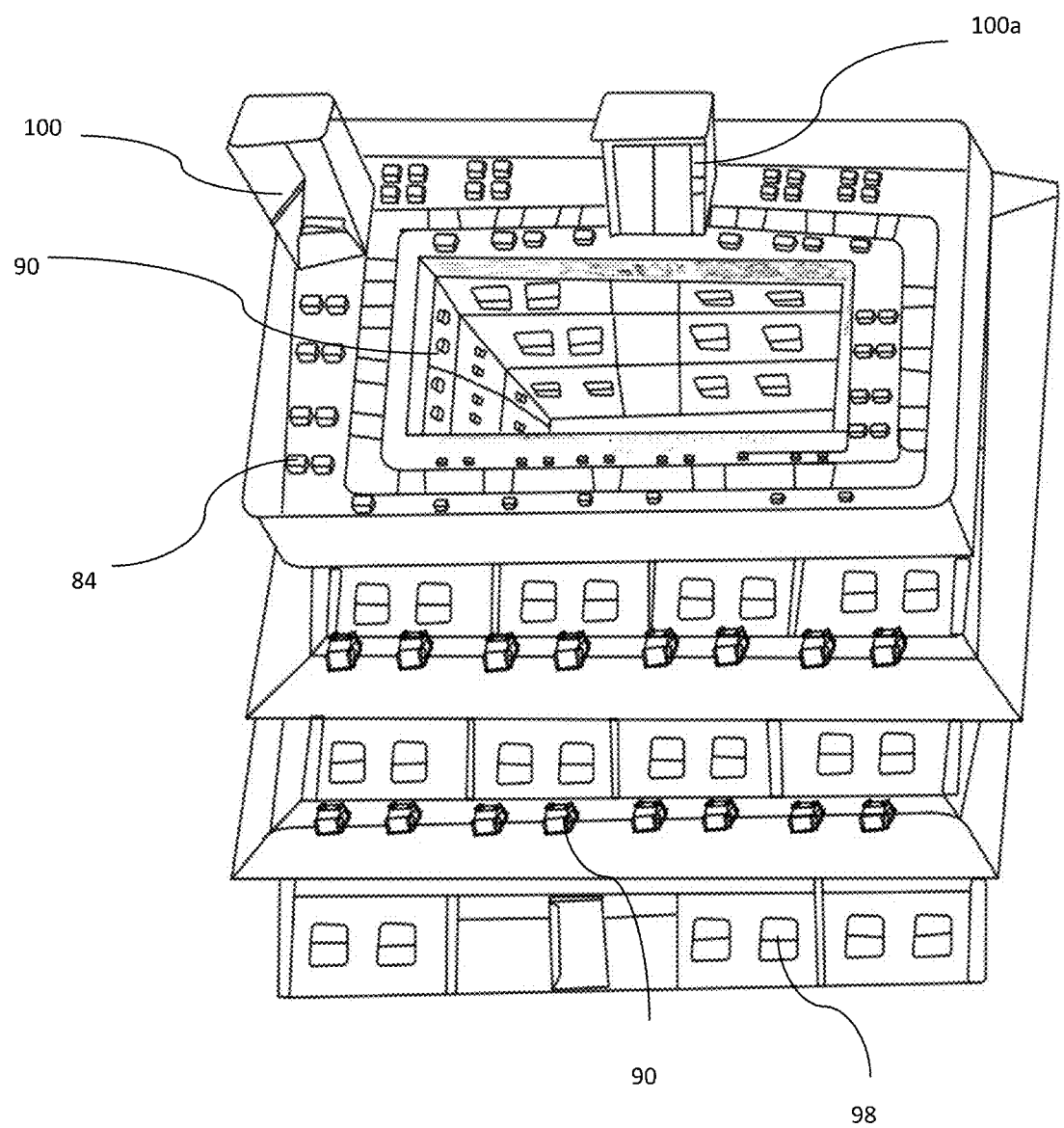
Figure: 51

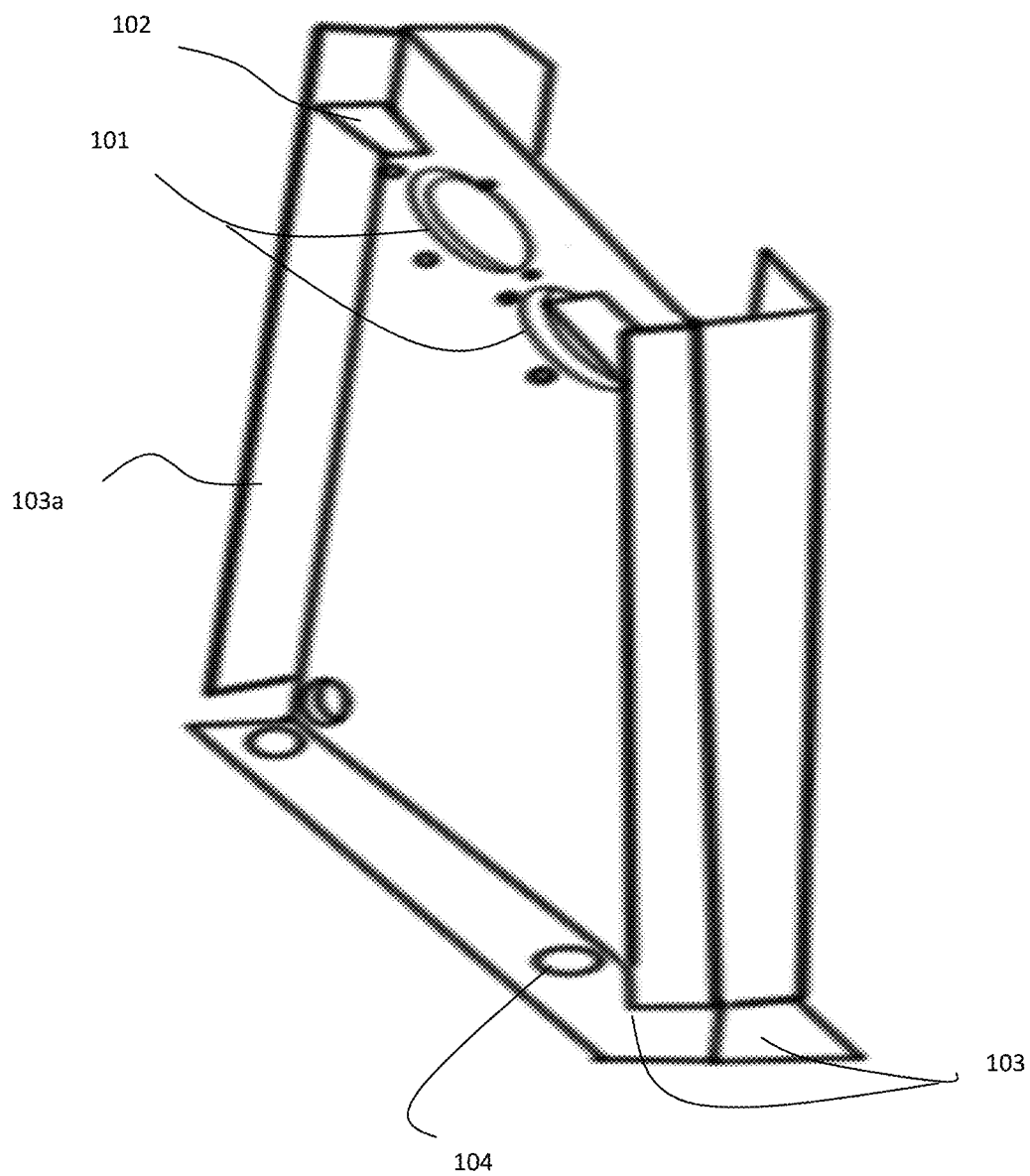
Figure: 52

Roof top Solar panel mounting frame come ventilator front to inside view
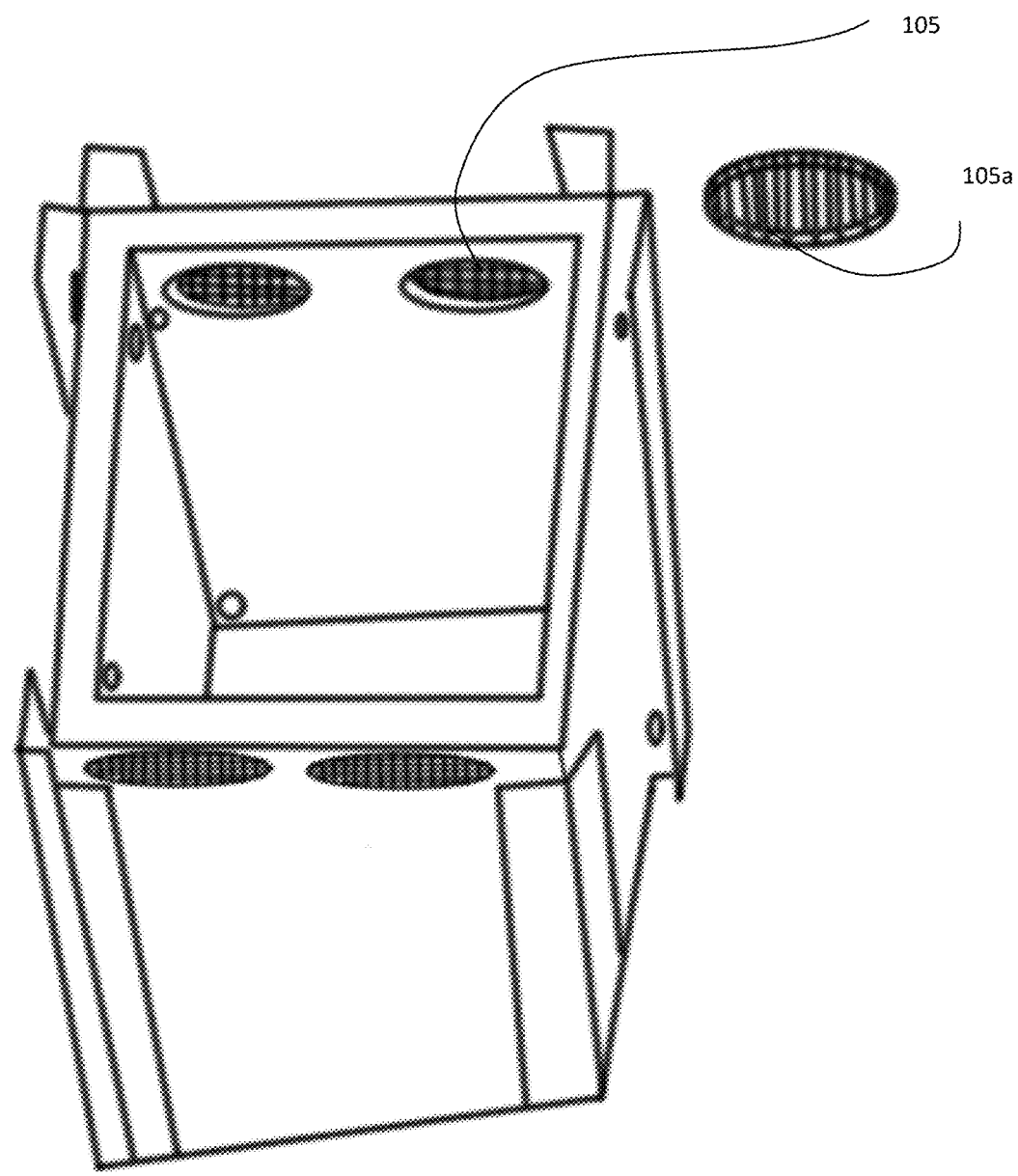
Figure: 53

Roof top Solar panel mounting frame come ventilator side to inside view with assembly parts
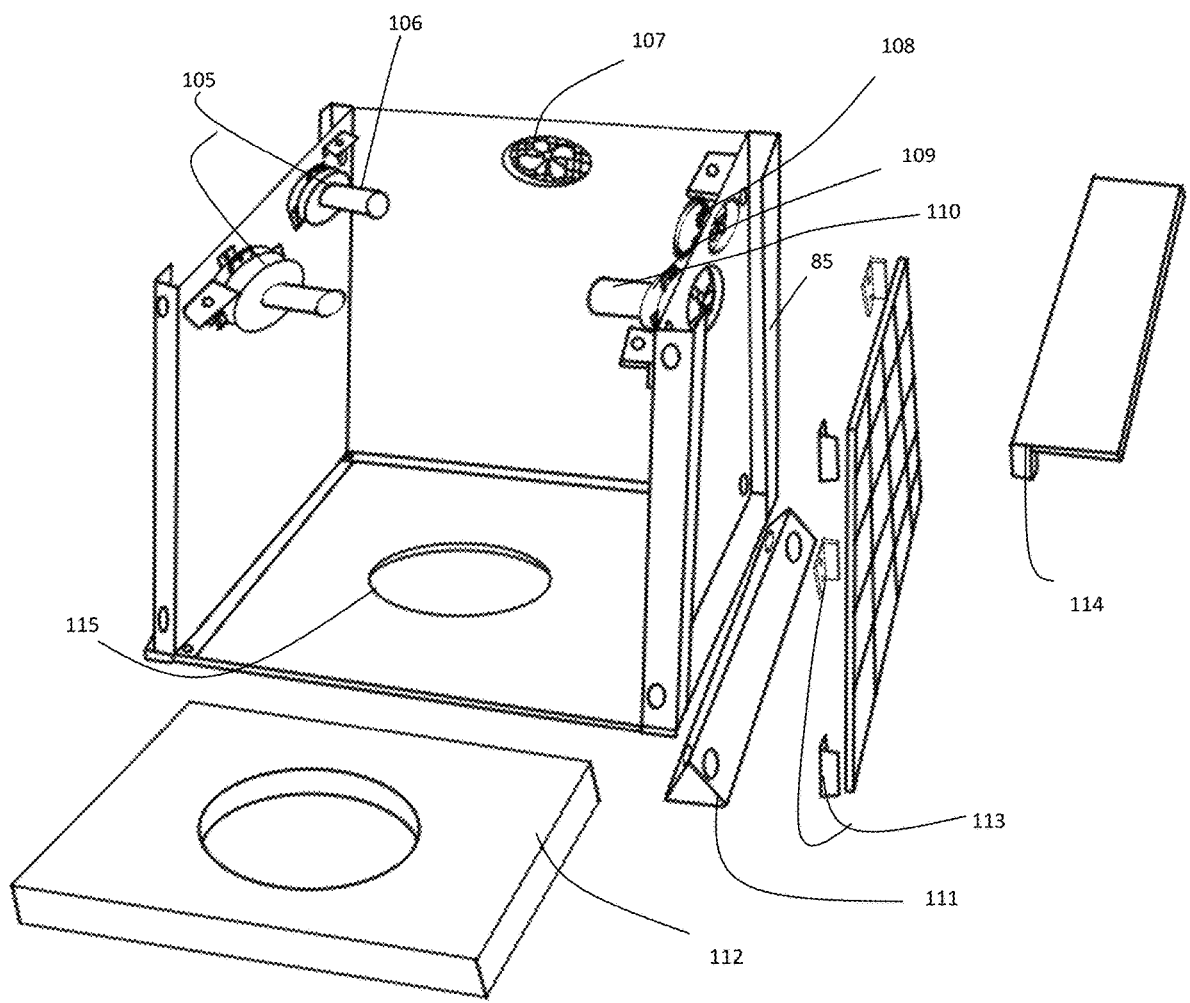
Figure: 54

Roof top Solar panel mounting frame come ventilator top view
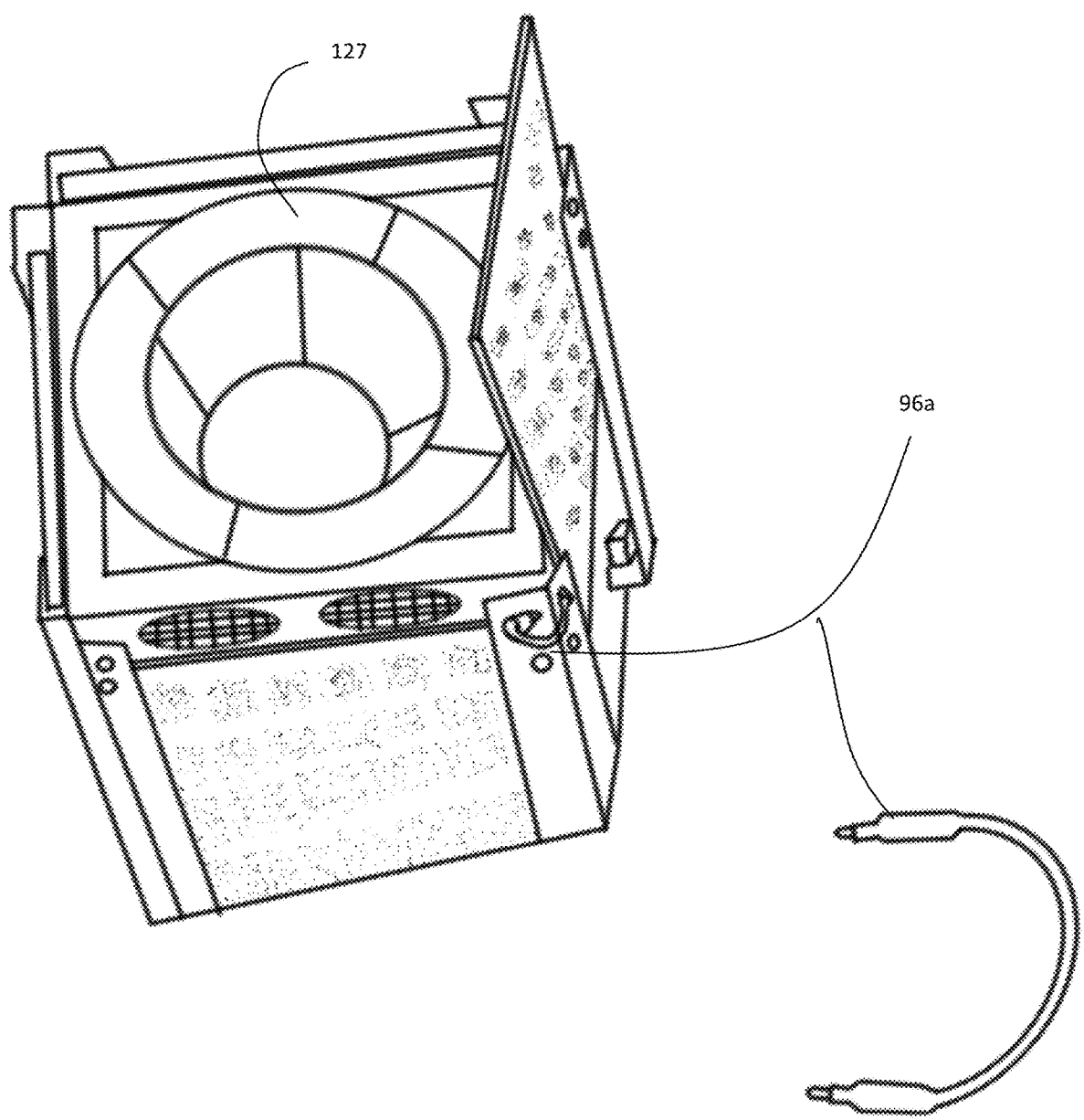
Figure: 55

Roof top Solar panel mounting frame come ventilator side to internal view
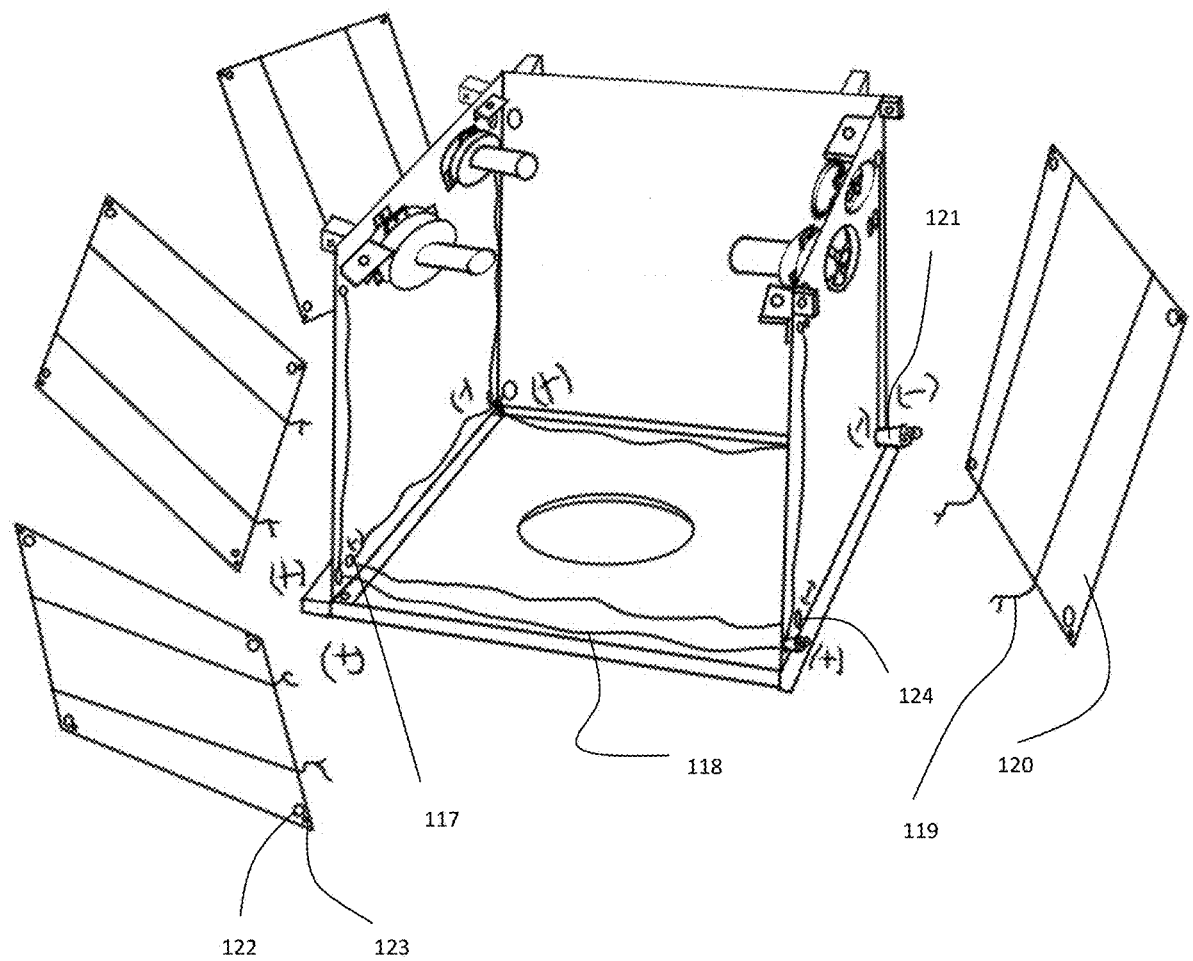
Figure: 56

Roof top solar panel mounting frame come ventilator   front to top internal view
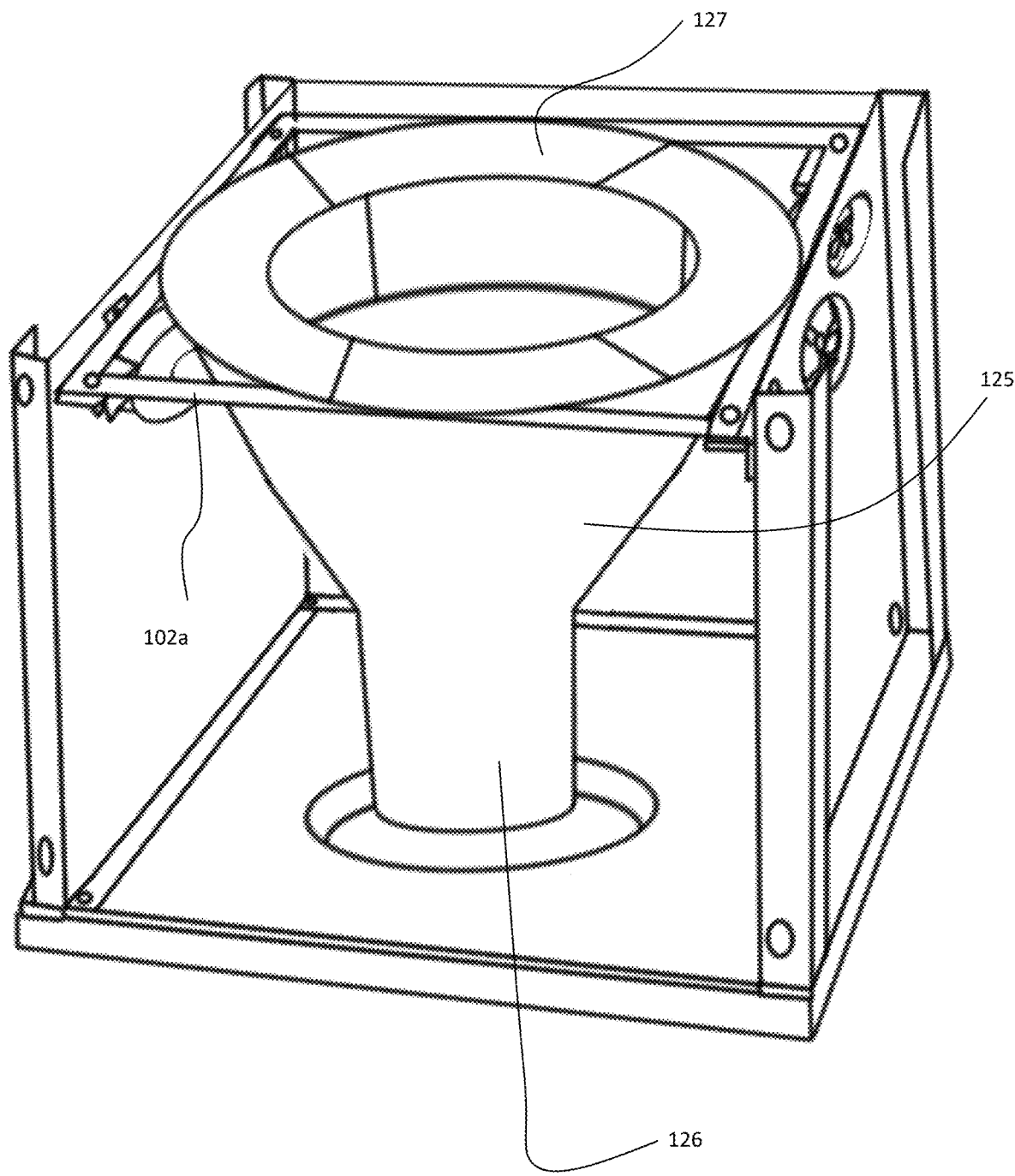
Figure: 57

Roof top solar panel mounting frame come ventilator front to top internal view
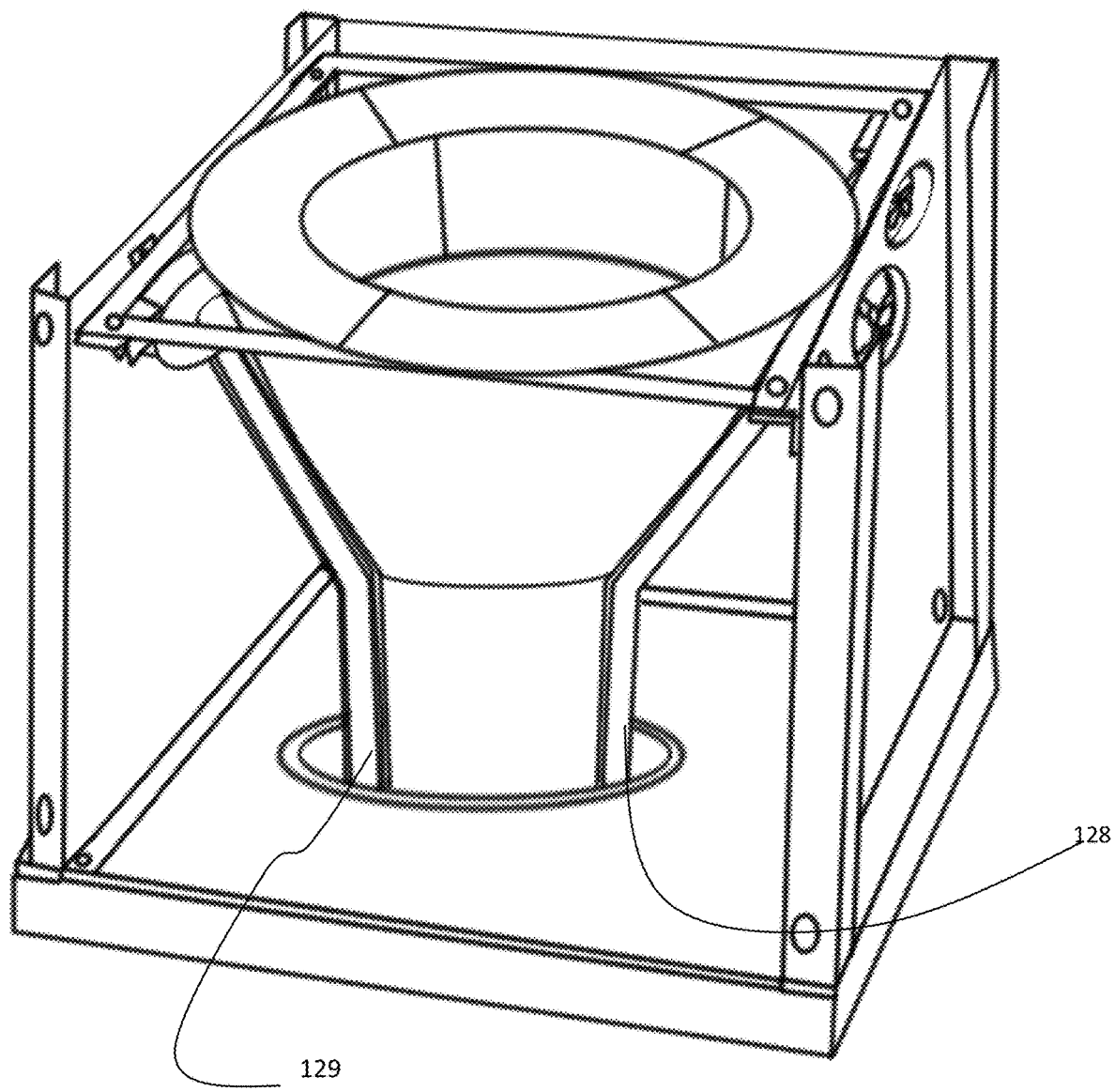
Figure: 58

Roof top solar panel mounting frame come ventilator front to top internal view
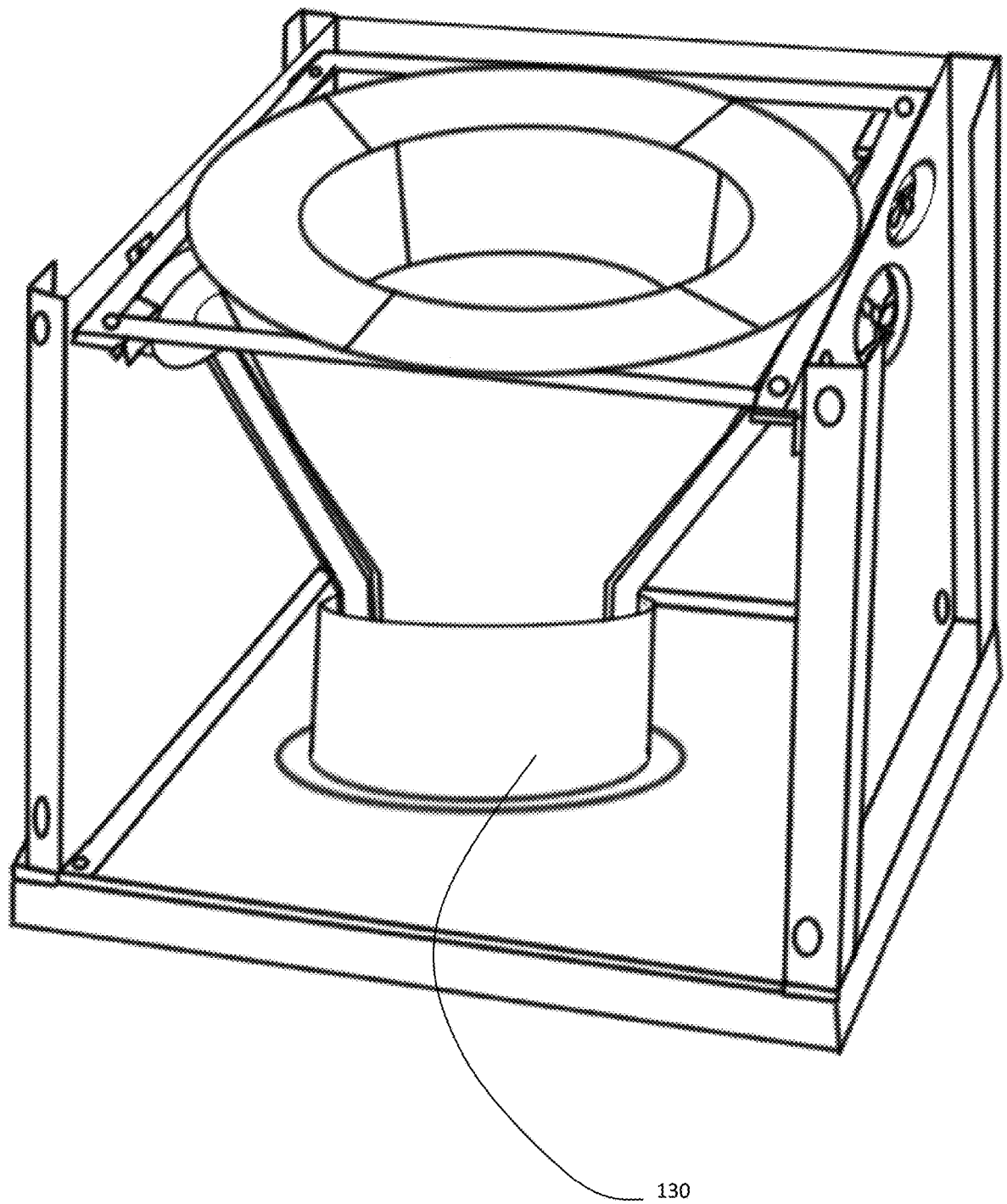
Figure: 59

Roof top solar panel mounting frame come ventilator front to top internal view from roof top to inside room
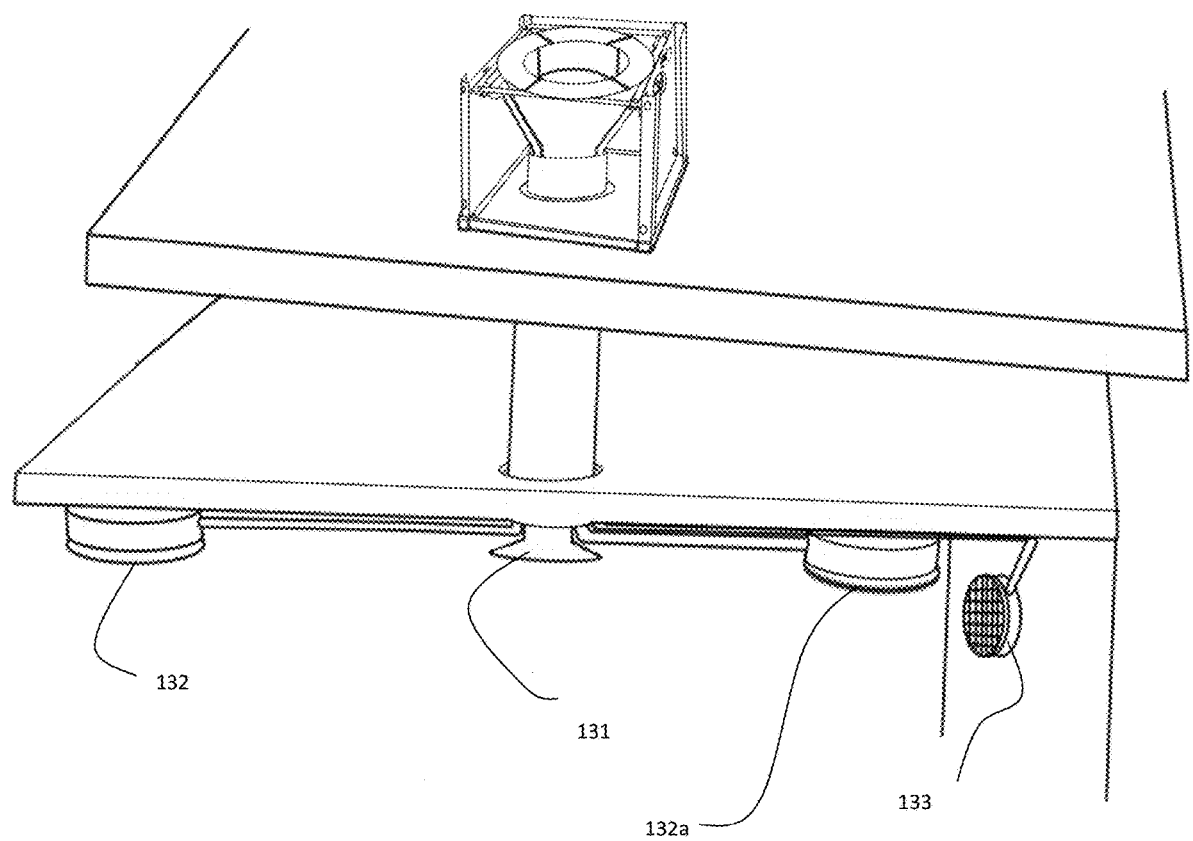
Figure: 60

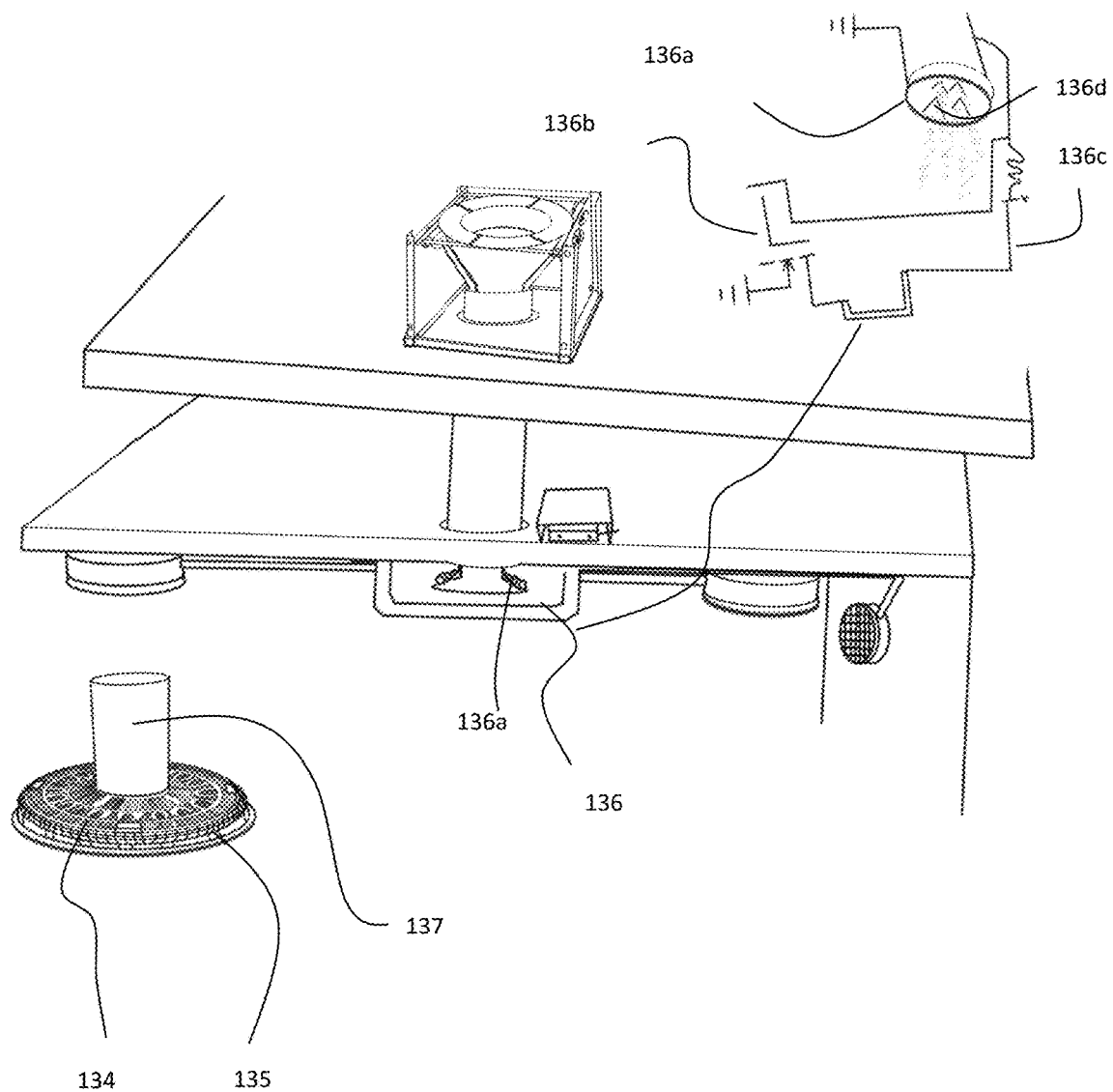
Figure: 61

Front view of roof top solar panel mounting frame come ventilator
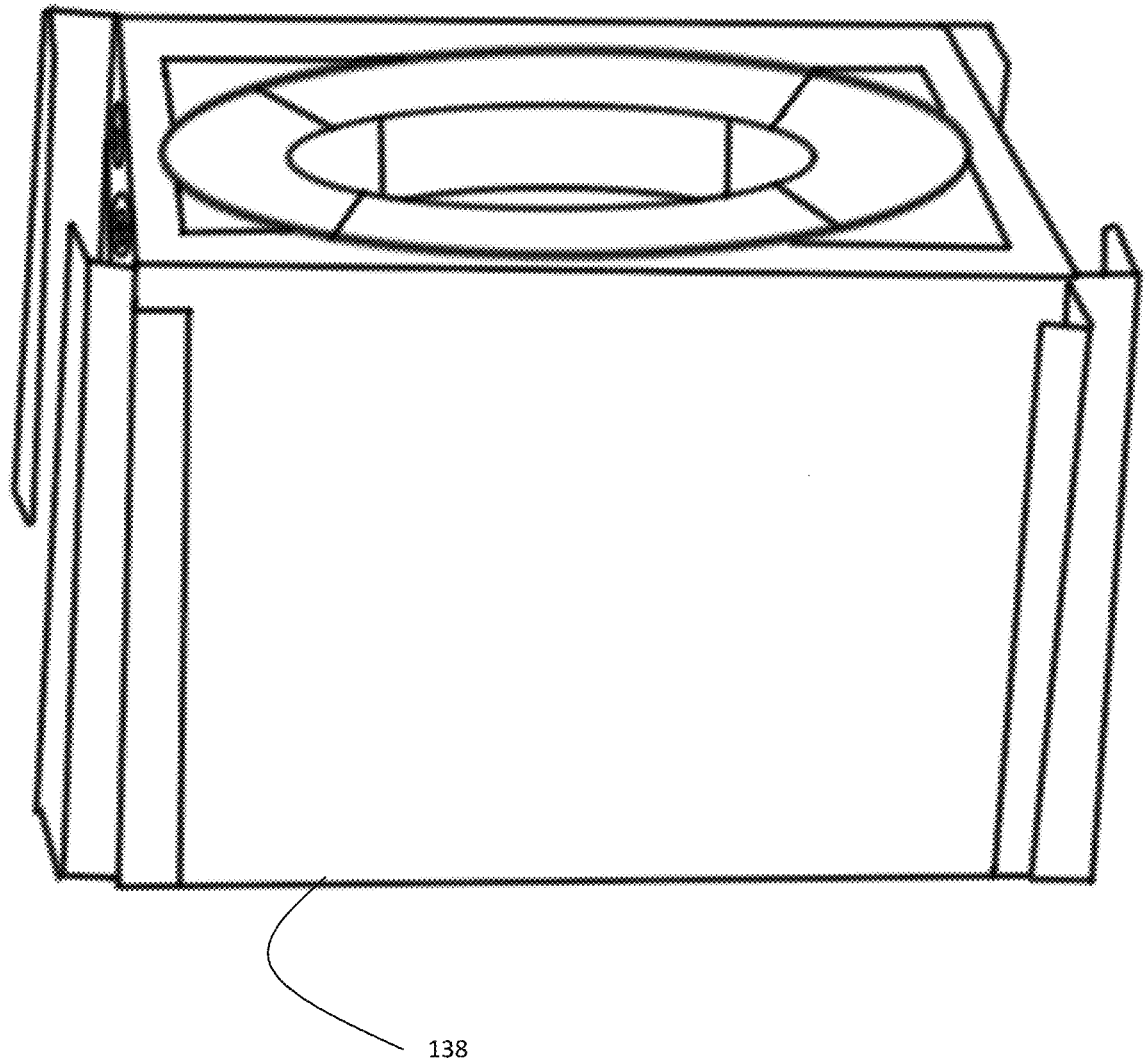
138
Figure: 62

Roof top solar panel mounting frame come ventilator front to top view
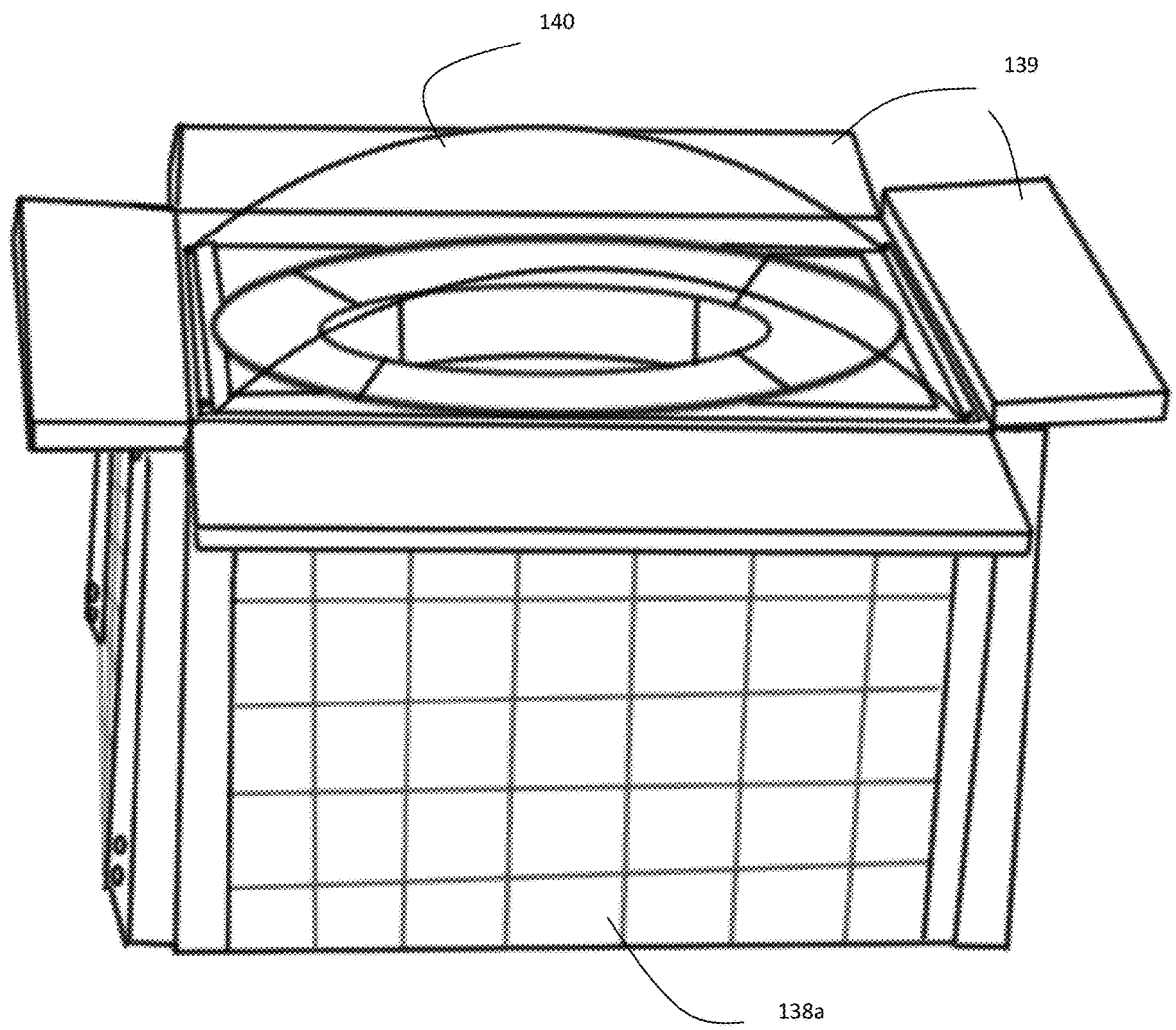
Figure: 63

A modern home back to top view with roof top and wall mount solar panel mounting frame come ventilators
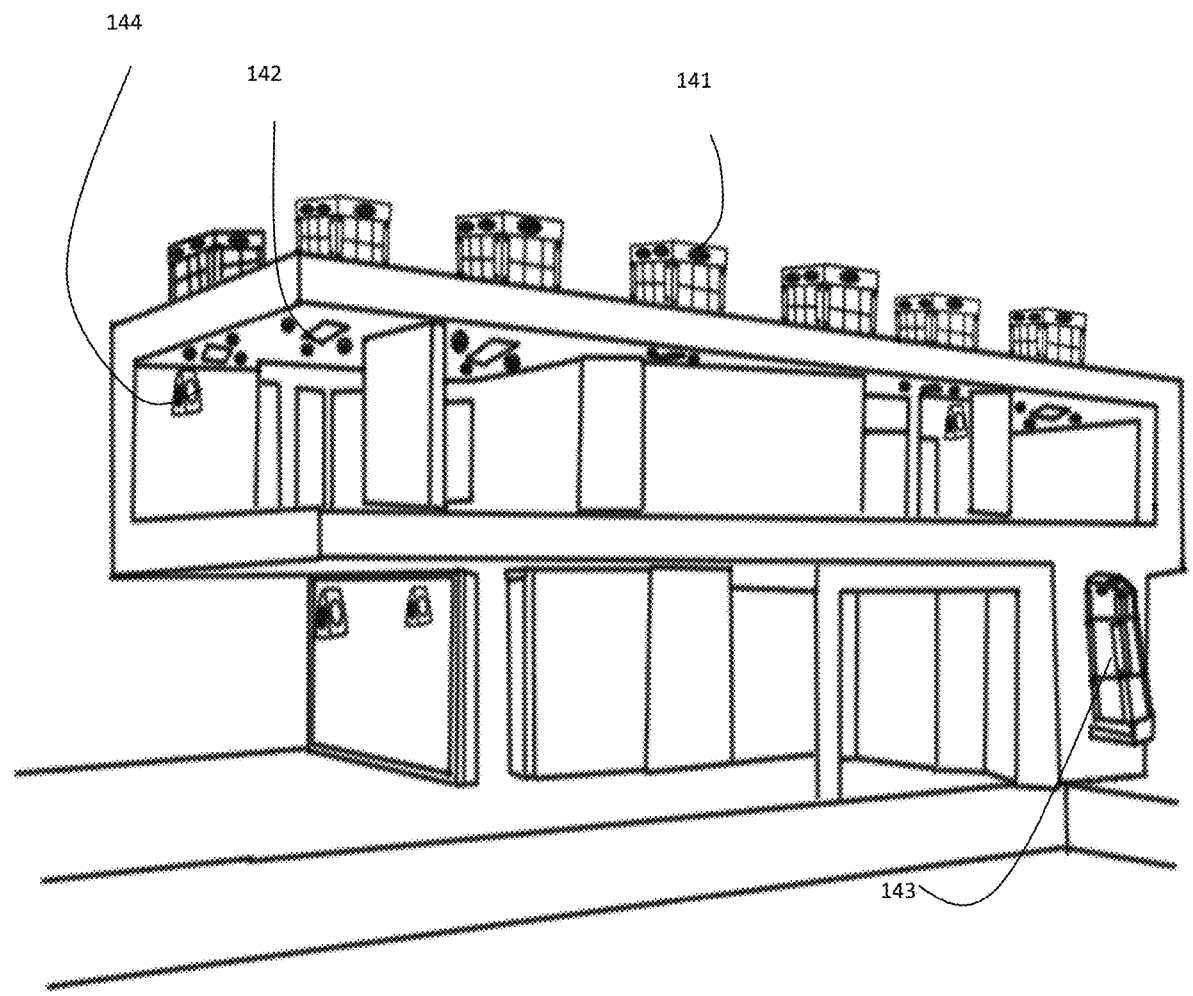
Figure: 64

Modern home internal and top view with roof top and side wall solar panel mounting frame come ventilators
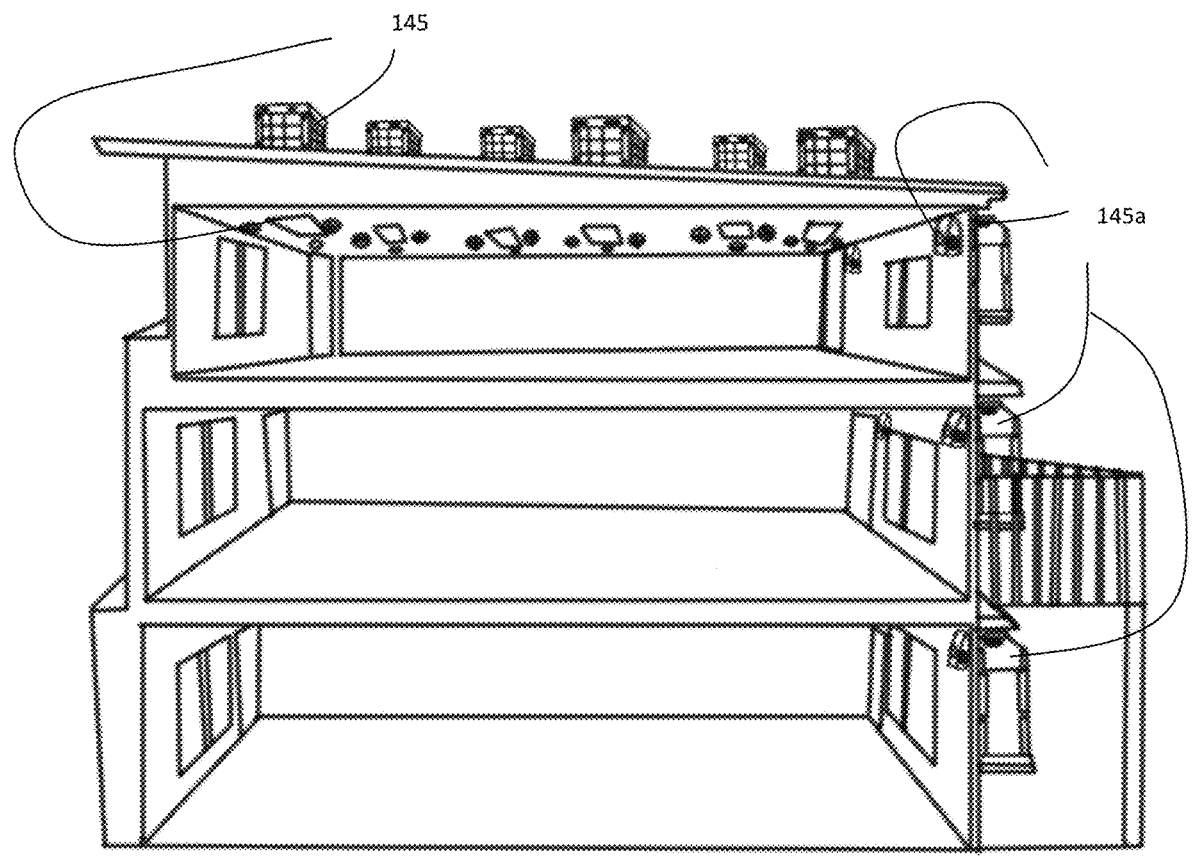
Figure: 65

Modified slope roof top solar panel mounting frame come ventilator side to top view
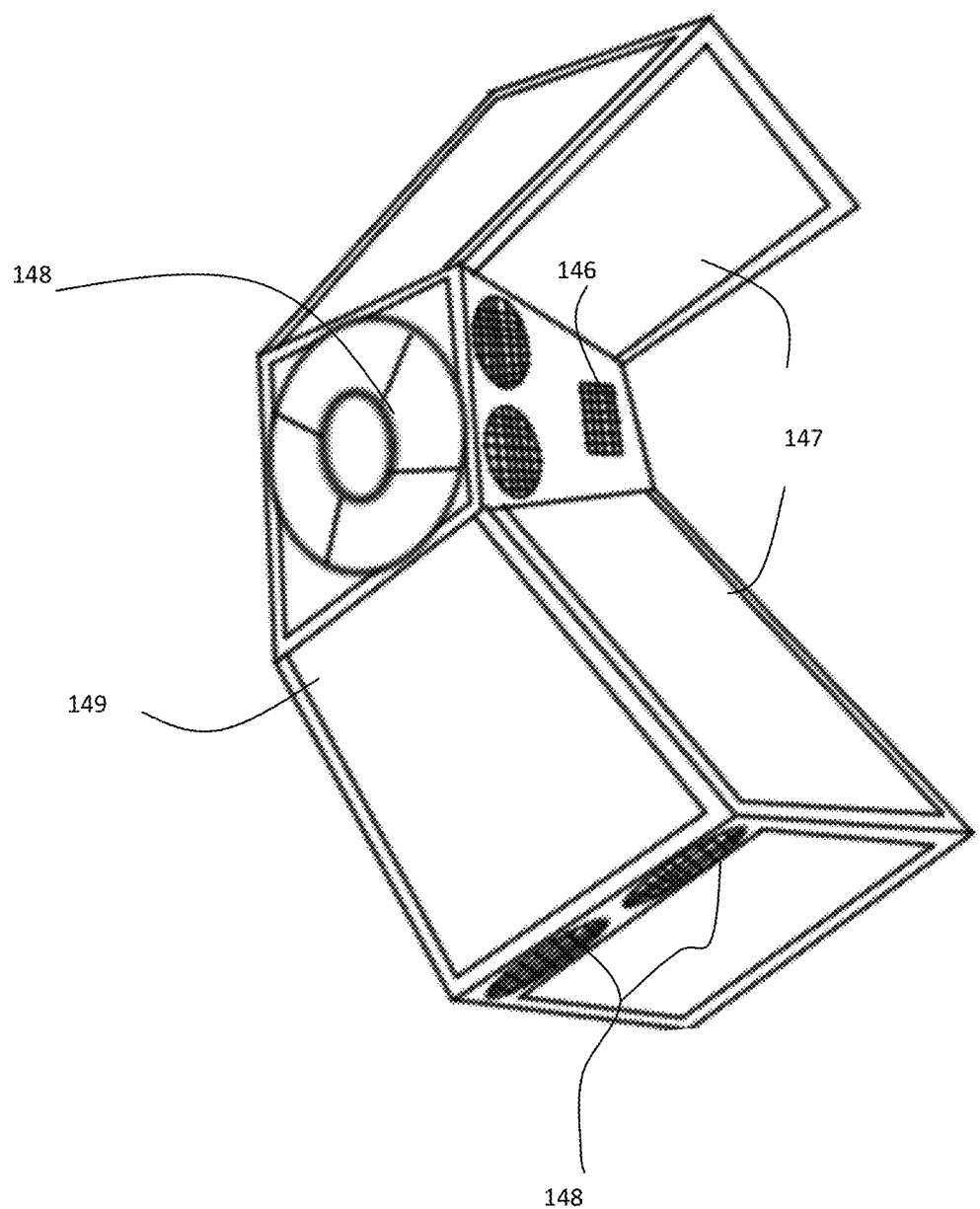
Figure: 66

Slope roof top solar panel mounting frame come ventilator front view
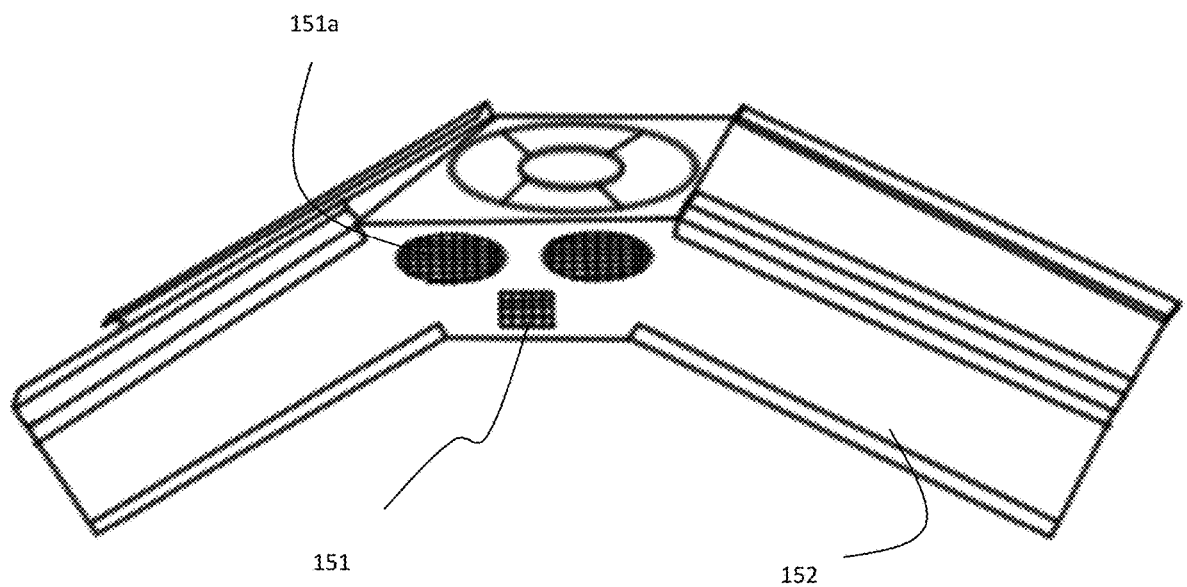
Figure: 67

From roof top to into the hallway /room internal view of slope roof top solar panel mounting frame come ventilator
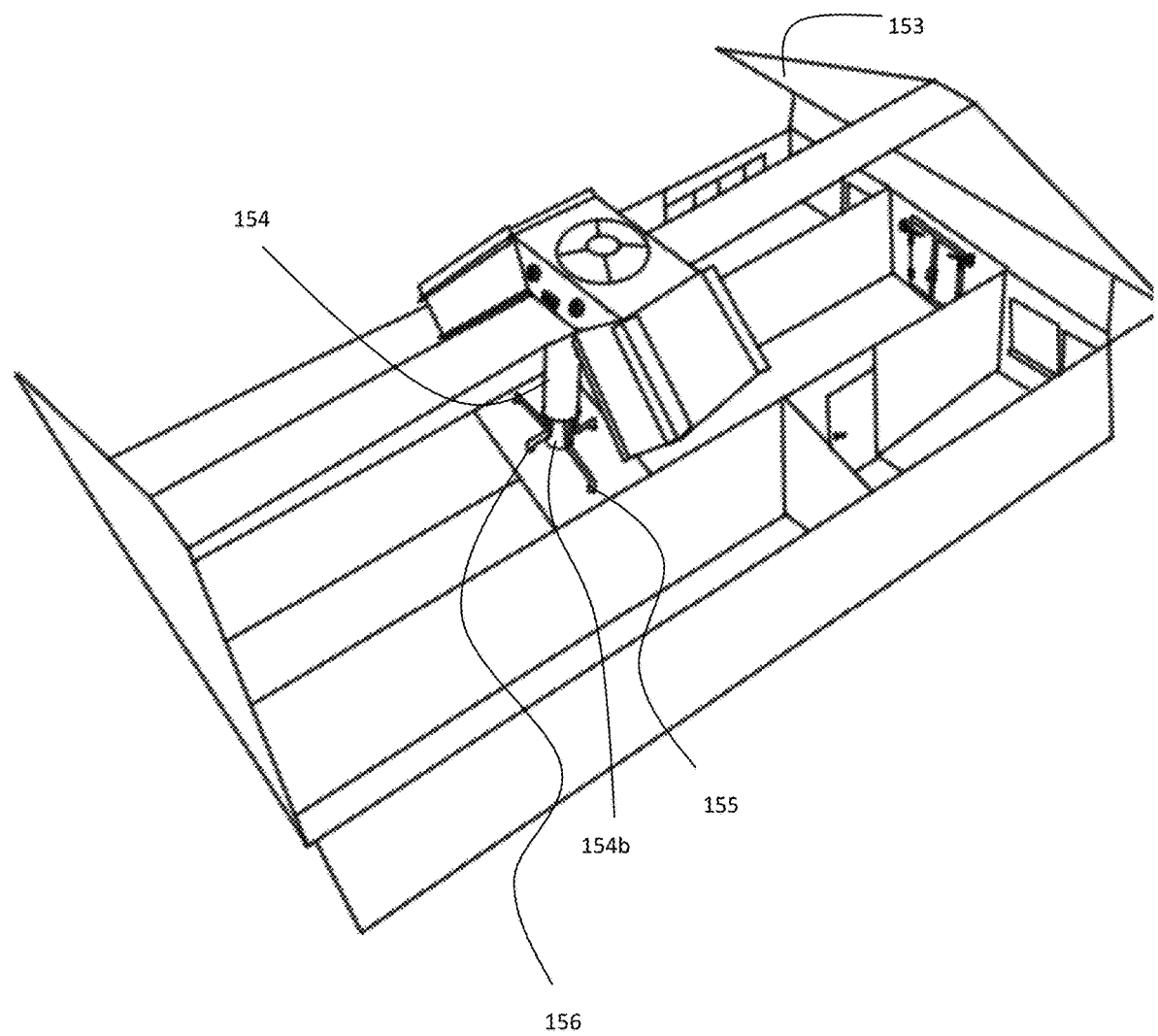
Figure: 68

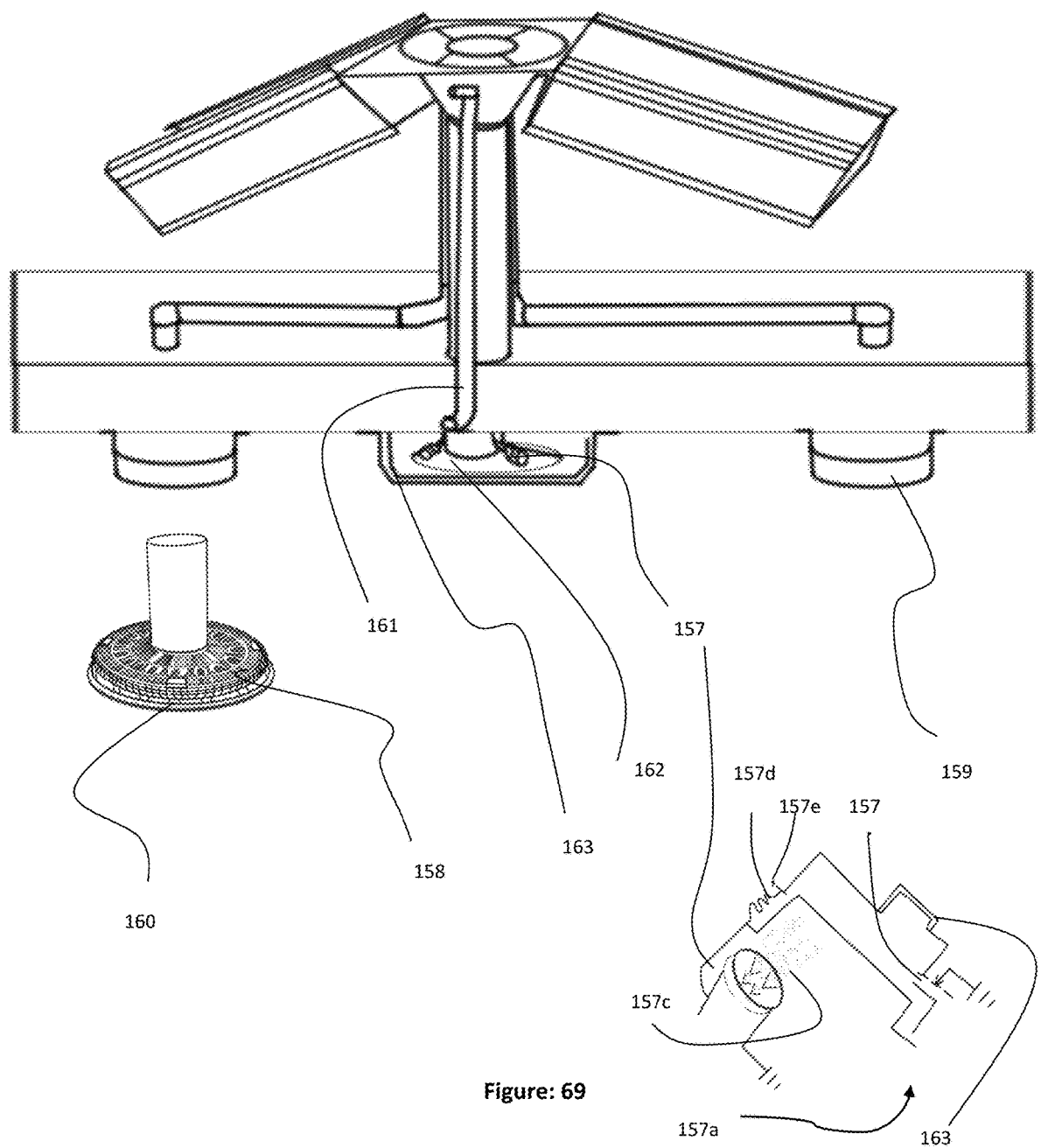
Front to top internal view of slope roof top solar panel mounting roof come ventilator with dark sensor circuit
Figure: 69 front to top internal view of slope roof top solar panel mounting roof come ventilator with heat sink
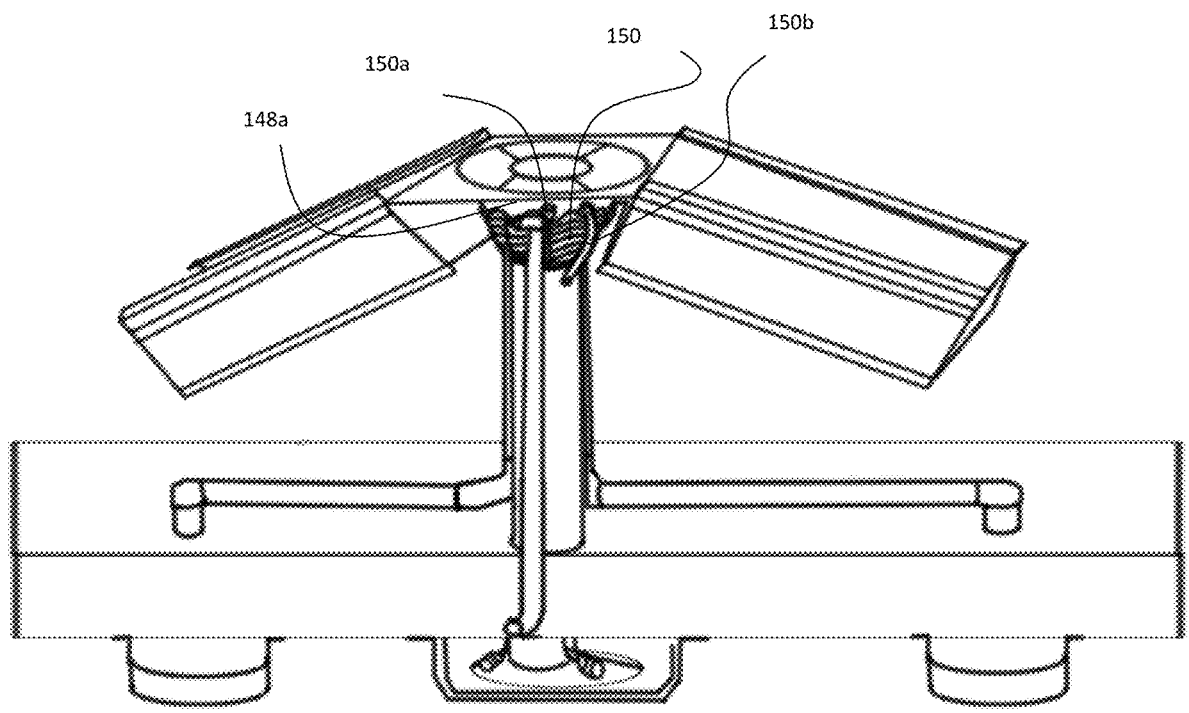
Figure: 70

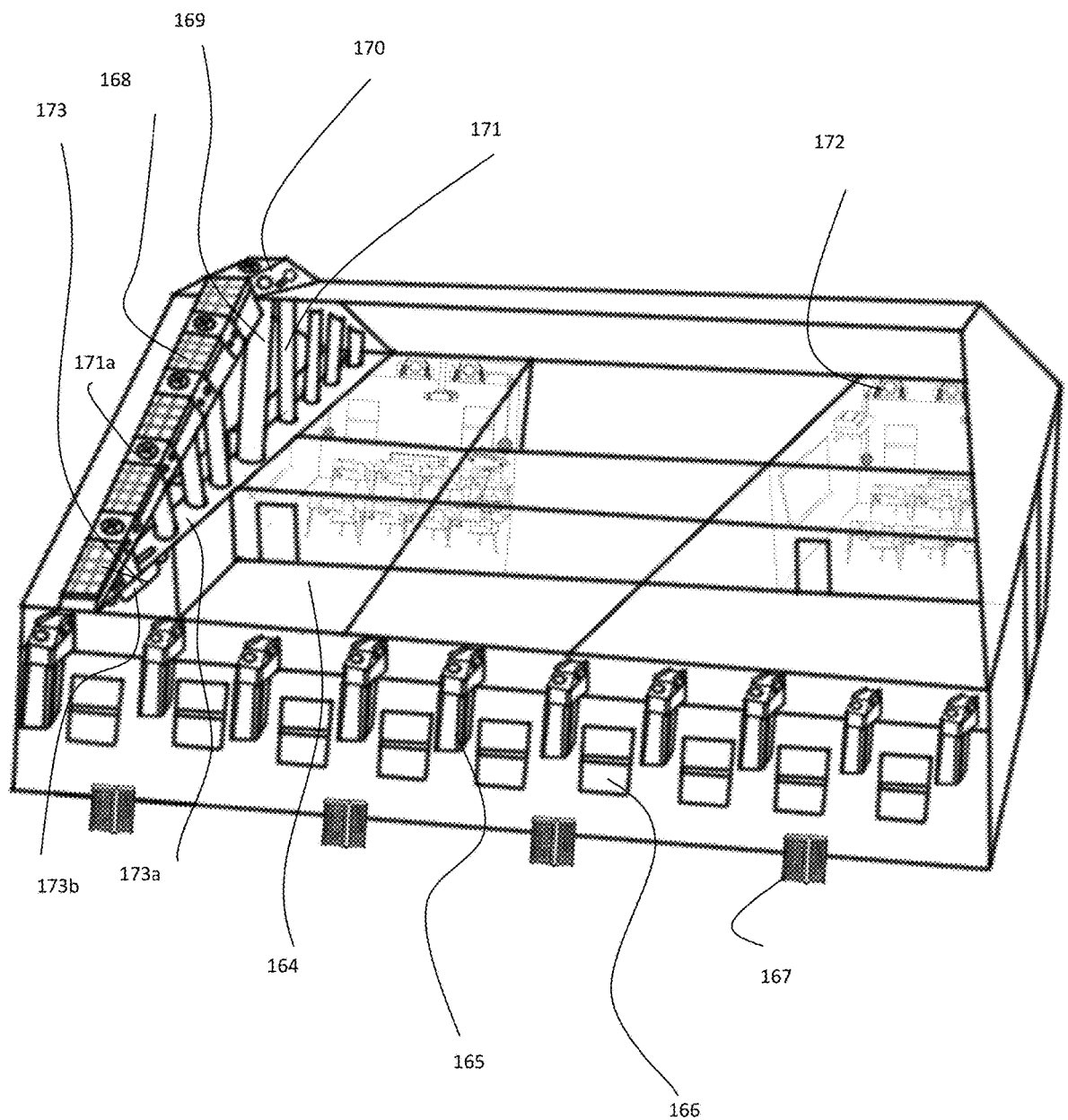
A Model classroom's top to internal view
slope roof with extended roof top wall mount solar panel frame come ventilators
Figure: 71

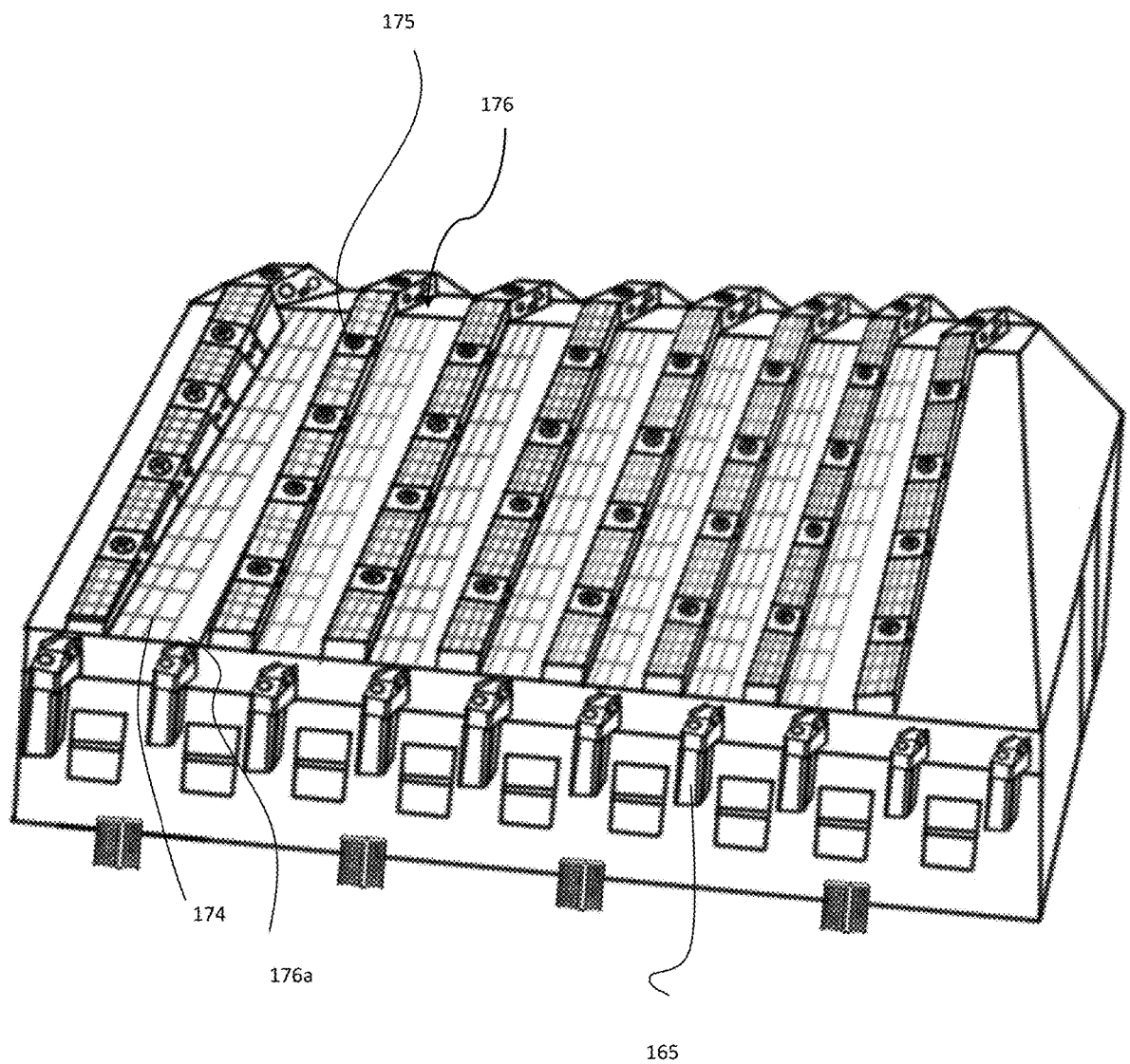
Figure: 72

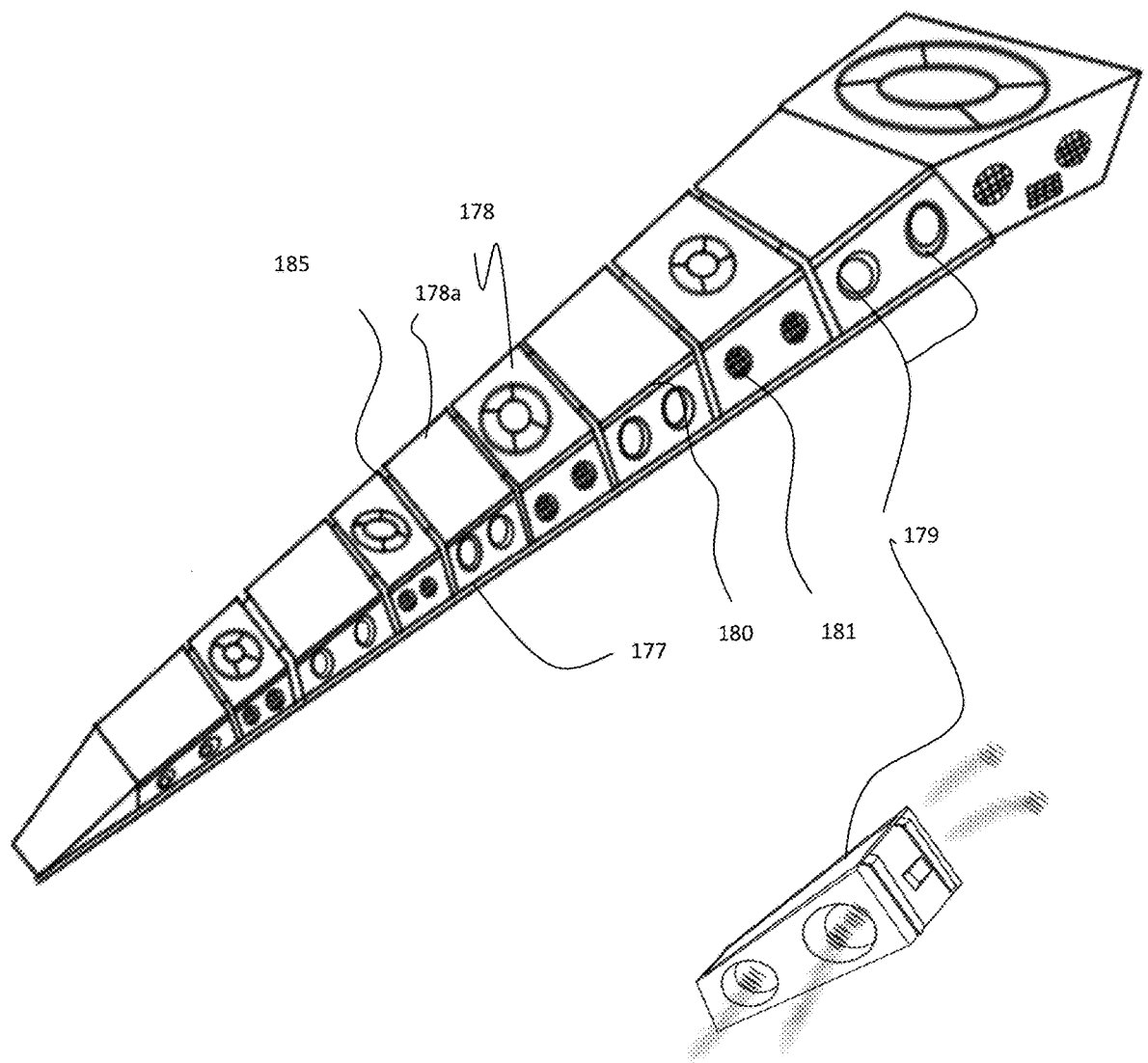
Figure: 73

Side to top view of slope roof top extended solar panel mounting frame come ventilator extinction attachment
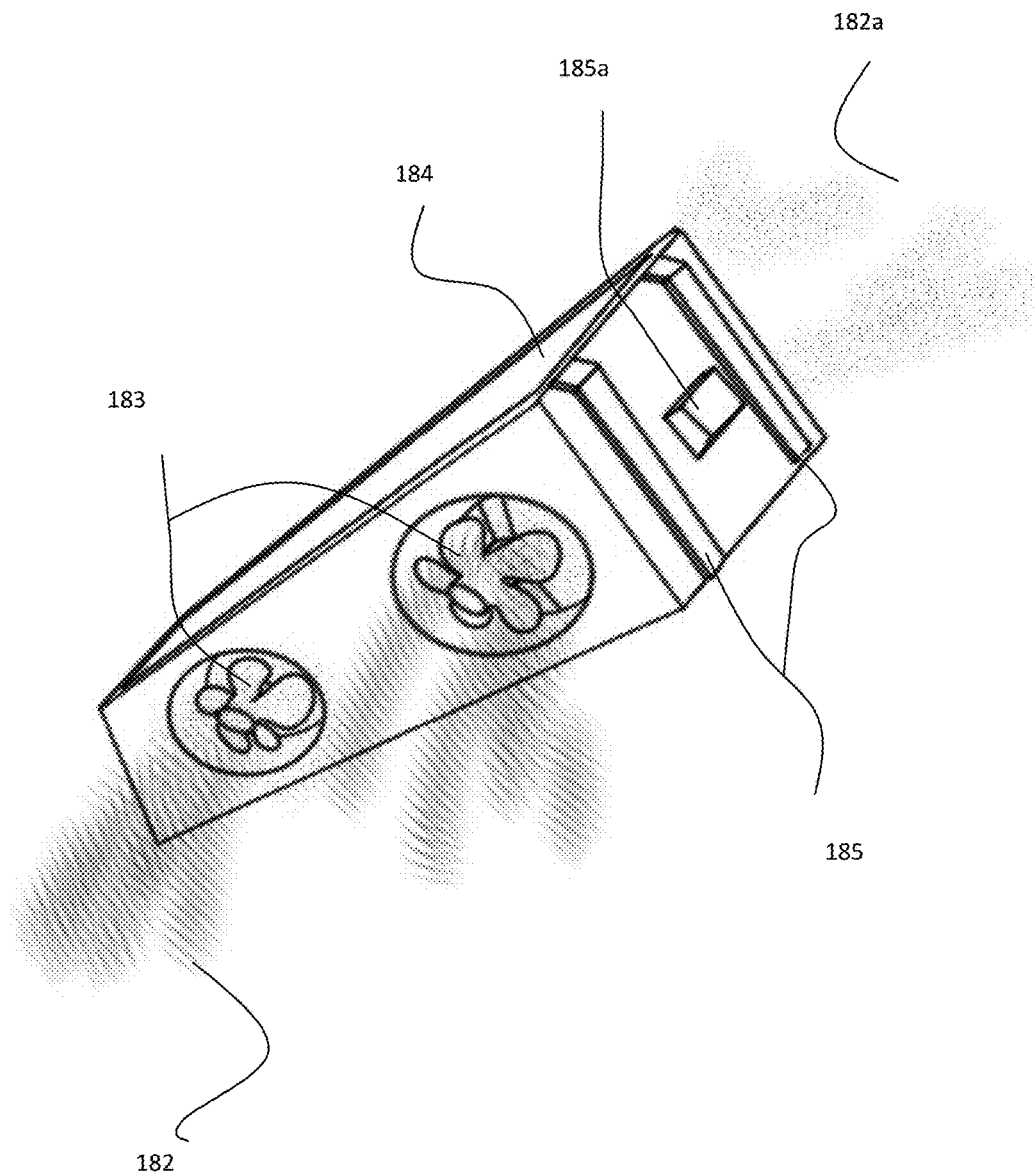
Figure: 74

Slope roof top extended solar panel frame come ventilator front to top two sides view
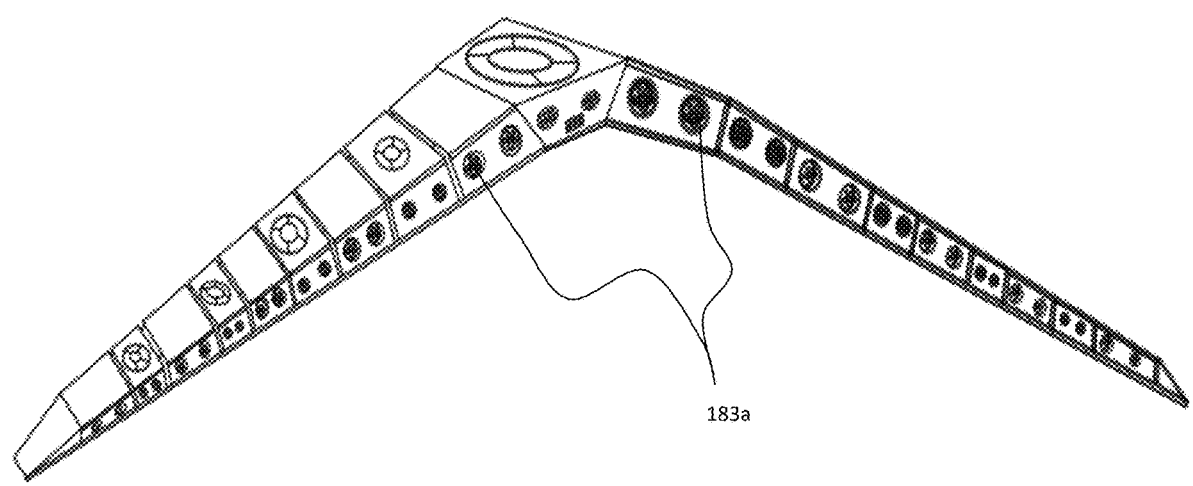
Figure: 75

Front to top view heat sink come emergency heater with air pipe attachment
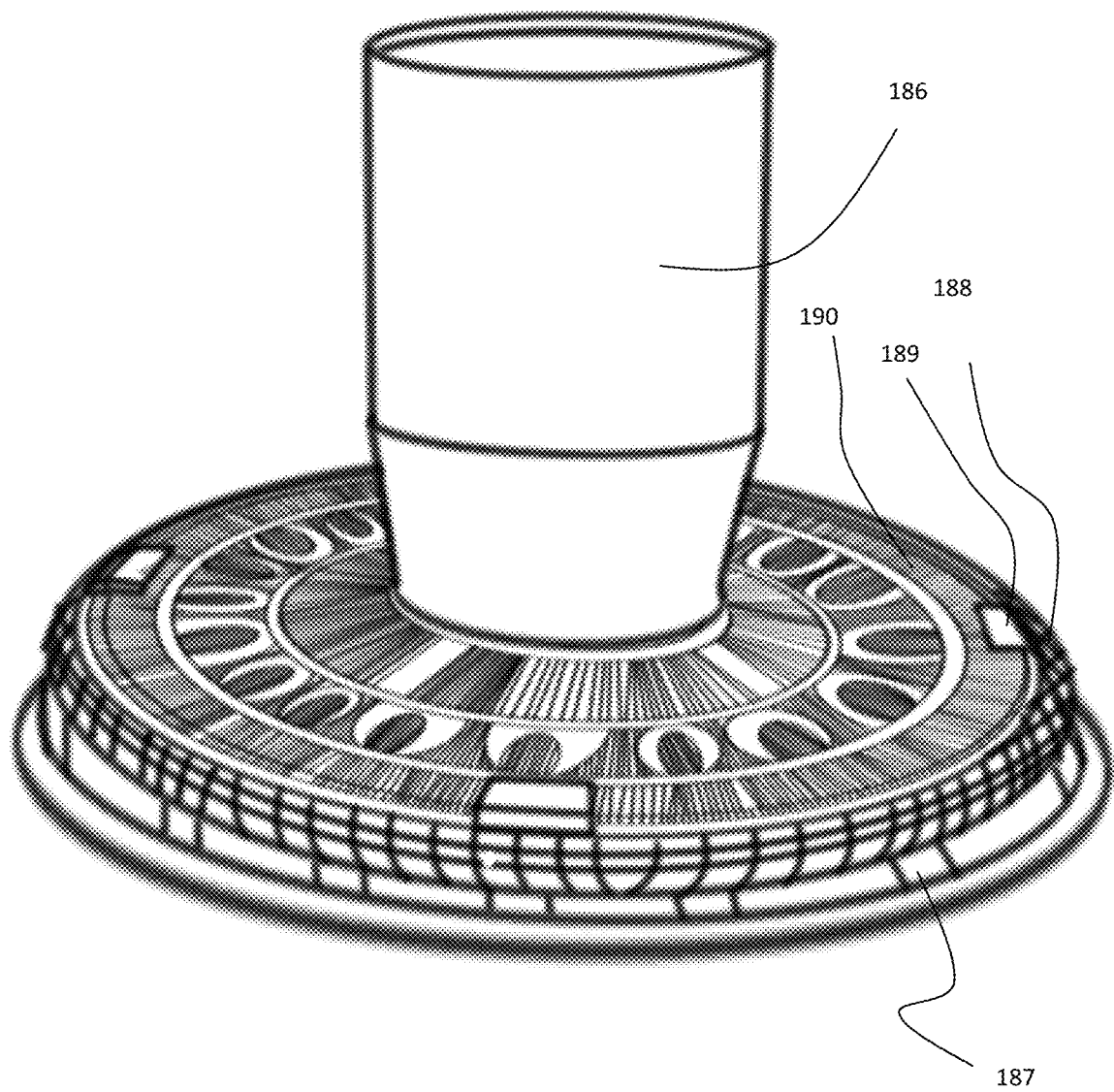
Figure: 76

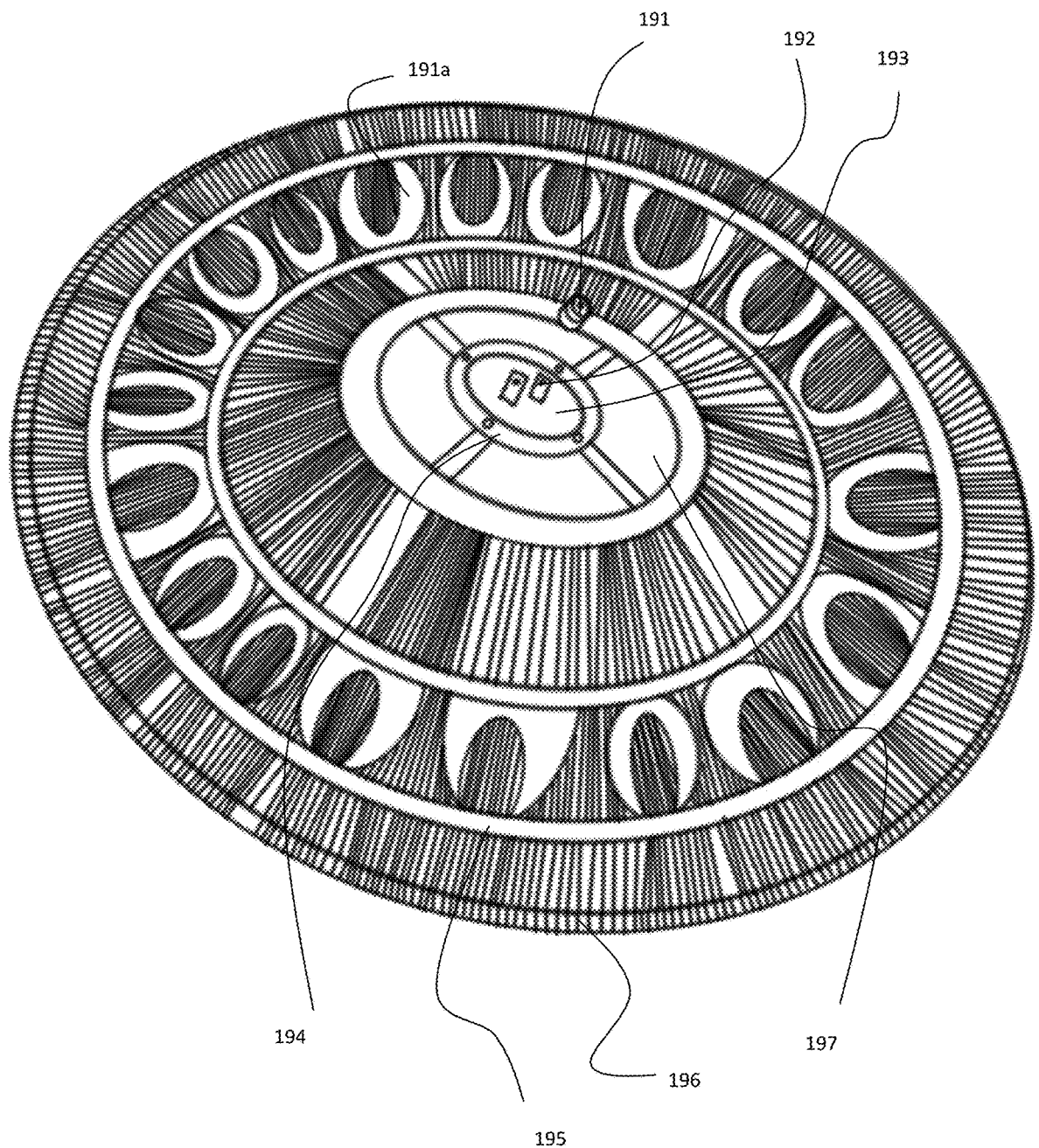
Figure: 77

Heat sink and fan internal view
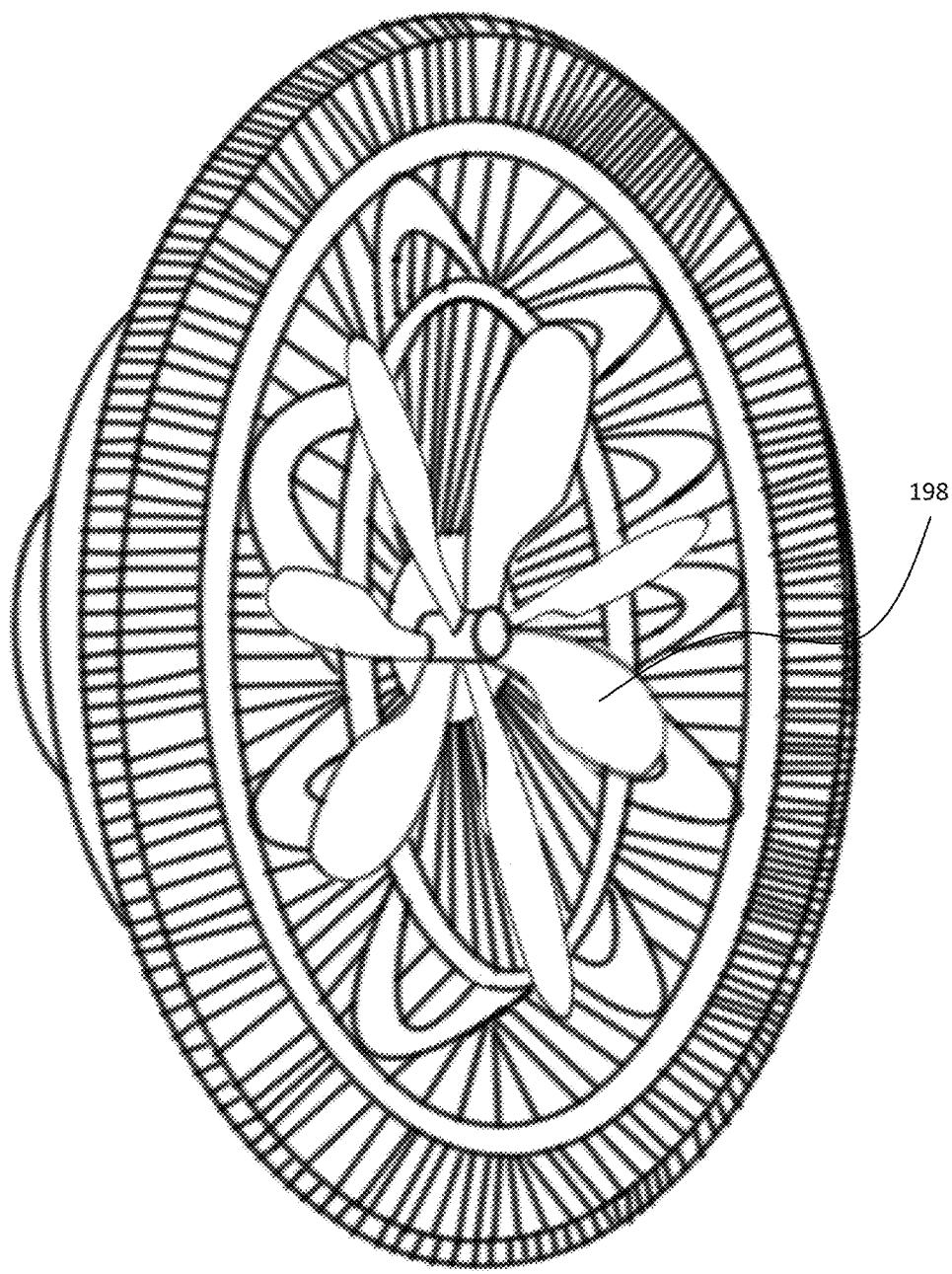
Figure: 78 heat sink, fan back to front view with cover
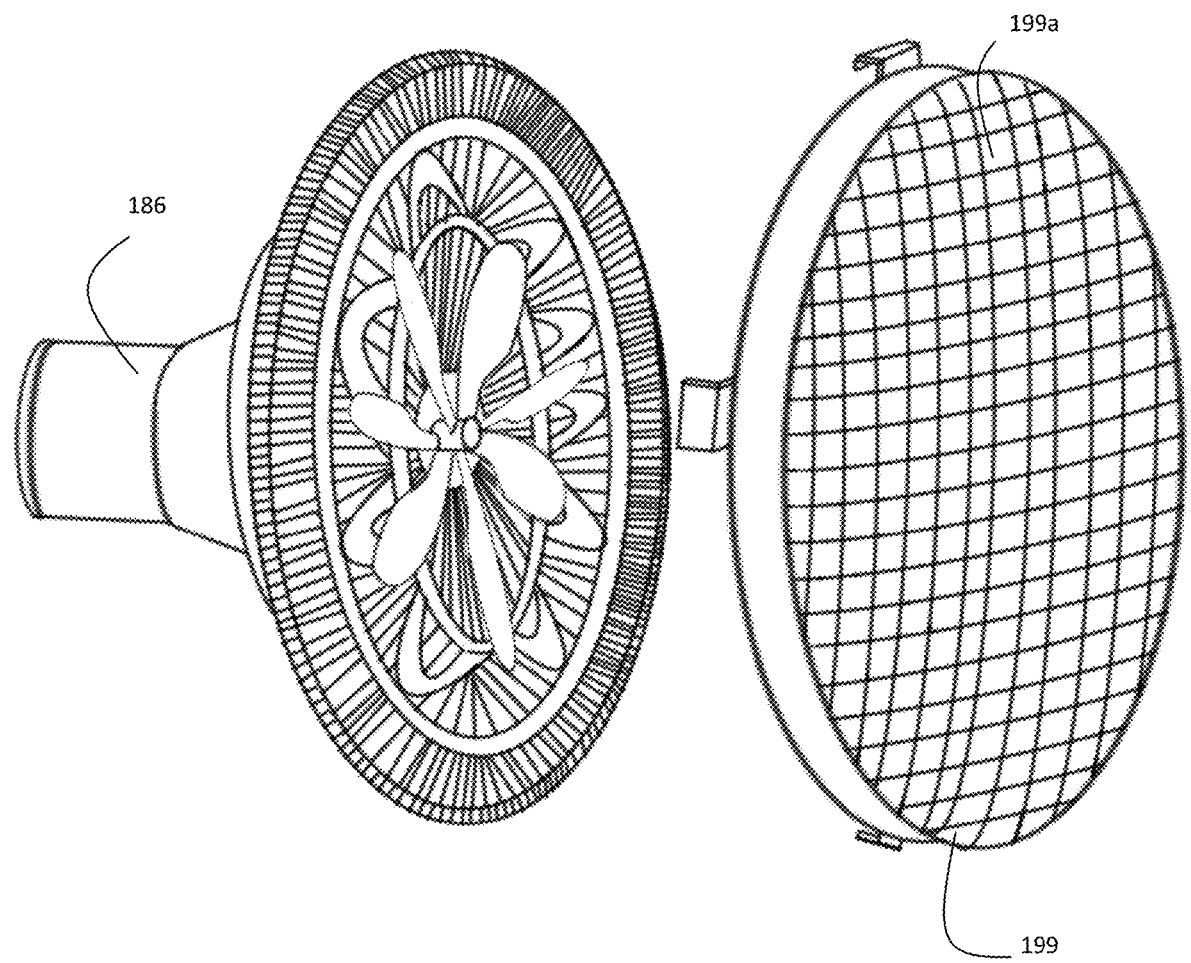
Figure: 79

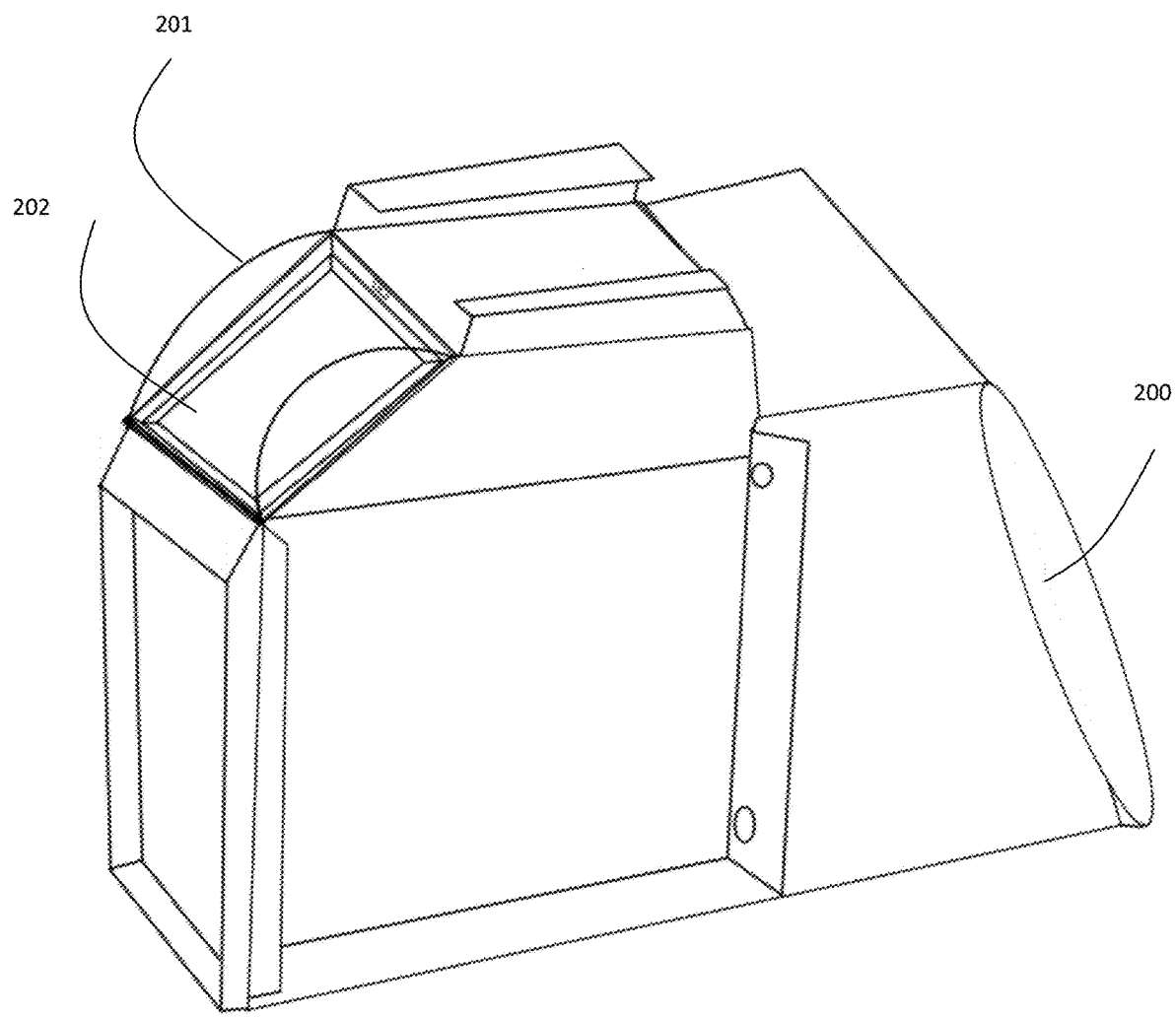
Figure: 80

Wall insert solar panel mounting frame come sun light ventilator back to side view
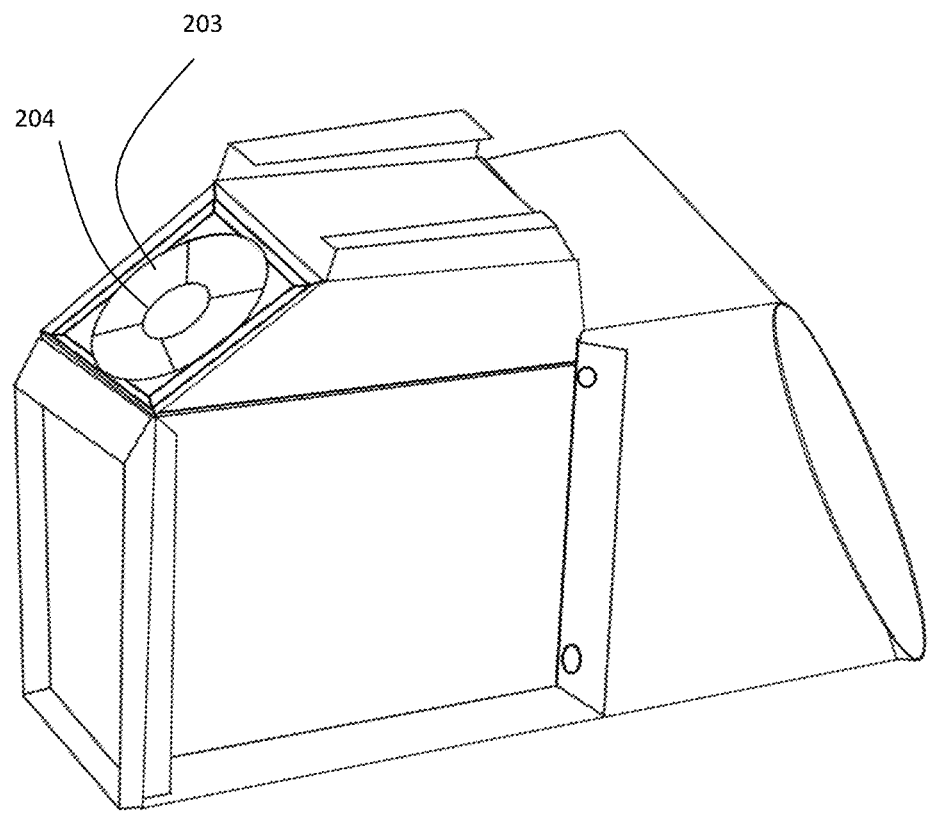
Figure: 81

Wall insert solar panel mounting frame come sun light ventilator
back to front internal view
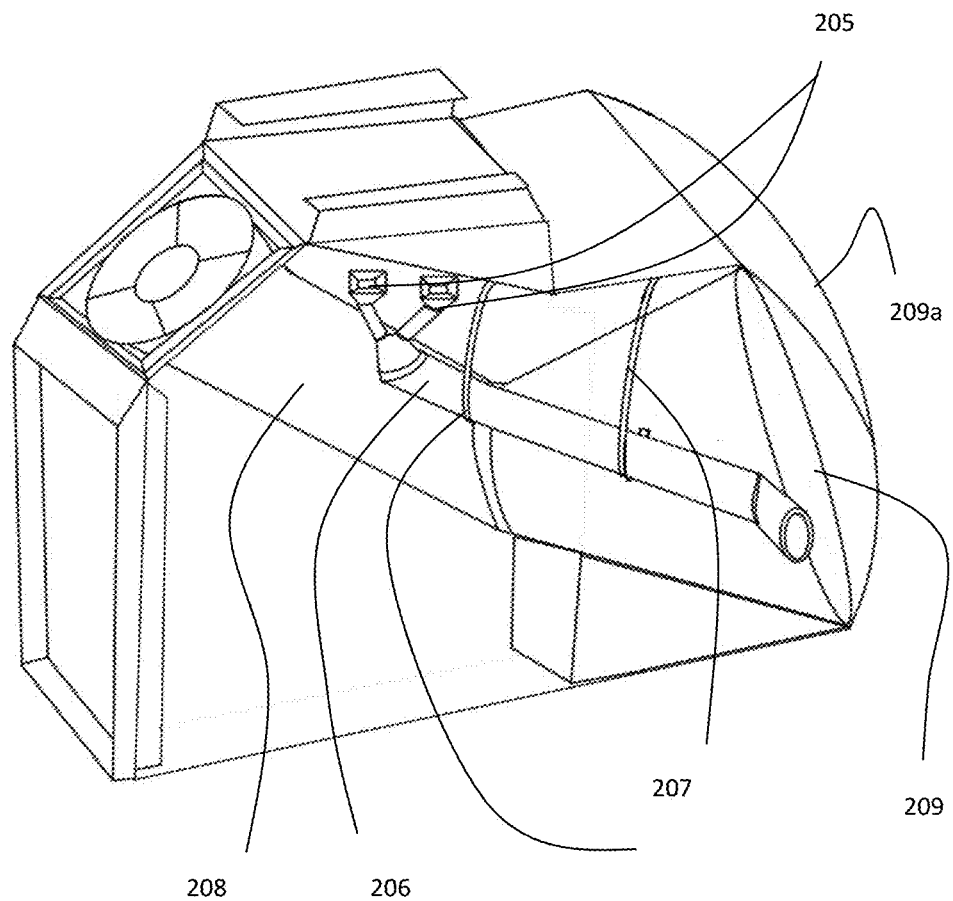
Figure: 82

Wall insert solar panel mounting frame come ventilator
back to front internal view
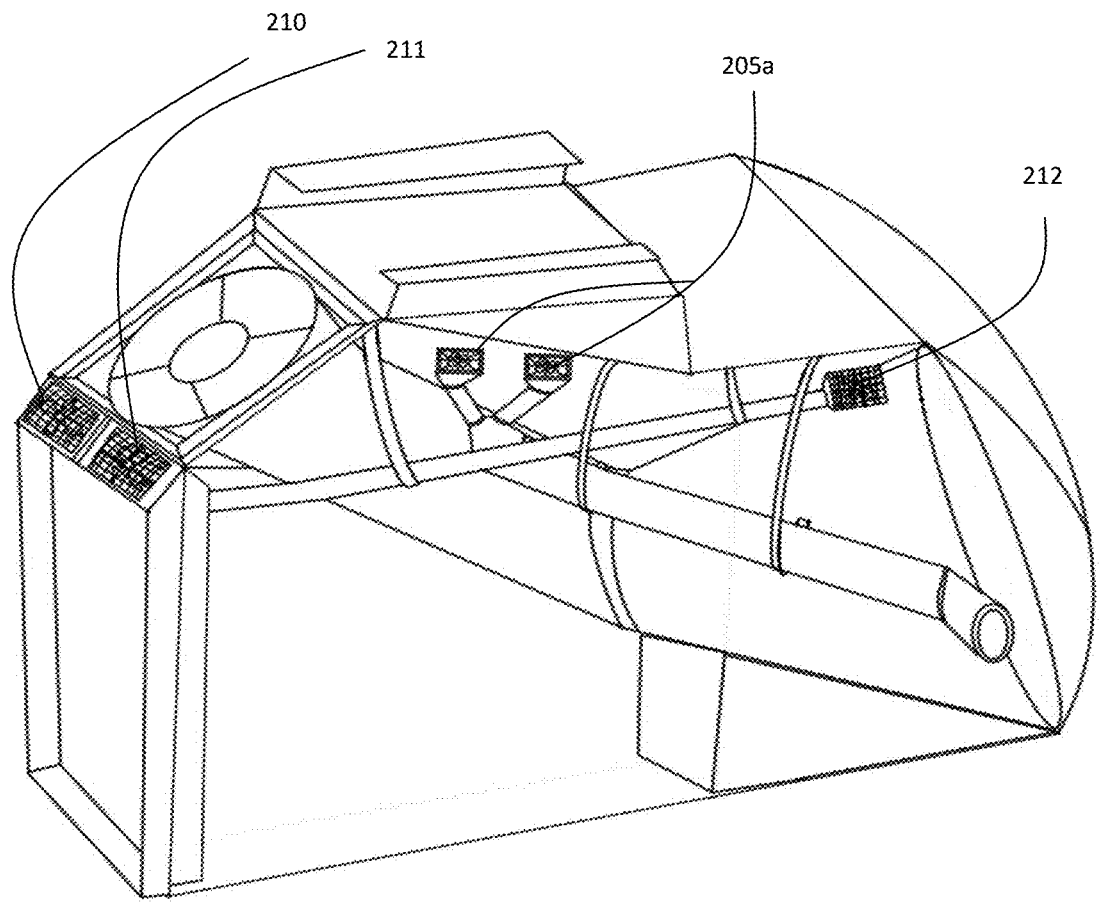
Figure: 83

Wall insert solar panel mounting frame come ventilator back to front internal view
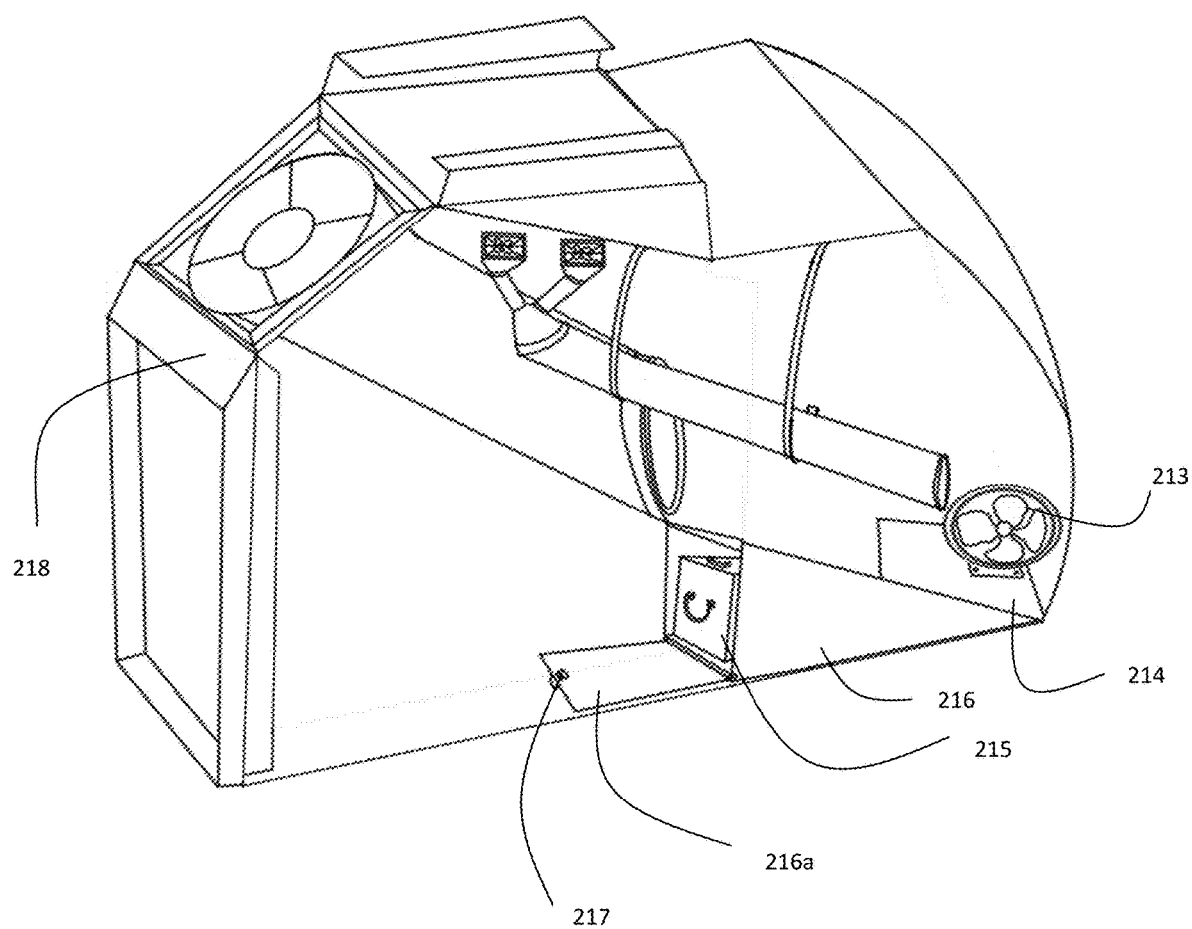
Figure: 84

Wall insert solar panel mounting frame come ventilator back to front
Internal view
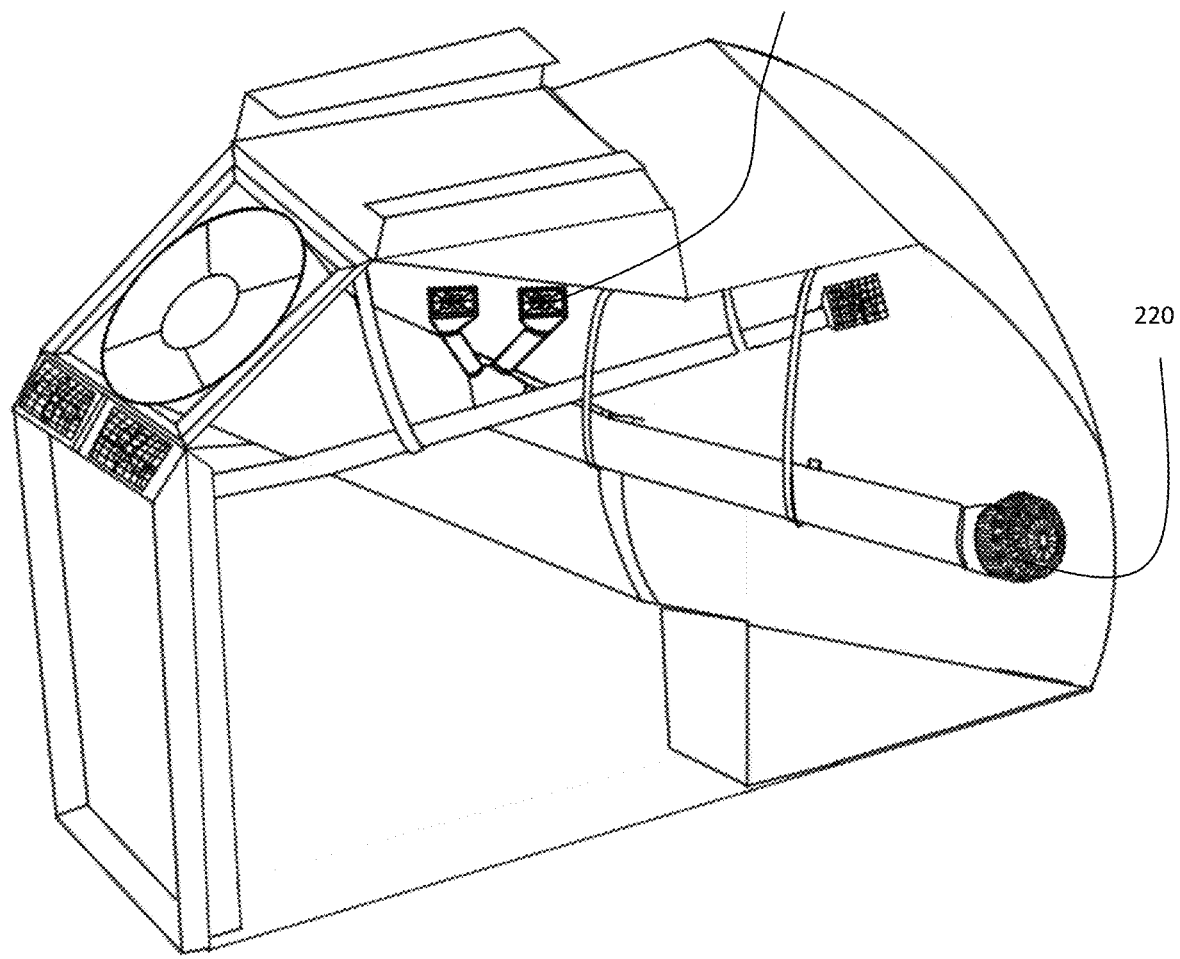
Figure: 85

Wall insert solar panel mounting frame come ventilator back to side view
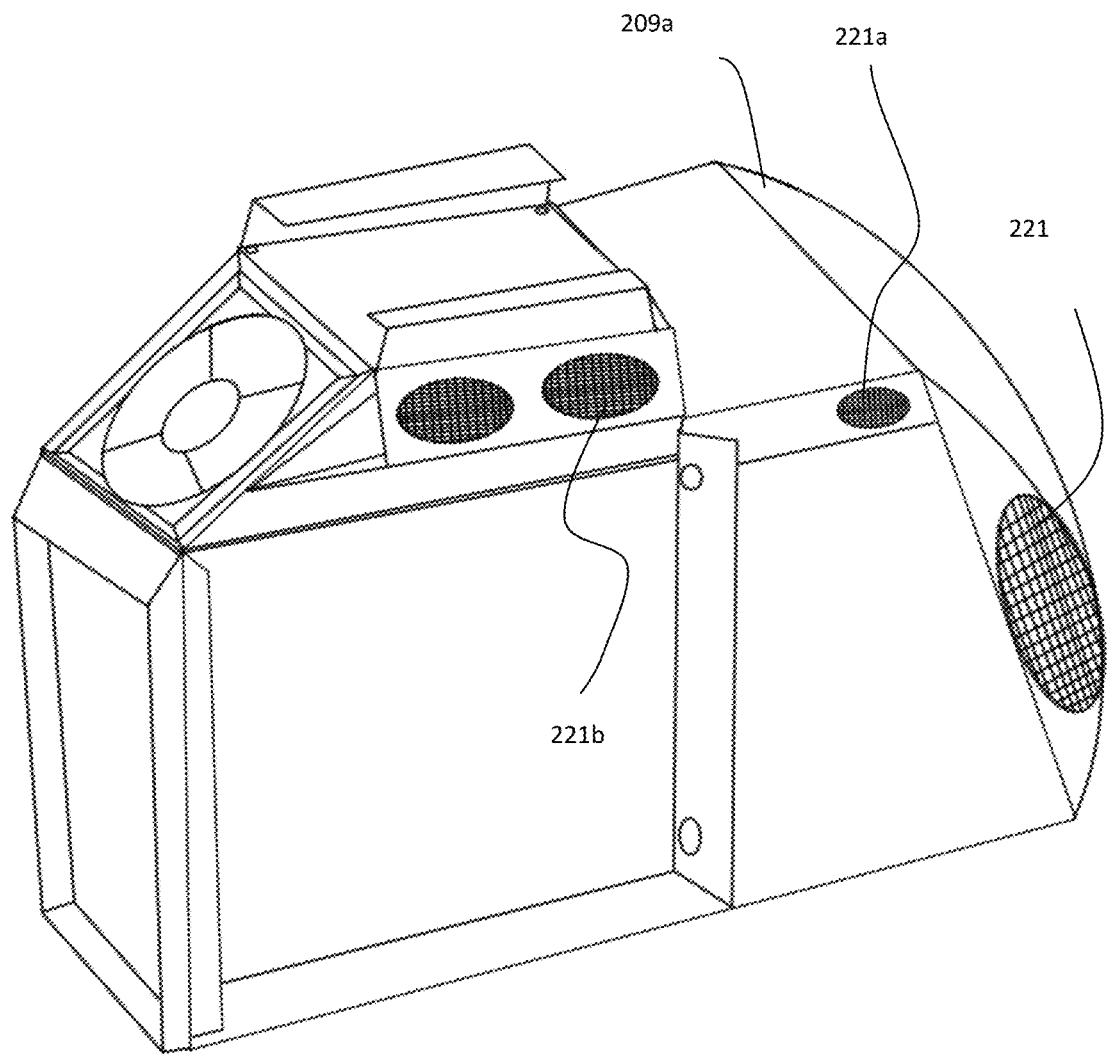
Figure: 86

Air cooling fan and heat sink back view when the coolant tank cap is opened
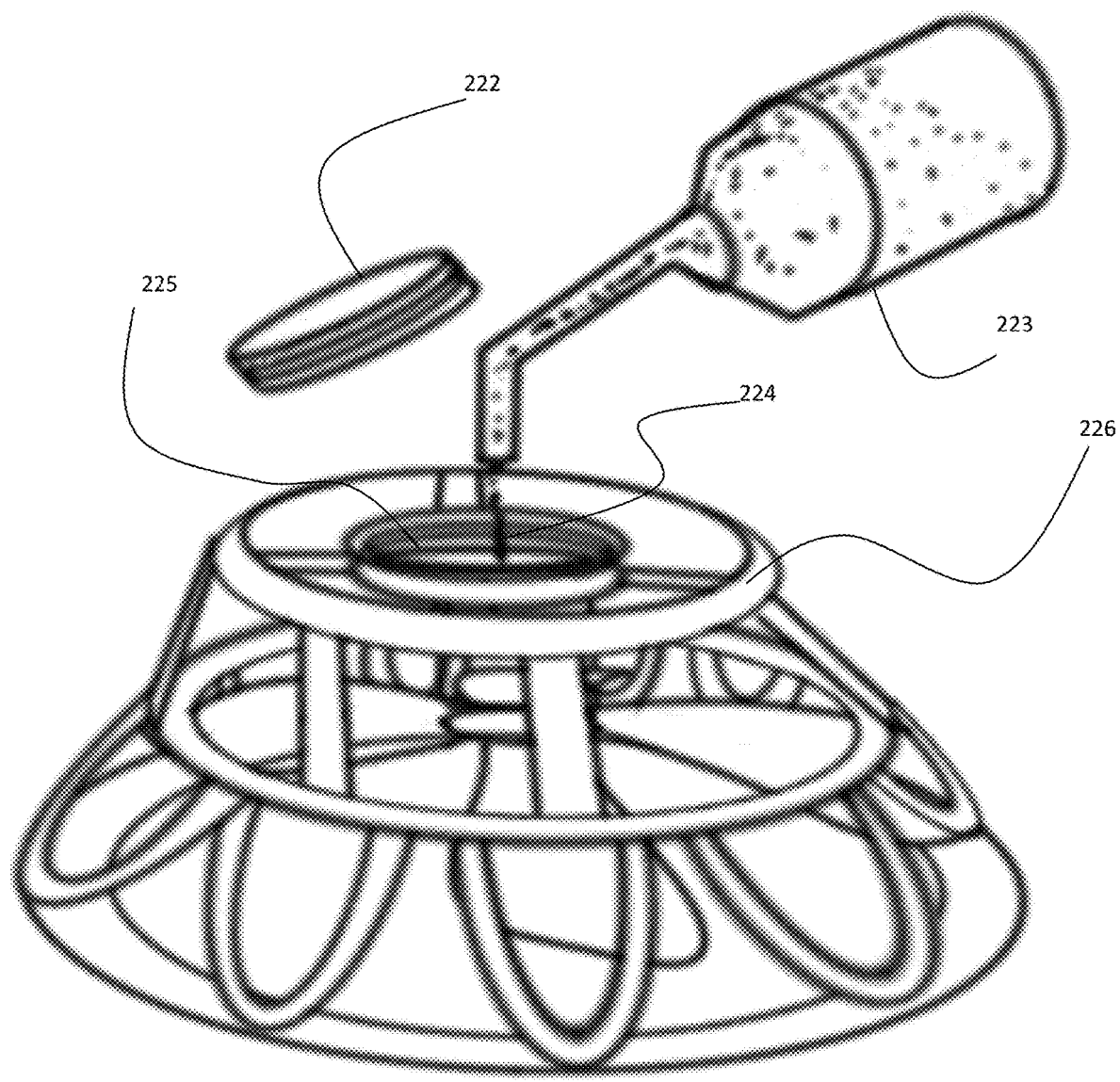
Figure: 87

Heat sink back to front view with coolant pipeline
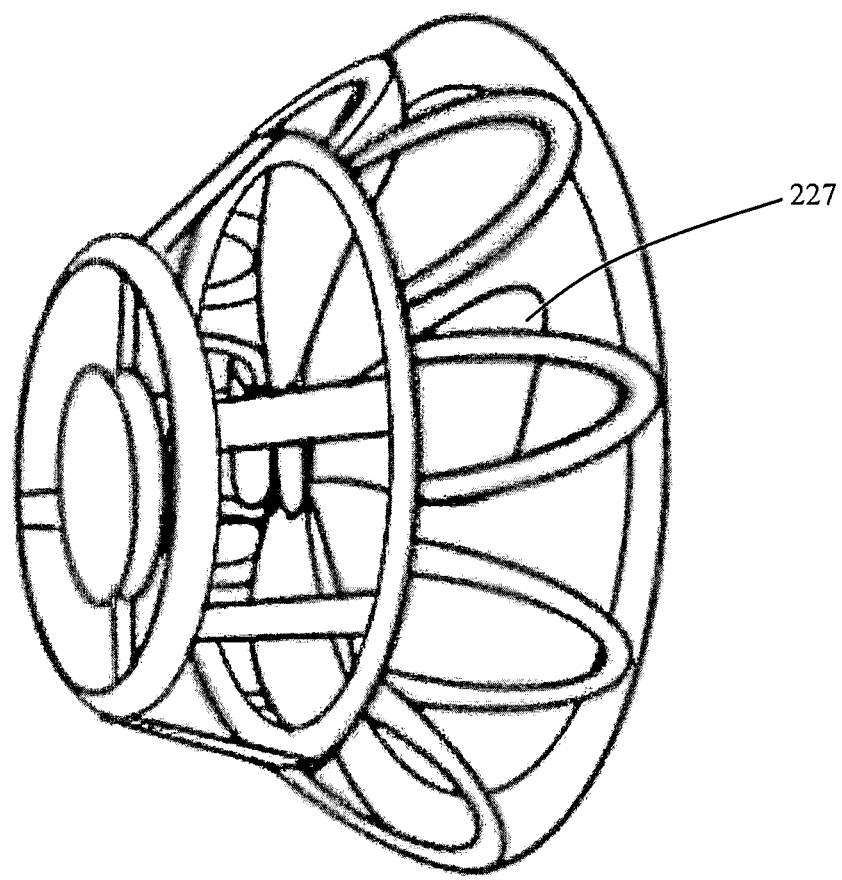
Figure: 88

Air cooling fan and heat sink back view with air pipe connection
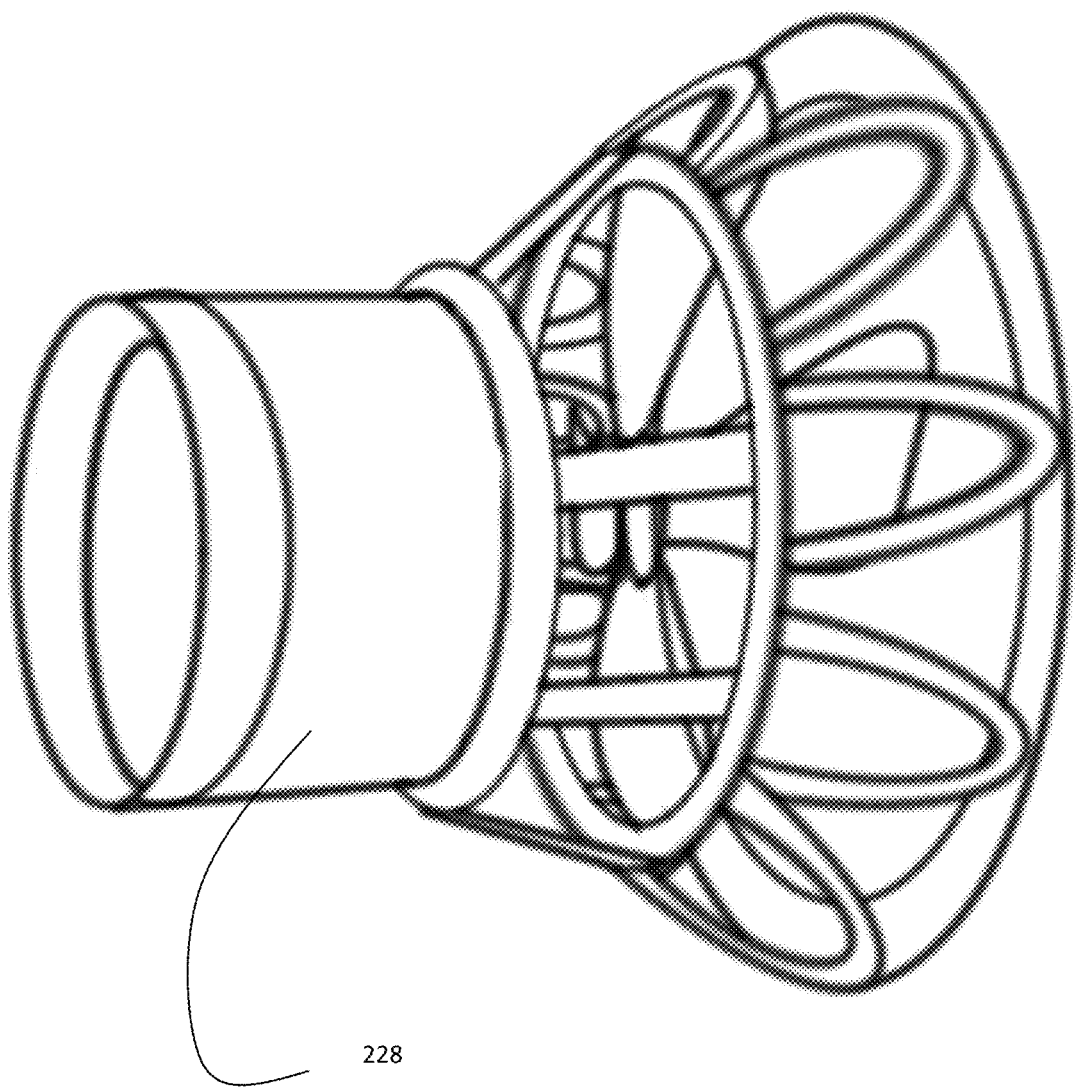
228
Figure: 89

Air cooling fan and heat sink back to front view
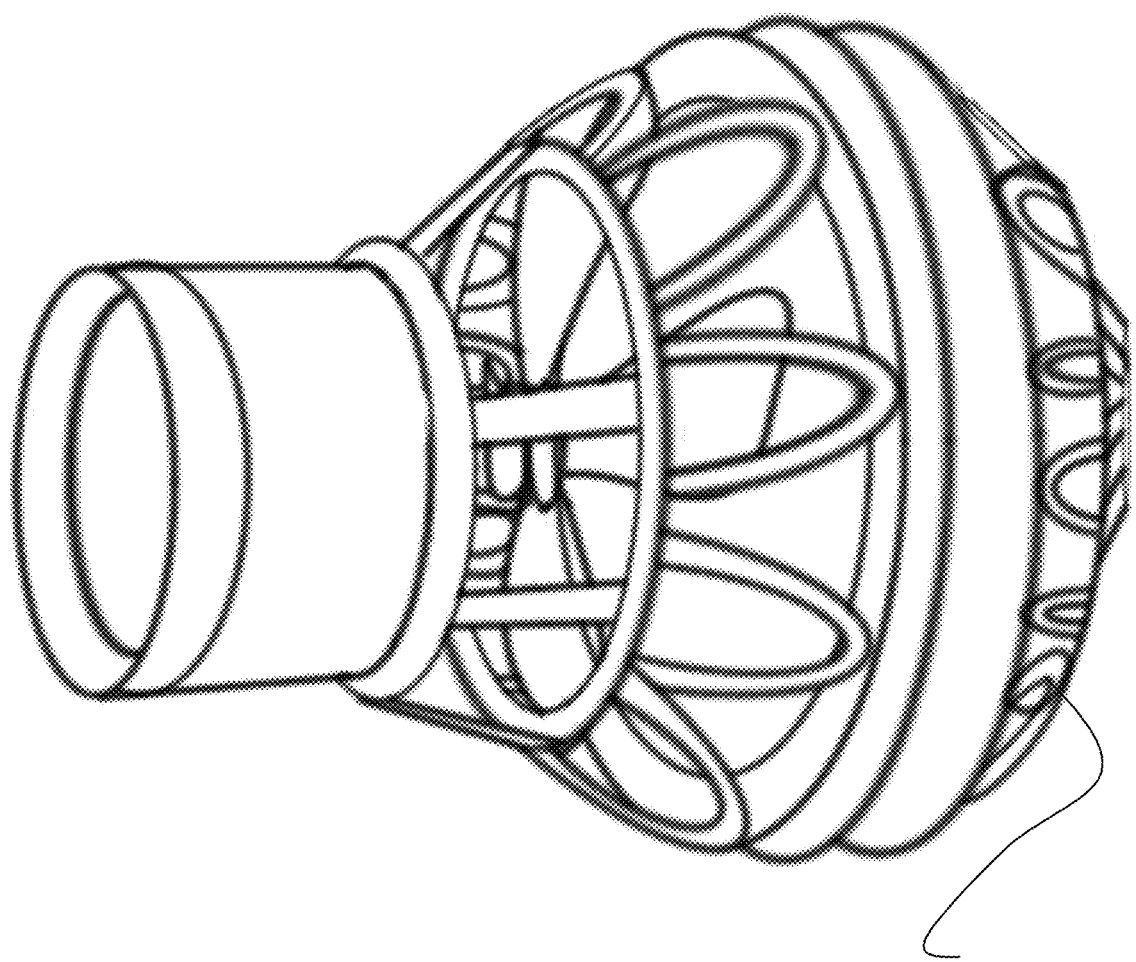
229
Figure: 90

Air cooling fan and heat sink internal view
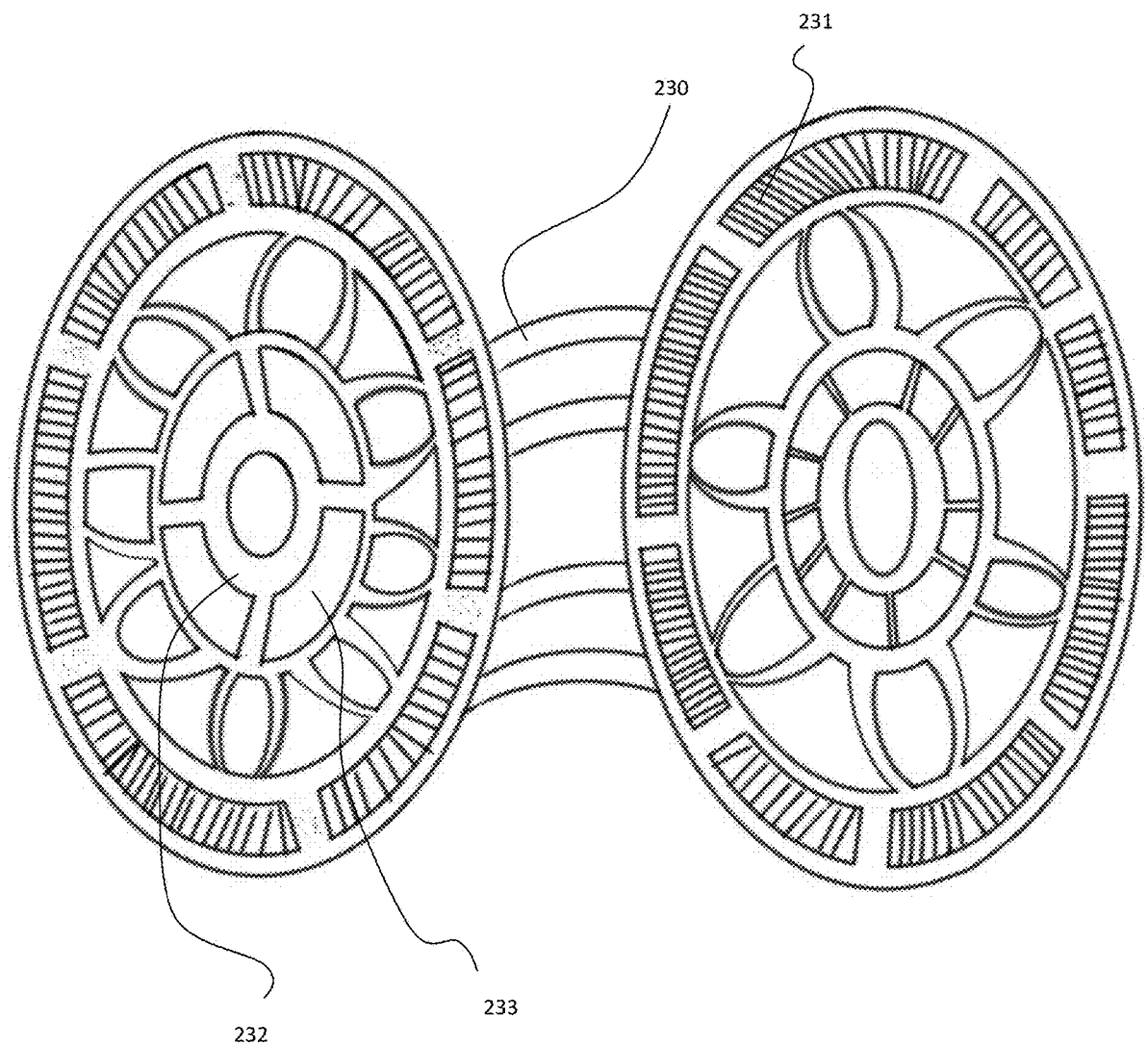
Figure: 91

Air cooling fan and heat sink internal view with heat sink metal layers
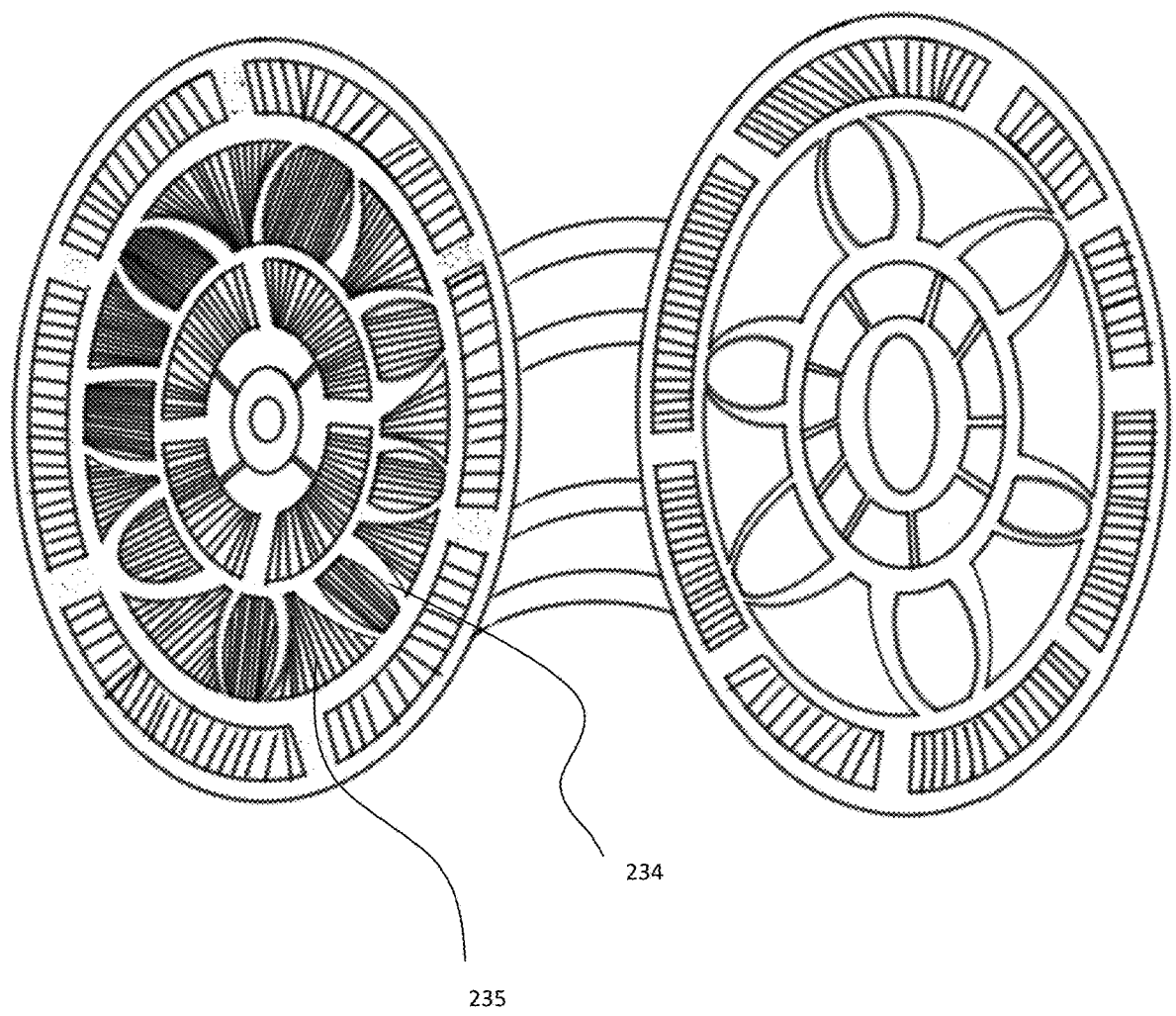
Figure: 92

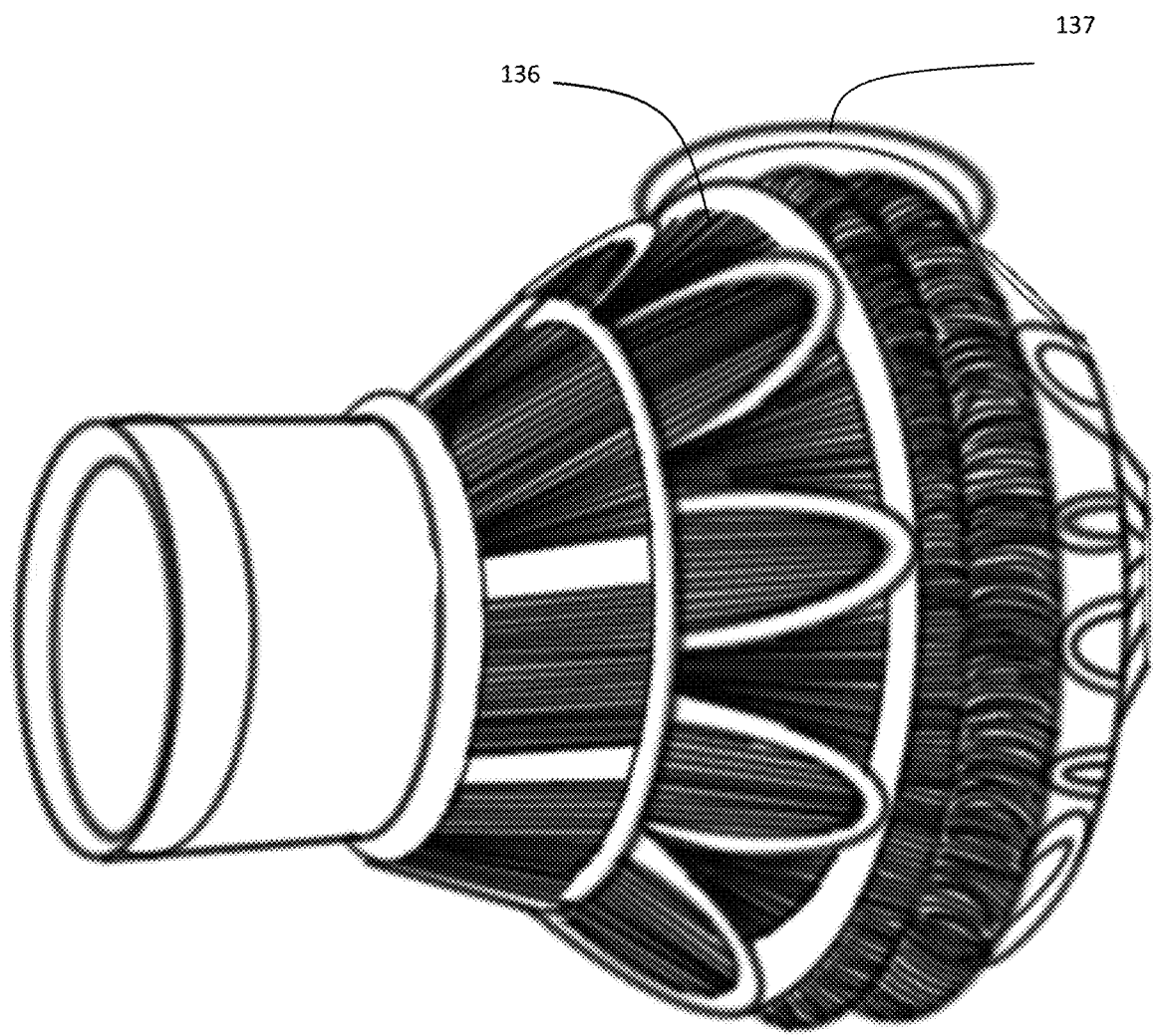
Figure: 93

Wall insert solar panel mounting frame come ventilator back to front internal view
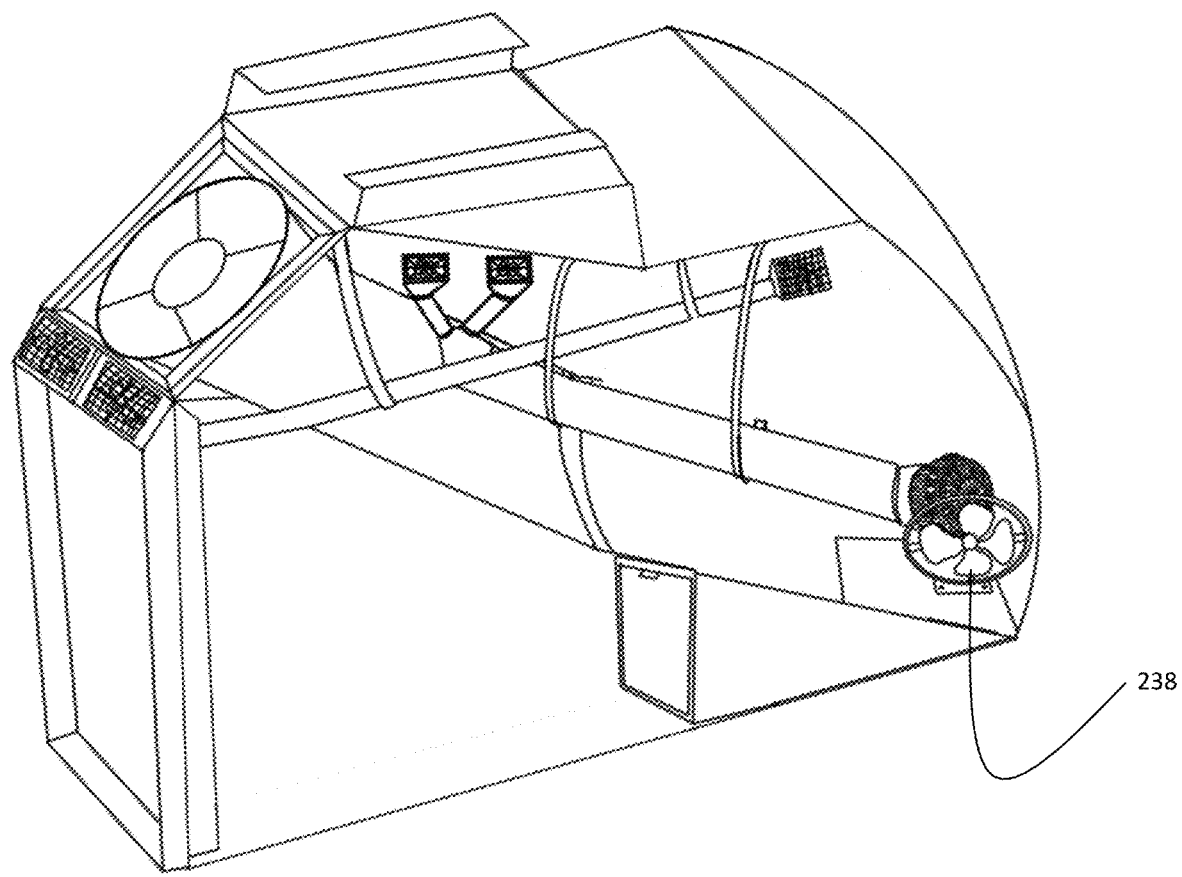
Figure: 94

Wall insert solar panel mounting frame come sun light ventilator
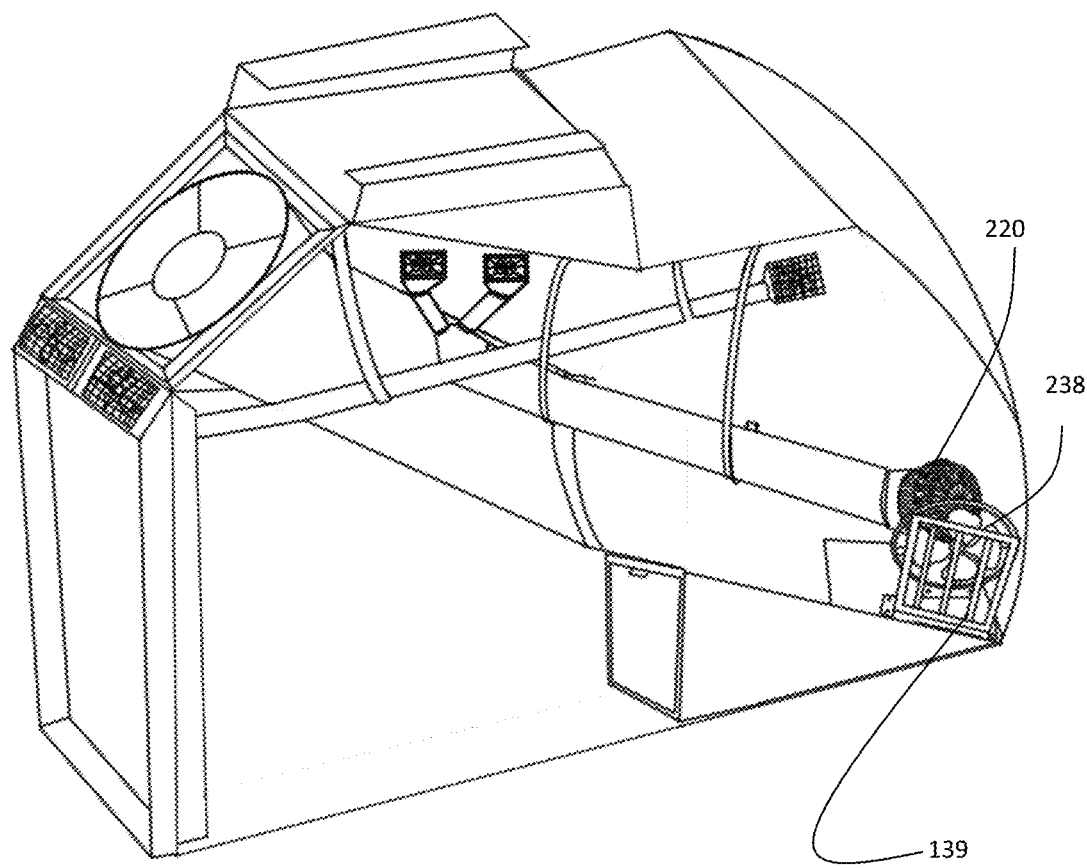
Figure: 95

Wall mount solar panel mount frame come ventilator back to top view
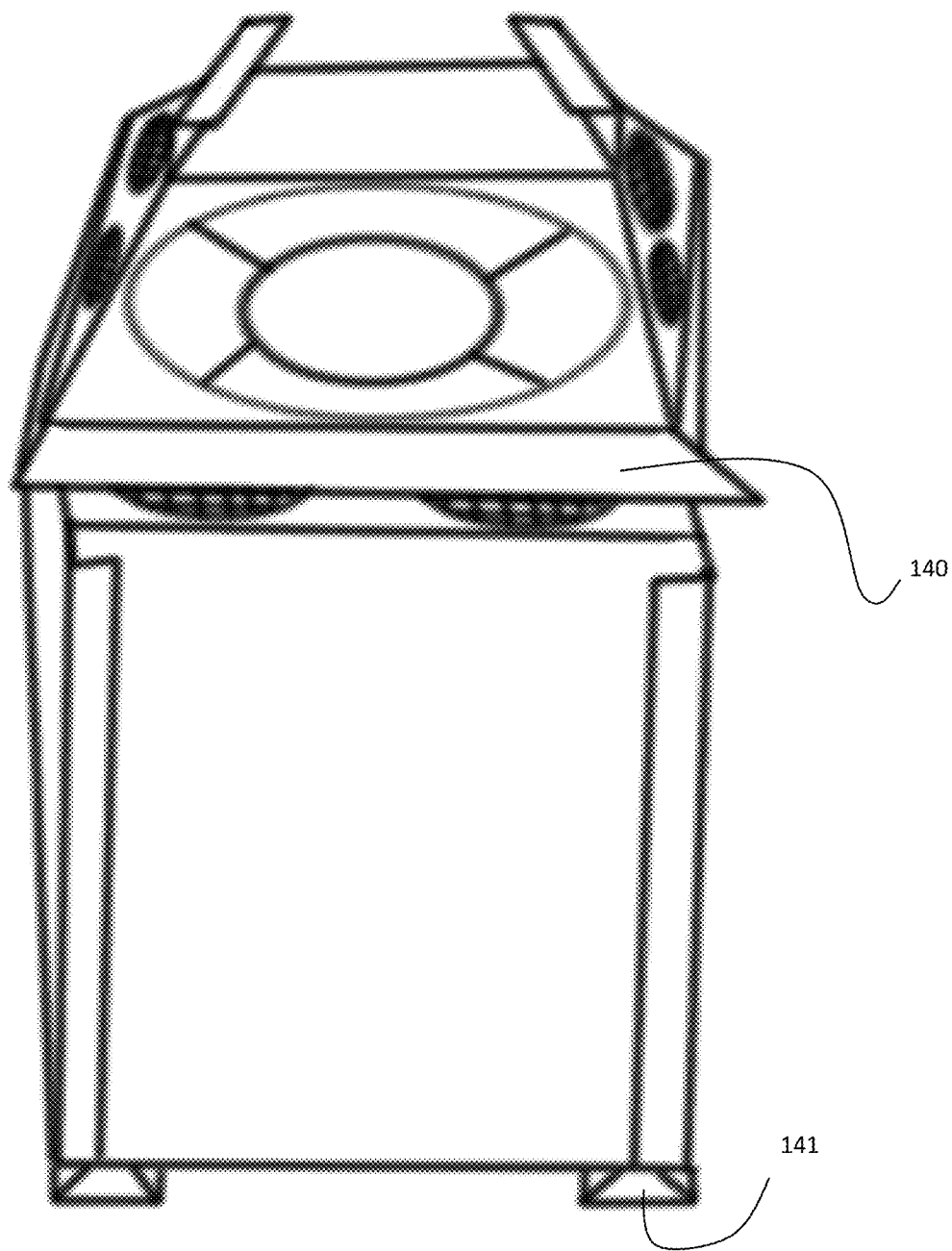
Figure: 96

Wall insert solar panel mounting frame come sun light ventilator
two part (split) model
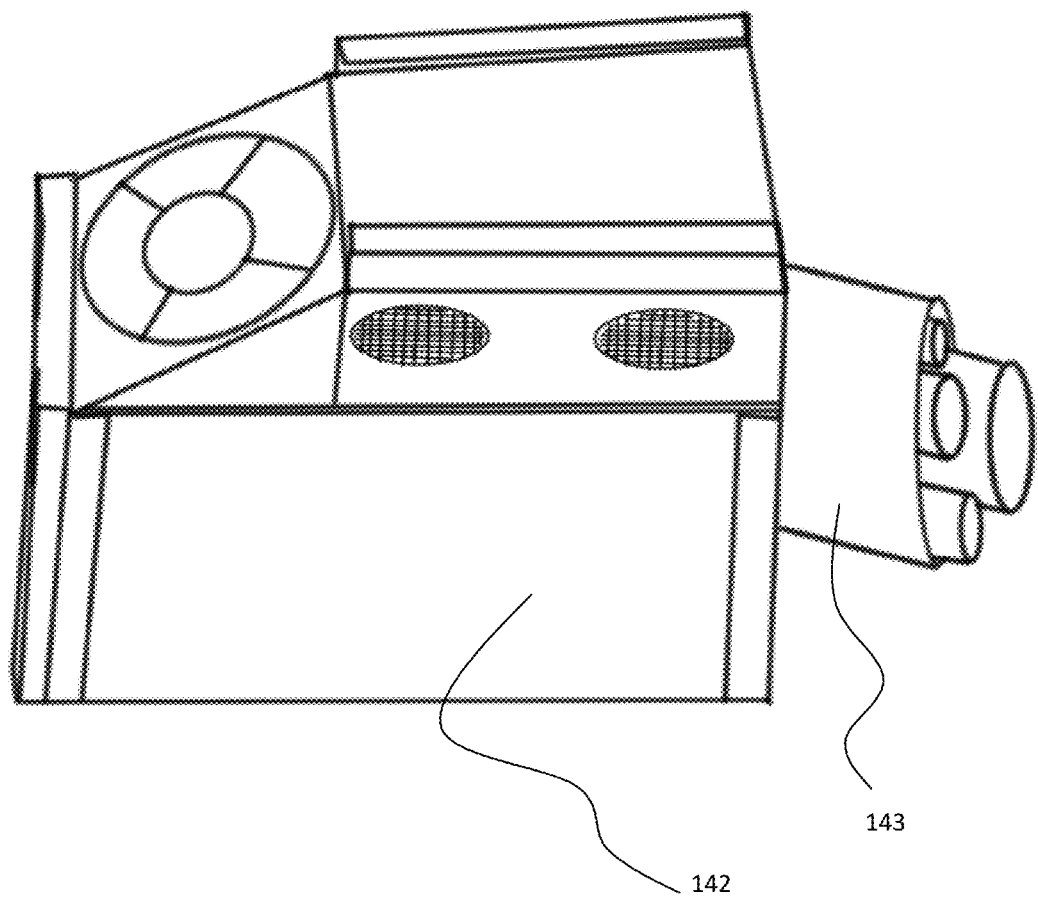
143
142
Figure: 97 wall munt solar panel mounting frame come ventilator internal parts view
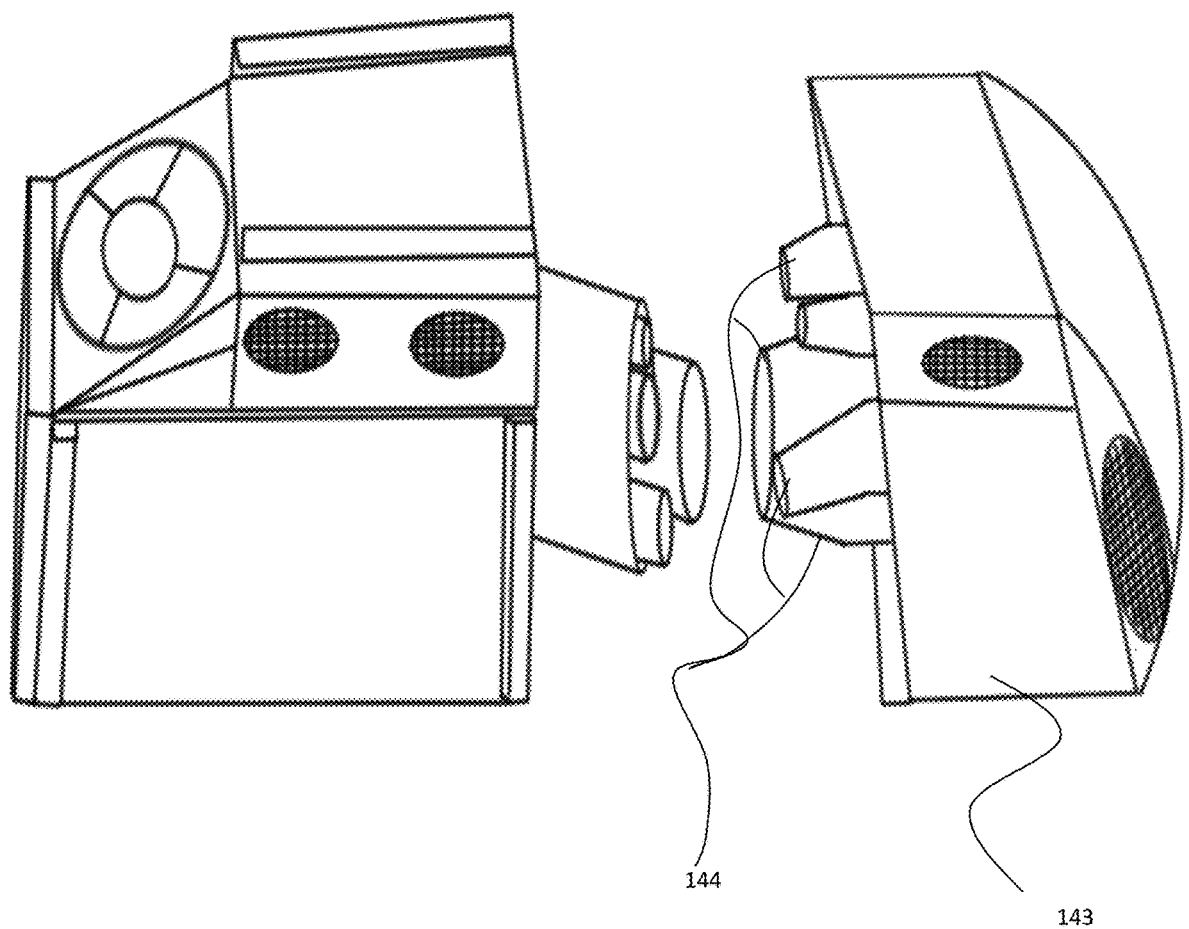
Figure: 98

Wall insert solar panel mounting frame come sunlight ventilator inside and outside view
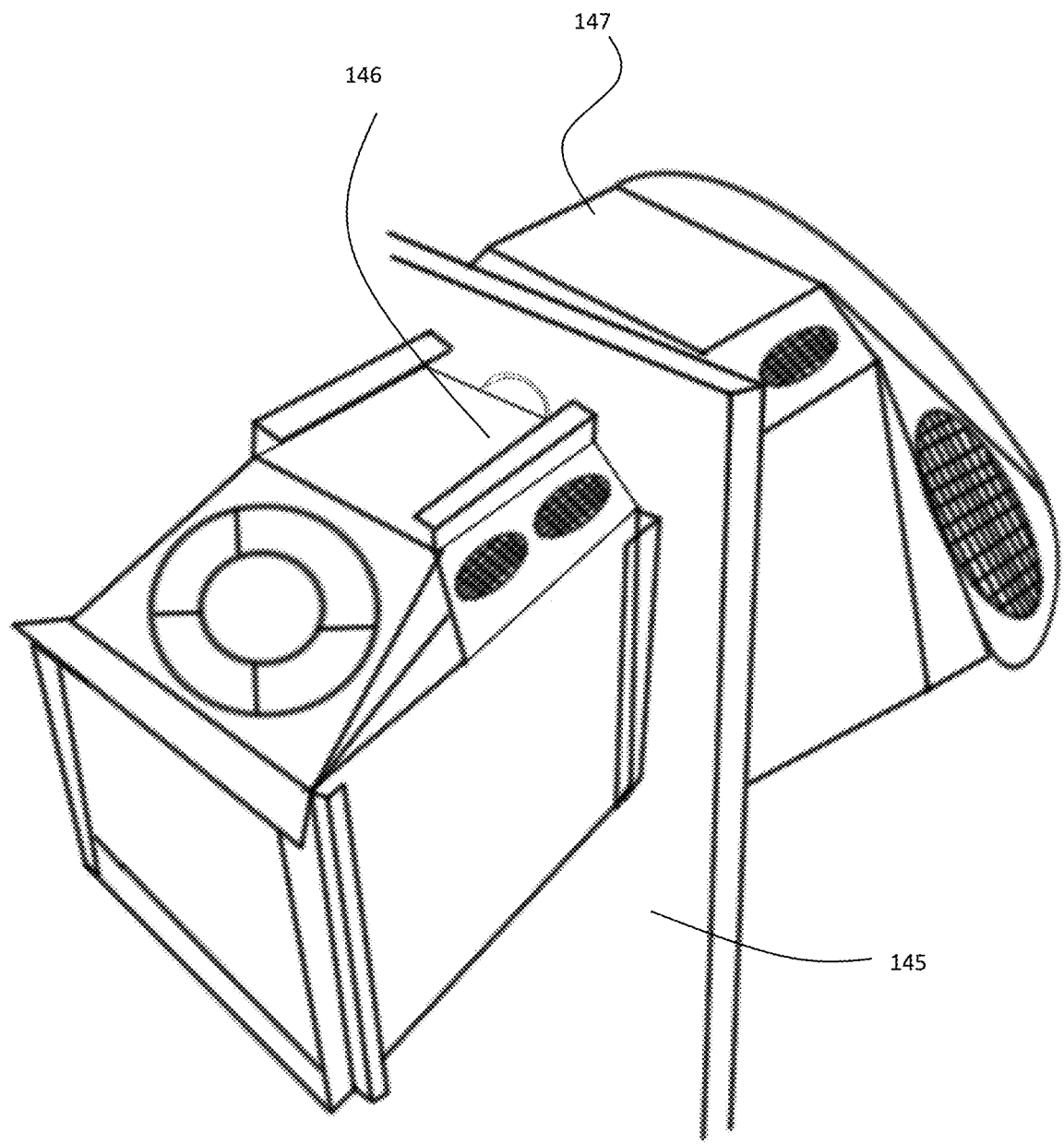
Figure: 99

Bottom to top view of wall mount solar panel mounting frame come ventilator mounted on wall with extended wall mount frame
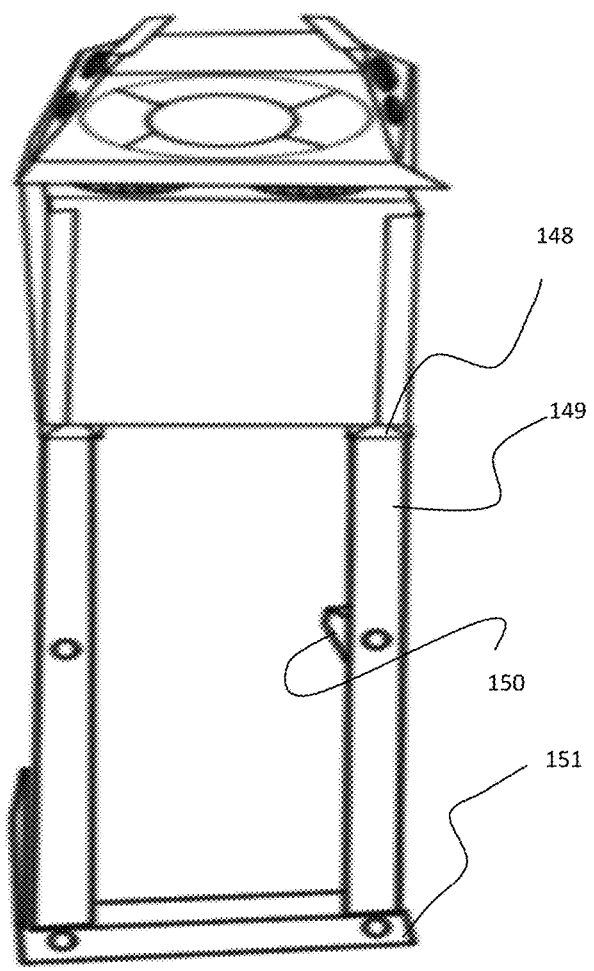
Figure: 100

Side to front top view of wall mount/insert solar panel mounting frame come ventilator
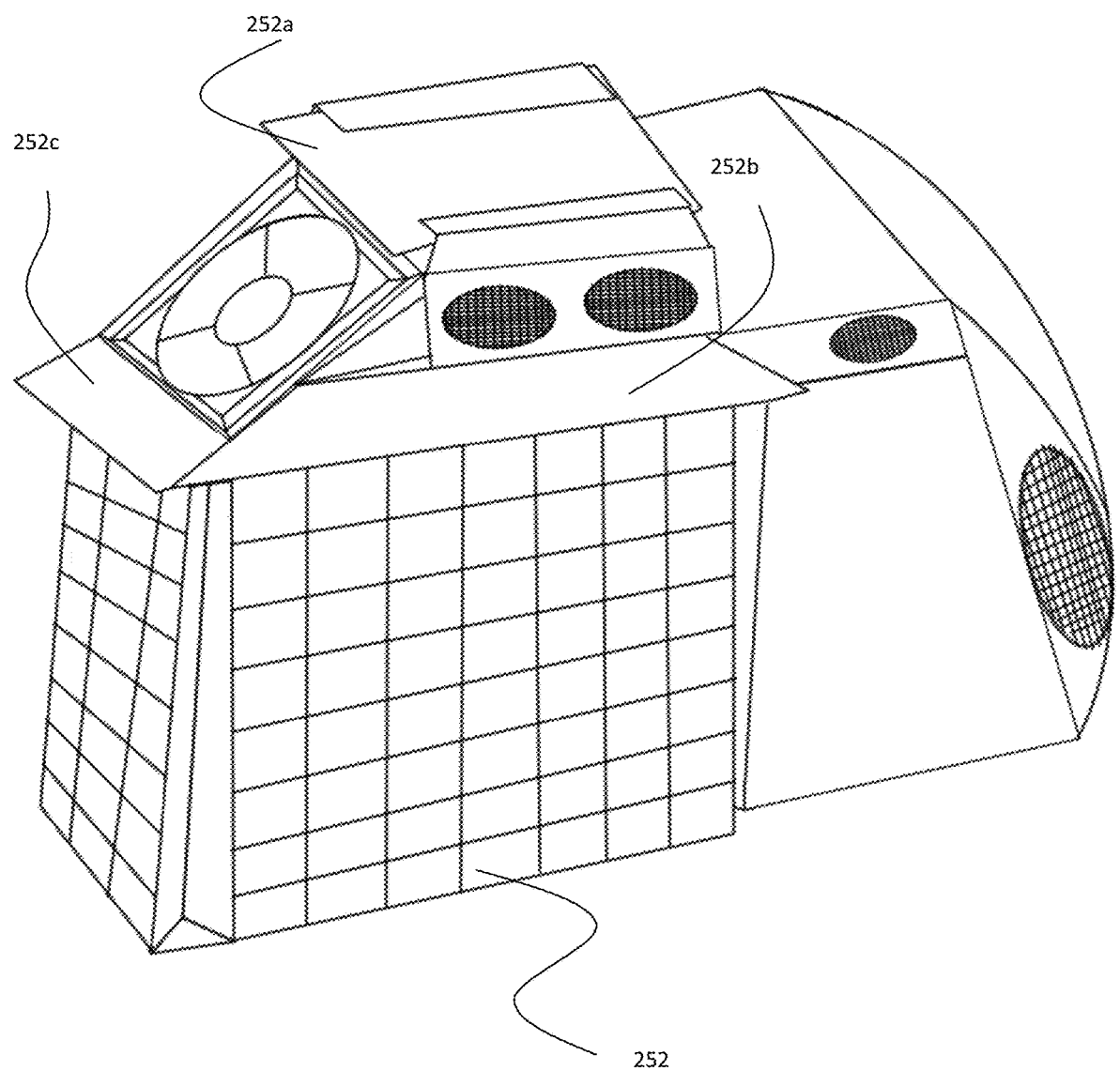
Figure: 101

Front to internal view of solar panel mounting frame come ventilator
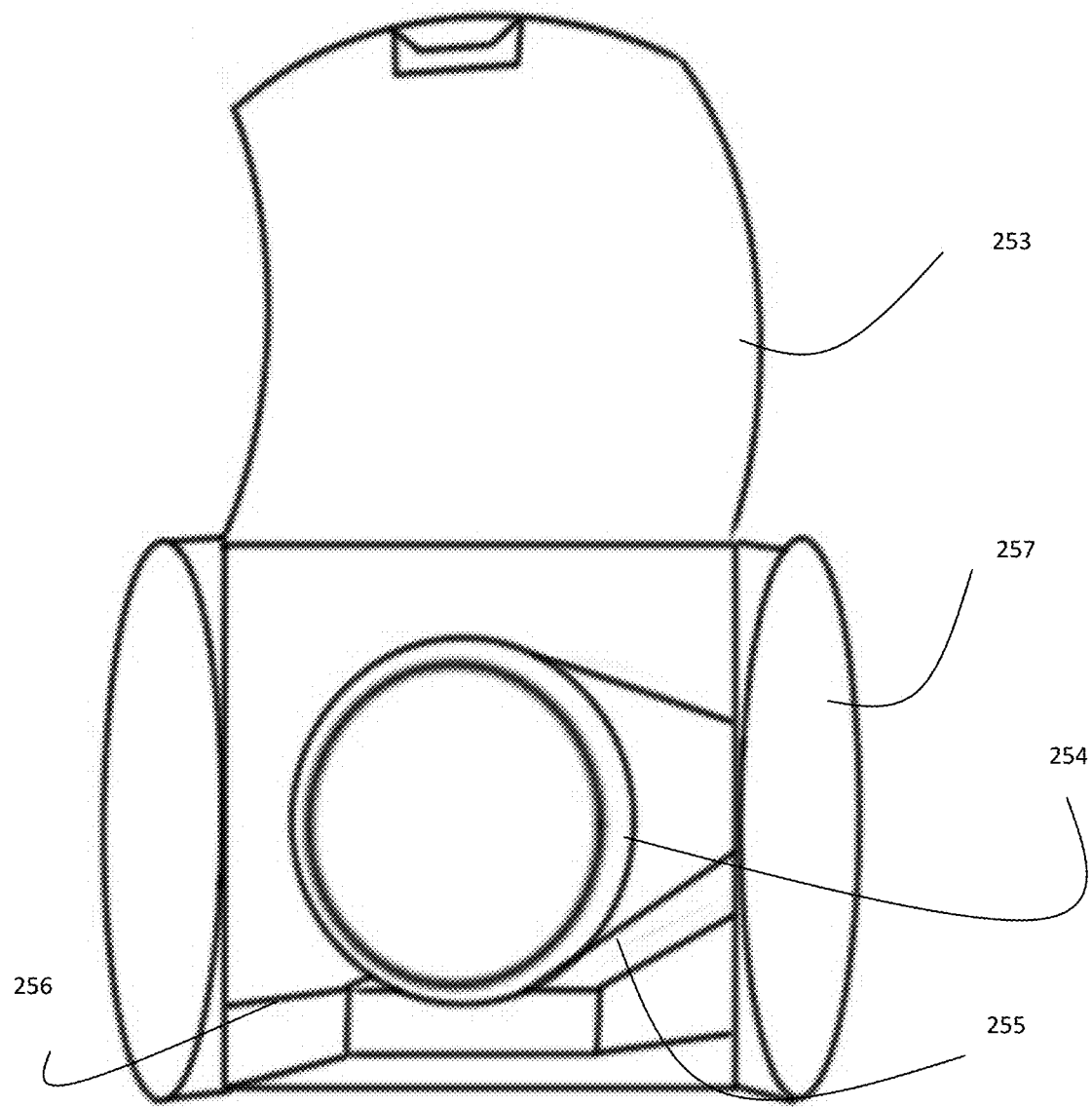
Figure: 102

Front to internal view of solar panel mounting frame come ventilator
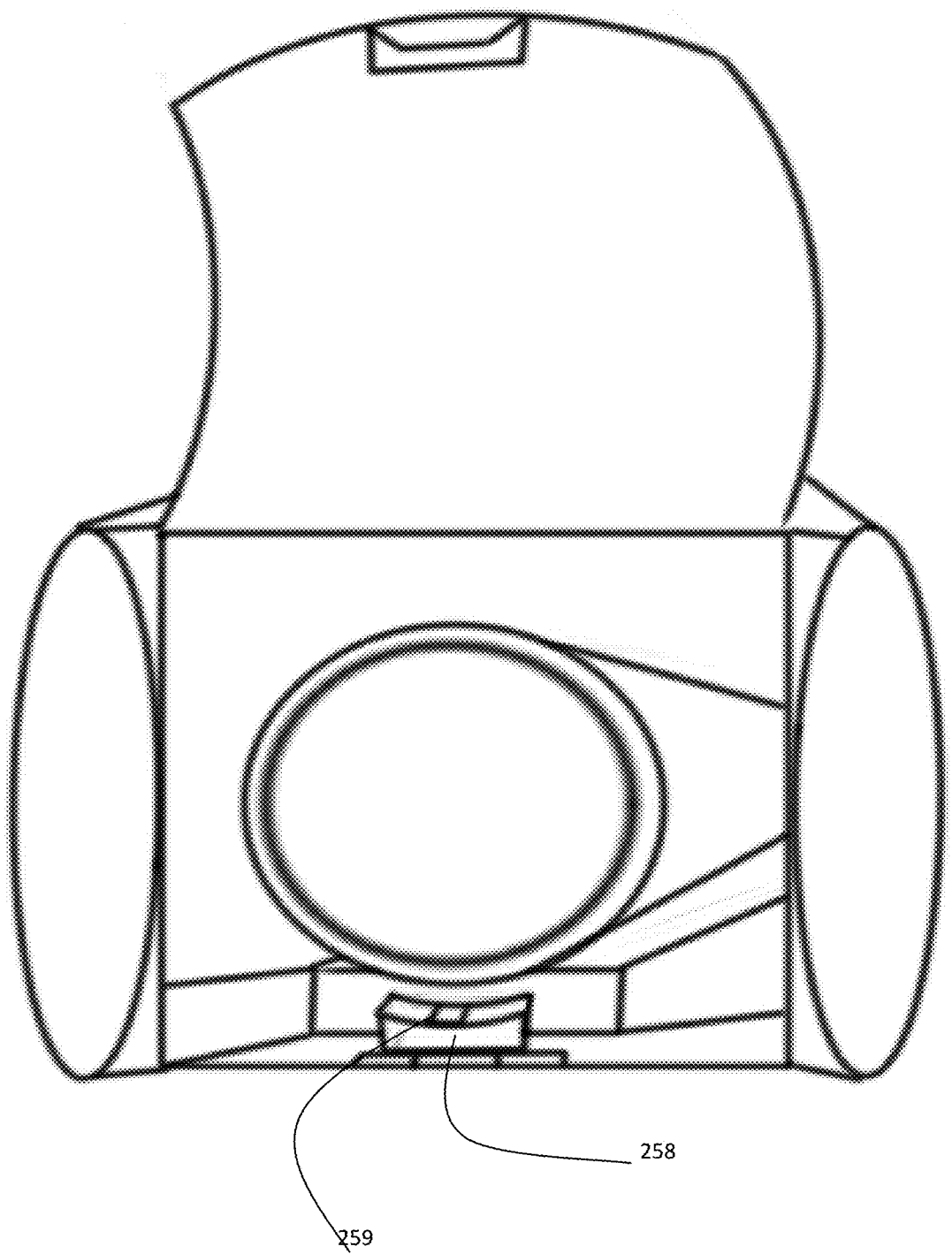
Figure: 103

Front to internal view of solar panel mounting frame come ventilator
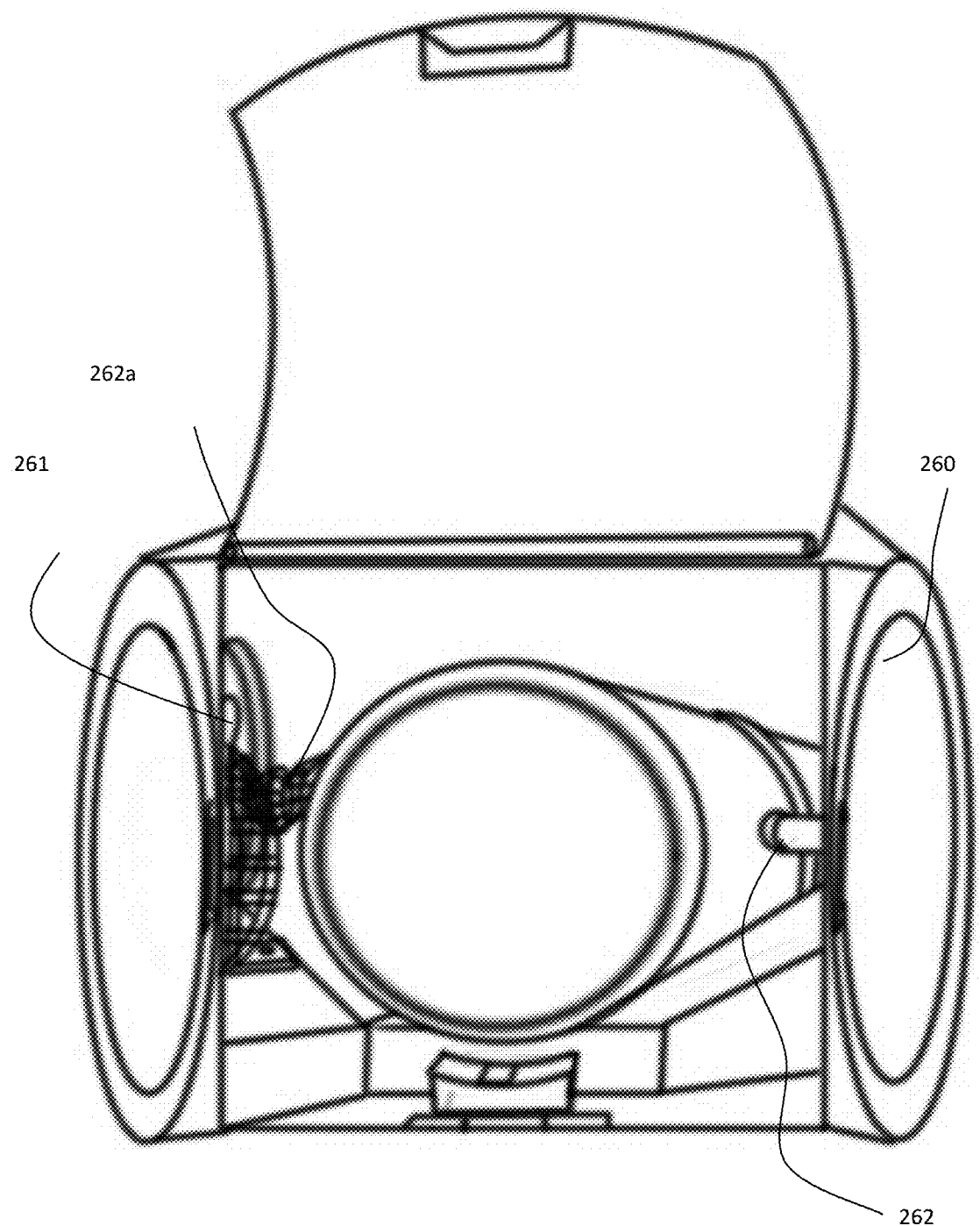
Figure: 104

Front to internal view of solar panel mounting frame come ventilator
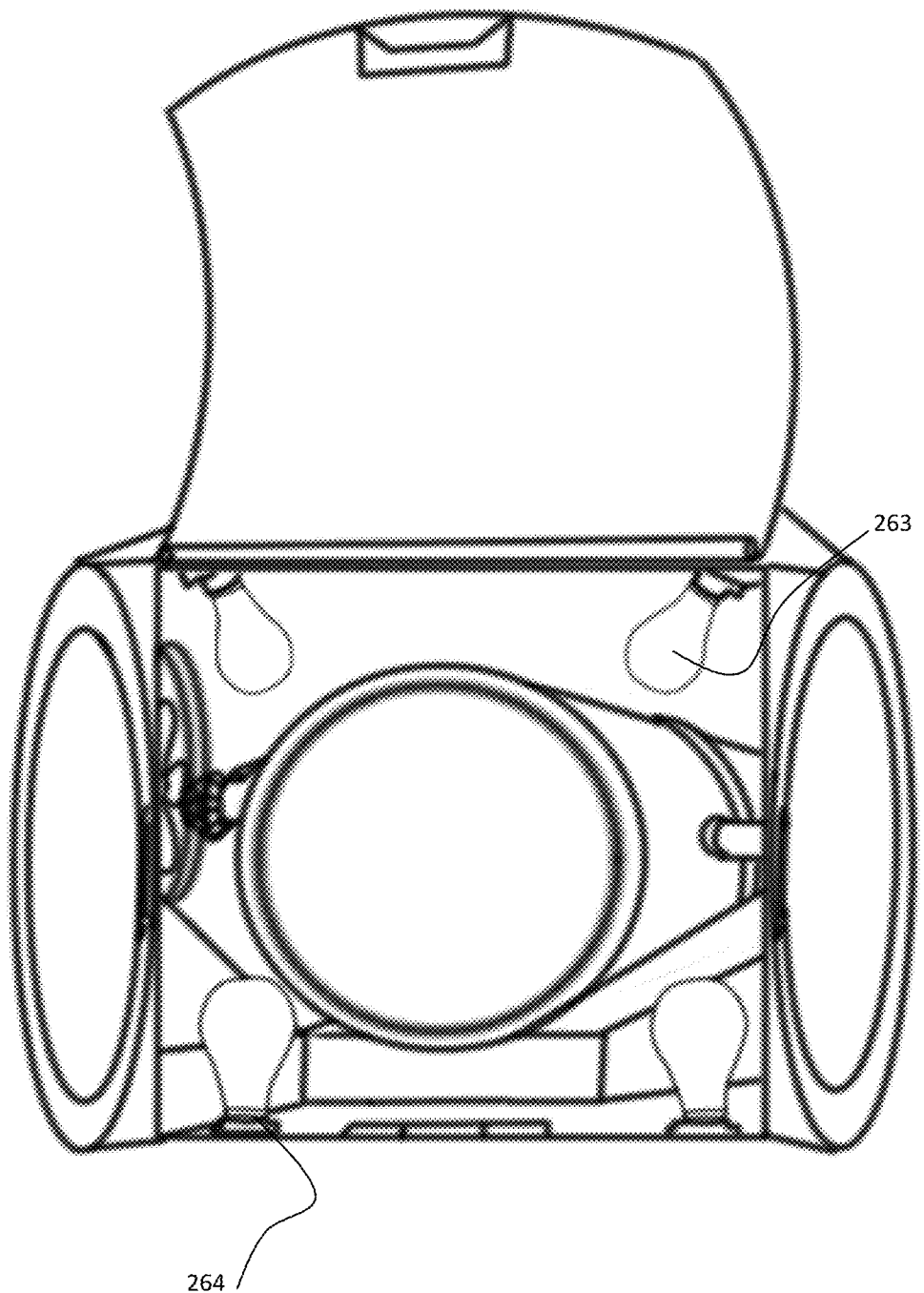
Figure: 105

Front to internal view of solar panel mounting frame come ventilator
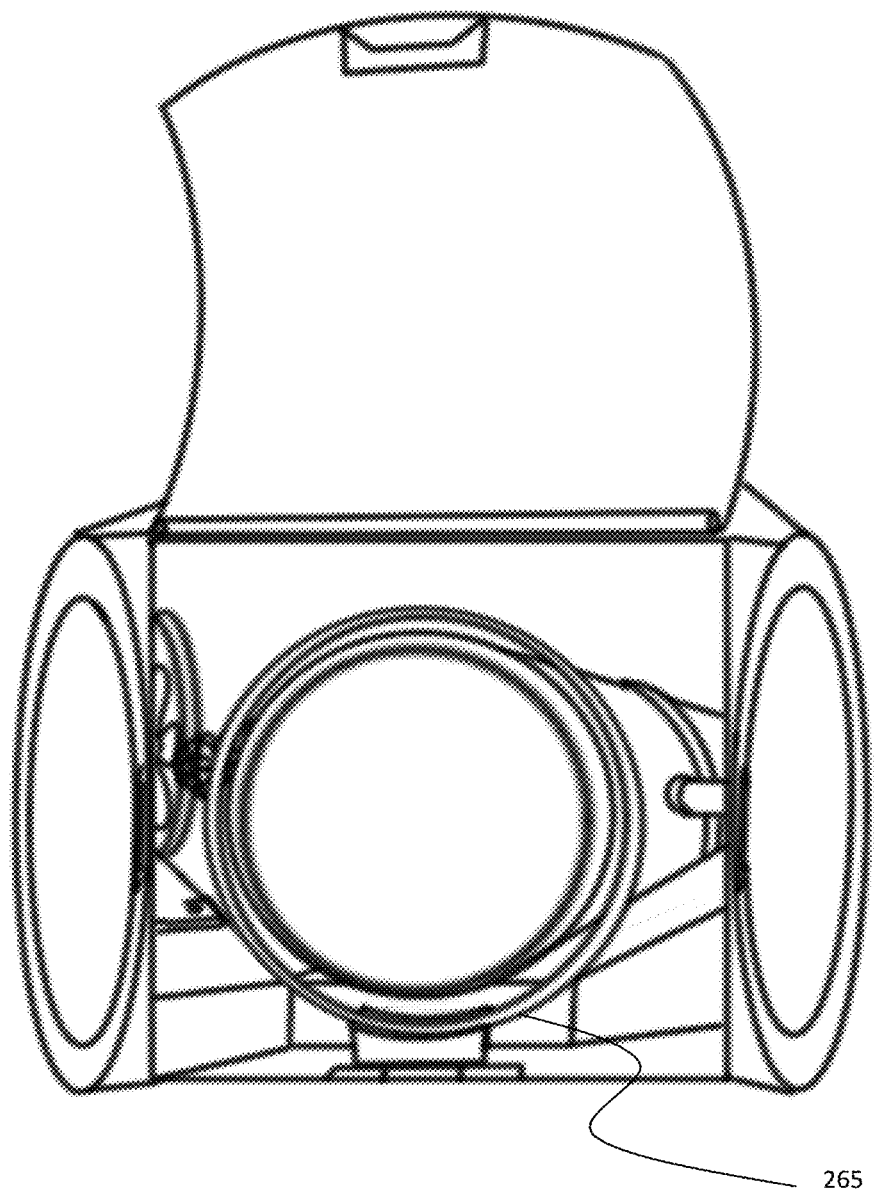
265
Figure: 106

Wall mount solar panel mounting frame come ventilator internal positive (+) and negative(-) cable arrangement.
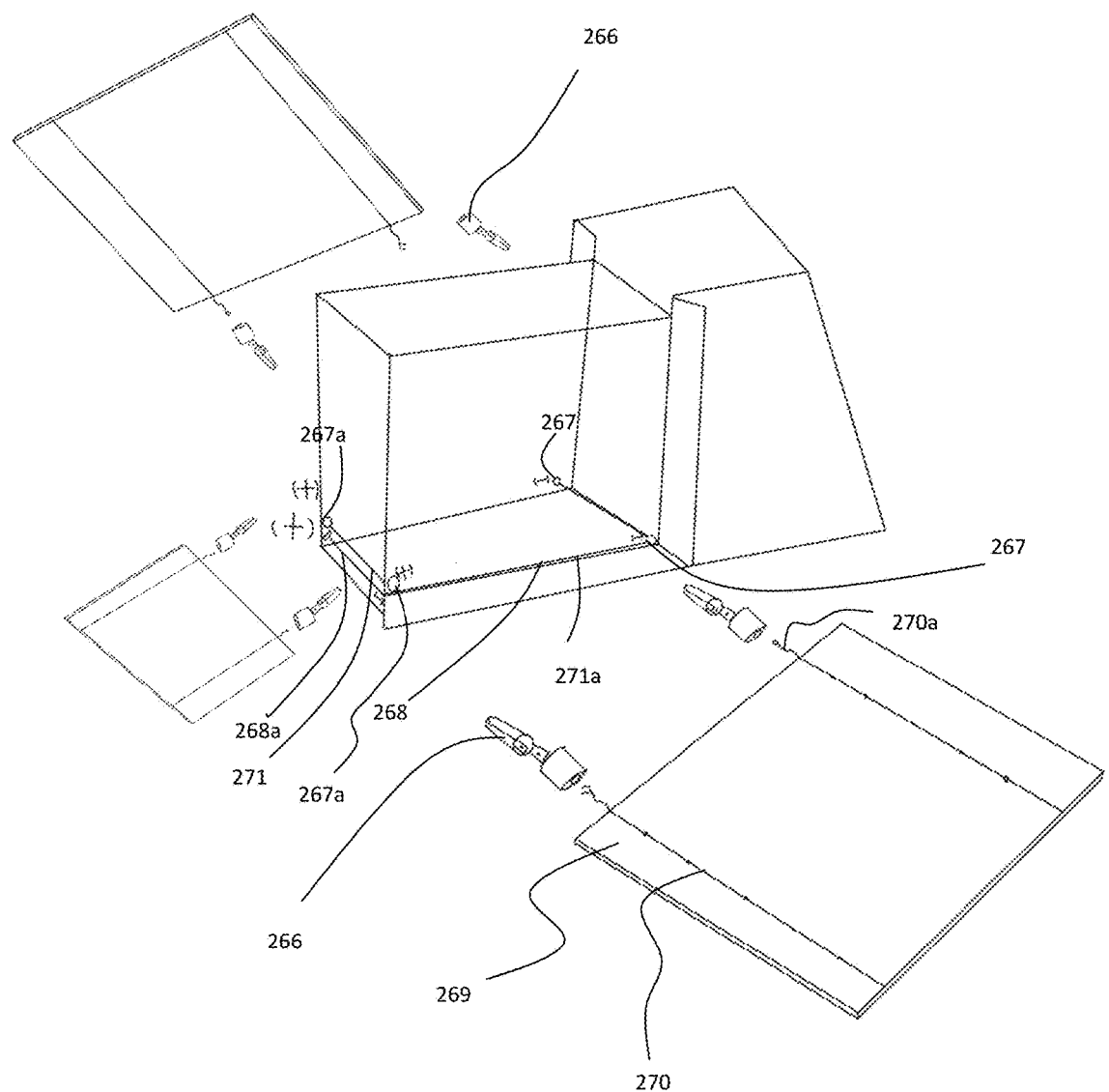
Figure: 107

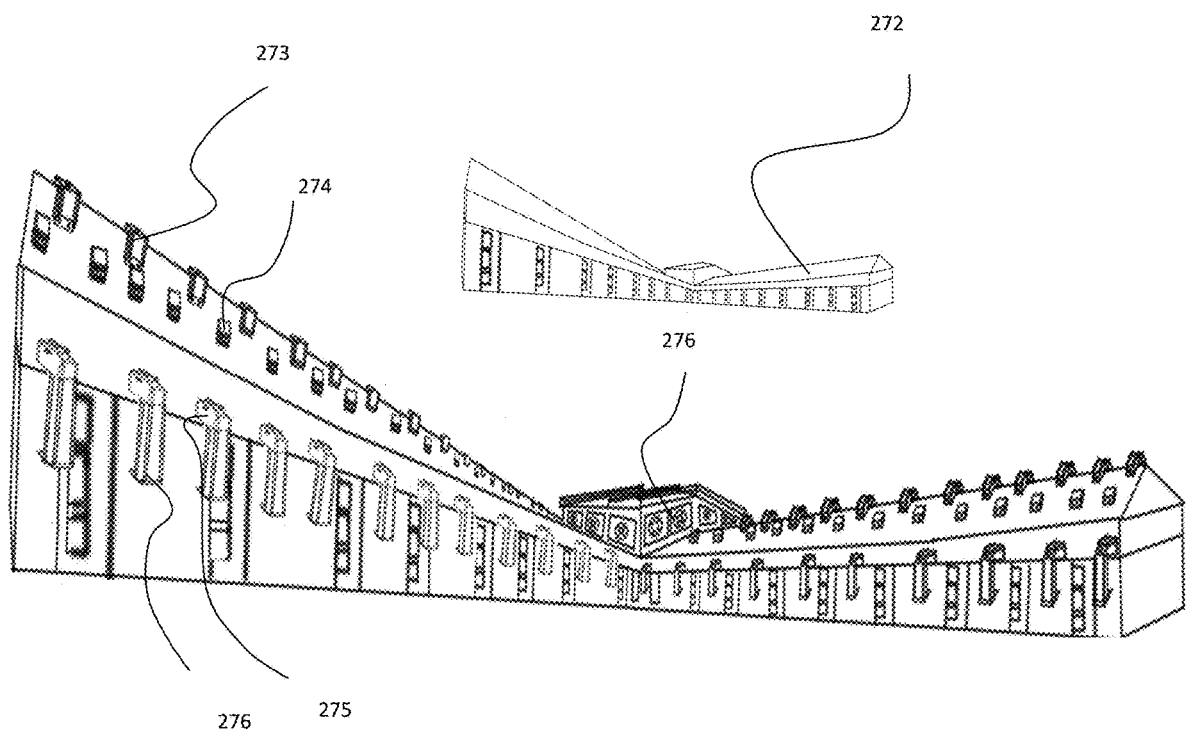
A school building back to top view with slope roof top, slope roof, and wall mount solar panel mounting frame come ventilators
Figure: 108

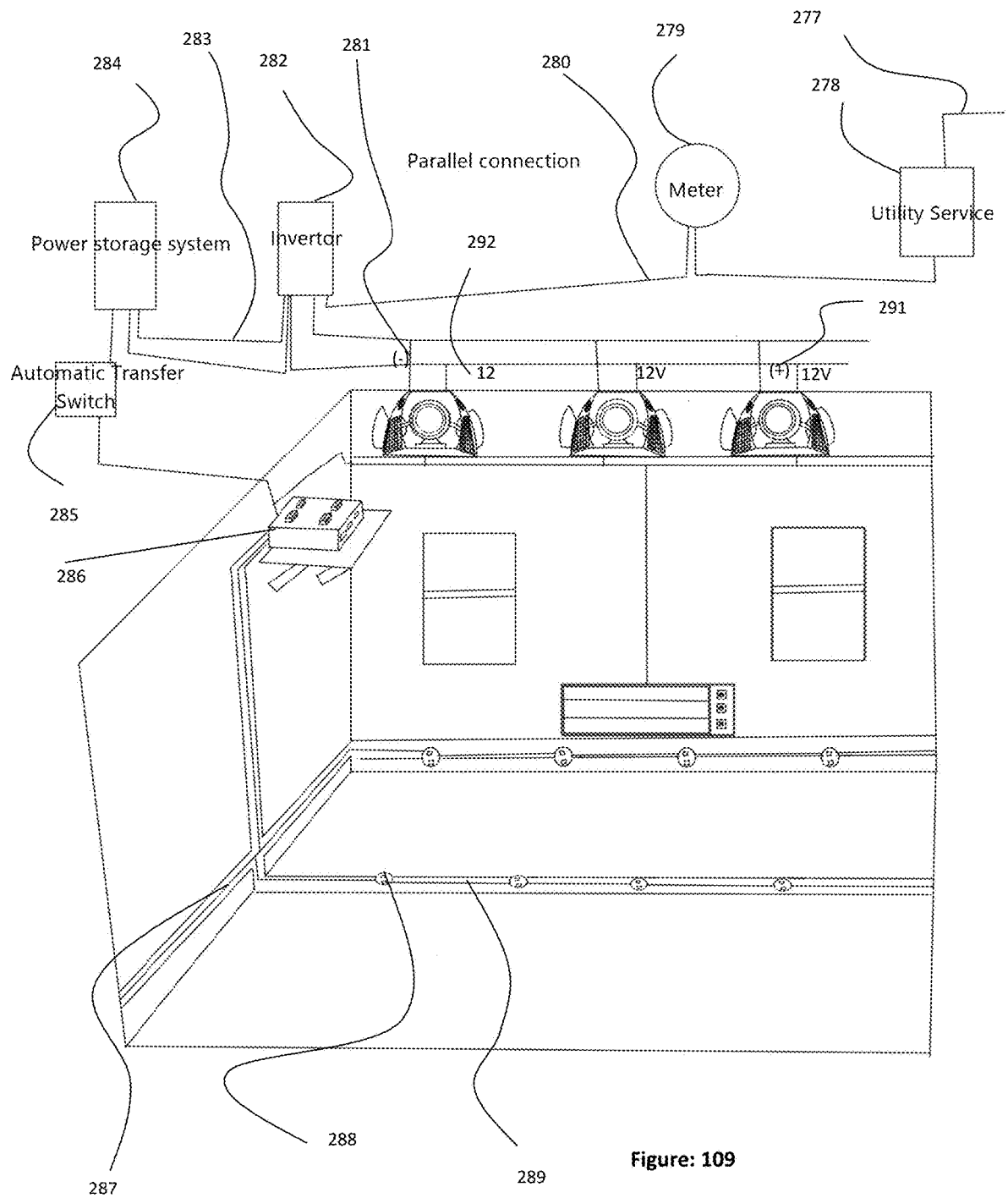
Figure: 109

Classroom internal view showing circuit connections between wall mount solar panel mounting frame come ventilator and D.C to A.C and storage system. Next the under ground power cable view.
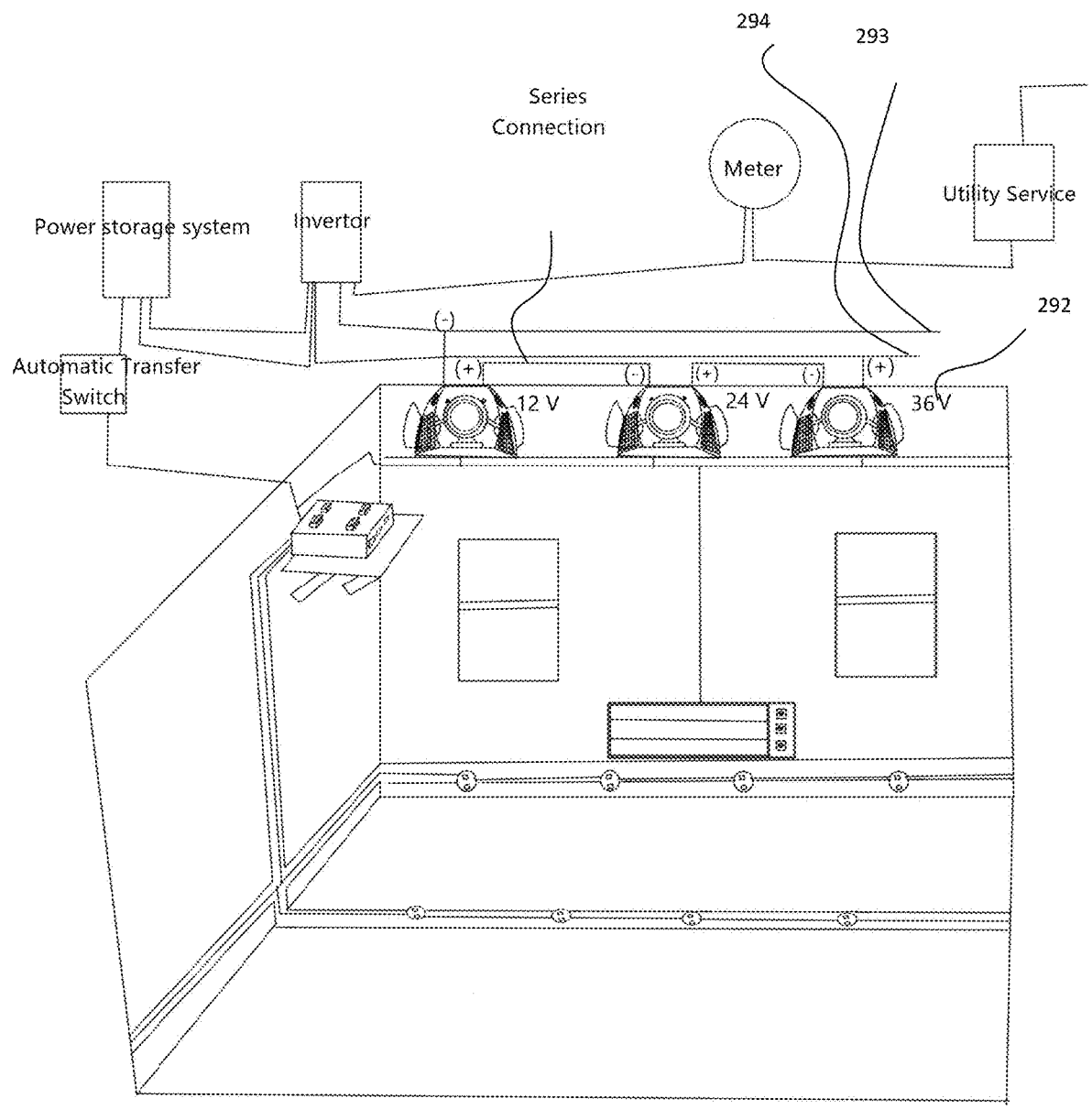
Figure: 110

Classroom internal view showing floor power supply to each student desk
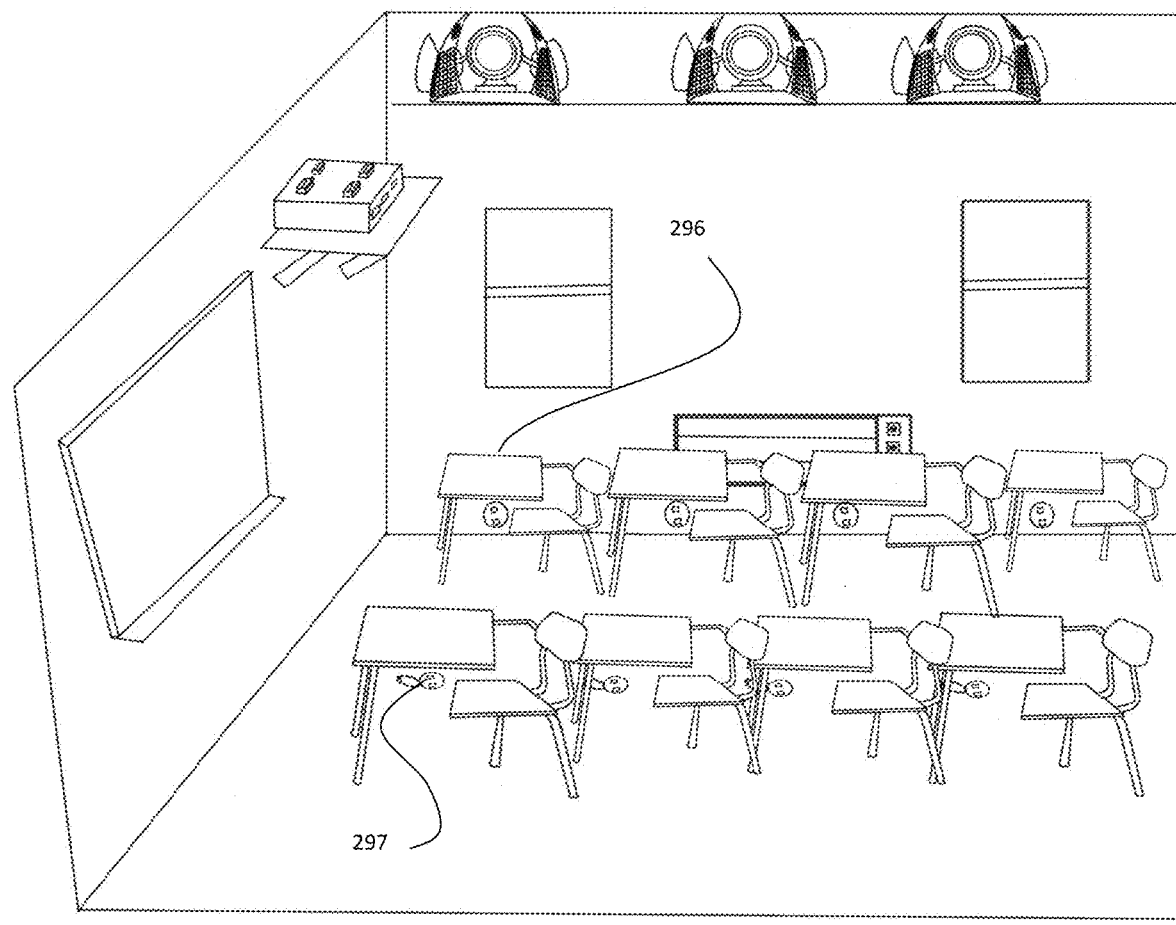
Figure: 111

Classroom internal view showing floor power supply to each student desk with dual tablet and movable digital podium
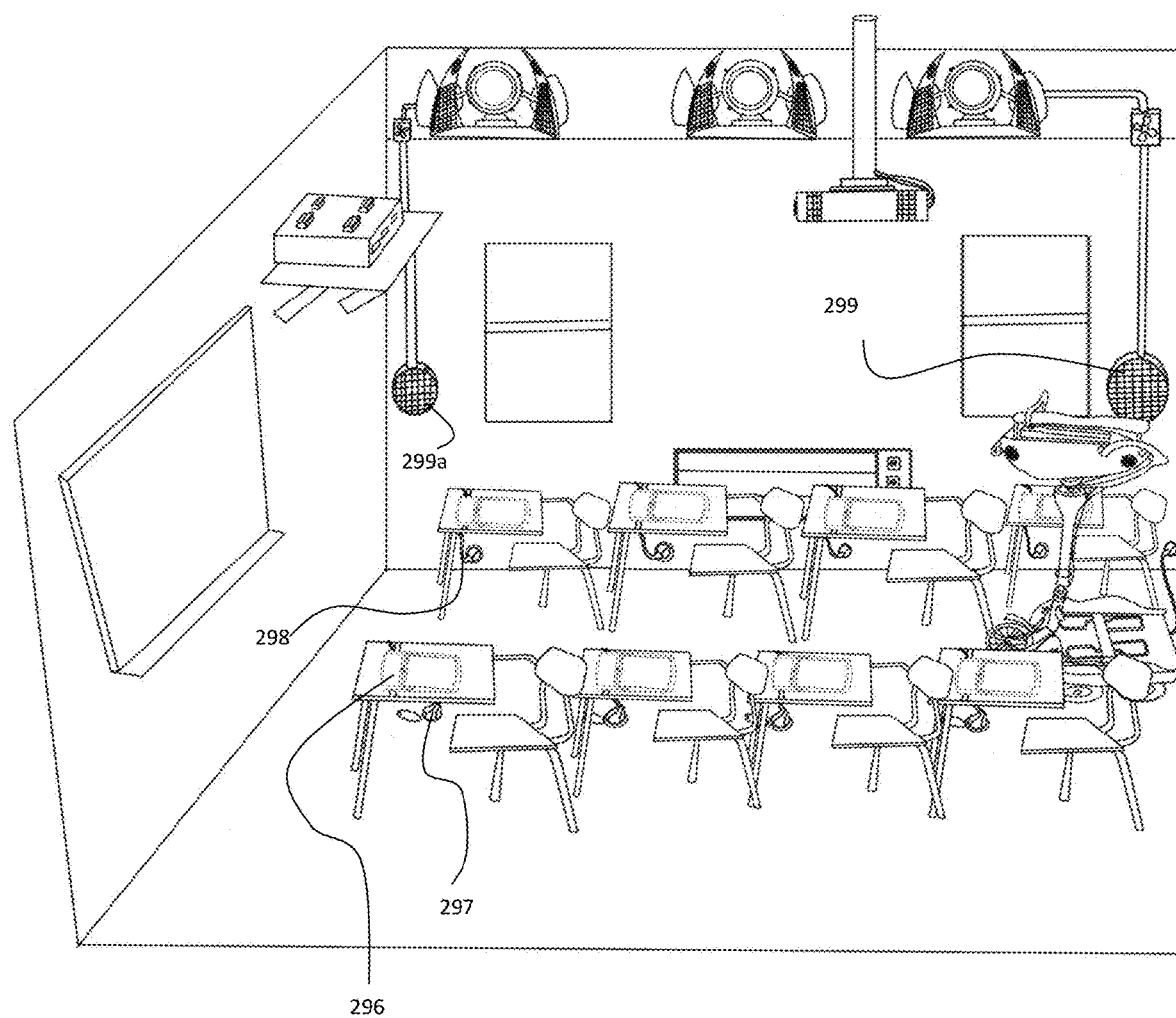
Figure: 112

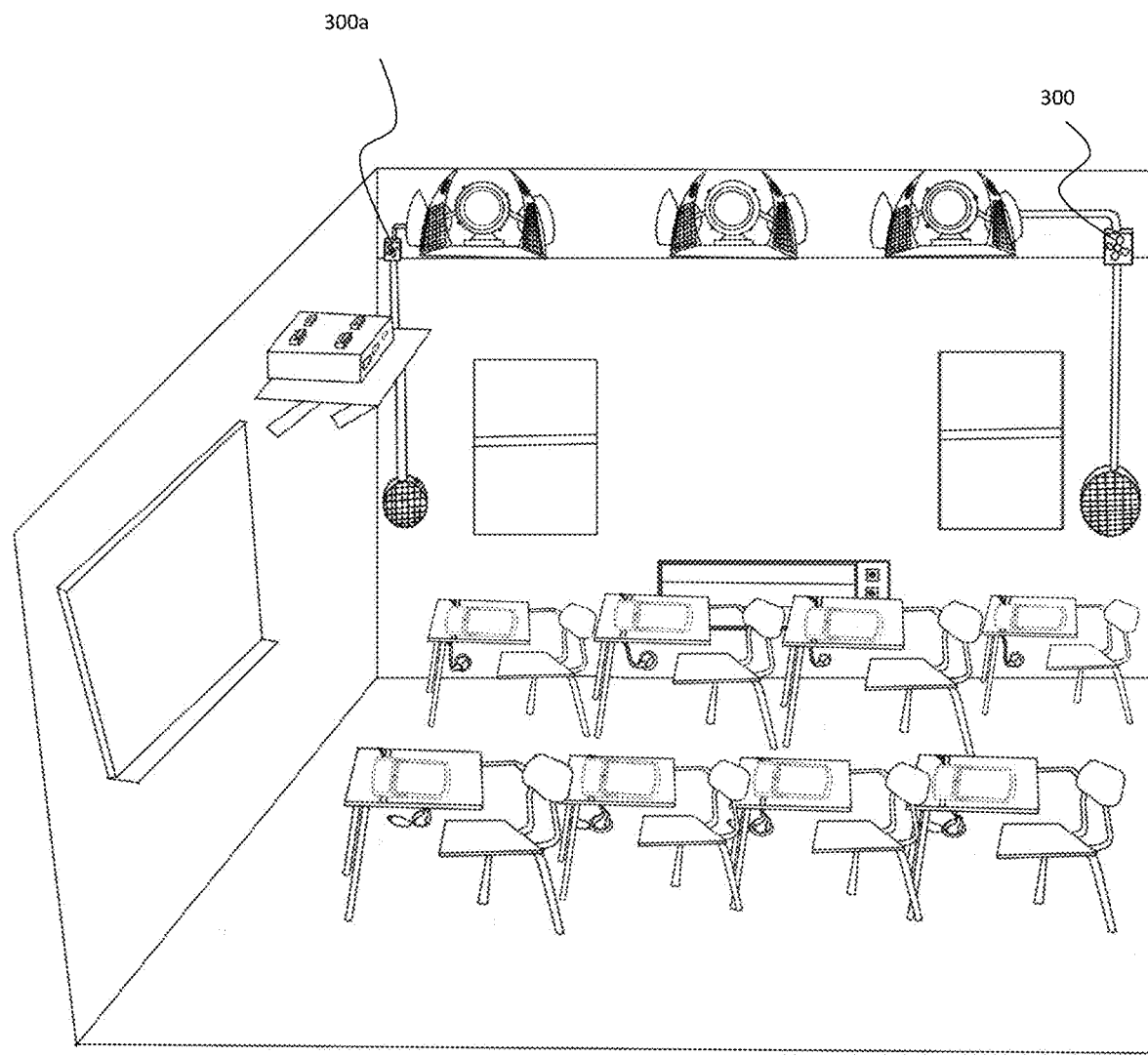
Figure: 113

Back to top view of a school roof mounted with slope roof top , slope roof and wall mount solar panel mounting frame come ventilators
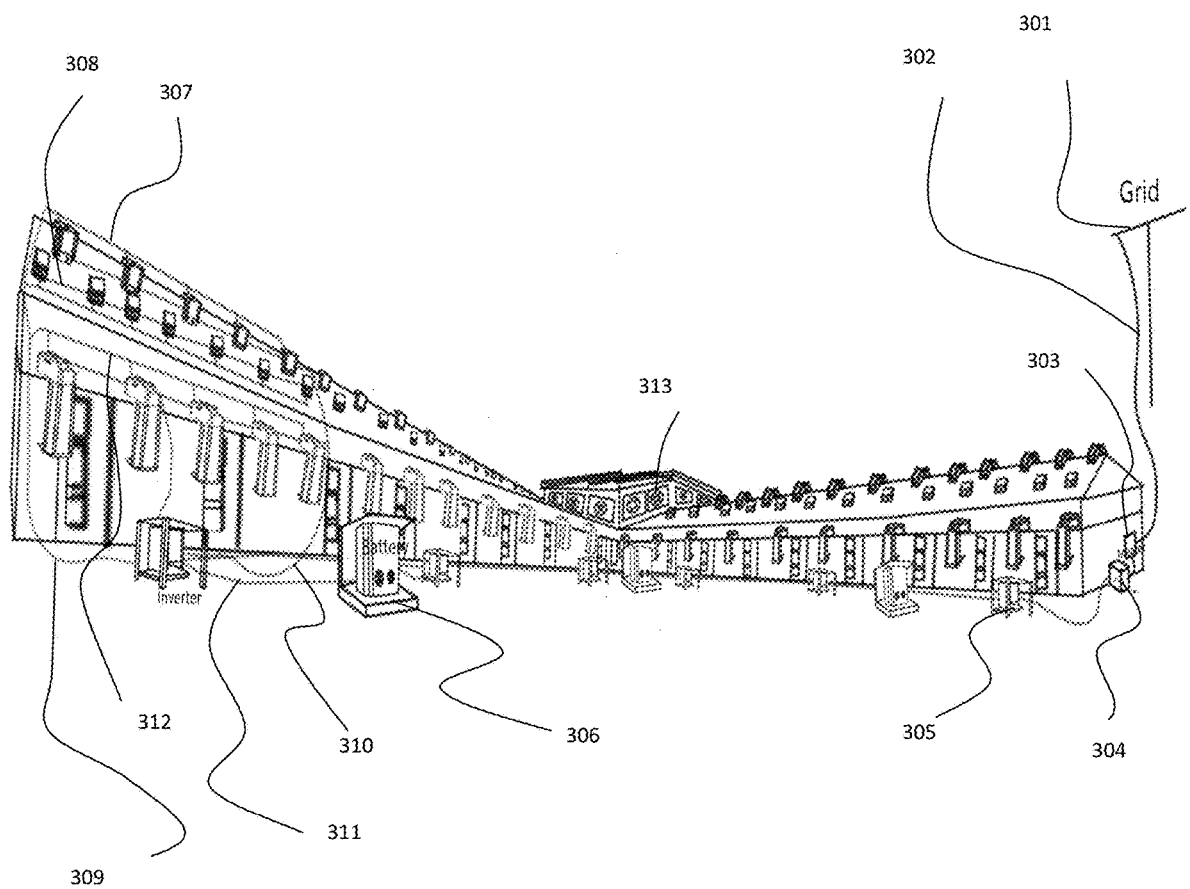
Figure: 114

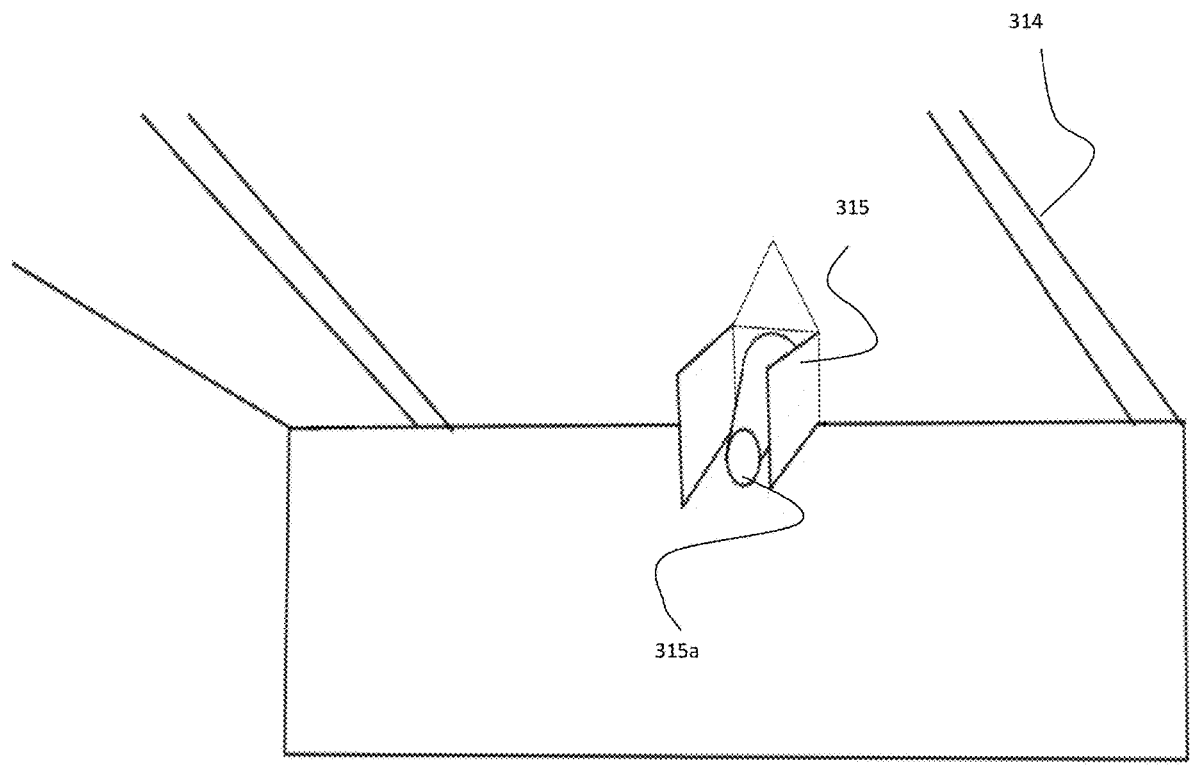
Figure: 115 roof internal view showing triangle dormer parts of sunlight dome air in and out (exhaust system)
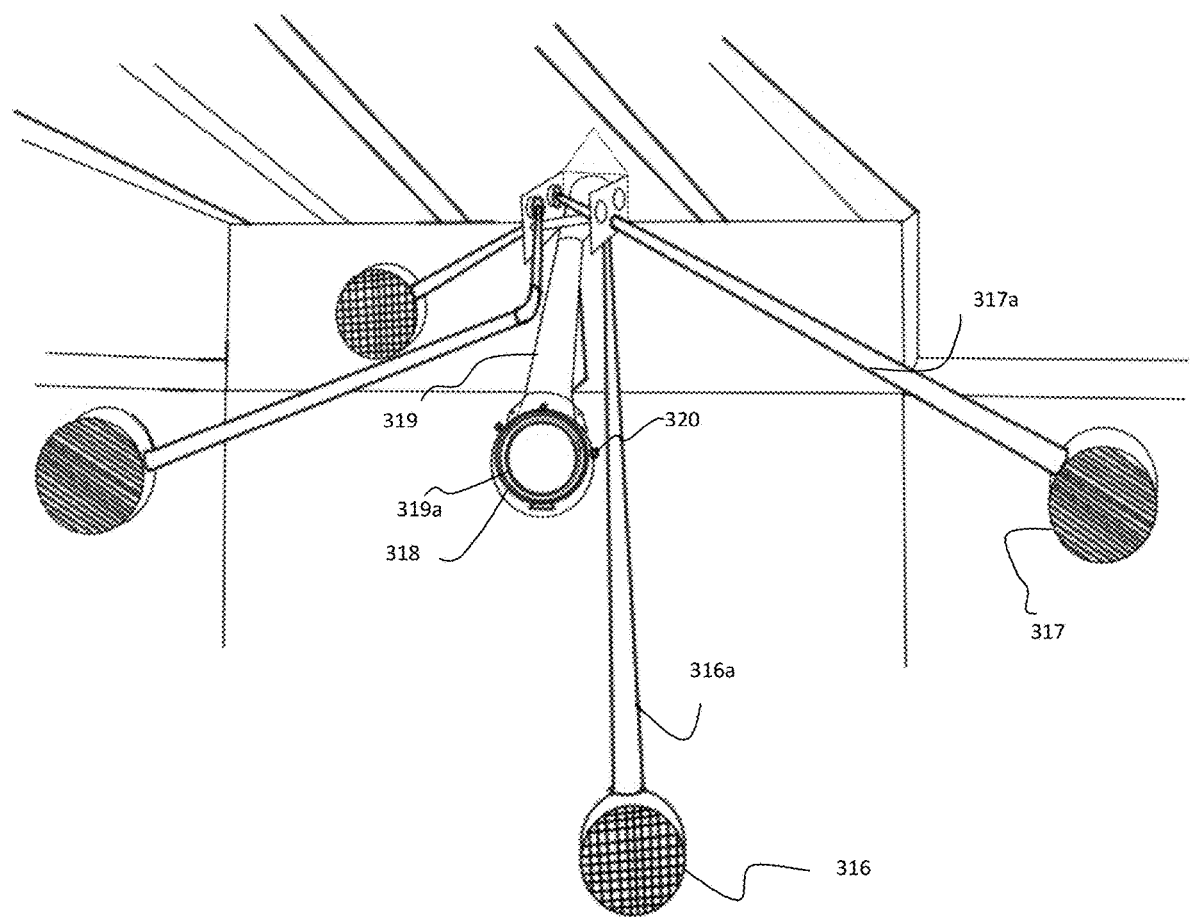
Figure: 116

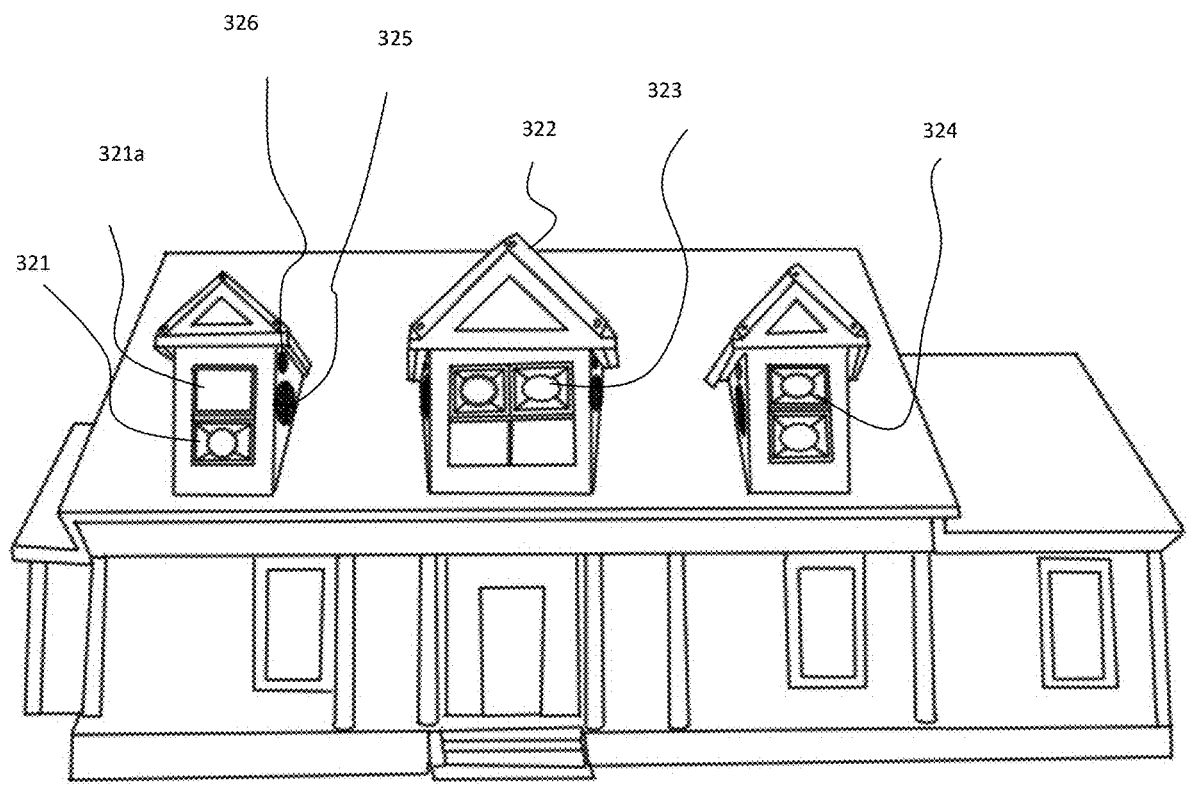
A traditional home front to top view showing triangle dormer modified with SAVES technology
Figure: 117

Slope roof dormer side to top view
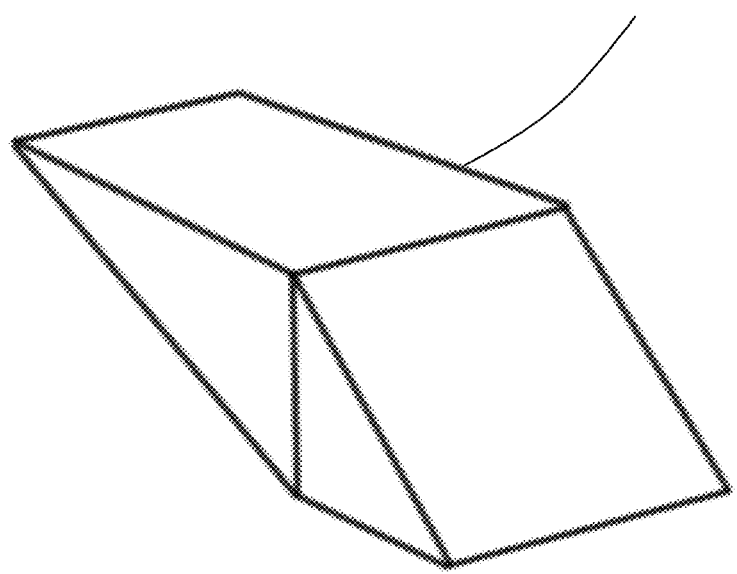
327
Figure: 118

Slope roof dormer side to top view with solar panel mounting rail and air-in and out fans
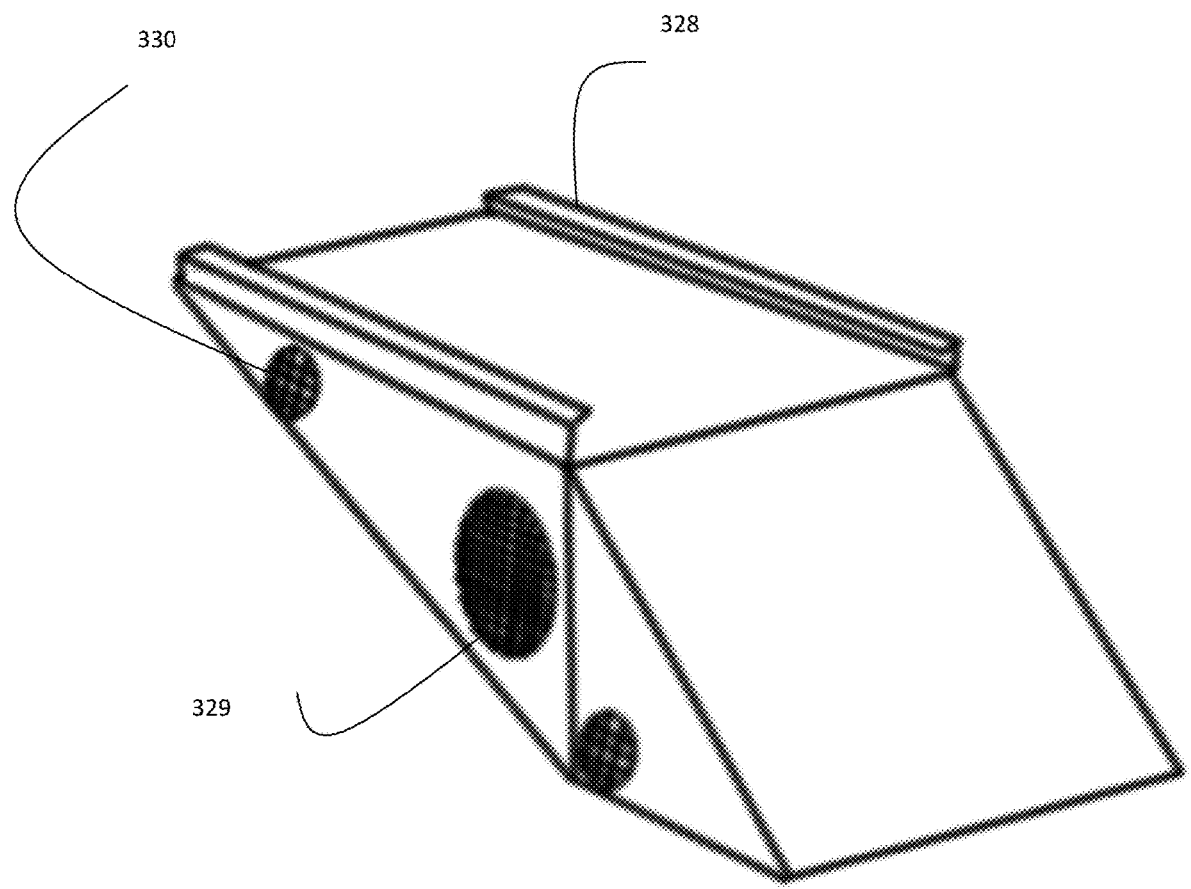
Figure: 119

Slope roof dormer side to top view with sunlight collecting chimney.
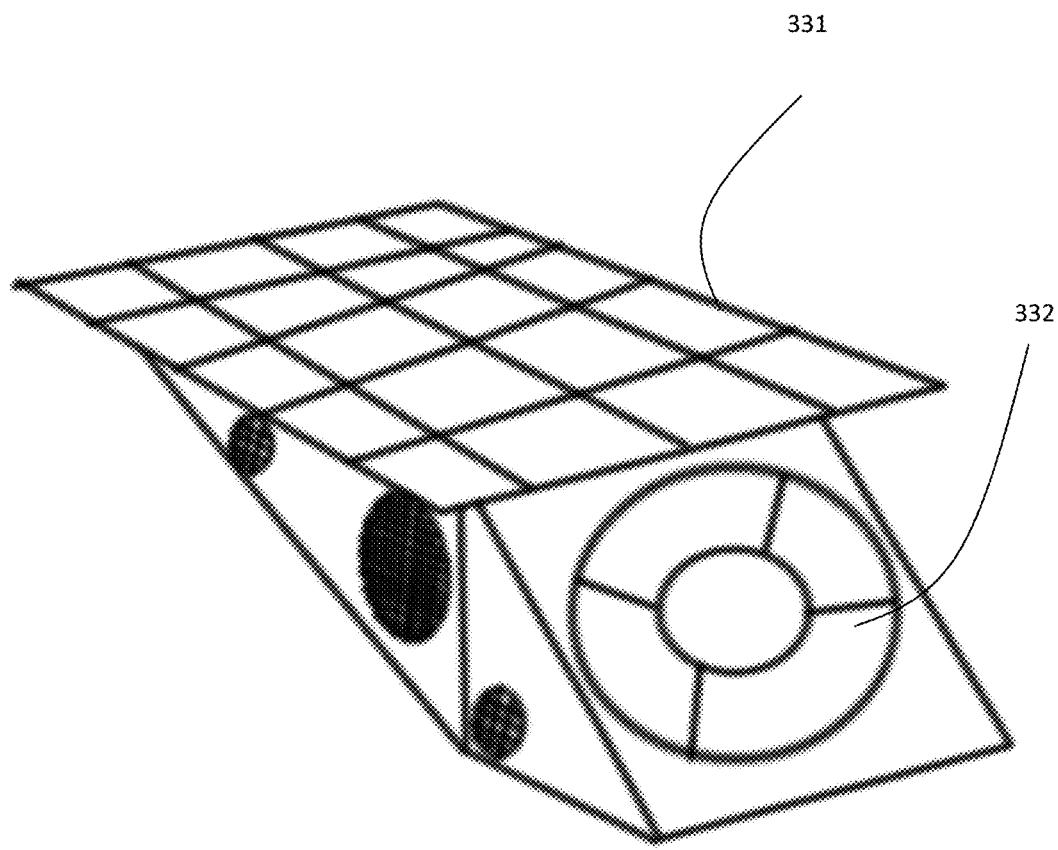
Figure: 120

A modern home front view with slope dormer and roof top solar panel mounting frame come ventilator
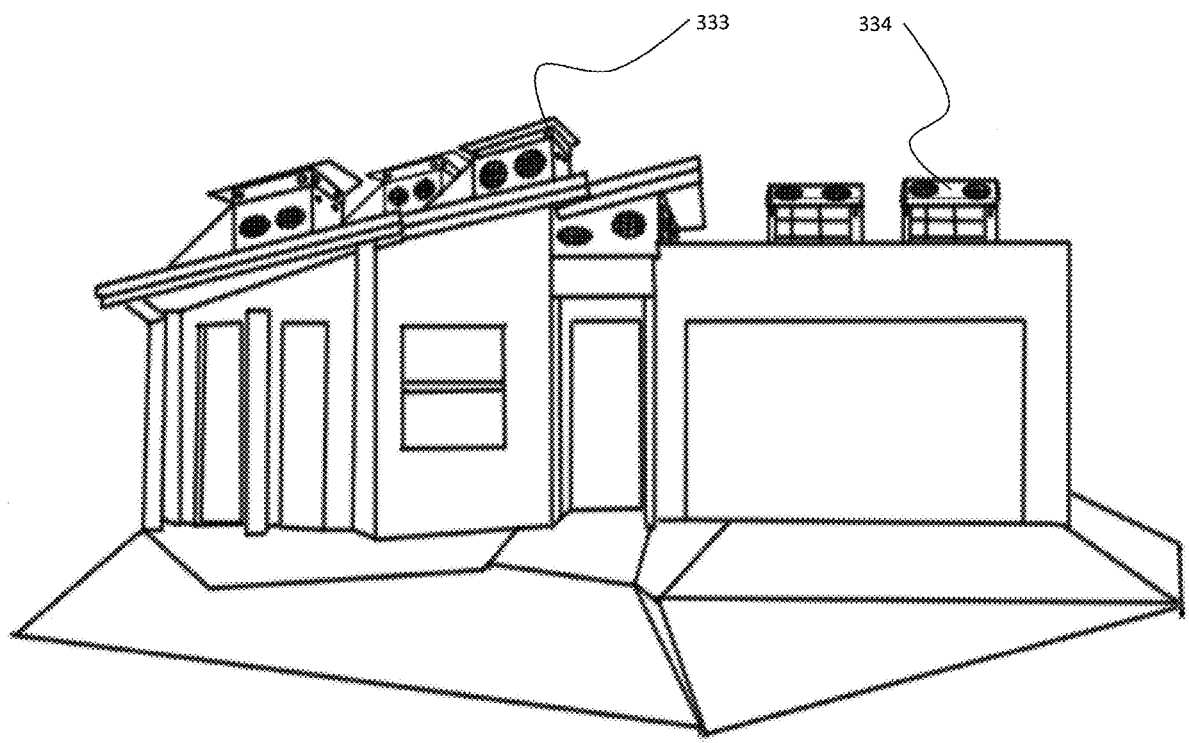
Figure: 121

Wall insert sunlight dome and pipe lines front to side view( inside the room)
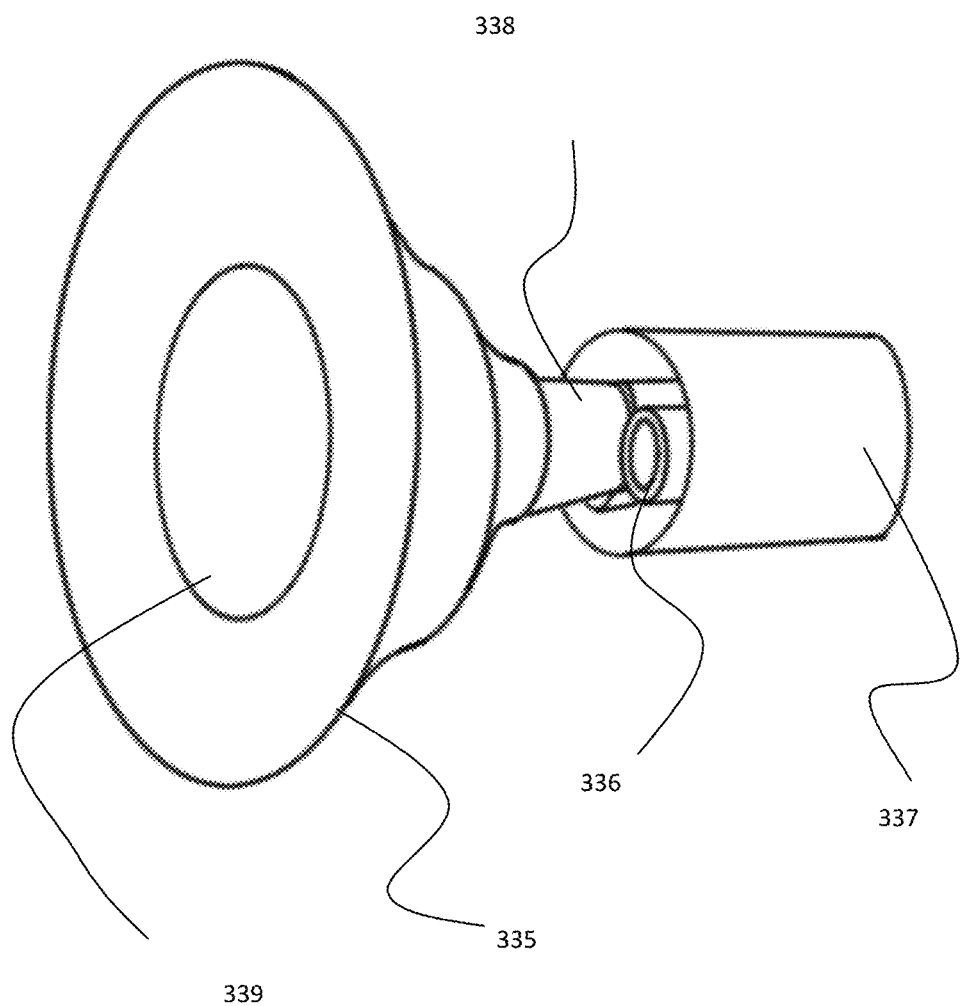
Figure: 122

In and outside view of wall mount sunlight, air-in and out (exhaust) system with flat chimney and pipe mount air-in fan.
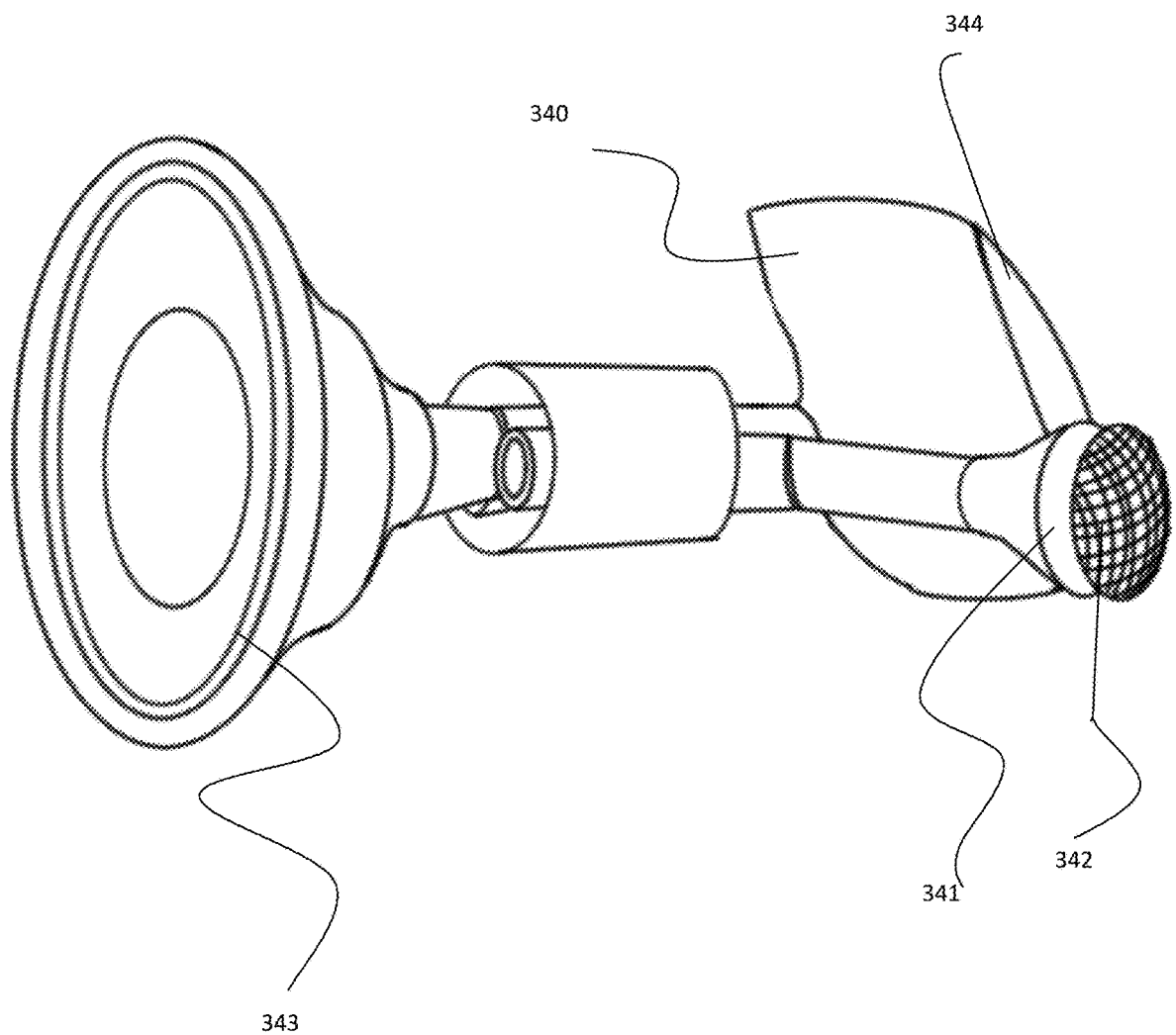
Figure: 123

In and outside view of wall mount sunlight, air-in and out (exhaust) system
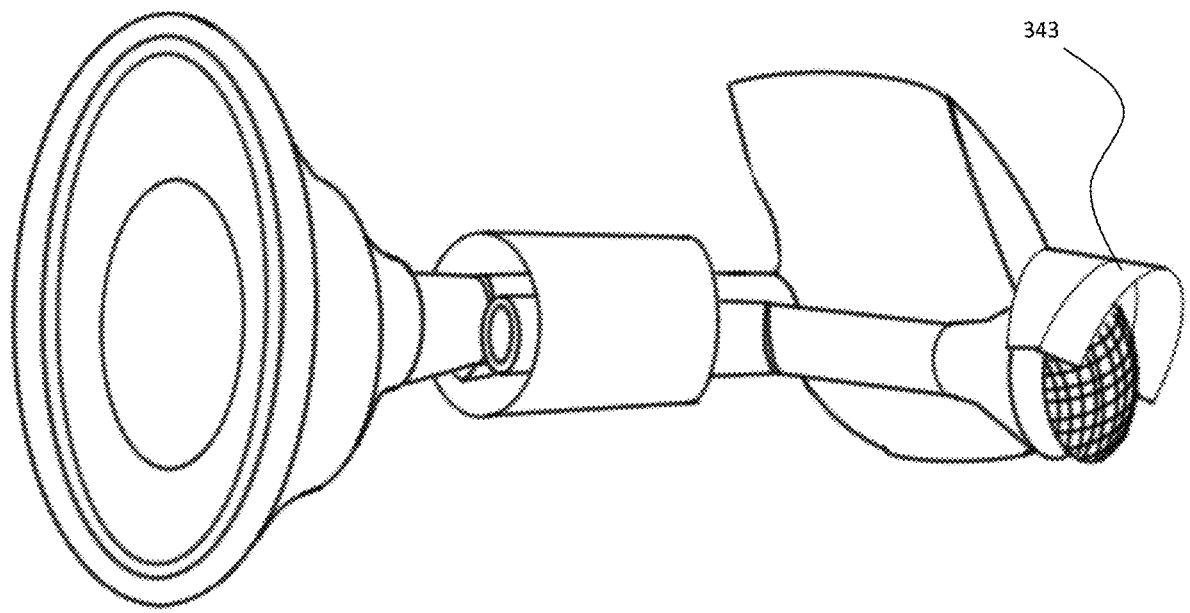
Figure: 124

In and outside view of wall mount sunlight, air-in and out (exhaust) system
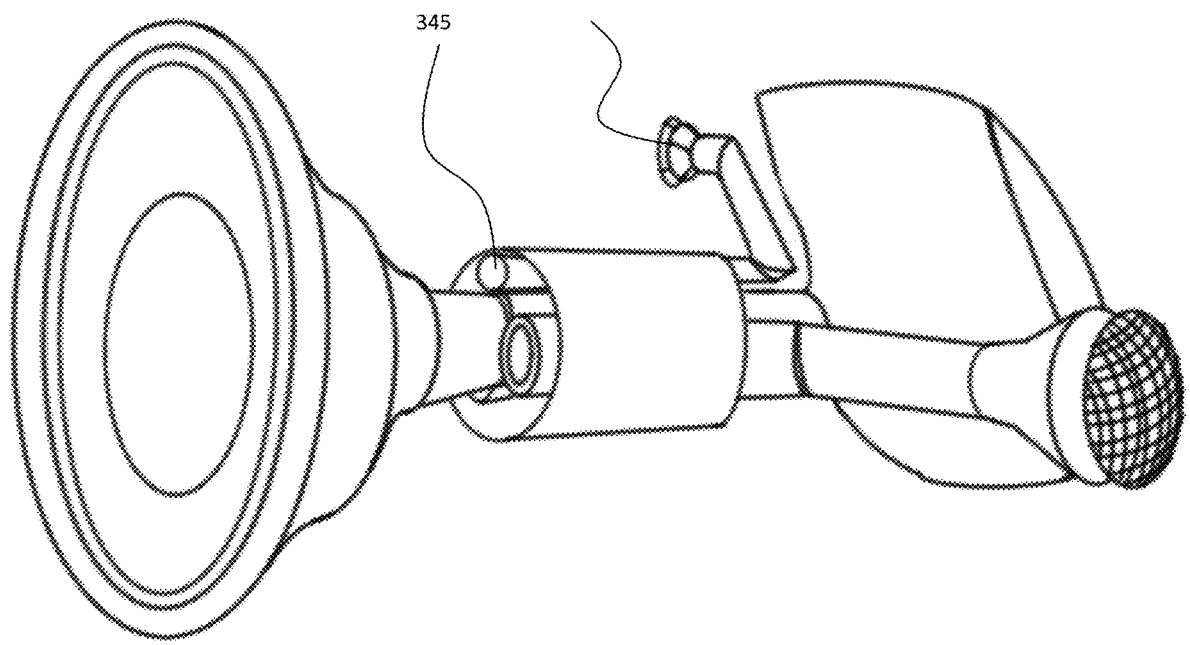
Figure: 125 wall mount sunlight and air ventilation and exhaust system inside view
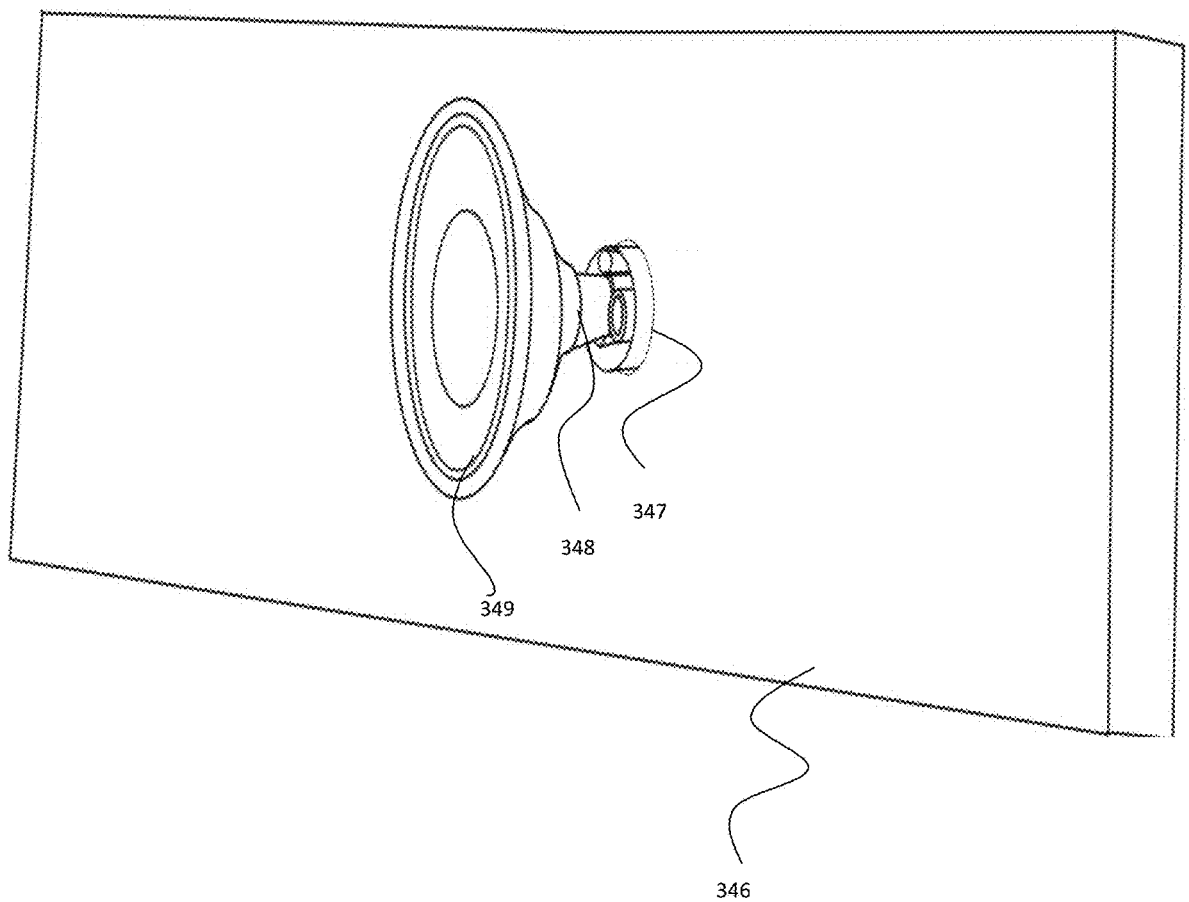
Figure: 126

Inside view of wall mount sun light and air-in and out (exhaust) system
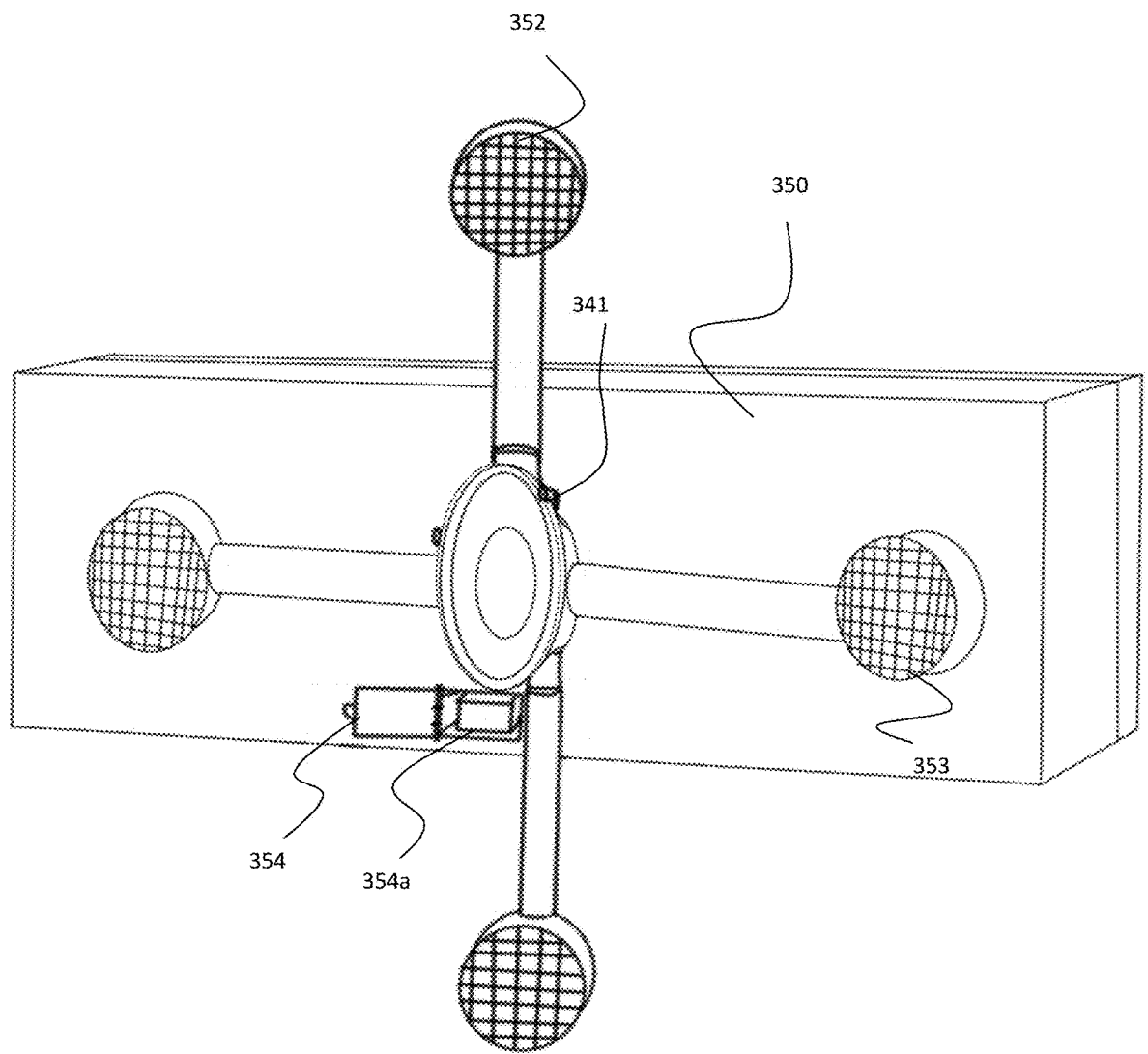
Figure: 127

Back to top view of school with wall mount sunlight and air ventilation and exhaust system
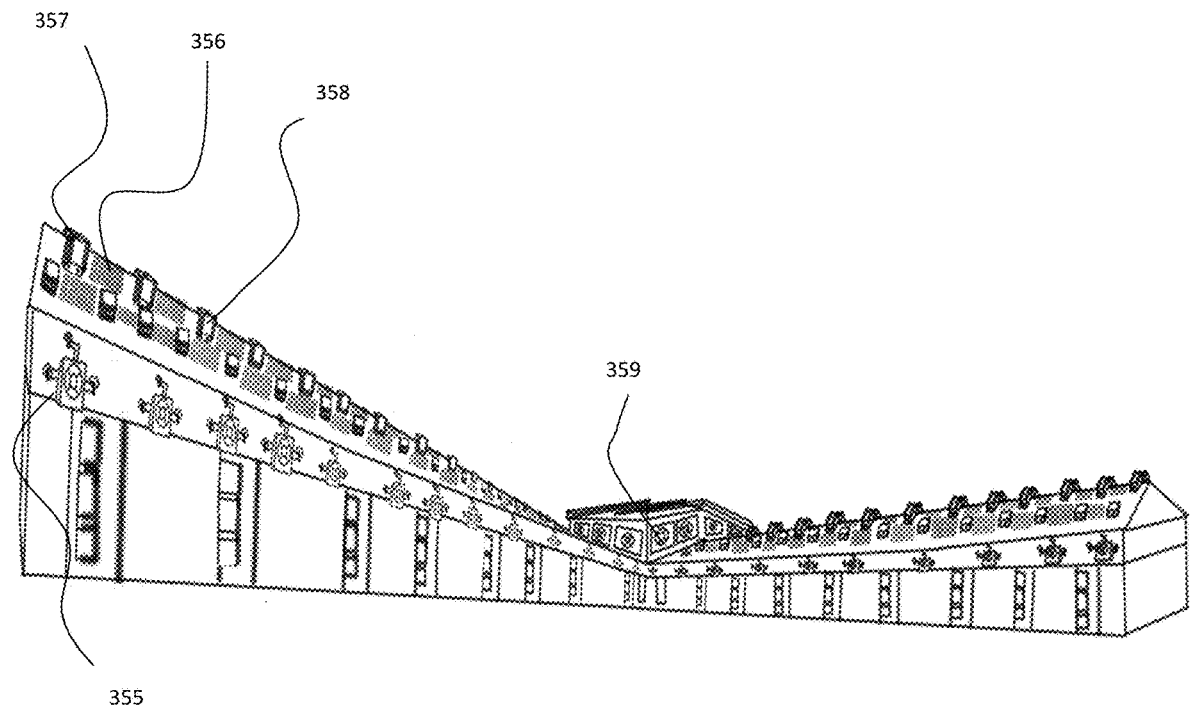
Figure: 128

Front view (inside the room) of window mount sunlight collecting flat chimney parts
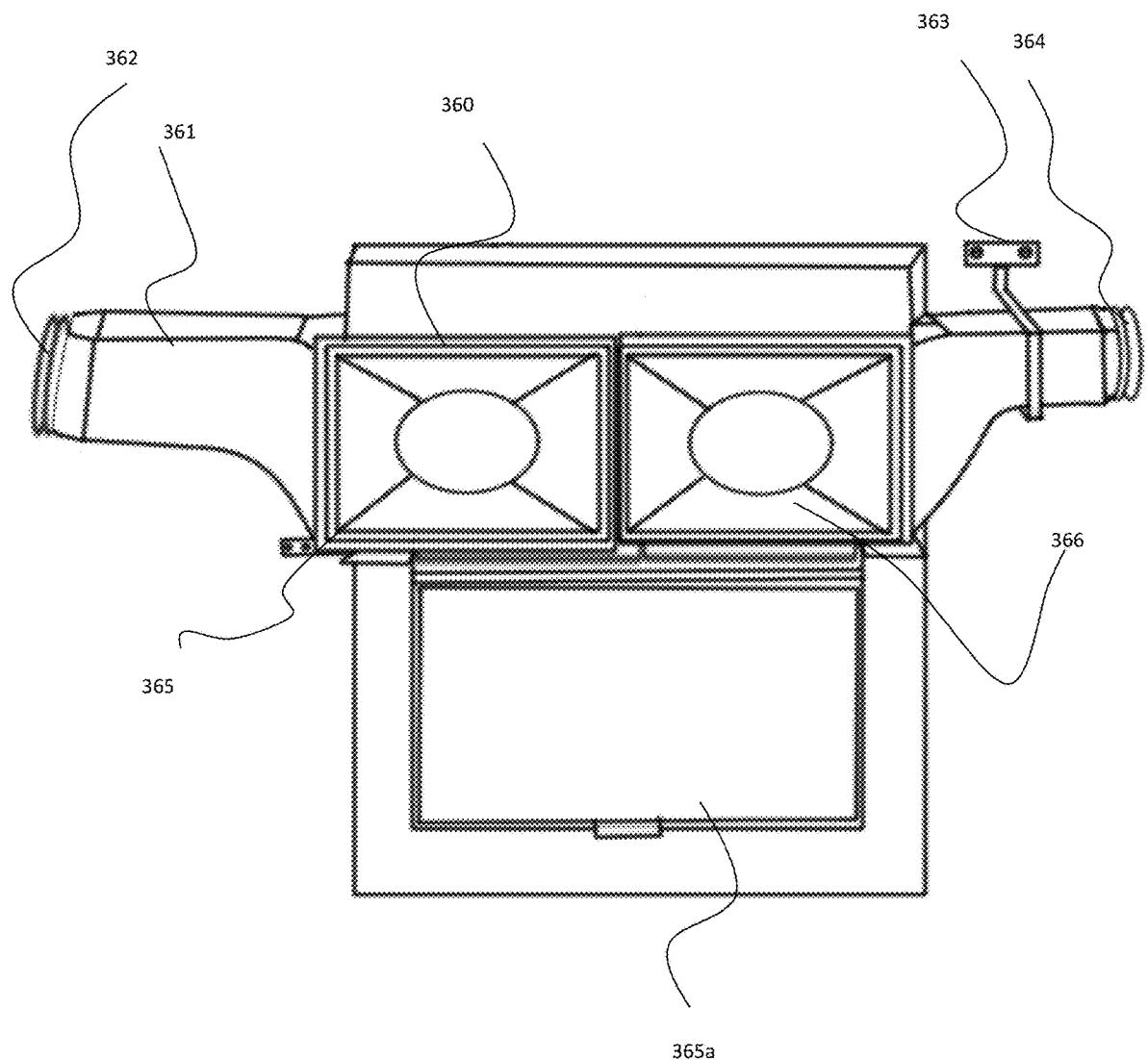
Figure: 129

Front view (inside the room) of window mount sunlight collecting flat chimney and air-in and out parts
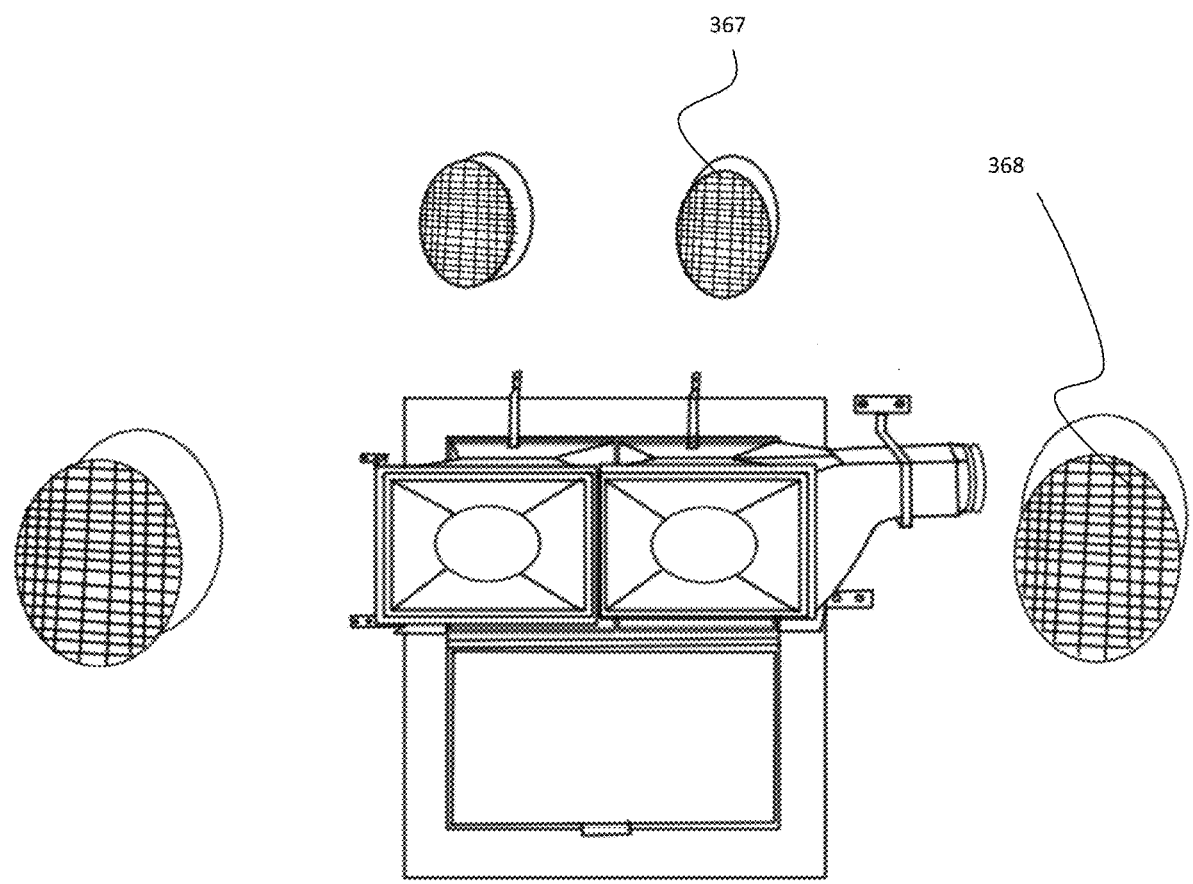
Figure: 130

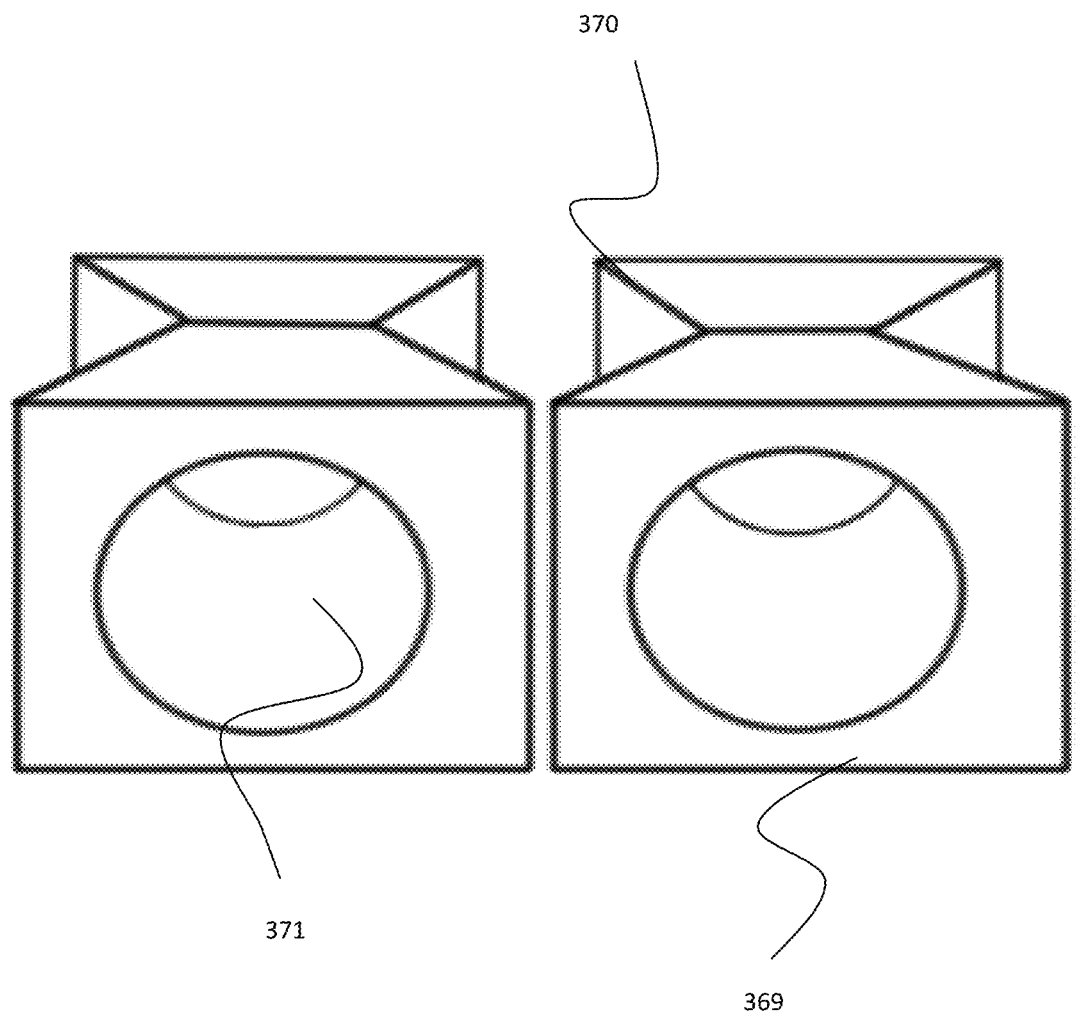
Front to top view of sunlight collecting dual flat cones
Figure: 131

Internal view of sun light collecting flat cone and extinction pipe joints
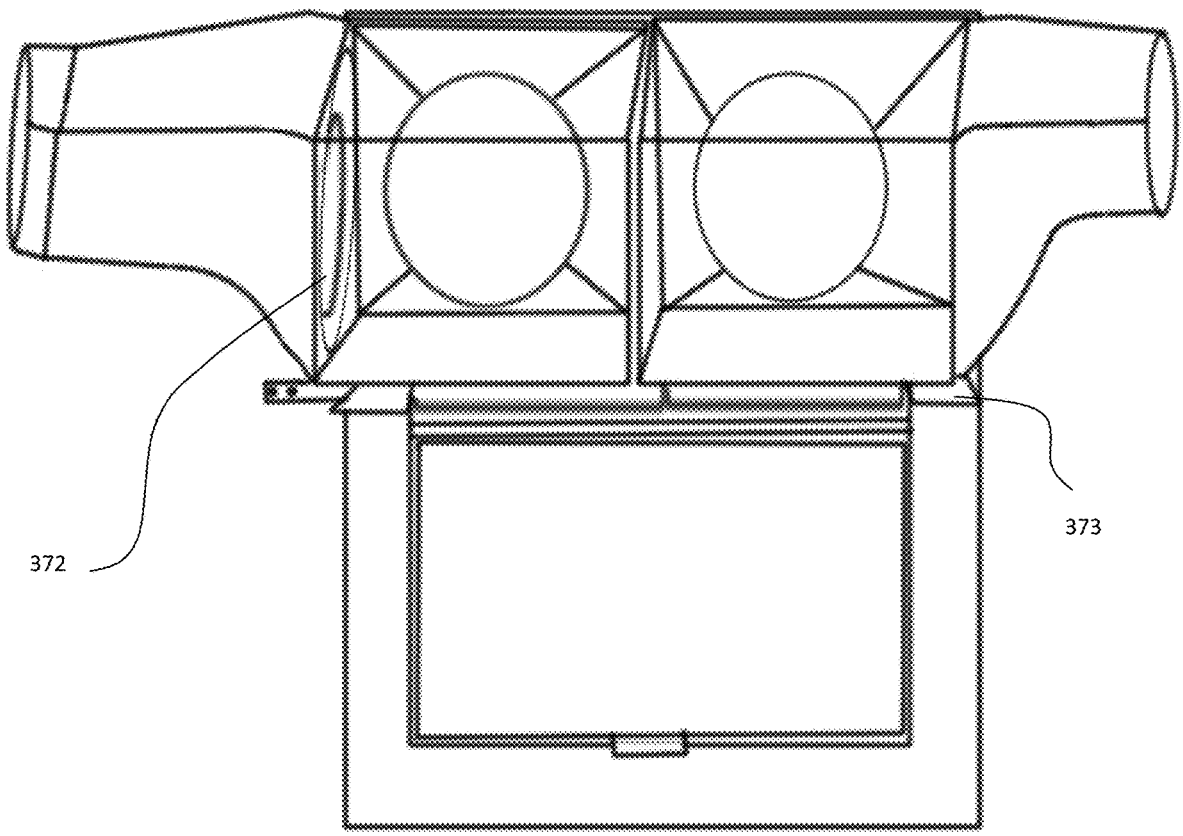
Figure: 132

Front view of window mount sunlight chimney parts
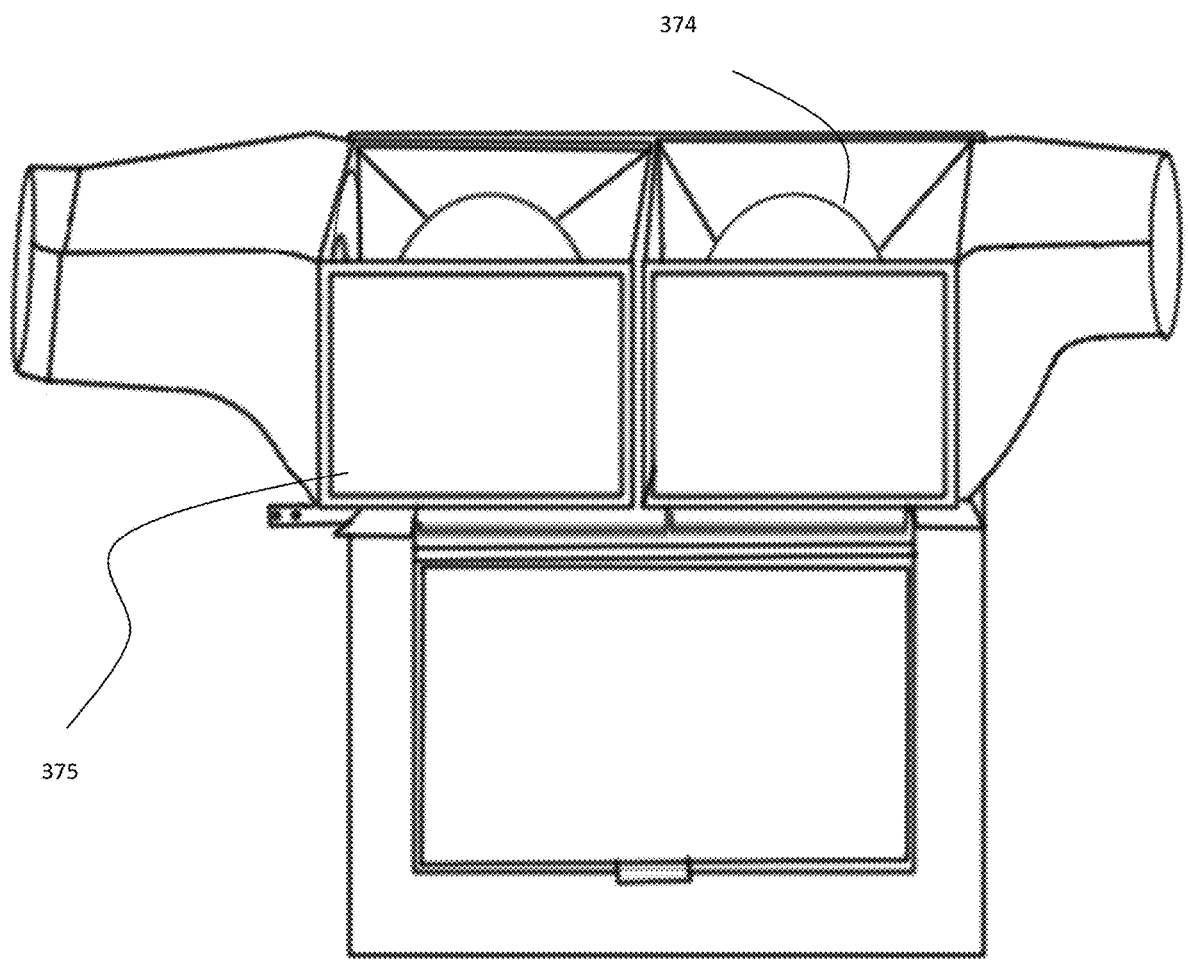
Figure: 133

Flat Cone chimney parts (back and front views)
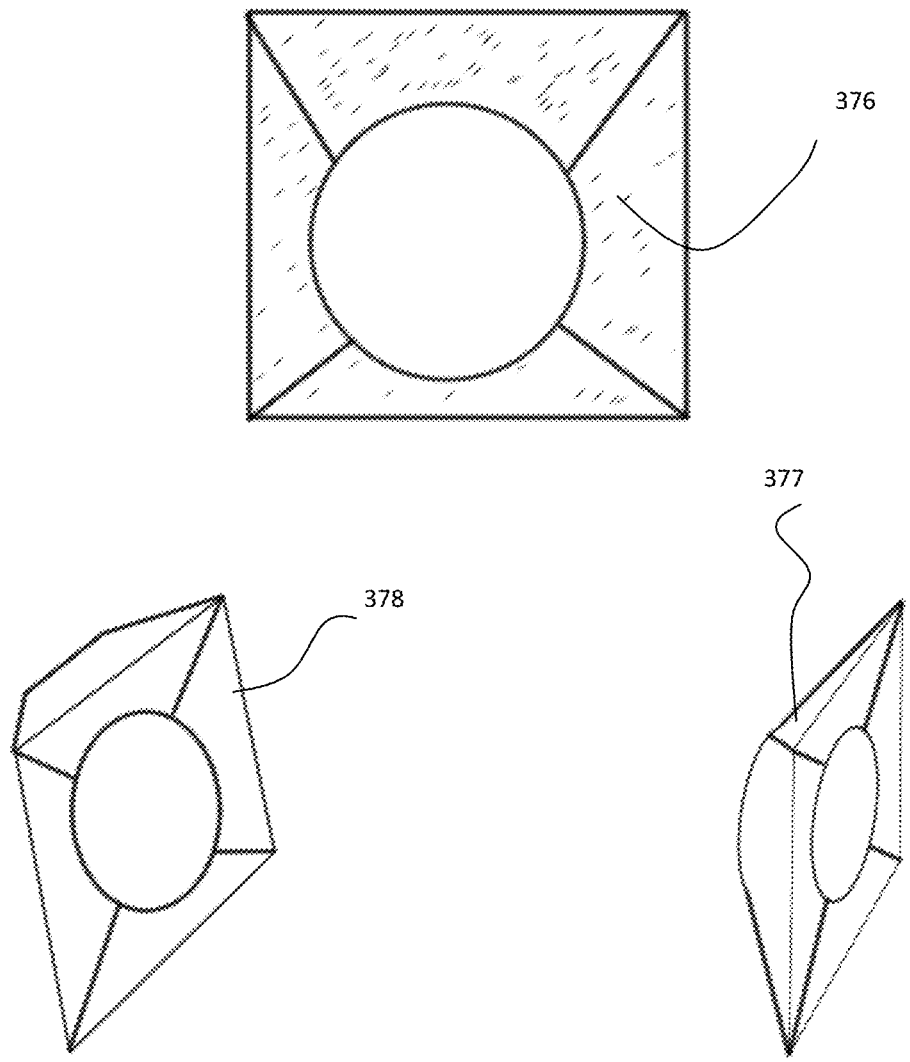
Figure: 134

Window inside front to top view of closed frame
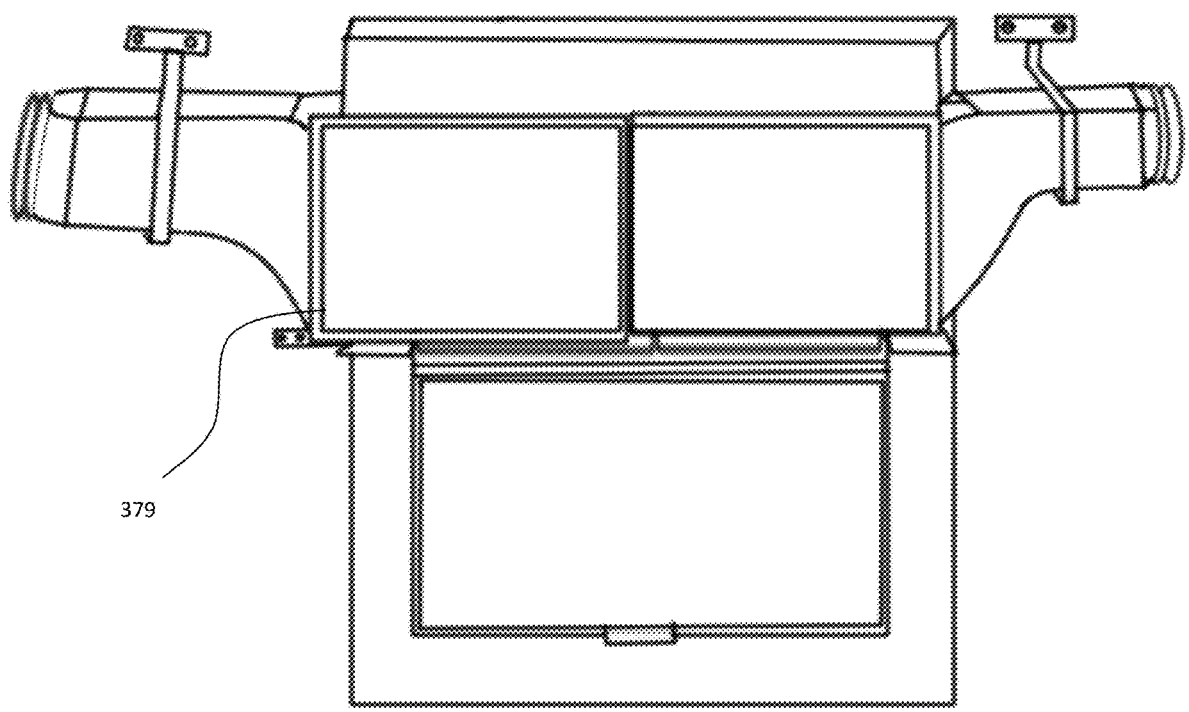
379
Figure: 135

Front to top view of a traditional home with window mount flat chimney and wall mount solar panel mounting frame come ventilator
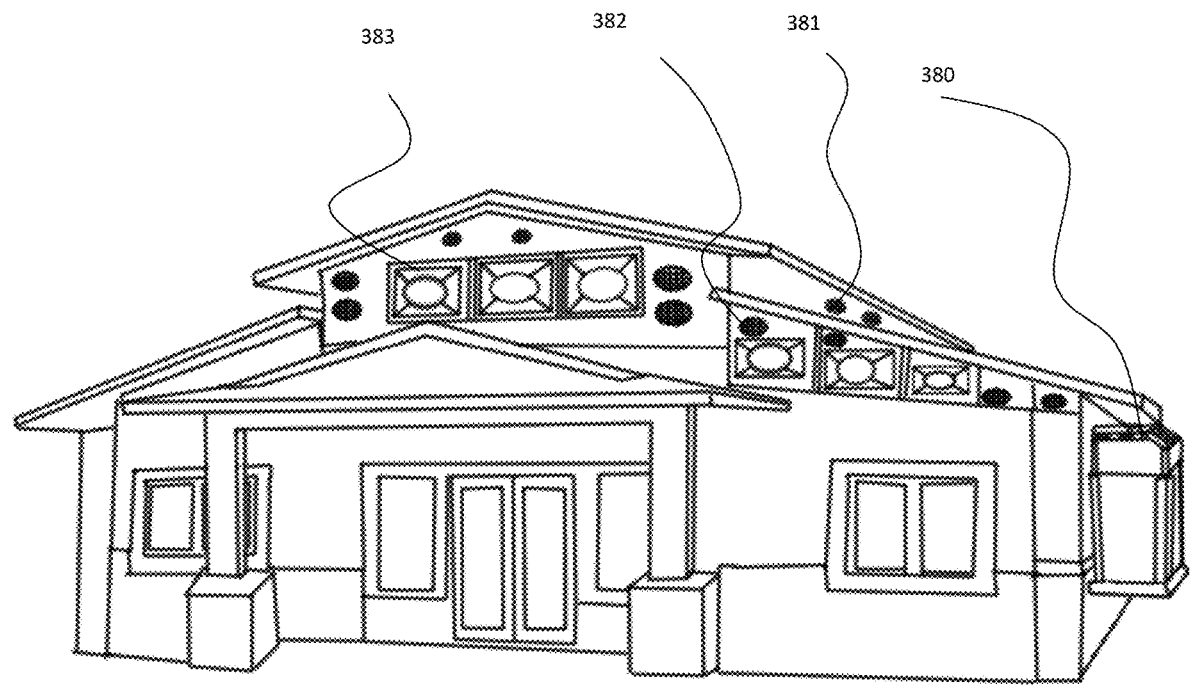
Figure: 136

Top to internal view of a home with window mount flat chimney and its pipe line to a sunlight exit dome
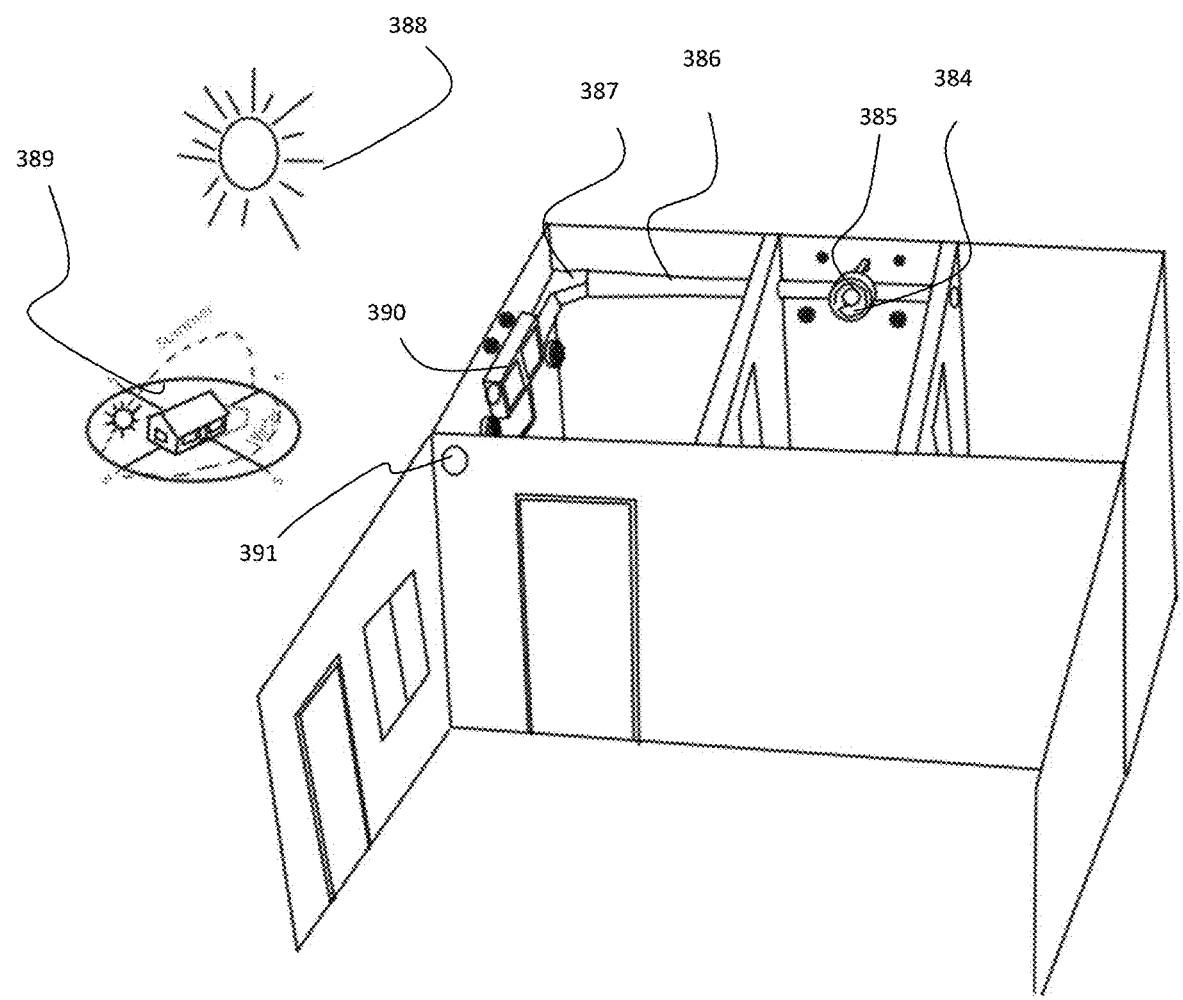
Figure: 137

Internal view of room showing parts of roof top solar panel mounting frame come ventilator with multiple sunlight exit pipes
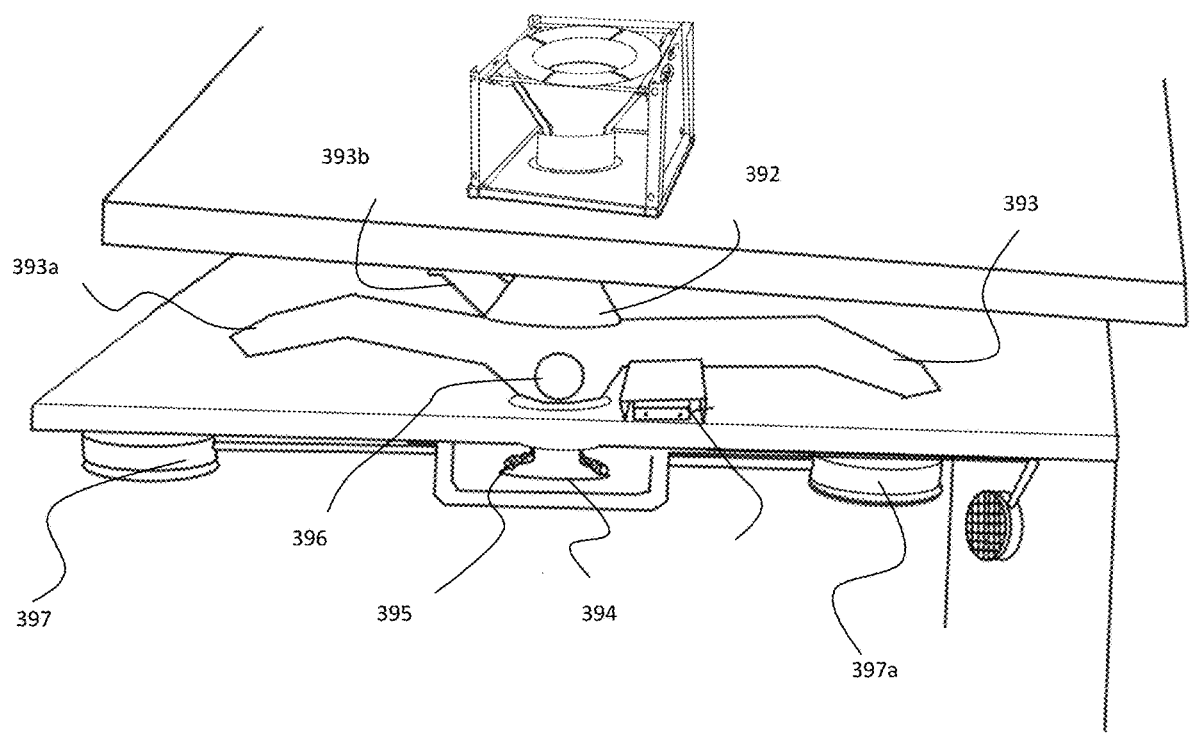
Figure: 138

A home front to top view which is in between two large apartments and has very less light source
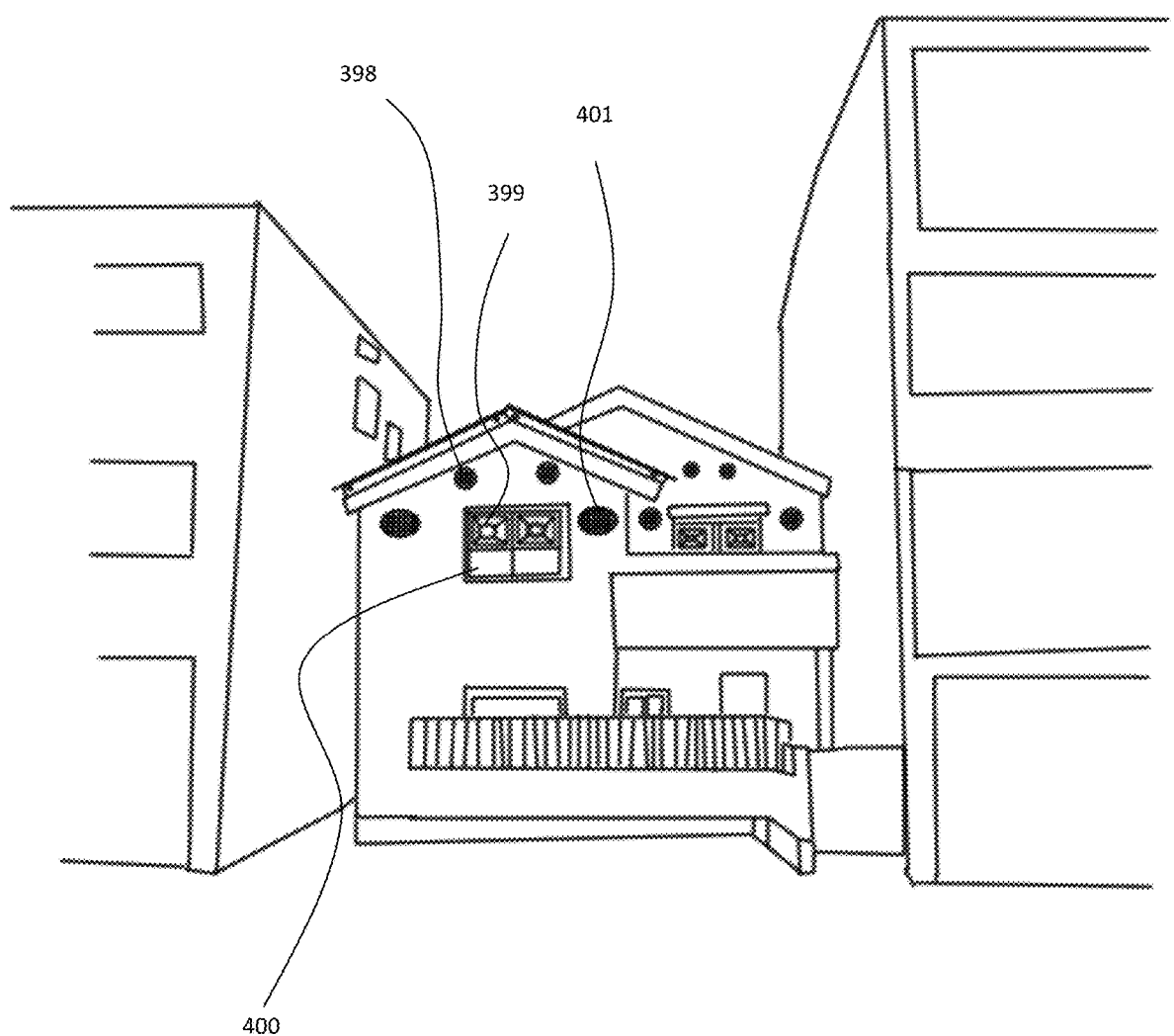
Figure: 139

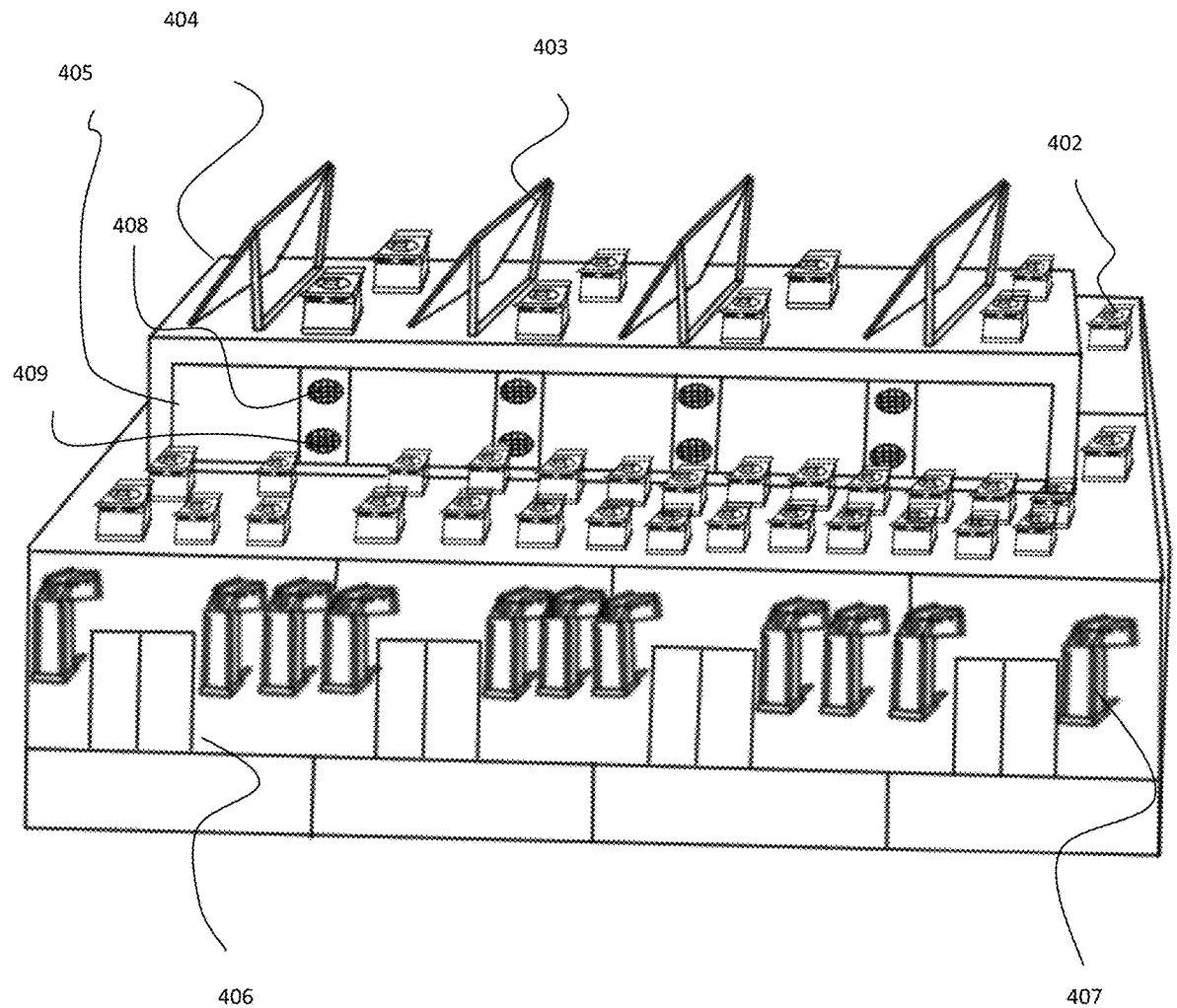
Front to top view of modified flat roof with roof top, wall mount solar panel mounting frame come ventilators
Figure: 140

A NetZero School model plan top view showing how to use SAVES technology
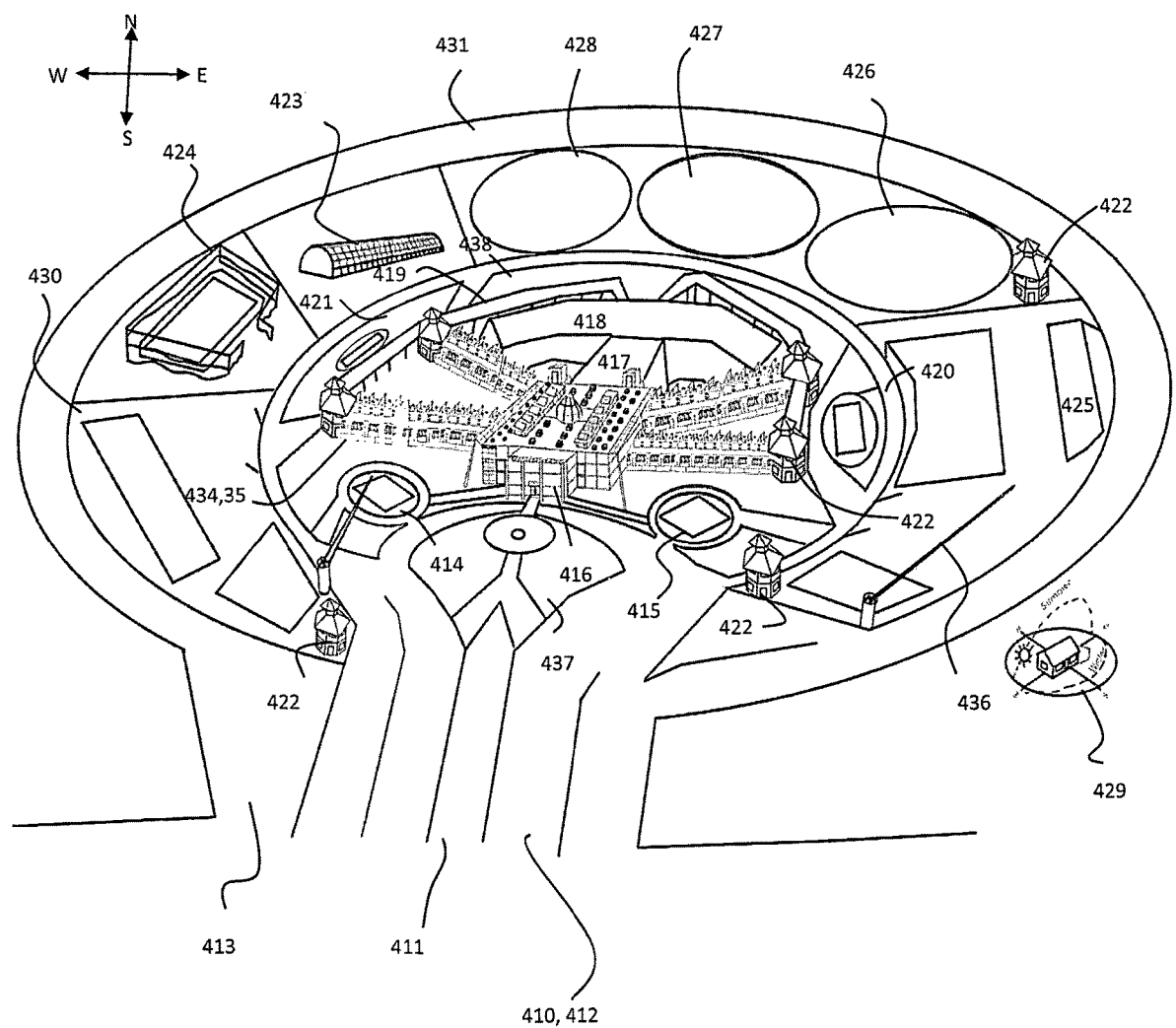
Figure: 141

SOLAR MOUNTING FRAME AND LIGHTING ASSEMBLY

FIELD OF THE INVENTION

The technology described herein relates generally to systems and methods for digital podiums.

BACKGROUND OF THE INVENTION

Surely Students pay attention on global warming, but there has been no history when and how the pollution emerged into our lives. Just do a quick reflection on our daily technological lifestyle; you drive a car, commute, and use electricity for entertainment and communication in schools as well as in offices. While traveling, you burn diesel, petrol, or gas, while commuting you use electricity, to store your data, you use SSD drives, flash drives or DVD but finally you submit your report on a sheet of paper. The point is, at some stage in a manner we all creating discards. One and half a century back, whatever the wastage was produced by humans and animals was mostly decomposed, or it is not an environmental polluting substance. But now due to the increased reliance on technology, presently man using most of the resources available on the land and within hundred and fifty years we used almost all the resources (nonrenewable). Now it is time to stop what we doing and find safe methods to continue the life at the same speed.

Today there is lot of technology integration into the classroom, but anyway you have to use paper along with computer because there is no proper technology integration yet. It is time to replace something with paper in the classroom to reduce pollution as well as to bring the effective technology integration into the classroom. In fact without writing and reading practice, there is no other way to improve human memory in all the content areas. The more you speak (as well as different languages), do, and participate in activities along with reading and writing, the more of problem solving capacity you will get. However, this ability differs from person to person due to their experience and practice.

Having computer knowledge is an additional skill; it is not an alternate, or substitute for paper, pen and pencil. Your hand writing coordination by using pen and pencil with your intelligence is much higher than the coordination with any other technology or computer and keyboard. For instance, the tests scores of paper and computer are always differ, even though you give those same questions as well as the same number of questions. So always you get different time duration for paper based test and computer based test administration. Most of the famous writers still use paper and pen to express their thoughts, and later they bring into the computer. However, you can also master the skill with computer key board but during this process you need to go through many skill correction processes like spelling, and grammar, if you're new to that particular language, definitely it will take some more extra time too.

Schools and Universities are tried to replace computer with paper, yet they are not succeeded, so now they are keeping computers in the labs away from classroom. Computer needs different skills to operate, in the classroom from elementary to university, if you have good typing skills you can take notes and use it effectively otherwise, by the time you type a word your teacher might completed a paragraph.

We all definitely need computers but not in the classroom, they are just perfect in computer lab. All the students must continue their reading and writing practice in all the contents up to Bachelors level, because up to that level neuropsychological development will not be completed. However, form masters level also you need to practice reading and writing but it depends on the individual's chosen profession.

To have computer in the classroom for every student it is very expensive, it needs funding, and other thing is, every two to three years software companies upgrade their software, due to that many online operated text material cannot be downloaded unless until you have a compatibility software in your system. Upgrading software and hardware is great deal in this economy for public schools and as well as to the universities.

Any way the point is computer technology is separate knowledge it is not enhancing the natural skills of reading and writing (it may help in certain conditions, for Example: accommodations and modifications for exceptional). If you go beyond the nature it happens just like that. Today, most of the children in the world suffering with writing problems, either they can't write nor they can't type on the key board. This problem is not only with the children, it is up to PhD level without any discrimination.

When they get into the real jobs most of the newcomers, facing problems related to writing and typing while completing their projects. Because most of them take excess time to complete their assignments due to the lack of sufficient typing and writing skills.

Technology should enhance the natural processes, if you stop natural process it will cost you one day.

In order to contribute to solve some of the above mentioned problems, as well as an interventionist and educator, I continuing my personal research in various aspects of human life and technology, as a part of that, the present invention "Student, Teacher, Administrative and Research Coordinating Helper" (STARCH) is the one.

BRIEF SUMMARY OF THE INVENTION

The present invention is a combination of three different instruments used together in classrooms from Pre K-PhD. These instruments can solve (i) Security issues, (ii) technology integration issues, (iii) reduce the paper usage, (iv) as well as reduce the consumption of electricity used in the educational setting supplied from nonrenewable sources, by replacing the solar battery storage system. The main three inventions are: 1. Moveable Digital podium, 2. Dual tablet, and 3. solar panels mounting frame come ventilator.

1. Moveable Digital Podium:

The digital Podium can be used to teach, communicate, and record the class teaching or prepare content instruction audio video lessons and monitor the security (students outside the class, and any administrative instructions or information situation to the administrators) inside as well as outside the classroom.

(i) Pedal and chain wheel base
   (ii) height adjustable pole,
   (iii) multi tablet
   (iv) Podium Chair
   (v) security display.

Pedal and Chain Wheel Base:

Usually you just stand on the floor in front of any traditional podium, however, the present classroom teacher need to walk around the class and at the same time he/she need to teach, write on board as well as operate his/her computer. Presently most of the technology integrated classrooms has interactive boards and they can be operated with the help of wireless operated writing pad. But the big deal is discipline. Teacher must stop what he/she is doing, to respond to a student, or he need to pay all his attention to student. Once you start paying attention to a student the whole class will stop what they doing and just observe the seen. There are many issues happens around the class like; (i) one of your students out of the class and may be involved in a fight, (ii) other in restroom for more than assigned time, (iii) a visitor taken permission to observe your class, but gone else ware. Until unless the front office let you know what's happening in intercom or call you on the phone, other than that you may not know all these things. But once your class listens that in your class intercom or you on phone for some two minutes so, meanwhile you may have some distraction in the classroom. In order to deal all the above aspects one time can be possible if you move around in the classroom, continue teaching, interact with each individual student, observe your students who are out of the class, conform visitor pass after watching live video of a visitor face, provide differentiated instruction, provide modifications to those who have individual needs, and record your own teaching with your students responses or activities then you can deal discipline, and provide effective teaching. But all these can only possible if you move your computer along with the board interactive writing pad, as well as with two three cameras. But it is not possible in the classroom while teacher is walking, even though you arrange all the required things on a wheel table still it is heavy as well as you need more space. "Well it is not dream anymore"; if you stand on the base of the digital podium you can do all the above mentioned things while moving between the rows of your student chairs. The podium base will be available in two types one is puss pedal wheel and other one is chain based pedal wheel.

(a) Pedal Wheel Base:

This base supports the podium pole and it is movable when you press the pedals. These are four individual pedals are directly attached to the wheel rotating curve bar, front two pedals are used to move forward and back two wheels are used to move backwards. All the Wheels can be i locked individually when you don't want to move the podium.

(b) Chain Wheel Base:

The chain pedal also works just like pedal wheel podium but only the difference is the pedals are attached to the chain wheel and there are only two pedals.

Height Adjustable Pole:

Pole is connected to the multi-tablet frame and at the bottom it is mounted in the podium base, so according to the person's height you can adjust the height of the podium with the help of a key.

Multi Tablet Frame:

This frame works as a port for three different size tablets and one mini-projector as well as data storage, come broadcast system for dual tablets used by the students in the classroom. Further it also has inbuilt mice and dual cam arm with a supporting battery.

Podium Chair:

Chair can be used as any regular char with wheels in class room but in addition to a regular chair has a bag to store simple things like documents and any other class supplies. In addition to a regular chair this can be attached to the podium and will be able to move along with the podium when the person presses the podium pedals.

Secularity Display:

This is just a general display screen available in the market, but will be coordinated with the system to display issued passes in different locations such as; office, number of visitors, restroom, auditorium, conferences, and etc. In the displayed pass you can see a unique identification number and how much time the pass is been in the use. An administrator automatically gets the intimation to his programmed cell phone about over time passes and he can monitor during his walks in the hallway. Before issuing a visitor pass the relative teacher can confirm his/her pass by watching them from the multi-tab relayed by programmed cameras arranged at out gate along with self-issuing pass machine.

2. Dual Tablet:

This is a combination of tablet and a regular LCD screen, specially customized for classroom use, any ware in the world with the solar power as well as the regular DC −6-12 volts. This book will be made with the aim of bringing the technology into the regular classroom and enhancing the natural reading and writing process from childhood to post PhD. This tablet is enabled with Wi-Fi and all the screens run with programming but this is little bit different. The LCD screen is only capable of playing the teacher relayed audio video (because it uses different format) instructions, or any presentations. Student can store his favorite lessons or pending work lessons, and as well as every day teacher's classroom instructions in his/her personal data space. However teacher can post assignments, notes, or individualized instructions before a week, to the students account, this will eliminate the regular teacher's extra work for the students with individual requirements of audio video recordings as well as the requirements of Learning disabled including ESOL. Furthermore, teacher can differentiate and also provide modifications according to the individual student needs.

One cannot use this dual-tab for the regular internet browsing; only this is WI-FI enabled with the teachers' broadcasted instructions and to the store their notebooks other than that one cannot enter into any network. Whereas the second part is, the writing tablet, it is only for reading and writing; one can write and save that forever in the shared system or in to the USB (2.5 or 3.5). First create as many note books you want in the system and use each note book for assigned classroom. In the same note book create rules (lines) for writing and crate graph, draw diagrams use colors and make graphs or geometric diagrams, infect one can have all these effects in one single page or where ever he/she want, regardless of the page type. Even though, student changes their class, it does not matte, he/she can log into their account from any dual tab available in the school.

The written language can be changed in to the print but in order to do that the writer should select one language prior to start writing or after writing from the available languages. The processes completely enhance natural reading and writing skills due to the eye, mind and hand coordination related to individual thinking process. But one cannot bring other software work into the dual tab. But once the written work is turned in to the print it can easily imported into typing software. However, this tablet is only for hand written works but when you convert your handwriting into the print or as tease copy that into your own flash drive, later you can open that in any computer. But this hand written work is always available in the school data base for the school records. This dual tablet will eliminate all the bad browsing problems we have in the class room the display screen is under control of teacher, only student can forward or review, or can store in his school personal space as well as into his personal flash drive. Teacher can prepare for the everyday teaching effectively with the help of audio video recording options as well as can provide modifications without any commitment. The wireless speakers attached to the individual system will completely eliminate the noise problems, now each child can have his instruction in the same content standard, element at his present level accordingly as well as there is not much skills required to operate the system. Teacher can monitor each student in the classroom and communicate with each student individually, warn them, about his/her behavior, teacher can also post his/her expectation to a particular student, and can issue hall pass, rest room pass (a number that student has to remember and use it to open the bathroom door, once the number is issued to a student it will be displayed on the particular restroom's display board with the issued time) for each purpose in the campus including the colleges (at university level) so the administrator finds any student in the hallway he/she can just need the pass number, once he enters the number in the app enabled cell phone he will find all the information about that student.

Each dual tablet book runs with the 12 volt DC power or it has an inbuilt solar sensor, it also converts the light energy into electrical power, so the solar energy can directly store into the tablet battery for emergency backup use.

4. Solar Panel Mounting Frame Come Ventilator:
(i) Roof top
(ii) wall insert
(iii) battery system Till date the style in solar system is to arrange the solar panels in one direction and later use the tracking system (with the help of actuators but to run tracking motor also you wasting power) to find the sunlight. However the present invention will differently solve the tracking problem by using the panels in all directions instead of using the tracking system.

Roof Top Solar Panel Mounting Frame:

On four sides of this frame you can mount four solar panels; on the top it has a transparent glass to send the sunlight directly into the classroom. There are four pipe structures under the transparent glass to mount four light sensitive bulbs, these bulbs will automatically on when sunlight is off inside the classroom, so there is no need to use regular electricity to run the lights.

Wall Insert Solar Panel Mounting Frame:

This solar panel mounting frame also has same features but this is designed to insert inside the side walls.

TABLE 1

ELEMENTS WITH DRAWING FIGS.

FIG.: 1:
60. Dual tablet in use by a student at left side
67. Tablet sliding rail attached to student desk
102. Permanent display projector in the school
102a A permanent display board
1. Base
FIG. 2:
1. Wheel podium beam cover
2. Wheels
3. Wheel chair lock-(i)
4. Pedal
5. Lock
6. Podium top cover
7. Podium pole
8. Foot rest
9. Podium pole height adjusting keys
10. Pole threads cover
11. Internal threaded pole
12. Multi-tablet frame connecting pole
13. Cone shape multi-tablet connecting baring arrangement structure
14. Audio video in and out
15. Handel
16. Handle support combines the multi-tab frame and podium pole
17. Multi-tab Frame
18. Air flowing way
19. USB in TABLE 1-continued

ELEMENTS WITH DRAWING FIGS.

20. USB in
21. Operating keys
22. Four way key
23. Writing pad hook connecting pole
24. Arm rest rail for movement
25. Arm rest supporting bracket
26. Arm rest
27. Hand grip
28. Writing pad
29. tablet-1
29a. tablet-2
29b. tablet-3
30. Dual cam and microphone arm
FIG.: 3
30. Dual cam and microphone arm
30a. video cam-1
35. Audio speakers
13a. Multi-tab tilting u-clamp mounts
13b. Multi-tab frame tilting lock
13c. Ball baring arrangement for handle movement
13d. Front break connecting wire
13e. Handel clamp support
13e. Wire holding hook
FIG.: 4
29b. Tablet-3
30g. Arm rest clamp mounting thread
24. Arm rest rail
31a. Tablet power and data transfer inserts
31b tablet power and data transfer inserts
32. Layer-3
FIG.: 5
29, a, b. Tablet 1, 2, & 3
30. Dual cam and micro phone arm
33. Tablet movement and mounting rails
FIG.: 6
17. Multi-tab frame
23. Writing pad hook (34b) connecting pole
23a. Writing pad hook pulling ring
34. Writing pad rotating rod
34a. Writing pad reliable sheet.
34b. Writing pad hook
FIG.: 7
15. Front wheel break
15a. break wire valve
16. Handel
16a. handel stabilizing clamps
16c. "u" clamp mount
17. Multi-tab frame
18. Air ventilation (fan)
19, 19a. USB connection
19b. audio video in and out ports
19c. extra audio video cable in and out
19d. power and charging in
35. Audio speaker
FIG.: 8
36. Layer-1 for lithium battery
36a. Layer-2 for circuit board
36b. Layer-3 for multi-tab mounting rails
36c. power and data transfer connections
FIG.: 9
Layer-1
33. Length and width adjustable
phone/mini projector mount
FIG.: 10
13g "u" clamp mounting space
13a. side of the bracket
13h. Ball Barings for "u" clamp smooth movement
FIG.: 11
13i. thread pipe to mount in the podium pole
FIG.: 12
9. Pole height adjusting keys
10. Cover for extending bar
11. Podium pole extendable internal bar
11a. ball baring crew extinction to rotate
12. Podium pole lower part
13. Podium pole upper part of (baring part)
13c. handle rotating ball Barings
13e. Handle support hook TABLE 1-continued

ELEMENTS WITH DRAWING FIGS.

13k. Cable hook-1
13j. thread pipe to fit in ball bring podium pole
13i. Crew mounts for Handel stabilizer (16a)
13k. Cable hook-2
13l. Ball crew rail attachment
mounts for internal bar (11)
FIG.: 13
16d. "U" clamp to mount under the
multi-tab frame at (16c)
16e. "u" clamp mount
16f. mounting bracket
16g. thread hole to combine
clamp and bracket
FIG.: 14
2. Wheel
2a. wheel and tire supporting bars
2b. wheel pole mounting bar
15a. breaks
6a. speaker
6b. light
5. Wheel lock
5a. food rest
4. Pedal
3a. wheel chair locks system
FIG.: 15
13d. Break wire
13e. handle support
13f. break wire hook
15 Frond wheel handle break
15a. break wire insert
16 handle
FIG.: 16
1 Custem punched 1.5 inch iron beam
1c. square space to mount pedal
FIG.: 17
1. Podium base
1a. podium pole mounting hole
2b. space for pedal
2c wheel rotating rod
2b. wheel rotate "u" curve
FIG.: 18
4a. Pedal mounting pipe clamp
FIG.: 19
4b. pedal pipe "connecting two side hook
4c. pedal extinction clamp
5b. pedal lock space
6d. foot rest mounting supporting poles
FIG.: 20
1a. Podium pole mounting hole
5. Pedal lock
2e. wheel rotating pole
5a. foot rest
FIG.: 21
3. Wheel chair bar (39d) lock
FIG.: 22
15. Front wheel Handel break
15a. break
16. Handle
FIG.: 23
15. Front wheel hand break
5. Pedal lock
4. Pedal
6d. hood
6c. light and horn
15a break
FIG.: 24
8. Foot rest
3. Locks
FIG.: 25
Pedal podium with multi-tab
FIG.: 26
8. Foot rest
23a. writing pad hook
34b. arm rest support moving rail
26. Arm rest
34a writing pad
30a dual cam and micro phone
33b. mini projector focused on screen TABLE 1-continued

ELEMENTS WITH DRAWING FIGS.

FIG.: 27
4. Pedal is connected to Cain
wheel (4f-FIG. 28)
16. Handle
FIG.: 28
1. Base
1a. Podium pole mounting hole
2d. front wheel rotating rod
4e. axil rotating road
4f. chain axil wheel
4g. chain axil rotating pedal
4h. chain
4i. pedal mount
4j. extra support wheel
4k. pedal support wheel extinction
FIG.: 29
4. Pedal (made by combining
axil wheel extension and extra
support wheel extension)
FIG.: 30
4k foot support on pedal
5. Pedal lock
5c. Pedal lock out
FIG.: 31
6d. hood supporting poles
FIG.: 32
4l. extra support clamp to pedal
6c. light and horn
6e. hood
6f. front wheel mounting poles
FIG.: 33
35. Chair wheel and cylinder
support frame
36. Custom made actuator
36a. iron ring
36b. actuator height adjustment key
36c. Iron pipe
37. Wheels
38. Lock insert
39. Extendable lock arm
39a. lock arm clamp
39b. arm extinction key lock
39c. arm extinction key
39d. Lock key
39e. extinction arm insert
40. Sitting space
40a. extended back rest
40b. back rest
41. Teacher bag
FIG.: 34
39d. arm extinction is locked
inside the lock (3)
3. Lock
Figure 35:
30. Dual cam and microphone arm
42. Video out of cam-(30a) is
enabled in multi tab 29, and 29b
43. Recording subject
44. Video out of cam-2(30b)
video out sent to tab-29
45. Real time editing key
board and operating keys
FIG.: 36
30a. cam-1
30b- cam-2
30c. Micro phone
30d. base Pipe clamp
30e. support base
30f. Micro rail
30g tilt-2-clamp
30h. rotationclamp
FIG.: 37
46. Teacher sent Be Quit request to a student
47. Students are shown as boxes in rows
47a. Student (Sam) is trying to
communicate with teacher
48. A student sent request for pass

TABLE 1-continued

ELEMENTS WITH DRAWING FIGS.

49. Tablet (29b) screen is divided into two parts
50. Teacher Hand Writing
51. Second tablet is assigned for previewing the work before sending to student or watch ongoing recordings.
51a. Power point preview
52. Student pass number as well as time of he/she been out from class for 15 minutes.
52a. Contact administrator
FIG.: 38
53. Laser projector display and touch enabled
54. Laser ray
55. Touch the places where the touch is enabled
FIG.: 39
1p. foot rest
56. Program poster display board.
57. Wheel to be fixed in the tread hole (59)
58. Permanent Stand
59. Treaded hole for wheels
FIG.: 40
60. Dual tablet book
61. Pam rest (while writing)
62. Hand writing enabled visible scree
62a. free writing area without rules
62b. Rules are enabled when required
62c. secnond white space as well graph area
62d. Rules are enabled again when required
63. Operating keys
63a. USB for record input in the scree two (64)
63b. input display from multitasks (29, a, & b)
63c. four way key to manage the input display in screen two (64)
63d. left side operating keys
64. Screen two
FIG.: 41
65. Writing stick using from left side
66. Power supply
67. Dual tab sliding rail to adjust for right and left handed writing
68. Power card connected to dual tab
FIG.: 42
62e. symbol of contestant
62f. contestant Id
62g. Thumb impression recognizer enabled space
FIG.: 43
69. Micro solar panel
70. Screen tilting hook
71. Two side micro solar panel rotating key
72. Wireless ear phones
FIG.: 44
69a. Side two micro solar panel
73. Sliding rail insert clamp
74. Circuit board opening cover
75. Battery opening cover
FIG.: 45
76. Number locked door
77. Rest room
78. Wireless screen display
79. Student pass
80. Student identifying pass number
81. Time of pass issued
82. Over time pass
83. Total number of person in the rest room
FIG. 46
84. Multi-solar panel mount frame-come roof top ventilator
85: Solar panel mounting support and supply cable attachment
85a. Supply attachment in other side frame
85b. Roof insert (in to the concrete)
86. Solar panel cable Socket in
87. Mirror and cone shape sunlight collecting chimney mounting space
FIG. 47
89. Series and parallel patron arrangement quarter inch cable in
96a. Solar panels cable connecting quarter inch cable
FIG. 48
85. Solar panel mounting support and supply cable attachment
86. Solar panel cable Socket in
87. Mirror and cone shape sunlight collecting chimney mounting space
90. Wall mount solar panel frame come ventilator
91. Solar panel or shade mounting frame
92. Wall insert extension (permanent wall mount)
FIG.: 49
93. Carved glass ventilation
94. Wall
95. Frame extinction to sit inside the wall
FIG.: 50
9. Wall sun ventilator glass
96. Storage battery
97. Power supply on floor
97a. power supply on wall
99. Individual room AC
FIG.: 51
84. Roof top solar panel mount frame
90. Wall solar panel mount frame
98. Air title transparent window
100. Walking upstairs entry into tares
100a. lift entry into the tares
FIG. 52
101. Fan and air pipe mounting space
102. Frame top mounting bracket extension
103. Frame base supporting extension
103a. Frame attachment extension
104. Base support locking blot space
FIG. 53
105. Air filter mash
105a. Air filter
FIG. 54
105. Air intake fans
106. In take air pipe
107. Local fan
108. Local exhaust fan
109. Internal exhaust fan
110. Internal exhaust fan pipe
111. Solar panel angel (slope) change bar
112. Frame base support come rain block
113. Panel mounting brackets
114. Frame extension (rain protector)
115. Space (hole) for air and sunlight collecting pipe
FIG. 55
96a. cotter inch male socket inserted into
116. Quarter inch cable connecting two panels
127. Chimney opening
FIG. 56
117. (−), cable lines
118. (+), cable
119. Panel positive cable
120. Solar cells/film mounting metal plate/fiber
121. Quarter inch female socket
122. Socket space,
123. Bolt helical
124. Cable joint
FIG.57
125. Cone chimney to collect sunlight
126. Cone chimney pipe
127. Chimney opening
FIG. 58
128. Air exhaust (out) fan pipe
129. Air intake fan pipe TABLE 1-continued

ELEMENTS WITH DRAWING FIGS.

FIG. 59
130. Single pipe line for all the pipes
FIG. 60
131. Sun light dome
132. Fan and emergency heatr-1,
132a. Fan and emergency heater-2
133. Air exhaust (out)-1
FIG. 61
134. Air heat sink
135. Emergency heater
136. LED bulb
136a. Photodiode/dark sensor
136. b. Automatic switch
136c. circuit with photodiode, LED light, and automatic switch
137. Air in pipe connecter
FIG. 62
138. Closed frame
FIG. 63
138a. Solar panel
139. Rain cover
140. Light filter and chimney cover
FIG. 64
141. Mounted roof top solar panel mounting frame
142. Sun light dome
143. Wall mounted solar panel mounting frame
144. Solar panel mount frame come ventilator inside view
FIG. 65
145. Roof top solar panel mounting frame come ventilator
145a. Wall mount solar panel mounting frame come ventilator
FIG. 66
146. Cone shape sunlight collecting chimney heat sink fan or radiator fan.
147. Extended side walls to fit on slope roof.
148. Air intake fans
149. Sun light gathering cone shape chimney
FIG. 67
151. Heat sink's exhaust fan/radiator
151a. Air intake fan-1
152. Extra space for mounting solar panels/film.
FIG. 68
153. Open roof
154. Single pipe to cover all the pipes and wiring into the room/hallway/sealing
154a. Cone shape sunlight collecting chimney extension pipe
155. Exhaust fan (air out) pipe-1
156. Air in fan pipe-1
FIG. 69
157. Photodiode/dark sensor
157a. Circuit with photodiode, LED light, and automatic switch
157b. Automatic switch
157c. light intensity
157d. resister
157e. power supply
158. Heat sink
159. Air out fan-1
160. Emergency heater
161. Air out fan pipe-1
162. Sunlight out dome
163. LED light
FIG.70
150. Cone heat sink
150a. liquid coolant pipe cap
150b. Fan/radiator hose
FIG. 71
164. Internal view of classrooms
165. Wall mount solar panel mounting frame come ventilator
166. Window
167. A.C with unit
168. Solar panel mounted on extended slope roof top solar panel mounting frame come ventilators
169. Cone shape sunlight caring pipe extension into the hallway
170. Slope roof top solar panel mounting frame middle part
171. Cone shape sunlight caring pipe extension into the classroom
172. Wall mount solar panel mounting frame come ventilator internal view
173. Sun light come air in and out into the classroom
173a. Roof sealing
173b. Sunlight exit, LED and air-in fans
FIG. 72
165. Wall mount solar panel mounting frame come ventilator
174. Roof top solar film
175. Slope roof top mounting frame attached to extinction
176. Slope roof top
176a. Space for walking
FIG. 73
177. Frame mounting rail
178. Cone shape sun light collecting chimney top
179. Roof top (outside) air circulation pipes
180. Sliding space for attaching rain protectors (shades)
181. Air takes in fan-1
185. Frame attachment inserts
FIG. 74
182. Air flow in
182a. Air flow out
183. Fan (without motor)
184. Solar panel mounting space
185. Frame attachment inserts
185a. Rubber washer between the joints
FIG. 75
183a. Fans arranged on both sides of extended solar panel mounting frame come ventilators
FIG. 76
186. Extinction pipe attached to liquid heat sink come emergency heater
187. Emergency heater
188. Cover
189. Fan cover lock
190. Heat sink
FIG. 77
191. Liquid (coolant) pipe cap
192. Power supply pins to fan
193. Fan
194. Fan mounting extinction
195. Liquid circulating pipe
196. Heat sink metal layers
197. Air in space
FIG. 78
198. Fan
FIG. 79
186. Air-in pipe
199. Fan cover
199a. Gap to air flow
FIG. 80
200. Fan out cover
201. Light Filter cover
202. Mirror
FIG. 81
203. Chimney top
204. Chimney cone extension pipe (sun light in take)
FIG. 82
205. Air intake fan mounting cones
206. Air intake pipe
207. Air pipe supporting metal tape
208. Cone shape sun light collecting pipe
209. Cone pipe out (light exit)
209a. half circular fiber dome (light enhancing dome)

TABLE 1-continued

ELEMENTS WITH DRAWING FIGS.

FIG. 83
210. Exhaust fan-1
211. Exhaust fan-2
212. Exhaust fan intake (from inside the room)
FIG. 84
213. Fan
214. Fan mounting pad
215. Rechargeable Battery
216. Door
217. Door lock
218. Exhaust fan cove to protect form rain
FIG. 85
219. Air intake fans
220. Liquid heat sink with internal fan
FIG. 86
201. Fan mesh
201a. Exhaust fan mesh
201b. internal air intake fan mesh
FIG. 87
222. Liquid heat sink cap
223. Liquid (coolant) bottle
224. Liquid (coolant)
225. Liquid in take small tank
226. Liquid circulating pipe line
FIG. 88
227. Internal fan
FIG. 89
228. Air intake pipe connecting extension
FIG. 90
229. Heat sink front cover with liquid pipe
FIG. 91
230. Liquid transfer pipe
231. Heat absorbing metal layers
232. Fan motor mounting space
233. Air intake space
FIG. 92
234. Liquid circulating pipe joints
235. Heat absorbing metal layers in between the liquid pipe lines
FIG. 93
236. Heat sink metal layers
237. Front and back covers liquid circulating joint line
FIG. 94
238. Fan in front of the heat sink come fan
FIG. 95
220. Heat sink
238. Fan
239. Emergency heater mounted in front of fan
FIG. 96
240. Exhaust fan cover
241. Extension frame come wall mount frame connecting joint
FIG. 97
242. Wall mounts frame part-1
243. Single large pipe which carries all the pipes (exhaust, air & light)
FIG. 98
243. Wall mounts frame part-2
244. Extend joints to attach all the pipes which coming form part-1
FIG. 99
245. Wall
246. Part-1 mounted on outside of the wall
247. Part-2 is mounted inside the room
FIG. 100
248. Extended frame and wall mount frame joint
249. Exited frame (support & space)
250. Wall insert bracket
251. Wall insert bottom stand
FIG. 101
252. Solar panels mounted on the wall insert permanent frame
252a. Extendable plastic sheet to cover chimney top from rain
252b. Side rain cover
252c. back rain cover FIG. 102
253. Half circular fiber glass cover
254. Cone shape sunlight out into the room
255. Cone pipe supporting base
256. Fan and emergency heater mounting base
257. Air in fan-2
FIG. 103
258. Circular LED/energy efficient light power supply (holder) and support mount
259. Power supply holder
FIG. 104
260. Closed fan cover
261. Fan-1
262. Fan-2 pipe
262a. Heat sink
FIG. 105
263. LED/energy efficient bulb-1
264. Power supply holder
FIG. 106
265. Circular (round) LED/energy efficient light
FIG. 107
266. Male socket-1, which connected to solar cell/panel
267. Female socket
268. Negative (−) supply line connected to socket
269. Panel back
270. Photovoltaic energy collecting cable from all the cells
271. Positive (+) supply line
FIG. 108
272. A school building which is completely closed and depended on electrical light
273. Slope roof top solar panels mounting frame come ventilator
274. Slope roof modified solar panel mounting frame come ventilator
275. Wall mount solar panel mounting frame come ventilator
276. Wall mount support come extended space for extra solar panels mounting
FIG. 109
277. Connection to main supply line (grid)
278. Service connection
279. Electrical meter
280. A. Power line
281. (−) supply line connected to inverter
282. Invertor
283. D. C supply line to inverter form storage (batter) system
284. Power storage system
285. Automatic transfer switch
286. Individual power storage system in the classroom
287. Power cable
288. Plug to charge dual tablet (or anything)
289. Cable inside the floor
290. Total 12 volts out from each wall mount unit (parallel connection)
291. Positive cable from final unit connected to cable to the inverter
FIG. 110
292. Unites connected in series with increase voltage
293. Continuing negative cable (−) connection
294. Continuing cable positive (+) connection
295. Series connection (positive to negative and negative to positive) between units
FIG. 111
296. Student desks arranged in ninety degree to the window/light source
297. Power supply to charge dual tablet
FIG. 112
296. Dual tablet
297. Charging cable pug
298. Cable
299. Exhaust fan-1
299a- exhaust fan-2

TABLE 1-continued

ELEMENTS WITH DRAWING FIGS.

FIG. 113
300. Exhaust joint fan-1
300a. Exhaust joint fan-2
FIG. 114
301. Power gird pole
302. Cable connection to power grid
303. Meter
304. Auto transformer
305. Inverter-1
306. Battery-1
307. Slope roof top frames connected in series
308. Slope roof fame connected in series
309. Positive cable line connected to inverter
310. Negative cable line connected to inverter
311. A.C cable line to inverter
312. Wall mount frames series connection
313. Sun light connecting Cone chimney mounted on glass to supply day light into the rotunda
FIG. 115
314. Slope roof
315. Triangle dormer
315a. Cone shape sunlight collecting chimney extension
FIG. 116
316. Exhaust fan-1
317. Air out-1
318. Circular LED light
319. Extended cone chimney tube connected to sun light out
320. Air out pipe
FIG. 117
321. Glass mount flat cone chimney
322. Glass
323. Up two sides mounted flat cone chimney
324. Up right mounted two flat cone chimney
325. Air in fan-1
326. Exhaust fan (air out)-1
FIG. 118
327. Slope dormer
FIG. 119
328. Frame to mount solar panel
329. Air intake fan-1
330. Exhaust fan out-1
FIG. 120
331. Solar panel
332. Cone shape chimney
FIG. 121
333. Modified slope dormer for modern building
334. Roof top solar mounting frame come ventilator
FIG. 122
335 light dome
336. In take air pipe-1
337. Single pipe cover
338. Cone chimney extended pipe connected to light dome pipe
339. Sunlight exit
FIG. 123
340. Sun light collecting flat cone mounting support
341. Air intake fan-1 cone
342. Fan mesh cover
FIG. 124
343. Rain cover
FIG. 125
344. Exhaust fan out
345. Exhaust fan pipe
FIG. 126
346. Wall
347. Single pipe line hollow (hole)
348. Flat cone extension pipe and light dome pipe joint
349. Circular LED light mounted around (inside) the dome
FIG. 127
350. Wall
351. Dark sensor-1

TABLE 1-continued

ELEMENTS WITH DRAWING FIGS.

352. Exhaust fan-1
353. Battery
354. Batter shelf cover
FIG. 128
355. A wall mounted outside parts of modified sunlight, air ventilation and exhaust system
356. Solar panels
357. Slope roof top solar panel mounting frame come ventilator
358. Slope roof solar panel mounting frame come ventilator
359. Glass mounts sunlight collecting flat cone
FIG. 129
360. LED Light
361. Light collecting dome extinction pipe
362. Light pipe connecting end
363. Light pipe wall mounting clamp
364. Light pipe closing cap
365. Window frame
366. Sunlight collecting flat cone chimney inside view
FIG. 130
367. Direct wall mount exhaust fan-1
368. Direct wall mount air in fan = 1
FIG. 131
369. Sunlight collecting dual flat cone in
370. Sunlight collecting dual flat cone out
371. in way to sunlight
FIG. 132
372. Light exit wat into pipe
373. Flat cone and light pipe support iron plate
FIG. 133
374. Non transparent metal cover
375. Front side flat cone chimney
FIG. 134
376. Back side of flat cone chimney
377. Front part (joint-1) of flat cone chimney
378. Joint two of flat cone chimney
FIG. 135
379. Completely closed light exit
FIG. 136
380. Wall mount solar panel mounting frame come ventilator
381. Exhaust fan out
382. Air takes in-1
383. Glass mounts sunlight collecting flat cone chimney
FIG. 137
384. Sunlight dome
385. LED light
386. Light pipe
387 pipe joint
388. Sunlight
389. Sola path diagram
390. Window glass mounted sunlight collecting flat cone chimney
391. Extra pipe line extension hole
FIG. 138
392. Multiple pipe line joint connected to cone chimney extension
393. Extended sun light pipe-1
393a. Extended sun light pipe-2
393b. Extended sun light pipe-1
394. Sun light exit dome
395. Dark sensor-1
396. Joint space for another sunlight extension
397. Air in fan-1
397a. Air in fan-2
FIG. 139
398. Exhaust fan out-1
399. Window glass mounted sunlight collecting flat cone chimney
400. Window glass
401. Air takes in fan-1
FIG. 140
402. Roof top solar panel mounting frame come ventilator
403. Large solar panels and stand

TABLE 1-continued

ELEMENTS WITH DRAWING FIGS.

404. Upright extended wall on the roof to mount glass to bring more sun light into the hallways
405. Glass mounted to extended wall
406. Classroom
407. Wall mount solar panel mounting frame come ventilator
408. Air intake fan-1
409. Exhaust fan out-1
FIG. 141
410. Four lane one way lane
411. Divider
412. Main gate in and out
413. after school programs ext-2
414. Staff parking space
415. Parents and visitors parking
416. Main building (administration, library, conference room, staff meeting, etc.)
417. Lunch and extracurricular activity rooms
418. Indoor stadium and auditorium
419. Walking ramp with roof
420. Internal ring road connecting with each wing
421. Parking space for green house and water pond
422. Temporary office and restrooms for staff (after school activities bus ramp duty staff)
423. Green house with transparent solar film
424. Fish (aquaculture) pond for students experiments/projects
425. Parking space for games and other after school activities
426. Ground one for stadium
427. Ground two for other games and stadium
428. Ground three for track and other games
429. Solar path diagram
430. Extra space for activities and parking
431. Outer ring road
434. Modified classroom wings with complete solar light and natural air
435. Extendable modified classroom according to requirement and space
436. Gate-1
437. Space for front garden
438. Space for back garden

BRIEF DESCRIPTION OF THE DRAWINGS

The technology described herein is illustrated with reference to the various drawings, in which like reference numbers denote like device components and/or method steps, respectively, and in which:

FIG. 1 is a perspective diagram illustrating a dual tablet in use by a student, a tablet sliding rail attached to a student desk, a permanent display projector in the school, a permanent display board, and a base, according to an embodiment of the technology described herein;

FIG. 2 is a perspective diagram illustrating a digital podium, according to an embodiment of the technology described herein;

FIG. 3 is a perspective diagram illustrating digital podium side view;

FIG. 4 is a perspective diagram illustrating a tablet, according to an embodiment of the technology described herein;

FIG. 5 is a perspective diagram illustrating a multi-tablet configuration, according to an embodiment of the technology described herein;

FIG. 6 is a perspective diagram illustrating a multi-tablet configuration, according to an embodiment of the technology described herein;

FIG. 7 is a perspective diagram illustrating a bottom view of a multi-tablet configuration, according to an embodiment of the technology described herein;

FIG. 8 is a perspective diagram illustrating an internal view of a multi-tablet configuration, according to an embodiment of the technology described herein;

FIG. 9 is a perspective diagram illustrating an internal layer and mini laser projector of the multi-tablet, according to an embodiment of the technology described herein;

FIG. 10 is a perspective diagram illustrating a ball bearing clamp for use with the multi-tab frame, according to an embodiment of the technology described herein;

FIG. 11 is a perspective diagram illustrating a ball bearing clamp for use with the multi-tab frame, according to an embodiment of the technology described herein;

FIG. 12 is a perspective diagram illustrating a podium pole, according to an embodiment of the technology described herein;

FIG. 13 is a perspective diagram illustrating a clamp, according to an embodiment of the technology described herein;

FIG. 14 is a perspective diagram illustrating a wheel assembly, according to an embodiment of the technology described herein;

FIG. 15 is a perspective diagram illustrating podium supporting pole and handle, according to an embodiment of the technology described herein;

FIG. 16 is a perspective diagram illustrating an iron bar, according to an embodiment of the technology described herein;

FIG. 17 is a perspective diagram illustrating a wheel base, according to an embodiment of the technology described herein;

FIG. 18 is a perspective diagram illustrating a pedal wheel mechanism, according to an embodiment of the technology described herein;

FIG. 19 is a perspective diagram illustrating a pedal arrangement, according to an embodiment of the technology described herein;

FIG. 20 is a perspective diagram illustrating a four wheel foot divider arrangement, according to an embodiment of the technology described herein;

FIG. 21 is a perspective diagram illustrating a back view of a podium standing base, according to an embodiment of the technology described herein;

FIG. 22 is a perspective diagram illustrating a pedal bike without the podium, according to an embodiment of the technology described herein;

FIG. 23 is a perspective diagram illustrating a five-wheel chain bike without a podium, according to an embodiment of the technology described herein;

FIG. 24 is a perspective diagram illustrating a five-wheel chain bike with a podium, according to an embodiment of the technology described herein;

FIG. 25 is a perspective diagram illustrating a pedal bike with a podium, according to an embodiment of the technology described herein;

FIG. 26 is a perspective diagram illustrating writing pad and dual cam enabled projector on a pedal five wheel base with podium, according to an embodiment of the technology described herein;

FIG. 27 is a perspective diagram illustrating movement with the chain wheel podium, according to an embodiment of the technology described herein;

FIG. 28 is a perspective diagram illustrating the internal mechanisms of the chain wheel podium, according to an embodiment of the technology described herein;

FIG. 29 is a perspective diagram illustrating pedals, according to an embodiment of the technology described herein;

FIG. 30 is a perspective diagram illustrating a chain moving pedal comfort arrangement, according to an embodiment of the technology described herein;

FIG. 31 is a perspective diagram illustrating a chain wheel cover hood and supporting poles, according to an embodiment of the technology described herein;

FIG. 32 is a perspective diagram illustrating a chain wheel cover plastic hood, according to an embodiment of the technology described herein;

FIG. 33 is a perspective diagram illustrating a height adjustable single pole chair, according to an embodiment of the technology described herein;

FIG. 34 is a perspective diagram illustrating a pedal podium connected to a single pole wheel chair, according to an embodiment of the technology described herein;

FIG. 35 is a perspective diagram illustrating a multiple tab system in use and having a dual cam and microphone, according to an embodiment of the technology described herein;

FIG. 36 is a perspective diagram illustrating a dual cam and microphone arm, according to an embodiment of the technology described herein;

FIG. 37 is a perspective diagram illustrating a digital podium, according to an embodiment of the technology described herein;

FIG. 38 is a perspective diagram illustrating a tactile enabled laser display from a mini projector, according to an embodiment of the technology described herein;

FIG. 39 is a perspective diagram illustrating a permanent digital podium, according to an embodiment of the technology described herein;

FIG. 40 is a perspective diagram illustrating a dual tablet, according to an embodiment of the technology described herein;

FIG. 41 is a perspective diagram illustrating a student in use of the dual tablet;

FIG. 42 is a perspective diagram illustrating a dual tablet with finger print recognition for polling, according to an embodiment of the technology described herein;

FIG. 43 is a perspective diagram illustrating a solar powered dual tablet, according to an embodiment of the technology described herein;

FIG. 44 is a perspective diagram illustrating a back view of the solar powered dual tablet depicted in FIG. 43;

FIG. 45 is a perspective diagram illustrating a security system display, according to an embodiment of the technology described herein;

FIG. 46 is a perspective diagram illustrating a roof-top solar panel mounting frame come ventilator side to top view (permanent mounting frame);

FIG. 47 is a perspective diagram illustrating a solar panel mounted on one side of roof top solar panel mounting frame come ventilator;

FIG. 48 is a perspective diagram illustrating a wall insert solar panel mounting frame and ventilator, (permanent wall mount) back and side view, according to an embodiment of the technology described herein;

FIG. 49 is a perspective diagram illustrating a solar power mount frame shown mounted into a wall, according to an embodiment of the technology described herein;

FIG. 50 is a perspective diagram illustrating a solar power storage system utilized to supply power to duals tablets in a classroom, according to an embodiment of the technology described herein; and FIG. 51 is a perspective diagram illustrating a solar power enabled school configured to power multiple digital podium systems, according to an embodiment of the technology described herein.

FIG. 52 is a perspective diagram illustrating a frame front to side view, this frame is a side assembly of roof top solar panel mounting frame come ventilator.

FIG. 53 is a perspective diagram illustrating roof top solar panel mounting frame come ventilator side to internal view with assembly parts.

FIG. 54 is a perspective diagram illustrating roof top solar panel mounting frame come ventilator top view.

FIG. 55 is a perspective diagram illustrating roof top solar panel mounting frame come ventilator side to internal view with solar panels cable system.

FIG. 56 is a perspective diagram illustrating roof top solar panel mounting frame come ventilator front to top internal view with cone shape sunlight collecting chimney.

FIG. 57 is a perspective diagram illustrating roof top solar panel mounting frame come ventilator front to top internal view with cone shape sunlight collecting chimney.

FIG. 58 is a perspective diagram illustrating roof top solar panel mounting frame come ventilator front to top internal view with cone shape sunlight collecting chimney, air-in and out pipes.

FIG. 59 is a perspective diagram illustrating roof top solar panel mounting frame come ventilator front to top internal view with cone shape sunlight collecting chimney, air-in and out pipes covered with large pipe.

FIG. 60 is a perspective diagram illustrating roof top solar panel mounting frame come ventilator front to top internal view from roof top to inside room with sunlight dome, air-in and out (exhaust) fan mounts.

FIG. 61 is a perspective diagram illustrating roof top solar panel mounting frame come ventilator front to top internal view from roof top to inside room with sunlight dome, air-in and out (exhaust) fan mounts. In addition to this the figure also illustrates the internal heat sink-a, circuit with photo diode, automatic switch, and LED light.

FIG. 62 is a perspective diagram illustrating front view of roof top solar panel mounting frame come ventilator assembled with all the four side frames.

FIG. 63 is a perspective diagram illustrating roof top solar panel mounting frame come ventilator front to top view of completed roof top solar panel mounting frame come ventilator with solar panels, rain shade, and top cover to protect sunlight collecting chimney.

FIG. 64 is a perspective diagram illustrating a modern home back to top view with roof top and wall mount solar panel mounting frame come ventilators.

FIG. 65 is a perspective diagram illustrating a modern home internal and top view with roof top and side wall solar panel mounting frame come ventilators.

FIG. 66 is a perspective diagram illustrating modified slope roof top solar panel mounting frame come ventilator side to top view.

FIG. 67 is a perspective diagram illustrating slope roof top solar panel mounting frame come ventilator front view.

FIG. 68 is a perspective diagram illustrating roof top to into the hallway/room internal view of slope roof top solar panel mounting frame come ventilator.

FIG. 69 is a perspective diagram illustrating front to top internal view of slope roof top slope roof top solar panel mounting roof come ventilator with dark sensor circuit and heat sink.

FIG. 70 is a perspective diagram illustrating front to top internal view of slope roof to solar panel mounting roof come ventilator with heat sink.

FIG. 71 is a perspective diagram illustrating a model classroom's top to internal view slope roof with extended roof top wall mount solar panel frame come ventilators.

FIG. 72 is a perspective diagram illustrating front to top view of a school, mounted wall mount, extended solar panel mounting frame come ventilator and with roof top solar film.

FIG. 73 is a perspective diagram illustrating slope roof top extended solar panel frame come ventilator front to top view one side.

FIG. 74 is a perspective diagram illustrating side to top view of slope roof top extended solar panel mounting frame come ventilator extinction attachment. Illustrating the fans (without motors) mounted inside the air circulation pipe.

FIG. 75 is a perspective diagram illustrating slope roof top extended solar panel mounting frame come ventilator front to top two sides view.

FIG. 76 is a perspective diagram illustrating fort to top view heat sink come emergency heater with air pipe attachment.

FIG. 77 is a perspective diagram illustrating heat sink come emergency heater top view with electrical supply plug in pins, liquid pipe line and heat sink metal layers.

FIG. 78 is a perspective diagram illustrating heat sink and fan internal view.

FIG. 79 is a perspective diagram illustrating heat sink, fan back to front view with cover.

FIG. 80 is a perspective diagram illustrating wall insert solar panel mounting frame come ventilator back to side view.

FIG. 81 is a perspective diagram illustrating wall insert solar panel mounting frame come sun light ventilator back to side view.

FIG. 82 is a perspective diagram illustrating wall insert solar panel mounting frame come sun light ventilator back to front internal view.

FIG. 83 is a perspective diagram illustrating wall insert solar panel mounting frame come ventilator back to front internal view.

FIG. 84 is a perspective diagram illustrating wall insert solar panel mounting frame come ventilator back to front internal view.

FIG. 85 is a perspective diagram illustrating wall insert solar panel mounting frame come ventilator back to front internal view.

FIG. 86 is a perspective diagram illustrating wall insert solar panel mounting frame come ventilator back to side view.

FIG. 87 is a perspective diagram illustrating Air cooling fan and heat shin back view when the coolant tank cap is opened.

FIG. 88 is a perspective diagram illustrating heat sink back to front view with coolant pipeline.

FIG. 89 is a perspective diagram illustrating Air cooling fan and heat sink back view with air pipe connection.

FIG. 90 is a perspective diagram illustrating air cooling fan and heat sink back to front view.

FIG. 91 is a perspective diagram illustrating air cooling fan and heat sink internal view.

FIG. 92 is a perspective diagram illustrating Air cooling fan and heat sink internal view with heat sink metal layers.

FIG. 93 is a perspective diagram illustrating air cooling fan and heat sink back to side view.

FIG. 94 is a perspective diagram illustrating wall insert solar panel mounting frame come ventilator back to front internal view.

FIG. 95 is a perspective diagram illustrating wall insert solar panel mounting frame come sunlight ventilator.

FIG. 96 is a perspective diagram illustrating wall mount solar panel mount frame come ventilator back to top view.

FIG. 97 is a perspective diagram illustrating Wall insert solar panel mounting frame come sun light ventilator two-part (split) model.

FIG. 98 is a perspective diagram illustrating wall mount solar panel mounting frame come ventilator internal parts view.

FIG. 99 is a perspective diagram illustrating wall insert solar panel mounting frame come sunlight ventilator inside and outside view.

FIG. 100 is a perspective diagram illustrating bottom to top view of wall mount solar panel mounting frame come ventilator mounted on wall with extended wall mount frame.

FIG. 101 is a perspective diagram illustrating side to front top view of wall mount/insert solar panel mounting frame come ventilator.

FIG. 102 is a perspective diagram illustrating front to internal view of solar panel mounting frame come ventilator.

FIG. 103 is a perspective diagram illustrating front to internal view of solar panel mounting frame come ventilator.

FIG. 104 is a perspective diagram illustrating front to internal view of solar panel mounting frame come ventilator.

FIG. 105 is a perspective diagram illustrating front to internal view of solar panel mounting frame come ventilator.

FIG. 106 is a perspective diagram illustrating front to internal view of solar panel mounting frame come ventilator.

FIG. 107 is a perspective diagram illustrating wall mount solar panel mounting frame come ventilator internal positive (+) and negative (−) cable arrangement.

FIG. 108 is a perspective diagram illustrating a school building back to top view with slope roof top, slope roof and wall mount solar panel mounting frame come ventilators.

FIG. 109 is a perspective diagram illustrating classroom internal view showing circuit connections between wall mount solar panel mounting frame come ventilator and D.C to A.C and storage system. Next the underground power cable view. This illustration explains parallel connection (circuit).

FIG. 110 is a perspective diagram illustrating classroom internal view showing circuit connections between wall mount solar panel mounting frame come ventilator and D.C to A.C and storage system. Next the underground power cable view.

FIG. 111 is a perspective diagram illustrating classroom internal view showing floor power supply to each student desk.

FIG. 112 is a perspective diagram illustrating classroom internal view showing floor power supply to each student desk with dual tablet and moveable digital podium.

FIG. 113 is a perspective diagram illustrating classroom internal view with exhaust fans.

FIG. 114 is a perspective diagram illustrating back to top view of a school roof mounted with slope roof top, slope roof and wall mount solar panel mounting frame come ventilators.

FIG. 115 is a perspective diagram illustrating home internal roof view showing triangle dormer.

FIG. 116 is a perspective diagram illustrating roof internal view showing triangle dormer parts of sunlight dome air in and out (exhaust system).

FIG. 117 is a perspective diagram illustrating a traditional home front to top view showing triangle dormer modified with SAVES technology. Slope roof dormer side to top view.

FIG. 118 is a perspective diagram illustrating slope roof dormer side to top view.

FIG. 119 is a perspective diagram illustrating slope roof dormer side to top view with solar panel mounting rail and air-in and out fans.

FIG. 120 is a perspective diagram illustrating slope roof dormer side to top view with sunlight collecting chimney.

FIG. 121 is a perspective diagram illustrating a model home front view with slope dormer and roof top solar panel mounting frame come ventilator.

FIG. 122 is a perspective diagram illustrating wall insert sunlight dome and pipe lines front to side view (inside the room).

FIG. 123 is a perspective diagram illustrating in and outside view of wall mount sunlight, air-in and out (exhaust) system with flat chimney and pipe mount air-in fan.

FIG. 124 is a perspective diagram illustrating in and outside view of wall mount sunlight, air-in and out (exhaust) system with fan cover.

FIG. 125 is a perspective diagram illustrating in and out view of wall mount sunlight, air-in and out (exhaust) system.

FIG. 126 is a perspective diagram illustrating wall mount sunlight and air ventilation and exhaust system inside view.

FIG. 127 is a perspective diagram illustrating inside view of wall mount sunlight and air-in and out (exhaust) system.

FIG. 128 is a perspective diagram illustrating back to top view of school with wall mount sunlight and air ventilation and exhaust system.

FIG. 129 is a perspective diagram illustrating front view (inside the room) of window mount sunlight collecting flat chimney parts.

FIG. 130 is a perspective diagram illustrating front view (inside the room) of window mount sunlight collecting flat chimney and air-in and out parts.

FIG. 131 is a perspective diagram illustrating front to top view of sunlight collecting dual flat cones.

FIG. 132 is a perspective diagram illustrating internal view of sunlight collecting flat cone and extension pipe joints.

FIG. 133 is a perspective diagram illustrating front view of window mount sunlight chimney parts.

FIG. 134 is a perspective diagram illustrating flat cone chimney parts (back and front views).

FIG. 135 is a perspective diagram illustrating window inside front to top view of closed frame.

FIG. 136 is a perspective diagram illustrating front to top view of a traditional home with window mount flat chimney and wall mount solar panel mounting frame come ventilator.

FIG. 137 is a perspective diagram illustrating top to internal view of home with window mount flat chimney and its pipe line to a sunlight exit dome.

FIG. 138 is a perspective diagram illustrating internal view of room showing parts of roof top solar panel mounting frame come ventilator with multiple sunlight exit pipes.

FIG. 139 is a perspective diagram illustrating a home front to top view which is in between two large apartments and has very less light source. This figure illustrating how you can use window mount flat chimney to transfer sunlight into the rooms where there is very less light source.

FIG. 140 is a perspective diagram illustrating front to top view of modified flat roof with roof top, wall mount solar panel mounting frame come ventilators.

FIG. 141 is a perspective diagram illustrating a NetZero school model plan top view showing how to use SAVES technology.

DETAILED DESCRIPTION OF THE INVENTION

Referring now to the FIG. 1, Classroom enabled with Starch. The complete System (Digital podium-1 and dual tablet-60 run by solar power supply) of starch in use, students are using dual tab (60), some are using right hand and some other are using left hand for writing, by sliding with the help of sliding rail (67). While the teacher standing on the base of the five wheel digital pedal podium and using available classroom permanent projector (102) to focus on screen (102*a*) for displaying the work that he is doing in the multi-tab (FIG. 2-17).

Referring now to the FIG. 2, Podium base (1) is one and half inch flat iron plate to support wheels (2), four pedals (4) and to mount the podium pole (7). The front two pedals (4) are pressed to move forward and back two will be used for backwards, to stop interfering with the back two pedals there is a divider (5*a*) this divider also works as foot rest. To move forward half of the feet (toes) are used and for backwards ankles should be used.

Referring now to the FIG. 3, In side view you can see the dual cam and microphone arm (30) and its top view shows camera two-(30*a*), two audio speakers (35), on the top. At bottom you can see the podium pole attachment clamp (13*a*) and its lock (13*b*). The clamp (13*a*) is mounted into the podium pole's ball Baring (13*c*) port. On the other side you can see a handle supporting hook (13*e*) and the break wire (13*d*) as well as its hook (13*f*).

Referring now to the FIG. 4, the long custom-made tablet (around 17" long and 6" width) (29*b*) will be inserted into the multitab third layer (32), later it can be attached to tablet power and data transfer inserts (31, 31*a*, 31*b*). In order to insert the tablet hand rest rail (24) need to be removed, in this view you also can see the dual cam and microphone arm mounting threads (30*g*).

Referring now to the FIG. 5, Multi-tab, dual cam and microphone, arrangement view In the second layer of the multi-tab frame (17) there are three different rails (33 33*a*) to mount three tablets (29, 29*a*, 29*a*, and 29*b*) and hand rest is removed so you can also see dual cam and microphone arm (30). In case you want to mount your personal tablet (any company), just remove one of the tablet and mount yours there.

Referring now to the FIG. 6, Multi-Tab arrangement and front view of mini projector. All the three tablets are arranged in the third layer of frame (17), back side top of the frame there is a writing pad hook connecting pole (23) has a puller (23*a*), once this pole is pulled out you can hook the writing pad (34) with the help of hook (34*b*) in order to write on that. Under the writing pad (34) there is a mini laser projector lenses (33*a*) out is there.

Referring now to the FIG. 7, Multi-tab frame bottom view. Multi-tab frame (17) back view has the fitting arrangement for handle (16), a hand break (15) is mounted on the handle, and this hand break will be connected to the break with the break wire insert (15*a*) with a break wire. Opposite to the handle on the other sides of the frame you can see there are two sets of USB (19) plug-in ports. In the middle it has audio in and out ports (19*b*). To give stability to the frame and handle the handle will be connected to the podium pole with the help of two clamps (16*a*). Under the frame there are four audio speakers (35) and at front there are more audio, video in and out (19c) ports. Opposite side there are more audio video ports for commercial set up (film, TV and event management industry) and power-in and charging connections (19d) are there.

Referring now to the FIG. 8, Multi-tab inner layers. There are three different layers (36, 36a, 36b and 36c) to arrange circuit board, energy storage battery, mini projector mounting rails, and third layer for mounting three tablets.

Referring now to the FIG. 9, Multi-tab internal layer (1$^{st}$) and mini laser projector arrangement. The first layer (rack) (36) is for the circuit board and for the battery. From the first layer to about second layer height, there is a length and width adjustable rail arrangement (33) for mounting cell phone, portable tablets, micro projectors and touch sensitive laser micro projectors (presently available in the market).

Referring now to the FIG. 10, Ball baring clamp to join podium pole and multi-tab frame. The ball baring clamp has a curve place (13g) to tilt the multi-tab frame and for the smooth movement there is two lined ball-baring (13h) arrangement is there.

Referring now to the FIG. 11, The ball baring clamp is welded to threaded pipe. The clamp is welded with a pipe (13i) to fit inside the podium pole.

Referring now to the FIG. 12, Podium Pole—Supporting parts. In this diagram you can see, how the threaded pipe (13i) will be mounted into the podium pipe at handle rotating ball baring arrangement (13c). To give more stability to the handle, an extended hook (13e) is there, to organize the external cables and the break wire there are two cable hooks (13k-1,2). When the pole height adjusting keys (9) are rotated, the pole height will be extended, the ball crew attachment mount (13l) pushes the podium pole extendable internal bar (11). To cover the ball screw arrangement there is a cover for extending bar (10). Podium pole upper part (13) has ball baring arrangement and the lower part (12) has the height adjustment ball screw mechanism.

Referring now to the FIG. 13 Round iron ring clamp with flat mounting plate. The "U" ring (16d) is locked in the clamp with the help of clamp mount (16e) to mount the multi-tab frame there is a punched mounting bracket (16f) with thread holes (16g) for bolts.

Referring now to the FIG. 14, Pedal five wheel Four pedals (4) designed to give slow movement; there are locks (5) to stop the pedal wheels (2). The divider (5a) prevents the movement of two sides; in case of diminished light inside the building there are lights (6b) and speakers (6a) to give the horn. For temporary stops front break (15a) can be used, fifth wheel is attached to the pedal bike with the help of wheel and tire supporting bars (2a) for turn taking.

Referring now to the FIG. 15, Podium supporting pole and handle back view. The handle (16) works as wheel turn control, multi-tab tilt control and as well as support for the person to stand. There is a front wheel break (15) attached to the handle, the clamp (16d) stabilizes the handle and the multi-tab connection. For extra stability there is a handle support extension is there on the podium pole. There are two break wire (13d) hooks (13f) to hold and organize the entire wire system (15a) passing through the pole.

Referring now to the FIG. 16, Custom Punched one and half inch iron bar. Podium is constructed on the movable wheel base (1), base is nothing but a custom punched one and half inch flat iron plate.

Referring now to the FIG. 17, Pedal wheel base and its internal parts. To mount pedal and wheel rotating road (2c), there are four custom made square cut spaces (1b). To move the wheel front and back there is a wheel rotate "U" curve (2b, c) is there. To mount podium pole at front there a circular punch (1a) with threads.

Referring now to the FIG. 18, Pedal wheel mechanism. To mount the pedal on the base in order to push the wheel rotating "u" curve pedal if needs a pipe clamp (4a), this will enable the pedal to move up and down into the square space while pushing the "curve up and down, so corresponding that wheels will move.

Referring now to the FIG. 19, The two sided hook (4a) joins both the "u" curve and the pedal pipe in order to create the rotating movement by moving up and down. In order to separate the leg movement and to prevent touching the two pedals while pushing other there must be a divider required. To mount the divider's (foot rest) there are eight mounting poles (6d) on the base.

Referring now to the FIG. 20, to lock the pedal movement each individual pedal has a lock (5), if you moves one of your feet forward in between one of the two locks, it will lock those two pedals. If you moving forward and using front two pedals so the back two pedals are not to be interacted, so for that there is a divider (5a). While moving forward both the toes are working and during backwards both the angels will be in working.

Referring now to the FIG. 21, podium standing base back view. At the back side of the podium base there is a lock (3), this lock has two parts on will insert into the chair and the other one will be locked with wheel chair bar (39d-FIG. 33) lock.

Referring now to the FIG. 22, Pedal bike without podium. You can see the podium pole (12-FIG. 2) is mounted on the five wheel base with pipe handle (16) these five-wheels can be stopped by pressing hand break (15) with the help of break (15a).

Referring now to the FIG. 23, Podium with five wheel chain bike. This bike run by a chain wheel axil, the two pedals (4) are connected to a chain wheel axil. This type five wheel has only one pedal lock (5) a hand break (15, 15a), hood (6d) to cover wheel chain, on the hood it has a light and horn (6c) arrangement too.

Referring now to the FIG. 24, Podium with five wheel chain bike. The chain wheel bike is now mounted with Multi-tab frame (17), on podium pole there is a two sided extinction of foot rest (8) and back of the base it has a lock system (3) for the wheel chair.

Referring now to the FIG. 25, Pedal bike with podium is shown.

Referring now to the FIG. 26, Writing pad and dual cam enabled with mini focusing projector on pedal five wheels podium. On five wheels podium you can see a person placed his one foot on foot rest (8), fixed the writing pad (34) to the hook (23a) and focusing it through the dual cam arm (30a) from the mini projector (available in the market) on to a screen (33b). Recommended mini projectors presently available in the market can be used with the system.

Referring now to the FIG. 27, Moving on chain wheel podium inside the building In this figure you can see a person using both the chain pedals (4) and moving forward by controlling handle (16).

Referring now to the FIG. 28, Chain podium internal mechanism To arrange the chain at lower height and to move the Peron on the top of it, the base (1) is custom designed with a one and half inch flat iron plate and it is square punched (cut) to arrange the chain axil (4f) with road (4e). The axil rode is attached to a pedal mount (4i) in order to mount pedal (4-FIG. 29), for giving support to the pedal there is a rotating wheel (4j) with extended curve rode (4k). So when the chain (4h) is connected to the front wheel axil (2d) road, those wheels (2) will be moved when the pedal is pressed down. Simultaneously when one pedal goes down the other side pedal mount (4f), (4) will move up. In this figure you can also see the podium pole mounting threaded hole (1a) at front of the wheels.

Referring now to the FIG. 29, Pedal mounted on the two extension rods In order to give support to the feet pedal (4) is mounted on the two extended rods of axil wheel and supporting wheel.

Referring now to the FIG. 30, Chain moving pedal comfort arrangement. To give extra support for foot, pedal is designed with extended edge (4 kJ) and to lock these two pedals there is a single lock (5), when lock is pressed down, lock extinctions will exit through lock out (5c) ports.

Referring now to the FIG. 31, Chain wheel cover support pole In order to mount a hood to cove the mechanical system there are four extended hood mounting poles (6d) on the base.

Referring now to the FIG. 32, Chain wheel covered with plastic hood. The hood (6e) covers the mechanical system and also gives support to the light and horn (6c) to as prevents from any accidents. To mount the front wheel there is a mounting extinction (6f) at front. In order to stabilize the pedal there is a clamp (41) on both sides of the each pedal.

Referring now to the FIG. 33, Height adjustable single pole chair. This chair (36) is uniquely designed to combine with the five wheel pedal bike and as well with the chain pedal five wheel bikes. In order to combine with any one of these bikes there is an insert lock (38) at bottom of the chair (40) attached to the pole (36a) by a ring mount (36b) and a base (35). Base also supports the four wheels (37) with their rods. The pole (Mechanical pole) height can be adjusted by rotating the key (36c). To support the examiners trunk there is an extra height extended curved pipe (40a) is attached to the trunk supporter (40b). To create complete stability to move along with the podium bike there is an extendible pipe (39). This pipe is tilt enabled due to the joint arm clamp (39a), when required move the arm by rotating the key (39e) and lock to the base of podium bike with the help of lock key (39d).

Referring now to the FIG. 34, Pedal podium connected with a single pole (actuator) wheel chair. In this figure you can see how the arm is locked with podium lock (3) and how the arm (39d) is separated from the chair.

Referring now to the FIG. 35, Dual cam, microphone and multi-tab system is in use. In this picture you can see how a teacher is recording her group activity with front cam and her instructional teaching using microphone (30c) with back cam (30a). The Multi tab is enabled and back cam's output can be seen in the two screens (42), and front cam's output is also monitored in third tab (44). At the same time teacher editing at real time with the help of operating keys (45) as well as she is saving it in the system. The wheel chair (36) is connected to the five wheel podium so the teacher can move around and as well as shoot with two different cams at different angles, further she can edit it at real time.

Referring now to the FIG. 36, FIG. 36: Dual cam and microphone arm This dual cam and micro phone arm (30) have two digital video cams (30a, b) front and back to capture video same time in both directions (teacher and students) if any external camera, or audio devises are using to record anything those also can be attached to the system through the audio video in and out ports (19, 19a, 19b, & c—FIG. 7). Any external dives can also be connected to the multi-tab through thunderbolt or wireless/wireless USB, etc.

Referring now to the FIG. 37, Digital podium functions in the classroom. The is an example model, how you can use podium regularly in the classroom during the class time, a teacher can monitor her/his school, classroom, and be able to communicate with his/her students as well as with administrative staff without moving and talking. The total "18" number of students in row (47), but one student Sam (not a real name) (47a) trying to communicate with teacher and teacher sent warning to another student (46) to Be Quit. Other student sent a request for Rest room Pass (48). However, she already has a student in the restroom from last fifteen minutes (52) so it is time to Contact Administrator (52a). However all the administrators will get immediate alerts automatically from the system into their cellphone app. In order to issue a restroom passes to another student. Teacher can get information through the system from all the restrooms in the school via wireless display system on each rest room (FIG. 45). So before she/he issue a pass first she/he reports about one of his/her student not reporting to class back and can issue a new pass to another student according to the vacancy in the nearest rest room accordingly. In case of system failure student can press the button available in the restroom for help. While all this happening teacher can record her teaching and monitor in one tablet (51) as well as she/he can preview the teaching material she/he want to send into student's dual tab (FIG. 40) or to the permanent projector/mini projector (38) as well teacher can write directly on one of the tabs (50) and focus it simultaneously. If, teacher want to use his personal tablet (any brand) into the multi-tab port, it is possible too. So students can watch teacher examples on the board and they can do their assignment given to them in the dual tab (FIG. 40), as well as watch the prerecorded tutorial already sent to them. Other than that teacher can differentiate teaching for any student (FIG. 41), in case of such requirements of gifted, exceptional, or any other such individual requirements. Individualized teaching through pre-designed audio-video material and reading, writing material at the same time teacher can give individual attention immediately as required. Infect the exceptional student also can have individualized audio-visual material (prerecorded video, audio, modified reading and teaching material) through dual tab (40). Furthermore each student can go back and forth of the topics or topic related to the content with the help of dual tab and can have his/her required volume with the help of wireless ear phones (FIG. 43-72), in order to prevent allergies school systems must provide individual wireless ear-phones.

Referring now to the FIG. 38, Tactile enabled laser display from mini projector. Presently in the market there are many mini projectors, in order to mount them there is a length and width adjustable mini projector come cell phone port (FIG. 9-33). You can mount the mini laser projectors or any cell phone for display. Once you place the laser tactile enabled mini projector in the port (FIG. 9-33) it will display through the lenses (FIG. 6-33a), (54). However the lenses (FIG. 6-33a) also can be adjustable according to the distance of board or wall. In the present figure you can see how you can work with tactile enabled laser display (53). It will work, when you touch where ever the touch is enabled (55).

Referring now to the FIG. 39, permanent digital podiums. Permanent podium also has the same features just like the pedal and chain wheel podium except the operating wheel instead of operating base, permanent podium has unmovable permanent stand (58). You can fix temporary wheels (57) in to the given threads (59), when you want to move it from one place to another place. Preeminent podium also has a two side foot rest (13p) and a program display board (56). More over each presenter can slide their personal phone, or tablet into the system if they want to present anything.

Referring now to the FIG. 40, Dual tablet. This is nothing but two screened tablet (60), one side is for display (64) and the second screen (62) is completely dedicated to writing. However, in case of individual requirements (example FIG. 42) you can also customize the dual tablet. The display screen is non-tactile and only displays the things relayed by the teacher from the multi-tablet (FIG. 24-17) this will completely eliminate the bad browsing problems of students in the classroom. However, student can watch previous lessons, or presentations with the help of operating keys (63) and can view missed things using the four way key (63*c*) as well as he/she can also download the lessons into the USB drive by inserting their own personal USB drive. However, their personal files cannot be displayed or played in any of the screens, due to the customized software in the system. The screen one is tactile enabled however also can write with any touch screen pen available in the market. In this screen student can write without any rules (62*a*) and can enable rules (62*b*) when he/she want with the help of operating keys (63) at both right and left side. Same functionality keys are given both right and left (63, 63*d*)) side for the convenience of left handed and right handed students. When required you can also draw graphs with the help of graph lines at required place in the paper and rest of the place you can leave it as white paper (62*c*, 62*d*). While writing to place hand pam weight there is a pam rest place (61). With the help of operating keys student can communicate with teacher without saying a word, for instance operating keys or customized for students expressing their requirements of nurse pass, restroom pass, help in class work, any emergency etc., as well as teacher can also send her/his requests, requirements, expectations, remainders, warnings into the display screen. Written tests can be opened directly in the writing tablet, whereas, the test instructions can be displayed with example audio and video along with teacher instructions.

Referring now to the FIG. 41, A students using dual tablet in the classroom. For the convenience of left handed people the dual tab book can be slide to left side, because the dual tab is mounted on the rail (67) attached to the student desk. When the student changes, according to his/her physical habits, he/she can slide it, and can log of from the system when finished. The dual tab runs on 12 volts Direct current stored in the battery (FIG. 50-96), however there is a personal battery in the dual tab can be run for hours (depend on the battery chosen by customer). In case both batteries are out of charge, the power supply system automatically shifts to regular power supply in emergency. So you have only one supply cable (68), form custom designed supply system (66) from the ground. The person in this picture slide (moved) the dual tab to left side and writing with writing stick (65) with his left hand, once the period ends, the next student comes, he can slide it back to right side.

Referring now to the FIG. 42, Dual tablet enabled with finger print recognition for public poling. Dual tablet can be used for different purposes when it customized. Here dual tablet is customized for public poling by a custom designed finger print recognizing (62*g*) software (will be designed with the help of professionals) in order to conduct the public opinion pole. The circular box is the place for contestant ID picture (62*f*), and his campaign symbol (62*e*). Finger prints or recognized due to the pressure applied on the tactical screen in to a color filled box (62), due to the pressure the color in the box spreads around and the fingers impression will be recognized immediately according to the memory preloaded into the system. However, in order to stop the interference of the previous finger marks screen will be made with anti-finger mark material.

Referring now to the FIG. 43, Solar powered dual tablet. A custom built the two sided solar panel (purchased form market) (69), this panel is tiltble due to the inbuilt pipe setup (71). In case, if screen is invisible due to the sun light, in order to prevent that screen can be tilted with the help of screen tilting hook (70). To personalize the audio there are two wireless audio speakers (ear phones) (72) at left side of the screen two.

Referring now to the FIG. 44, Solar powered dual tablet back view. Second side of solar panel (69*a*), rile insert (73) and circuit board cover (74) as well as battery cover 75) can be seen at the back view of the solar power dual tab (also same for the regular dual-tablet).

Referring now to the FIG. 45, Security system display on school restroom with number locked doors. The display (78) is just a display screen available in the market; however this will be operated by the custom designed software in order to control the student pass, as well as to control the security problems from outside. You can operate any door with the number lock sensor (already available in the market). Issued pass will be displayed in the display board (79) with a unique identifying number (80) but the number lock is only issued to the student in his dual tablet whenever student requests the teacher. This two numbers (door key and pass number) are issued by the system run software, so same number will not be issued twice. Once the student (person) enters into the restroom (any room or designated place) by dialing his key number on door dial pad (76), from that movement his time will be activated (81). However, in teacher's monitor she/he can watch both the times (after entering the restroom and the time from the classroom) in the multi-tab. If the school system wants to use the pass number for visitors, a digital token printer (available in the market) should be programmed with the system. Once the visitor punches the pass and dials that number on the front door dial pad, from that movement visitor's picture and as well as his timer will be enabled automatically and will be available to any of the teacher who gets the admin pass. If the system also includes the digital metal detector come scanner at front door, this will reduce maximum sudden threats from outside.

Solar, Air Ventilation and Exhaust System (SAVES)—
Introduction

There are many evidences of prehistoric human life in the caves. As they started developing tools they also gradually learned to construct homes. However, their home models are very similar to those caves. Sun pass into the caves through narrow spaces and it spreads everywhere inside it. But, gradually its' intensity decreases because, most of it absorbed by the minerals inside the caves.

As man developed tools, he also learned to construct different types of homes according to the environment where he lived. In the beginning, their windows had doors which need to be opened in the morning or when sunlight is required during the day time and they need to be closed when light is not required. However, after manufacturing glass, man learned to use glass for windows. So, the glass gradually changed the building designs and it constantly changing.

Glass windows helped the people who are living in cold places. Now, people construct homes similarly in all the continents due to the availability of air conditioners as well as available all-weather technology. However, due to the security, budget, and the cold weather conditions, in many places till majority of public and commercial buildings as well as homes are using traditional designs and material. Most of the traditional buildings are air tight and allow less light. This can be seen, in many pubic properties; like schools, universities, commercial spaces and homes.

Traditional constructions are strong and their life time is longer. Whereas, modern constructions provide more comfort at the same time they require more maintenance. Therefore, the present invention SAVES' can help you to construct in desired traditional or modern plans to provide security comfort, and also increase the building life time with less maintenance. At the same time, SAVES' will allow you to follow the local building construction codes.

Constructing homes in east and west facing/direction or in south and east facing/direction according to the solar path in the site of construction is very important. It will help to get sunlight into all the rooms from the morning to evening. Next, it will help to get maximum photovoltaic energy from solar panels which are mounted on the walls as well as on the roofs.

Further, it is also our responsibility to construct homes environmental friendly, in order to decrease the greenhouse gases. As scientists discovering more and more planets with water and light, it is creating more interest in public to know what kind of life may exist on them. At the same time, scientists also afraid to know that some planets like Mars which are near to us, once upon a time had water on them but, not now. You might have various reasons for that but, it is our duty to keep our planet safe until naturally some serious changes occur and continue finding ways to travel faster to the new inhabitable planets.

Light and air, has same importance in providing comfortable learning environment. However, due to the various reasons most of the public properties using electrical lights during the daytime even though plenty of sun light is available out there. In the same way, air is bought inside through air circulation system in order to control the temperature which uses electricity and release greenhouse gases. In fact, earth, sun, and air together has the capability to provide comfort naturally without spending more electricity. But, you need to use all the available renewable energy to control air conditioning, temperature and exhaust technology accordingly. Using natural resources can save the earth and enhance natural learning process.

For instance, NetZero building management system is increasing in public and private sector. In order to maintain the building temperature many NetZero buildings are using geothermal heat technology to maintain air temperature and to provide hot water in the building.

Air safety is very important in public and private properties because, the threat to public life is not just by the visible weapons but, there are many harmful invisible chemicals and electronic devises become available to many. According to the history most of the wars had between two countries or between two groups of countries. However, now it is time for all countries to come together and fight against harmful international elements which are creating threat to the public life by using harmful chemicals and electronic devises.

Chemicals mixed in food and air can cause serious impact on learning process and can show serious impact on people's health who are exposed to them. Most of these chemicals create learning difficulties and appear like it is due to the person's own deficiency/neuropsychological issues. Next, in the environment where the electronic devises are used inappropriately also impact learning process and can cause health and psychological problems. Chemicals and electronic devises influence learning and testing facilities. Therefore, it changes the person's thinking and decision making abilities. Most of these cutting edge technologies and chemicals can target a particular person in a group without impacting any other person in the rest of the group. So, who are not aware of these things will feel like that particular person has some issues. Therefore, providing natural air, light into each room is very important and at the same time, exhausting the polluted air immediately from the rooms is very important. Further, it is also important to install detectors to find harmful chemicals and electronic devises in public, private and commercial properties.

Any chemical, which is pressure released will stay below the knee level for longer time until it diluted and it will take longer time to reach to the roof to pass out through the central exhaust system. In the same way, exhaust system can exhaust the hot air and bad gases but, by the time it is exhausted out, people in that place already inhale it. Therefore, having more individualized room exhaust system at lower heights is very important. Even though, centralized air conditioning system, temperature maintenance system and exhaust system is arranged; it is also important to have alternate individual room fresh air release as well as exhaust system. Using alternate air and exhaust management systems like SAVES will improve learning process, health and provide more options for individuals. Further, it also helps in emergency when there is no power supply or during the power shortage.

Referring now to the FIG. 46, roof top solar panel mounting frame come ventilator. This sheet shows two figures, one is top to internal view (84) and second one is, back to internal view. This is a permanent model to mount on the flat roof. In order to mount the frame the roof insert (85b) should be inserted into the roof. On the top, it has space (87) to mount mirror and cone shape sunlight collecting chimney (FIG. 55, 127, FIG. 63, FIG. 48, 87). Next, it has wire connecting socket (86) to connect the cables from the solar panels (FIG. 56).

Referring now to the FIG. 47, Solar panel mounted on one side of frame. While the solar panel (purchased form market (96b) is mounted into the one side of frame, you can adjust the flow of the electricity with the help of two way cotter inch pin cable (96a) can be inserted in the female socket (89) to arrange panels (FIG. 56, FIG. 107, FIG. 109, FIG. 110, & FIG. 114) in series or parallel circuit according to your requirement.

Referring now to the FIG. 48 wall insert solar panel mounting frame come ventilator (permanent mount) back view and side view. In this figure the back view (90) shows the mirror (87) and the shade inserts (91). The side view shows solar panel mounting space (85), cable socket (86) and the wall insert extension (92).

Referring now to the FIG. 49, Solar panel mount frame when inserted into the wall Inside the room, frame has curve glass (93) ventilation and the extinction (95) for the proper wait control on the wall (94) can be seen in this figure, frame also requires back side support.

Referring now to the FIG. 50, Solar power storage system as well as supply method for dual tablets in the classroom. Once the solar panel frames are arranged on the side of the walls and on roof, ventilators (9) will give sunlight as well as supply power (from solar panels) to the storage system (96) in to each class, room. The stored power will be supplied through a systematic wired through side of the walls (97a) as well as in the floor (97). However, each system (multi-tab, dual-tab and display system) has their individual storage battery system once they are charged they work at an average of 7-12 hours and the power stored in the main system (96) in each classroom works as back up vice versa. In case of emergency regular supply will be used automatically. Even individual room AC (99) system also runs by the solar power with proper monitoring arrangement (required solar technology is already available in the market). For more ventilation each side of the wall must have two air-tite transparent glass windows. Usually schools and universities will have larger building structures if all these enabled with STARCH, they also become larger sources of electricity. The extra stored power (electricity) during holidays can be uploaded into the State or National supply system, so by that educational systems also can earn some extra money to spend their projects.

Referring now to the FIG. 51, A model two stair school building completely enabled with solar power by mounting frames on wall and roof to run STARCH as well as for common use. The solar panels mounted on the roof (84), side of the wall (90), and minimum two air-tite glass windows (98) on each side of the class room. Schools should always have alternative to save power like here this school has on regular stairs (100) (to save power) and lift (100a).

Referring now to FIG. 52, roof top solar panel mounting frame side assembly (instant mounting frame). This is, one side of the roof top solar panel mounting frame come ventilator. This frame can be linked to another side frame with side extinction (103a) to make four sided box shape frame. Next, the frame can be mounted on any flat surface with the help of base support locking bolt in insert space (104). Completed frame has space for two fans and air pipe mounting space (101) and next two fans on both ends of frame; above them it has frame top mounting bracket extensions for mounting cone shape sun light collecting chimney and mirror on the top of it. Further, you can mount a cover to protect from air and to filter the light.

Referring now to FIG. 53, roof top solar panel mounting frame come ventilator front to internal view. This view shows front side two fans meshes (105) and back side two other fan meshes. Next, at the side of the frame there is an air filter (105a) which can be mounted in-between the fan (FIG. 54, 107) and the mesh. Due to the air filter (it is optional, based on the amount of dust gets into the air pipe in the period of 3 or 6 months), maintenance may require after every six (6) months (change the filters). If the air quality is good cleaning can be done from outside the mesh with the help of available air suction cleaners/vacuum cleaners on regular basis.

Referring now to FIG. 54, roof top solar panel mounting frame come ventilator's side to internal view with assembly parts. This picture shows how a frame can be mounted on any roof by just making single hole (115) to send all the parts through one single pipe (FIG. 59, 130) in to the room/s. The figure shows how the fan (105) and the pipe (106) which takes the air into the heat sink pipe (FIG. 61, 137). On each frame there is a place to mount two fans (air in [105] or air out []). From air out fans one of the fans (109) can be used just to take the heat out from the frame and there is option to mount extra air intake fan (107) to cool the internal pipes. Roof top frames, are mounted on the top of the roof so; when the frames are mounted in high temperature places, it may need this kind of arrangement. Air and temperature regulation can keep the frame in good condition for longer time. The "L" bars (FIG. 46, FIG. 54, 85) on each side of frame under the each "L" bar there is a space to mount power shocked FIG. 56, 121) which can be connected to the panel positive or negative line with the help of extinction wire or with a male socket according to the arrangement. You can mount on the "L" bars or you can remove the "L" bars and mount on the top of it with the help of panel mounting brackets (113). So, due to this arrangement you can mount any kind of panel (like plastic, film or any fiber solar panels) on the frame. The triangle bar (111) will help you to change the angel (45°) so; the panel will be slope instead of straight. Beside the fans on both sides of each frame there are two brackets (FIG. 52, 102) to mount cone shaped chimney (FIG. 55, 127).

Referring now to FIG. 55, roof top solar panel mounting frame come ventilator's top view with cotter inch socket, mounted panels and, cone shape sun light collecting chimney. This figure shows, mounted solar panels and sunlight collecting cone chimney (127). The two panel's positive and negative cables can be connected in series by using cotter inch cable (96a). Because, each panel's positive (+) and negative (−) cables are connected to separate cables so they are always in parallel connection so, you get one final output. But, when you combine positive and negative it will increase the voltage.

Referring now to FIG. 56, roof top solar panel mounting frame come ventilator's side to internal view shows cable arrangement/connections. This figure show how you can connect solar panel cables (+,−), in order to make the complete frame as one cell. Basically all the positive cables (119) connected to one cable (118) all the panel negative cables are connected to one cable (117). These two cables are rotated around the four sides so; it is easy to connect all the four panels. The main cables (117, 118) are connected to one female socket (121) on each side after connecting the panels these outlets can go out through the square panel's socket spaces (122) or through the "L" bars (FIG. 54, 85) so, you can insert cotter inch cable (FIG. 55 96a) to connect two panels positive and negative cables in order to connect in series.

Referring now to FIG. 57, roof top solar panel mounting frame come ventilator's front to top internal view. This figure shows how cone shaped sunlight collecting chimney (125, 126 &127) can be mounted inside the frame. This figure shows how all the four frames (FIG. 52) connected together with the help of joining iron bar (102a). Further, this iron bar (102a) provides support to mount the sunlight collecting cone shape chimney's opening (127). Cone chimney big opening to sunlight and it gradually decreases the size (125) to combine with a pipe (126) to send it into the room.

Referring now to FIG. 58, roof top solar panel mounting frame come ventilator's front to top internal view. This figure shows, how the in and out air pipes (129 & 128) are attached to the extinction pipe (FIG. 57, 126).

Referring now to FIG. 59, roof top solar panel mounting frame come ventilator's front to top internal view. This figure shows how the sunlight cone pipe (FIG. 57, 126), air in and out (FIG. 58, 128, 129) are packed with in a single pipe (130) to send into the destination (room).

Referring now to FIG. 60, roof top solar panel mounting frame come ventilator internal view form roof top to inside room. This figure shows how a single pipe (FIG. 59. 130) brings into the room. The sunlight cone pipe (FIG. 57, 126) is connected to the sunlight dome (131). So, the collected light falls in the room. Next, the air in pipes is connected to fan and emergency heaters (132, 132a) and the exhaust fan (133) can be fixed according to the requirement.

Referring now to FIG. 61, roof top solar panel mounting frame come ventilator internal view form roof top to inside room. This figure shows how the fan and emergency heater connected to the air pipe (137). The air came from the outside goes through the pipe into the flat heat sink (134).

Heat from the air is absorbed by the heat sink metal layers and through the layers the heat will be sent into the coolant which travels automatically from top to bottom when it absorbs the heat due to the gravity and due to the internal fan (FIG. 78, 198) movement. Next, the figure shows the LED light (136) attached around the sunlight dome (FIG. 60, 131). The LED light will turn on when the darkness increases in the room due to the attached photodiode (136*a*). The LED light will turn on when the light intensity (136*d*) decreases due to the automatic switch (136*b*).

Referring now, to FIG. 62, front view of roof top solar panel mounting frame come ventilator. This view shows completed roof top solar panel mounting frame come ventilator with four sides closed (138) internal parts.

Referring now, to FIG. 63, roof top solar panel mounting frame come ventilator's front to top view. This picture shows completed roof top solar panel mounting frame come ventilator with solar panels (138*a*) mounted on it and the four sides on the top rain cover (139) with can protect from the rain. Further, in order to filter harmful (Ultra-Violent) rays and to decrease intensity the light filter and chimney cover (140) can be useful. Otherwise in the places where light intensity is in medium, in that place it may not require only a transparent glass mounted (FIG. 48, 87) on it is just sufficient.

Referring now, to FIG. 64, a modern home back to top view with roof top and wall mount solar panel mounting frame come ventilators. The figure shows, how you can mount roof top solar panel mounting frame come ventilators (141) and wall mount solar panel mounting frame come ventilators (143). Further, it also shows the internal view of sun light (142) and the ventilators (144) mounted on the sealing.

Referring now, to FIG. 65, a modern home side to top internal view, with roof top and wall mount solar panel mounting frame come ventilators. The figure shows how you can mount roof top solar panel mounting frame come ventilators (145) and wall mount solar panel mounting frame come ventilators (145*a*) on a modern home.

Referring now to FIG. 66, slope roof top solar panel mounting frame come ventilator side to top view. This figure shows how a roof top solar panel mounting frame come ventilator can be modified in order to mount on the slope roof tops. Slope roofs are triangle and at the same time, roof will have little flat surface and some may not have even that space too. So, bringing sunlight into the hallways is imposable. Therefore, in order to solve the problem the roof top solar panel's sides are extended (147) to able to mount on both sides (FIG. 68) of slope roof. Due to this modification, the both sides (147) of extensions created space for mounting four (4) solar panels. Therefore, total you can mount eight (8) solar panels. Further, you have more space to mount exhaust fans (148) on both sides of extinction (147). Apart from that, air in and out fans, also has space to mount cone shape sunlight collecting chimney heat sink fan (146) or radiator. The heat sink fan will help to send any heat inside the frame. The slope roof top solar panel mounting frame come ventilator, is mounted on the top of the roof so, in hot places there is a chance of getting more heat inside the frame so, and it may damage the glass on the top of cone shape sunlight collecting chimney or the chimney. Therefore, it is advised to mount a heat sink (FIG. 70, 150) around the chimney.

Referring now to FIG. 67, slope roof top solar panel mounting frame come ventilator front view. This figure shows, the side frame arrangement (152) for mounting solar panels and the heat sink fan (151) and the air intake fans (151*a*).

Referring now, to FIG. 68, roof top to, into the hallway/room internal view of slope roof top solar panel mounting frame come ventilator. This figure shows how a roof top solar panel mounting frame come ventilator can be mounted on the roof (153) top and how the single pipe (154) brings all the pipes (154*a*, 155, 156) into the hallway sealing. According to hallway size, the air in pipe (156) and exhaust pipe (155) as well as the sunlight dome (FIG. 69, 162) connecting extension pipe (154*a*) length and sizes can be decided.

Referring now, to FIG. 69, front to top internal view of slope roof top solar panel mounting roof come ventilator. This figure shows, how the air pipe is connected to the fan out (159) through heat sink (160), and sunlight collecting cone chimney pipe extension connected to the sunlight exit dome (162). Around the sunlight dome an LED light (163) is mounted to the light, to turn the light when the darkness increases. In order to turn on the LED light automatically it is connected to the photodiode/dark sensor (157) and the photodiode is connected to an automatic switch (157*b*) as shown in the circuit (157*a*). As the light intensity (157*c*) decreases, the photodiode sends the signals to the automatic switch and the switch allows the power (157*e*) to the LED light (163). Further, this figure also shows how the heat sink (158) and the emergency heater (160) arranged to mount in the air out fan dome (159).

Referring now, to the FIG. 70, front to top internal view of slope roof top solar panel mounting roof come ventilator with heat sink. This figure shows how the heat sink (150) can be mounted around the sunlight collecting cone shape chimney (148*a*). This heat sink has internal pipe and it has cap (150*a*) to pour liquid coolant the coolant heat can be decreased by connecting the fan/radiator hose (15*b*) to the fan or a radiator with fan.

Referring now to the FIG. 71, a model classroom's top to internal view slope roof with extended roof top wall mount solar panel mounting frame come ventilators. This figure shows how the extended solar panel mounting frame come ventilator can be mounted on the top of slope roof. The extended solar panel mounting frame come ventilator allows you to mount multiple solar panels (168) and multiple sunlight collecting cone chimneys (171*a*). Basically, the extended frame made in blocks (FIG. 74) and they all connected to each other with the help of their frame attachment inserts (FIG. 74, 185) and mounted on the roof as one single unit on the roof top mounting rail (FIG. 73, 177). In the same way the first frame of both side connected to the slope roof top solar panel mounting frame come ventilator (170). Therefore, all together it will look like a single unit (FIG. 75) in triangle shape. However, mounting a single large unit on a slope roof can create damage to the roof as well as to the solar panels. Therefore, in order to decrease the speed of the air speed on the extended frames you can mount air circulation pipes (FIG. 73, 179). In places with constant air flow the air pipe you can also mount fan (FIG. 74, 183) without motor. So, the fan can decrease the air speed (FIG. 74, 182, 182*a*). Due this arrangement you can have more than one light in one room because of the multiple sunlight, air in and out carrying pipes (171). These extended frames are arranged in fixed intervals on the roof (FIG. 72) so; in the hallways also you can have more sunlight, air in and out carrying pipes (169). Further, air pipes connected to the inside fans (173) and around the sunlight dome (173*b*) with LED light which can be run with the help of stored power when it gets dark with the help of dark sensor/photodiode (FIG. 69, 157). Therefore, inside any classroom electricity may not be required form the power grid because a small amount of power can be used in between which is produced by the solar panels. Further, this picture also shows the model classroom with wall mount solar panel mounting frame come ventilators (165, 172).

Referring now to the FIG. 72, Front to top view of a school mounted with wall mount, extended solar panel mounting frame come ventilator and a roof top solar film. This figure shows how a roof top extended solar panel mounting frame come ventilator mounted in an order to mount roof top solar film (174). Next, in coordination to extended frame, wall mount solar panel mounting frame come ventilators (165) also mounted so, this type of facility can produce more solar power and eliminate need to use electrical bulbs in a day time.

Now referring FIG. 73, slope roof top extended solar panel frame come ventilator front to top view. This figure shows how each part of extended frame (FIG. 74) are connected to each other attaching to the roof top solar panel mounting frame come ventilator as one single unit. All the frames can be mounted on the rail (177) to keep them strong. The mounting rail can be built as part of roof from the inside so, in that case it will be stronger and will be safe from air rain and other natural calamities. This figure show air circulating pipes (179) joints (185), and air-in (181) and out fans. The sunlight collecting cone shape chimneys (178) will be mounted in between one solar panel mounting frame (178a). Under each solar panel mounting frame air circulating pipes (180) and further fans (FIG. 74, 183) can be mounted.

Referring now, to FIG. 74, side to top view of slope roof top extended solar panel mounting frame come ventilator extinction attachment. This figure shows, solar panel mounting space (184) on top and on the side frame inserts (185). In between the two frame inserts, there is a rubber washer (185a) to decrease shake and further to decrease the damage. On both sides of the extinction frames in the air circulation pipes (FIG. 73, 180) air controlling fans (183) can be mooted to decrease the air flow (182, 182a) so, the frame can be safe form the force air.

Referring now, to FIG. 75, slope roof top extended solar panel frame come ventilator front to top view two sides. This figure shows how the two sides of the extended frames look like with mounted fans (183a) inside the air flow pipes.

Referring now, to FIG. 76, front to top view of heat sink come emergency heater with air pipe-in attachment. This figure shows how an air in pipe (FIG. 58129, FIG. 76, 186) can be mounted on the top of heat sink (190) to send the air throw it. The heat sink is closed with heater cover (188) and can be locked with a lock (189). Below the cover you can mount an emergency heater (187) to run it when the main (central) air condition stops working during the cold days.

Referring now, to the FIG. 77, top view of heat sink come emergency heater top view. This figure shows how the heat flat heat sink looks without air pipe. From the top you can see liquid coolant circulating pipe (191) which is in four circular pipes and connected in-between with half circular pipes (191a). So the when the heat is absorbed by the heat sink metal layers (196), that heat will be observed by the liquid inside the pipes and will be cooled due to the circulation created by the gravity and the decreasing height of the pipes as well as the move created by the fan (FIG. 78, 198) inside the heat sink. In between the first and second pipe there is a space (197) to pill the air from the air pipe (FIG. 76, 186). On the top of second pipe it has a cap (191) to open and pour the liquid into it. Further, in the space of first liquid pipe you can mount a fan motor (6v/12v or as required) to pull the air form the air pipe and send it forward. After mounting fan the power can supplied into the fan with the help of power pins (192).

Referring now, to the FIG. 78, heat sink internal view with fan. This figure shows how fan (198) is mounted in the heat sink inside the first pipe.

Referring now, to the FIG. 79, this figure shows the heat sink cover. The heat sink cover (199) can be used to close the heat sink and the fan. However, air can come out through the gaps (199a) on the top of cover.

Referring now, to the FIG. 80, wall insert solar panel mounting frame come ventilator back to side view. This figure shows, a transparent cover (201) mounted on the top of mirror (201) at the back side of the wall mount frame. At the front, which goes into the room you can see there is a closed fan cover (200).

Referring now, to the FIG. 81, wall insert solar panel mounting frame come ventilator back to side view. This figure shows, below the filter cover (FIG. 80, 201) and the mirror (FIG. 80, 202) there is a space to mount cone shape sunlight collecting chimney (204) this chimney has circular opening on the top (203). This chimney collects the sunlight and sends into the room through the extension pipe (FIG. 82, 208).

Referring now, to the FIG. 82, wall insert solar panel mounting frame come ventilator back to front internal view. This view show, how the chimney (FIG. 81, 204) is connected to extension pipe (208) and further into the room and so, the light will exit through cone pipe out (209) through the half circular fiber dome (209a). In order to send air into the room, there is an air pipe (206) which is connected to two air intake fan mounting cones (205). The air intake big pipe can be tied to the cone pipe extinction with the help of two (as required) metal tapes (207).

Referring now, to the FIG. 83, back to front internal view of wall insert solar panel mounting frame come ventilator. This figure shows how the two fans (205a) are mounted on the air intake cones. Next, the two exhaust fans (210, 211) in that one goes to right side (211) and pulls the air through the pipe with the help of fan (212). The second exhaust fan (210) is connected to left side exhaust fan pipe and pulls the air out form other side.

Referring now, to the FIG. 84, back to front internal view of wall insert solar panel mounting frame come ventilator. This figure shows how the back side two exhaust fans are covered with a cover (218), next the space under the cone chimney is converted as battery cabin (216). In this a rechargeable battery (215) will be placed to use it for emergency heater (FIG. 95, 139). This battery will be charged with the help of main power line which comes from the inverter (FIG. 109, 280, FIG. 114, 305). The battery cabin will be closed with the door (217). At the back side of the cabin there is an extended space/pad (214) to mount the fan (213). This fan pulls the air form the outside with the help of two fans (FIG. 83, 205a) through the air pipe (FIG. 82, 206).

Referring now, to the FIG. 85, back to front internal view of wall insert solar panel mounting frame come ventilator. This figure clearly shows how the air pulled through the air pipe fans (219) is comes out form the liquid heat sink with internal fan (220).

Referring now, to the FIG. 86, back to front view of wall insert solar panel mounting frame come ventilator. This figure shows how the complete frame will look like when you close it and fans are closed with iron/fiber mesh (221, 221a, 221b) and the sunlight exit is closed with half circular fiber (any other suitable material) glass cover (209a)

Referring now, to the FIG. 87, air cooling fan and heat sink back view when coolant tank cap is opened. This figure shows how the liquid cooling heat sink half part looks like from back side. At the back of the heat sink it has a tank (225), this tank can be closed with the cap (222). When required you can pour coolant (224) from any purchased coolant bottle (223). The poured liquid will circulate inside around the pipes (226) to absorb the heat through the heat sink layers.

Referring now, to the FIG. 88, air cooling fan and heater heat sink side view when coolant tank cap is closed. In this view you can clearly see the fan (227) mounted inside the heat sink.

Referring now, to the FIG. 89, air cooling fan and heater heat sink side view. This figure shows how the air intake pipe (228) can be attached with the heat sink.

Referring now, to the FIG. 87, air cooling fan and heater heat sink back to front view. This figure shows the front cover (229) attached to the back part. This picture shows complete pipe line from back to front connected to the liquid tank.

Referring now, to FIG. 91, internal view of both sides of heat sink. This figure shows how the both (front and back) parts of heat sink is connected with the help of liquid circulating plastic pipe (230). In the middle of the back part (232) you can mount fan and the spec between the liquid tank and the second pipe line there is an air intake space (233). When the fan moves, the air collected from the air pipe pulled forward. When the air is passing through the heat sink the heat will be absorbed by the heat absorbing metal layers (231) and the absorbed heat will be sent into the liquid. Further, the liquid moves from back to the front pipe line through the plastic pipe so, the liquid will be cooled and again sent back due to the fan movement and on the top of the tank and the cool air goes out through the front part of heat sink.

Referring now, to FIG. 92, internal view of both sides of heat sink. This figure shows the completed back heat sink with heat absorbent metal layers (235) and you can see the use of middle half circular pipe connection (234) between two circular pipe lines.

Referring now, to FIG. 93, back to front view of heat sink. This is the completed picture of heat sink when all the heat absorbing metal layers (236) are attached to the pipe line. Next, when the two (front and back) covers are attached together the plastic pipes (137) comes out and one pipe sends the liquid into the front part and the second pipe sends the liquid back into the back part and into the tank.

Referring now, to FIG. 94, back to front internal view of wall insert solar panel mounting frame come ventilator. This figure shows how the fan (138) mounted in front of the heatsink with internal fan (220).

Referring now, to FIG. 95, back to front internal view of wall insert solar panel mounting frame come ventilator. This figure shows how the fan (238) is mounted between heat sink (220) and the heater (239).

Referring now, to FIG. 96, back to top view of wall insert solar panel mounting frame come ventilator. This figure shows how the slope cover mounted on the top of the two exhaust fans (240). Next, at the bottom of the frame there is a joint clamp (241) which connected to the wall mount frame to the solar panel mounting frame come ventilator.

Referring back to middle internal view of split mode wall mount solar panel mounting frame come ventilator. This figure shows how the single pipe (143) can be sued to pack all the air intake and exhaust pipes as well as cone shape sunlight collecting chimney extinction pipe sent into the room through a hole made to the wall into the second part.

Referring now to the FIG. 98, side to internal view of wall mount solar panel mounting frame come ventilator. This figure shows how the pipes (144) can be extended from the front part (143) to connect with the pipes coming from single pipe from other side of the wall.

Referring now to the FIG. 99, bank to front and side to top view of split wall mount solar panel mounting frame come ventilator. This figure shows how you can mount the back (146) and front part (147) of frame inside the room on the wall (145).

Referring now to FIG. 100, back to top view of wall mount solar panel mounting frame come ventilator. This figure shows how the wall mount solar panel mounting frame come ventilator can be mounted on the wall with the help of extended frame joint (248) connect to the wall support frame (249). This frame can be mounted on the wall with the help of brackets (250) and wall mount support stand (251). Further, this frame can be used to mount extra solar panels on the three sides.

Referring now to FIG. 101, side to front top view of wall mount/insert solar panel mounting frame come ventilator. This figure shows how the completed solar panel mounting frame come ventilator looks after mounting solar panels (252) and the rain covers (252a, 252b, 252c).

Referring now to FIG. 102, front to internal view of solar panel mounting frame come ventilator. This figure shows how the cone chimney extended pipe (254) is mounted on the base (255). Next, beside that it has a space (256) to mount fan and heater). The front of the light exit can be closed with the fiber glass cover (253) for increasing the brightness and for the protection. Further, you can also see the closed fan covers (257) on both sides of the frame.

Referring now to FIG. 103, front to internal view of solar panel mounting frame come ventilator. This picture shows the LED light mounting base (258) and its power supply holder (259).

Referring now to FIG. 104, front to internal view of solar panel mounting frame come ventilator. This figure shows how the fan and heater mounted on the base (FIG. 102, 256) opposite to the heat sink (262a). Other side of the picture you can also see the air out pipe (262) which is connected to the other side heat sink.

Referring now to FIG. 105, front to internal view of solar panel mounting frame come ventilator. This figure shows how you can mount four LED bulbs (263) on the top and at on the base of the frame with the help of power supply holder (264).

Referring now to FIG. 106, front to internal view of solar panel mounting frame come ventilator. This figure shows how the circular LED light (265) is mounted on the LED light mounting base (FIG. 103. 258) with the help of holder (FIG. 103, 259).

Referring now to FIG. 107, wall mount solar panel mounting frame come ventilator internal positive (+) and negative (−) cable arrangement. This figure shows how you can connect solar panel cables (+,−), in order to make the complete frame as one cell. Basically, all the positive cables (271) connected to one cable all around inside (271a). In the same way all the negative cables (268) connected to one cable (268a) all around the frame. So, on each side of the frame you will have female positive (+) socket (267a) and female negative socket (267). So, connecting all the three panels each side with the help of male sockets (266) is easy. Further, one positive and one negative female socket will be mounted on the top of the panel junctions to connect positive cable (271) with negative cable (268) with the help of a quarter inch male socket in order to connect the panels in series as showed in FIG. 55, 96a.

Referring now, to FIG. 108, a school building back to top view with slope roof top, slope roof, and wall mount solar panel mounting frame come ventilators. This figure shows one school building (272) back to top view, which is completely closed and depended on electrical lights. So, this kind of building will consume/requires more electricity. Because, in the hallways, rotunda, and in the classrooms completely it has no ventilation. Therefore, using slope roof top solar panel mounting frame come ventilator (273, FIG. 68), slope roof top solar panel mounting frame come ventilator (274, FIG. 120) and wall mount solar panel mounting frame come ventilator (275) will provide ventilation in the hallways as well as in the classrooms. Further, in order to bring light into the rotunda you can mount mirrors or mirrors with flat cone chimney on them (FIG. 131 &134). Once you mount the flat cone chimney you can also mount a rectangle/ square LED (FIG. 129, 360) light around it (276).

Referring now to FIG. 109, Classroom internal view showing circuit connections between wall mount solar panel mounting frame come ventilator and D.C to A.C and storage system in parallel connection. This figure illustrates how each individual solar panel mounting frame come ventilator is connected to invertor (282) in parallel with the help of negative (−) supply line (281) and positive supply line (291). The invertor (282) gets A.C power supply (280) from meter (279) and the meter is connected with utility service (278) with gets power from main grid (277). The collected solar power sent to the power storage system (284) through invertor (282). However, when the supply into the classroom battery (286) and to the all other utilities (AC, fan, board and projector) will be regulated by the automatic switch (285). Further, in order to charge individual student dual tablets (FIG. 212, 296) can be charged with the help of floor mounted plug (288) which gets the power from the classroom individual battery (286) through the underground cable (289). The supply to the power from power storage system can be regulated by inverter with the help of A.C (280) supply when the solar power storage decreases. Future, if the wireless charging system becomes available then underground cable system may not be required to charge dual tablets. However, as a backup having alternate solution always helps the schools to continue instruction without any interruption.

Referring now to FIG. 110, classroom internal view showing circuit connections between wall mount solar panel mounting frame come ventilator and D.C to A.C and storage system in series connection. This figure is the same as the FIG. 109 explains everything same however, only difference is that the solar panel mounting frame come ventilators are connected in series (292) to increase the voltage. In order to connect the solar panel mounting frame come ventilator (Unit) in series the first unit negative (293) is connected to the invertor and the from first to end panels positive (294) and negative connected to each other. This series can continue until the end of last unit. From last unit, the final positive out will be connected to the cable (294) which is connected to the invertor.

Referring now to FIG. 111, classroom internal view showing floor power supply to each student desk. This figure shows how each student desk has connectivity (296 & 297) to charge their dual tablets.

Referring now to FIG. 112, classroom internal view showing floor power supply to each student desk with dual tablet and movable digital podium. This figure, shows the dual tablet (296) is connected to power cable (297, 298) from the floor power out. Next, exhaust fans (299, 299a) are mounted at lower level. Further, the moveable digital podium also being charged with the power cable.

Referring now to FIG. 113, classroom internal view showing floor power supply to each student desk with dual tablet and the exhaust fan pipe joint fans. This figure shows how the added fan (300) at joints will help the exhaust system to pull the air out faster when it turned on.

Referring now to FIG. 114, back to top view of a school roof mounted with slope roof top, slope roof and wall mount solar panel mounting frame come ventilators (units). This figure shows the relation between slope roof top solar panel mounting frame come ventilator (unit), slope roof solar panel come ventilator and wall mount solar panel mounting frame come ventilator (unit). All these units are connected in parallel circuit to store the solar power (in the same way you can also connects the units in series as you needed). First the A.C power is collected from the power grid (301) with the help of cable (302) to the meter (303) and from the meter it is sent to the auto transformer (304). From auto transformer, it will be sent to the inverter (305). However, each slope roof top unit is connected with inverters (305). In the same way wall mount solar panel mounting frame come ventilators also connected to the inverter. Therefore, collected energy will be sent to the batteries (306) and with the help of inverter power will be supplied to the individual room by regulating A.C and D.C power based on the availability of stored energy in the batteries.

Referring now to FIG. 115, this figure internal view of roof with triangle dormer. On the slope roof (314) inside the triangle dormer (315), the cone shape sunlight collecting chimney (315a) is mounted. So, with the help of extension pipe you can move the light wherever you wanted.

Referring now to FIG. 116, roof internal view showing triangle dormer parts of sunlight dome air in and out (exhaust system). The triangle dormer internal space is used and modified to bring two air-in pipes (316, 316a) and two air-out pipes (317, 317a) to circulate air in and out and one cone shape chimney extended pipe (319) is connected to the sunlight dome (319a). Further, around the sun light dome a circular LED light (318) is mounted same as showed in FIG. 69. The LED light is also connected to the photodiode (320) in the circuit to turn on automatically when the darkness increases.

Referring now to FIG. 117, a traditional home front to top view showing triangle dormer modified with SAVES technology. In order to take the light from outside to inside the room wherever it required a flat cone shape dome (321, FIG. 129, FIG. 130, FIG. 131, FIG. 132, FIG. 133, FIG. 134, FIG. 135, FIG. 136, FIG. 137) is mounted on the lower and upper parts (321, 321, 324) of the mirror (321a) as required. Next, the space both sides of the triangle dormer is used to mount air-in and out fans (325, 326). Further, the space (322) on the top of the triangle dormer is used to mount solar panels (322). Therefore, the triangle dormer modified with SAVES will work just like any of the (wall mount or roof top) solar panel mounting frame come ventilator. After mounting solar panels based on the requirement and the based on the number of the dormers on the roof the owner of the home can decide to connect the each individual dormer in series or in parallel circuits to send the collected photovoltaic energy into a storage system (battery) through an inverter. If the one or dormers are converted then, the owner also can use individual battery to store the energy in it and can arrange the battery inside the roof or inside the room as his/her convince. Further, you can also mount LED lights (FIG. 116, 328) as showed in FIG. 116) to have light when it turns to dark.

Referring now to FIG. 118, slope roof dormer side to top view. This figure shows the model of a regular slope roof top slope dormer. The slope dormer also a good sources to modify with SAVES technology to get sunlight where it is required or to turn it as power source and air circulating source into the home. So, the space under it can be used as a good working place due to the fresh air and uninterrupted natural light.

Referring now to FIG. 119, slope roof dormer side to top view with solar panel mounting frame and air-in and air-out system. This figure shows how a slope dormer can be modified into a solar mounting frame (328) come ventilator. On the top of the dormer two solar mounting rails (328) are mounted and side of the dormer air-in (329) and air-out/exhaust (330) are mounted.

Referring now to FIG. 120, slope roof dormer side to top view. This figure shows mounted solar panel (331) and a mounted flat cone chimney (332) to collect sunlight.

Referring now to FIG. 121, a modern home front view. This figure shows how you can mount slope dormer (333) and flat roof top dormer (334) which has both slope roof as well as flat roof.

Referring now to FIG. wall insert sun light dome and pipe lines front to side view (inside the room). This figure shows how you can use a sunlight dome (335) without any frame around it and can be bought sunlight (339) into the room. At the same time, a single pipe (337) can be used to bring air-in (336), flat cone shape sunlight collecting chimney extinction (338).

Referring now to FIG. 123, in and outside view of wall mount sunlight, air-in and out (exhaust) system. This figure shows how the cone chimney is modified as flat chimney (340) to mount it on the wall (FIG. 128, 355). This flat chimney is covered with a transparent fiber glass (344) to protect it from heat, air and rain. Next air-in (341, 342) and out are modified and attached to the pipe directly. Further, this figure also shows a circular (round) LED light (343) can combined (mounted on the sunlight dome) to use it when sunlight is not available.

Referring now to FIG. 124, in and outside view of wall mount sunlight, air-in and out (exhaust) system. This figure shows a modified air-in take (FIG. 123, 341, 342) is covered with a rain protector (343).

Referring now to FIG. 125, in and outside view of wall mount sunlight, air-in and out (exhaust) system. This figure shows how the modified exhaust pipe and fan (344) sent into the room (345) packing in single pipe.

Referring now to FIG. 126 wall mount sunlight and air ventilation and exhaust system inside view. This figure shows how the single pipe (347) bought all the pipes through the wall (346). The flat cone chimney pipe is to connect to the sunlight dome (348) and the LED light (349) is attached around the sunlight dome.

Referring now to FIG. 127, inside view of wall mount sunlight and air-in and out (exhaust) system. This figure shows all the parts of wall mount sun light and air-in and out system. You can see air-in (353), air out/exhaust (352). Next photodiode/dark sensor (351) arranged on both sides of the sunlight dome. Next, there is a local battery (354a) in a small shelf (354). This battery can be used to run the emergency heater or in case of arranging two three units, these batteries can be used as a main source with appropriate battery to support 24/7 with solar power.

Referring now to FIG. 128, back to top view of school wall mount sunlight and air ventilation and exhaust system. This figure shows a converted traditional school with mounted wall mounts sunlight and air-in and out system (355), large solar panel (356), slope roof top solar panel mounting frame come ventilators (358), and window mount flat cone chimney (359).

Referring now to FIG. 129, front view of window mount sunlight parts. This figure shows how a cone shape sunlight collecting chimney ((366) is modified (FIG. 131) to mount on window glass (365a). The flat chimney front part (FIG. 131, 369) collects sunlight which is falling on the window and directs into the second part (FIG. 131, 371) from there it will be sent into the room. If you need to control the entire window light which is entering inside to transfer to some other place (FIG. 137) you need to mount the flat chimney on both sides/up and down (FIG. 117, 324). This arrangement will allow you to collect more light form outside and distribute it thought the pipe (361). Both sides of these pipes can be closed with cap (364) or can be connected to the other pipe extension (362, FIG. 137, 387, 386). Next, around the inside dome you can mount the LED lights (360) to turn it on when the light intensity decreased with the help of photodiode/dark sensor (FIG. 127, 341). When the half of the window mounted the frame and the flat chimney rest of the window normally operated if it is properly planed. Therefore, you can open the glass (365a) whenever you want it.

Referring now to FIG. 130, front view of window mount sunlight parts. This figure shows how the complete modified window with SAVES looks like. In order to bring the air and send the air wherever you need, you need to drill and insert the air-in (368) and air-out (367) fan pipes on the wall directly.

Referring now to FIG. 131, sunlight collecting dual flat cones. Two flat cone chimneys (370, 371) are combined together. The cone chimney mounted on mirror (370) collects the light and the opposite chimney/dome let the light out.

Referring now to FIG. 132, internal view of sunlight collecting flat cone and extinction pipe joints. When you just want to use the flat chimneys to take the light to some other place, you can only use the one flat chimney and back side of it should be closed ((133, 375). So, the maximum light will be sent through the pipes (372). In order to support the frame and let the rest of window glass function uninterrupted both side supporting iron plates (373) will help.

Referring now to FIG. 133, front (internal) view of window mounts sunlight parts. The figure shows how the back part of the flat chimney is closed (375) to transfer the light though the pipes.

Referring now to FIG. 134, flat cone chimney parts. This figure shows, the two (378, 377) parts are combined together (FIG. 131) and can be mounted on the window wall (FIG. 130) when the light is controlled in the room. When the light needs to be transferred to another place (FIG. 137), only one cone chimney is mounted on the mirror (FIG. 132, FIG. 133).

Referring now to FIG. window inside front to top view. This figure shows completely closed light exit (379).

Referring now to FIG. 136, front to top view of a traditional home. This figure shows how a traditional home light and air circulation can be enhanced with the help of window/glass mount flat chimney (383), air-in and out (382, 381). Further, you can also see how the wall mount sunlight mounting frame come ventilator (380) is mounted.

Referring now to FIG. 137, top to internal view of home. This home's internal view shows how the window/mirror mount flat cone chimney can be used to (389) take the light into some other place where no natural light source is available. From the window pipes are connected and a joint (387) is used to turn the light and extinction pipe (386) is used to connect to the sunlight dome (384). Further, a LED light (385) is mounted around the sunlight dome. If required the sunlight also transferred to another side or into another room (391) through wall with the help of extinction pipe. In order to have good light intensity it is important to use the window which has more sunlight (388) and can have light all the day (389).

Referring now to FIG. 138, internal view of room, showing parts of roof top solar mounting frame parts. This figure shows how a roof top solar mounting frame come ventilator can be used to bring light through the extended pipe (392) and connected to multiple pipes (393, 393a, 393b, 396) to mount light exit dome on the top of sealing just like the light (394) modified with dark sensor (395) and LED Light. Further, you can mount the air-in (397) and air out fans.

Referring now to FIG. 139, a home front to top view which is in between two large apartments and has very less light source. This figure is the example and explains why the window mount flat chimney (399) is a good model to use where the homes has less light source in other rooms. Further, such homes can be modified by mounting air-in (401) and out (398) to circulate the air naturally and also use the fewer sources to mount the solar panels to produce the energy to run all the devises.

Referring now to FIG. 140, front to top view of modified flat roof with roof top, wall mount solar panel mounting frame come ventilators. This figure shows how the wall mount solar panel come ventilator (407) mounted on modern school building. In order to allow more sun light naturally the roof is elevated (404) above the hallways and across the hallways both sides large mirrors (405) mounted in between the mirrors on the walls air-in (408) and out (409) fans are mounted for natural air circulation. In the space of elevated roof (404) large solar panels (403) are mounted on stands. And in between the space of large solar panels roof top solar panel mounting frame come ventilators (402) are mounted. Further, on the top of the both sides of the elevated roof above the classrooms roof top solar panel come ventilators (402) are mounted in an order.

Referring now to FIG. 141, a NetZero school model top view. This figure shows how a modern school can be built in order to organize all the activities in an order and with clear monitoring opportunity to the administrator and the staff. Next, the classrooms (434, 35 and FIG. 140)4 are modified to have clear light and air at all the times during the instruction. Next, all the roofs and walls on all the buildings are mounted with solar panels using general solar panels. Next, student indoor activity places (417, 418) and for outdoor games and sports enough place is provided (426, 27, &28). For student outdoor activities and projects greenhouse (423) pond (424) and extra space (430) is provided. Next, in order to organize afterschool activities and monitor out posts or temporary office spaces are provided (422). After school programs parking space is provided separately (425) and the traffic is organized with internal ring road (420) and outer ring road (431).

I claim:

1. A solar mounting frame for a ventilator apparatus comprising:
   an adaptable solar mounting frame having four sides mounted to the ventilator apparatus;
   a side solar mounting frame having two L shaped angle rails to mount a solar panel;
   a first space disposed upon a top surface of the adaptable solar mounting frame configured to mount a transparent glass and a sunlight collection chimney;
   the transparent glass disposed on top of the solar mounting frame in the first space to allow the sunlight into a room; and
   a second space disposed upon a the top surface of the solar mounting frame configured to mount a shade insert;
   wherein the adaptable solar mounting frame is reconfigurable with the side solar mounting frame to create alternate shapes chosen from the group consisting of square, rectangle, triangle, diamond, and cone, and wherein the adaptable solar mounting frame comprises a single element;
   a secure hollow space defined within the adaptable solar mounting frame to mount an air and light circulating system and configured to help to filter, with an air filter, and carry air and light into a desired location in a building ;
   a light enhance system;
   a lighting control system;
   a heating and cooling control system, wherein the heating and cooling control system filters the air and regulates the temperature; and
   an air evacuation system.

2. The solar mounting frame of claim 1, wherein each side of the adaptable solar mounting frame comprises a slot to couple the solar panel.

3. The solar mounting frame of claim 1, further comprising:
   four light sensing lights which are disposed on each of the four sides of the adaptable solar mounting frame respectively and configured to switch on automatically when there is no sunlight and powered by the solar panel.

4. The solar mounting frame of claim 1, further comprising:
   an extension frame connected to the adaptable solar mounting frame.

5. The solar mounting frame of claim 1, further comprising:
   a wall mounting frame_connected to the adaptable solar mounting frame configured to be mounted on a wall; wherein the wall mounting frame has a right and left side wall in a rectangular shape and a front and back sidewall in a square shape and connected to the adaptable solar mounting frame.

6. The solar mounting frame of claim 1, wherein a side of the adaptable solar mounting frame comprises transparent glass.

7. The solar mounting frame of claim 1, further comprising:
   a power storage system, connected to the solar panel and configured to be utilized in a plurality of separate classrooms.

8. The solar mounting frame of claim 1, further comprising:
   a plurality of light sensing lights mounted within the adaptable solar mounting frame and configured to switch on automatically when there is no sunlight and being powered by the solar panel.

9. The solar mounting frame of claim 1, further comprising:
   a wiring system connected to the solar panel and configured to supply power from the solar panel.

\* \* \* \* \*